US012325164B2

(12) United States Patent
Niewels et al.

(10) Patent No.: US 12,325,164 B2
(45) Date of Patent: Jun. 10, 2025

(54) MOLDING APPARATUS AND METHODS

(71) Applicant: HUSKY INJECTION MOLDING SYSTEMS LTD., Bolton (CA)

(72) Inventors: Joachim Johannes Niewels, Thornton (CA); Adam Christopher Ulemek, Mississauga (CA); Peter Yankov, Bolton (CA); Sven Kmoch, Platten (DE); Ralf Walter Fisch, Saarburg (DE); Christophe Halter, Arlon (BE); Darrin Albert MacLeod, Jeffersonville, VT (US); Teng Guo, Richmond Hill (CA); Joaquim Martins Nogueira, Everett (CA)

(73) Assignee: Husky Injection Molding Systems Ltd., Bolton (CA)

( * ) Notice: Subject to any disclaimer, the term of this patent is extended or adjusted under 35 U.S.C. 154(b) by 126 days.

(21) Appl. No.: 17/723,583

(22) Filed: Apr. 19, 2022

(65) Prior Publication Data

US 2022/0332028 A1 Oct. 20, 2022

Related U.S. Application Data

(63) Continuation of application No. 17/269,571, filed as application No. PCT/CA2019/051205 on Aug. 29, 2019, now Pat. No. 11,518,077.

(Continued)

(51) Int. Cl.
*B29C 45/18* (2006.01)
*B29C 45/04* (2006.01)
(Continued)

(52) U.S. Cl.
CPC ........ *B29C 45/332* (2013.01); *B29C 45/0408* (2013.01); *B29C 45/0433* (2013.01);
(Continued)

(58) Field of Classification Search
CPC ............ B29C 45/0408; B29C 45/0433; B29C 45/1744; B29C 45/18; B29C 45/36; B29C 45/661; B29C 2045/662
(Continued)

(56) References Cited

U.S. PATENT DOCUMENTS

| | | | |
|---|---|---|---|
| 4,372,910 | A | 2/1983 | Stroup et al. |
| 4,528,150 | A | 7/1985 | Charlebois et al. |

(Continued)

FOREIGN PATENT DOCUMENTS

| | | | |
|---|---|---|---|
| CN | 204222080 | U | 9/2014 |
| CN | 206718334 | U | 12/2017 |

(Continued)

OTHER PUBLICATIONS

English translation of JP2965902B2 (Year: 1999).*

(Continued)

*Primary Examiner* — Christina A Johnson
*Assistant Examiner* — Xue H Liu
(74) *Attorney, Agent, or Firm* — Wolf, Greenfield & Sacks, P.C.

(57) ABSTRACT

A plastic molding system comprises: dispensing, pre-shaping and shaping cells and a transport subsystem. The dispensing cell has a station for dispensing a dose of plastic feedstock. The pre-shaping and shaping cells each comprise a plurality of stations for shaping the workpiece into a preform shape and into a final shape, respectively. The transport subsystem advances a workpiece along a selected one of a plurality of process paths to form a molded article. Each of the plurality of process paths is defined by a combination of stations of the dispensing cell, the pre-shaping cell and the shaping cell.

27 Claims, 127 Drawing Sheets

Related U.S. Application Data

(60) Provisional application No. 62/866,059, filed on Jun. 25, 2019.

(51) Int. Cl.

| | |
|---|---|
| ***B29C 45/17*** | (2006.01) |
| ***B29C 45/26*** | (2006.01) |
| ***B29C 45/33*** | (2006.01) |
| ***B29C 45/36*** | (2006.01) |
| ***B29C 45/66*** | (2006.01) |
| *B29K 105/00* | (2006.01) |

(52) U.S. Cl.

CPC .......... *B29C 45/1744* (2013.01); *B29C 45/18* (2013.01); *B29C 45/261* (2013.01); *B29C 45/36* (2013.01); *B29C 45/661* (2013.01); *B29C 2045/363* (2013.01); *B29C 2045/662* (2013.01); *B29K 2105/258* (2013.01)

(58) Field of Classification Search

USPC ...................................................... 425/436 R

See application file for complete search history.

(56) References Cited

U.S. PATENT DOCUMENTS

| | | | | |
|---|---|---|---|---|
| 4,880,372 | A | 11/1989 | Keida | |
| 5,468,443 | A | 11/1995 | Takada | |
| 6,030,203 | A | 2/2000 | Kuroda | |
| 6,241,932 | B1 | 6/2001 | Choi et al. | |
| 6,428,304 | B1 | 8/2002 | Sartor et al. | |
| 6,637,497 | B2 | 10/2003 | Herron | |
| 9,056,416 | B2 | 6/2015 | Ikeda et al. | |
| 9,211,671 | B2 | 12/2015 | Voth et al. | |
| 9,272,453 | B1 * | 3/2016 | Keir | B29C 45/2711 |
| 2004/0187444 | A1 | 9/2004 | Hutchinson et al. | |
| 2005/0184434 | A1 | 8/2005 | Akopyan | |
| 2014/0117571 | A1 | 5/2014 | Howe et al. | |
| 2015/0068958 | A1 | 3/2015 | Tanner | |

FOREIGN PATENT DOCUMENTS

| | | | |
|---|---|---|---|
| DE | 102010014920 | B4 | 5/2014 |
| EP | 2052842 | A1 | 4/2009 |
| JP | S6225023 | A | 2/1987 |
| JP | 63147621 | A | 6/1988 |
| JP | S63128909 | A1 | 6/1988 |
| JP | H05301275 | A1 | 11/1993 |
| JP | H10235701 | A | 9/1998 |
| JP | 2965902 | B2 | 10/1999 |
| JP | 2001225328 | | 8/2001 |
| JP | 2013237226 | A1 | 11/2013 |
| JP | 2015063011 | A1 | 4/2015 |
| WO | 2004060748 | A1 | 7/2004 |
| WO | 2017099720 | A1 | 6/2017 |
| WO | 2018081946 | A1 | 5/2018 |

OTHER PUBLICATIONS

On the Fast Track Arup's New and Novel Automation System, Arup Laboratories Jun. 22, 2015.

Carmen Klinger-Deiseroth, Intelligent Transport for Production Lines, ABB Review, Jul. 18, 2018.

* cited by examiner

MOLDING APPARATUS AND METHODS

RELATED APPLICATIONS

This application is a continuation of U.S. patent application Ser. No. 17/269,571, filed Aug. 29, 2019, and claims priority from U.S. Provisional patent application 62/724,790, filed Aug. 30, 2018, U.S. Provisional Patent Application 62/770,785, filed Nov. 22, 2018, U.S. Provisional patent application No. 62/856,833, filed Jun. 4, 2019, and U.S. Provisional patent application No. 62/866,059, filed Jun. 25, 2019, the disclosures of which are incorporated herein by reference.

TECHNICAL FIELD

This relates to molding, and more particularly, to molding systems defining multiple selectable process paths through process cells.

BACKGROUND

Many plastic molding systems are optimised for production of products in very large quantities. Such systems typically involve complex, multi-cavity molds for production of multiple identical parts simultaneously in each molding cycle.

Successful operation of such processes typically requires extensive custom tooling. For example, multi-cavity molds are custom designed and fabricated for each unique type of part to be produced. Complex melt control mechanisms are required to melt and thermally control molding material, and deliver molten material to each cavity. Molding material is therefore flowed through a fixed conduit to a mold.

While these systems are capable of producing large volumes of products at relatively low per-unit costs, they tend to be less cost-effective for smaller-quantity runs of products, and provide very little flexibility, as product changes generally cannot be made without significant revision or replacement of tooling.

SUMMARY

An example method for use in molding articles comprises: moving a vessel for holding molten molding material along a track to a molten molding material dispensing cell; dispensing a flowable molten molding material to the vessel at the molten molding material dispensing cell; following the dispensing, moving the vessel along the track to a molding cell; at the molding cell, injecting the molten molding material from the vessel to a molder of the molding cell.

In some embodiments, the molding cell has a plurality of molders and the method further comprises, prior to the injecting the molten molding material from the vessel to the molder, selecting the molder from amongst the plurality of molders dependent upon a characteristic of the molten molding material dispensed to the vessel at the molten molding material dispensing cell.

In some embodiments, the characteristic is a volume of the molten molding material dispensed to the vessel.

In some embodiments, the vessel is one of a plurality of vessels and the method further comprises: tracking a position of each vessel.

In some embodiments, the molten molding material dispensing cell has a plurality of dispensers, and the molding cell has a plurality of molders further comprises: moving the each vessel to a selected dispenser of the molten molding material dispensing cell to receive molten molding material, and moving the each vessel to a selected molder of the molding cell dependent upon a characteristic of molten molding material dispensed to the each vessel.

In some embodiments, the characteristic is a composition of the molding material.

In some embodiments, the composition comprises a colorant.

In some embodiments, the composition is a thermoplastic or a thermoset plastic resin.

In some embodiments, the method further comprises, following the injecting the molten molding material to the molder, returning the vessel along a return line of the track back toward the molten molding material dispensing cell.

In some embodiments, the method further comprises, following injecting the molten molding material from each the vessel, returning each the vessel along a return line of the track back toward the molten molding material dispensing cell.

In some embodiments, the selected dispenser is selected based on the characteristic of molten molding material dispensed to the each vessel when the each vessel was previously at the molten molding material dispensing cell.

In some embodiments, the method further comprises transferring articles molded at the molding cell to the return line of the track.

In some embodiments, the method further comprises transferring articles on the return line of the track to selected blow molders of a blow molding cell dependent upon the characteristic of molten molding material.

In some embodiments, the track comprises two carriages and the method further comprises: bringing the two carriages together to trap the vessel between the carriages; and subsequently maintaining the two carriages together while moving the two carriages along the track in order to convey the vessel along the track.

In some embodiments, the method further comprises gripping the vessel with grippers, thereafter separating the two carriages to release the vessel from the track, and thereafter manipulating the vessel with the grippers.

In some embodiments, the method further comprises, upstream of the molten molding material dispensing cell, swapping the vessel for another vessel.

In some embodiments, the vessel has a piston and wherein the injecting comprises moving the piston.

An example system for use in molding articles comprises: a track; a plurality of vessels carried on the track; at least one molten molding material dispenser along the track; at least one molder along the track; and a controller operatively associated with the track for selectively moving each vessel along the track (i) to a given dispenser of the at least one molten molding material dispenser whereat flowable molten molding material is dispensed to the each vessel and (ii) to a given molder of the at least one molder whereat molten molding material is dispensed from the each vessel.

In some embodiments, the system comprises a position sensor interconnected with the controller for tracking a position of the each vessel.

In some embodiments, the at least one dispenser comprises a plurality of dispensers and the at least one molder comprises a plurality of molders, and wherein the controller is configured to select the given molder from the plurality of molders dependent upon a characteristic of molding material dispensed to the each vessel at the given dispenser.

In some embodiments, the track has an outgoing line for carrying the vessels to the at least one molten molding material dispenser and to the at least one molder, and a return line for returning the vessels back toward the at least one molten molding material dispenser.

In some embodiments, the system further comprises a transfer device for transferring articles molded at the given molder to the return line.

In some embodiments, the transfer device is a first transfer device and the system further comprises at least one blow molder along the return line and a second transfer device to transfer the articles on the return line to a given blow molder of the at least one blow molder.

In some embodiments, the return line is parallel to the outgoing line.

In some embodiments, the track comprises a plurality of pairs of carriages, two carriages of each pair of carriages having complementary features for trapping the each vessel between the two carriages when the two carriages are brought together, the controller further operable to selectively bring the two carriages together and to move the two carriages while together in order to move the each vessel on the track.

In some embodiments, the track comprises a plurality of pairs of carriages, two carriages of each pair of carriages having complementary features for trapping at least one of the each vessel or an article of the articles between the two carriages when the two carriages are brought together, the controller further operable to selectively bring the two carriages together and to move the two carriages while together in order to move the each vessel or the article along the track.

In some embodiments, the system further comprises a pair of spring loaded grippers mounted for reciprocal movement transversely of the track such that the grippers may be extended toward the track to deflect around and grip a given the each vessel trapped by the two carriages.

In some embodiments, the each vessel has an identifier and the system further comprises a reader for reading the identifier of the each vessel, and wherein the controller is operatively associated with an output of the reader.

In some embodiments, the system further comprises a shunt line mounted for movement between a first position coupled to an end of the outgoing line and a second position coupled to an end of the return line in order to shunt the vessels from the outgoing line to the return line.

In some embodiments, the return line is parallel to the outgoing line and one of the outgoing line and the return line is directly above another of the outgoing line and the return line.

In some embodiments, the system further comprises at least one vessel re-ordering device upstream of the at least one molten molding material dispenser, the at least one re-ordering device comprising a reciprocal turntable with a plurality of vessel grippers.

In some embodiments, the characteristic is a composition of the molding material.

In some embodiments, the composition is a thermoplastic or a thermoset plastic resin.

An example plastic molding system comprises: a feedstock cell comprising a feedstock station for depositing plastic feedstock into a vessel, deposited plastic feedstock defining a workpiece; a pre-shaping cell comprising a plurality of pre-shaping stations each for shaping a given workpiece into a preform shape by injection into a pre-shaping mold; a shaping cell comprising a plurality of shaping stations each for shaping one workpiece from the preform shape to a final shape in a mold; a transport subsystem for advancing each workpiece along a selected one of a plurality of process paths to form a molded article from the each workpiece, wherein multiple ones of the process paths are defined by a combination of the feedstock station, a pre-shaping station of the pre-shaping cell and a shaping station of the shaping cell.

In some embodiments, the feedstock cell is a dispensing cell and wherein the feedstock station is a dispensing station for dispensing a dose of plastic feedstock defining each the workpiece.

In some embodiments, the dispensing cell comprises a plurality of dispensing stations, and wherein each of the plurality of process paths includes one the dispensing station.

In some embodiments, the system further comprises a thermal conditioning cell for producing a desired thermal profile in each the workpiece between the primary and secondary shaping cells.

In some embodiments, the plurality of process paths comprise a first process path for producing first molded articles having a first characteristic and a second process path for producing second molded articles having a second characteristic different from the first characteristic.

In some embodiments, the characteristic comprises a shape.

In some embodiments, each the pre-shaping station comprises an injection molding apparatus and each the shaping station comprises a blow molding apparatus.

In some embodiments, each the dispensing station comprises an extruder for dispensing the plastic feedstock as molten plastic.

In some embodiments, the system comprises a post-shaping cell for performing a finishing operation on the workpiece in the final shape.

In some embodiments, the workpiece in the final shape is a bottle and the post-shaping cell comprises a filling station.

In some embodiments, the post-shaping cell comprises a labelling station.

In some embodiments, the post-shaping cell comprises a capping station.

An example plastic molding system for a process comprising dispensing and shaping operations, comprises: a dispensing cell comprising a dispensing mechanism for dispensing doses of a plastic feedstock into vessels to create workpieces; a shaping cell comprising a plurality of shaping stations, each shaping station having a mold for receiving the plastic feedstock from a vessel and for forming the workpiece into a desired shape; and a transport subsystem for advancing each the workpiece along a selected one of a plurality of possible process paths through each of the dispensing cell and the shaping cell, to form a molded article from the each workpiece, wherein multiple ones of the possible process paths are defined by a combination of the dispensing mechanism and different ones of the plurality of shaping stations.

In some embodiments, the system comprises a conditioning cell comprising a plurality of conditioning stations, each for applying a treatment to one workpiece prior to processing of the one the workpiece in the shaping cell, and wherein each of the possible process paths includes one of the conditioning stations.

In some embodiments, the conditioning cell is configured under computer control to apply the treatment.

In some embodiments, the dispensing cell comprises a plurality of dispensing mechanisms, and wherein each of the possible process paths includes one the dispensing mechanism.

In some embodiments, the dispensing cell is for dispensing individual doses of the plastic feedstock, each to form a single molded article.

In some embodiments, each of the possible process paths includes a different combination of one the dispensing mechanism, and one the shaping station.

In some embodiments, the plurality of possible process paths comprise a first process path for producing first molded articles having a first characteristic and a second process path for producing molded articles having a second characteristic different from the first characteristic.

In some embodiments, the characteristic comprises a shape.

In some embodiments, the shaping cell is a primary shaping cell and each shaping station is a primary shaping station for performing a primary shaping operation to form a pre-shaped article, and the system further comprises a secondary shaping cell for performing a secondary shaping operation to form each the molded article by re-shaping each the pre-shaped article.

In some embodiments, each the primary shaping station comprises an injection molding apparatus and wherein the secondary shaping cell comprises a plurality of secondary shaping stations each comprising a blow molding apparatus.

In some embodiments, the dispensing cell comprises an extruder for dispensing the plastic feedstock as molten plastic.

In some embodiments, the transport subsystem comprises a guide mechanism and the plurality of process paths are at least partially defined by the guide mechanism.

In some embodiments, the guide mechanism comprises a loop and a plurality of branches each connecting stations of the cells with the loop.

In some embodiments, the guide mechanism comprises a track and a carriage mounted for movement on the track.

In some embodiments, the guide mechanism comprises a plurality of carriages, and the transport subsystem comprises a plurality of diverting devices for selectively initiating directional change of the carriages to individual stations of the cells.

In some embodiments, the primary shaping cell is for performing a primary shaping operation to form a pre-shaped article, and the transport subsystem comprises a plurality of pre-shape carriages mounted for movement along the track, for receiving pre-shaped articles from the primary shaping cell and carrying the pre-shaped articles to a subsequent processing station.

In some embodiments, the system comprises a post-shaping cell for performing a finishing operation on the workpiece in the final shape.

In some embodiments, the workpiece in the final shape is a bottle and the post-shaping cell comprises a filling station.

In some embodiments, the post-shaping cell comprises a labelling station.

In some embodiments, the post-shaping cell comprises a capping station.

An example method of molding plastic articles in a molding system comprising a plurality of feedstock providing stations and a plurality of shaping stations, comprises: forming a first molded article by conveying a first quantity of feedstock through the molding system in a first process path, wherein the conveying comprises moving the first quantity in a vessel; and forming a second molded article by conveying a second quantity of feedstock through the molding system in a second process path different from the first process path and partially overlapping with the first process path, wherein the conveying comprises moving the second quantity in a further vessel; wherein each of the first process path and the second process path includes a feedstock providing station of the plurality of feedstock providing stations and a shaping station of the plurality of shaping stations.

In some embodiments, the molding system comprises at least one conditioning station and each of the first process path and the second process path includes one the dose dispensing station, one the shaping station, and one the conditioning station.

In some embodiments, the shaping stations are primary shaping stations and each of the first process path and the second process path includes one the dispensing station, a primary shaping station, one the conditioning station and a secondary shaping station.

In some embodiments, the first process path includes a first shaping station and the second process path includes a second shaping station different from the first shaping station.

In some embodiments, the conveying the first dose of feedstock comprises dispensing the first dose of feedstock into a first vessel and the conveying the second dose of feedstock comprises dispensing the second dose of feedstock into a second vessel.

In some embodiments, the conveying the first dose of feedstock comprises dispensing the first dose from a first dispensing station and the conveying the second dose of feedstock comprises dispensing the second dose from a second dispensing station different from the first dispensing station.

In some embodiments, the first molded article and the second molded article have different shapes.

In some embodiments, the first molded article and the second molded article have different sizes.

In some embodiments, the first molded article and the second molded article are formed of different materials.

In some embodiments, each one of the first process path and the second process path includes an injection molding apparatus and a blow molding apparatus.

In some embodiments, the conveying the first dose of feedstock and conveying the second dose of feedstock comprises conveying carriages along a track.

In some embodiments, the conveying the first dose of feedstock and conveying the second dose of feedstock comprises operating a diverting device to initiate a change in direction from a track loop towards individual ones of the shaping stations.

In some embodiments, the molding system comprises a post-shaping station and the method further comprises performing a finishing operation in the post-shaping station.

In some embodiments, the finishing operation comprises filling.

In some embodiments, the finishing operation comprises labeling.

In some embodiments, the finishing operation comprises capping.

An example method for use in molding articles comprises: dispensing a dose of molten plastic material into a vessel; moving the vessel with the dose therein to a selected forming station of a plurality of available forming stations; transferring the dose of molten material from the vessel to a forming apparatus at the selected forming station; forming a molded article from the dose in the forming apparatus.

In some embodiments, the molded article is a pre-shaped molded article and the method further comprises moving the pre-shaped molded article to a finishing station of a plurality of available finishing stations and forming a finished molded article from the pre-shaped molded article at the finishing station.

An example system for molding articles comprises: means for dispensing a dose of molten plastic material into a vessel; means for moving the vessel with the dose therein to a selected forming station of a plurality of available forming stations; means for transferring the dose of molten material from the vessel to a forming apparatus at the selected forming station; means for forming a molded article from the dose in the forming apparatus.

In some embodiments, the means for dispensing comprises a plurality of dispensers, each for dispensing a molten plastic material having a different composition.

An example apparatus for transporting molten molding material comprises: a vessel having an internal cavity for receiving the molten molding material through an orifice and preventing flow of the material during transport; a coupling assembly for selectively mating to a processing station to transfer molding material; an ejection mechanism operable to force the molten molding material out of the vessel.

In some embodiments, the ejection mechanism comprises a piston received in the cavity.

In some embodiments, the vessel comprises an orifice for receiving the molding material from a melter, and the coupling assembly comprises a seal assembly for selectively sealing the orifice.

In some embodiments, the orifice is a filling orifice for mating to a melter to receive the molten molding material, and an ejection orifice for mating to a mold to force the molten molding material from the vessel into the mold.

In some embodiments, the apparatus comprises a thermal regulating assembly on the container for controlling a thermal profile of the molten molding material.

In some embodiments, the thermal regulating assembly comprises an insulator.

In some embodiments, the thermal regulating assembly comprises a heat sink.

In some embodiments, the thermal regulating assembly comprises a sleeve around the vessel.

In some embodiments, the thermal regulating assembly includes a heating element.

In some embodiments, the coupling assembly is a seal assembly for selectively sealing the orifice.

In some embodiments, the seal assembly includes a valve stem.

In some embodiments, the valve stem extends along an axis of the vessel, within the internal cavity.

In some embodiments, the seal assembly comprises a sliding gate.

In some embodiments, the vessel is configured to releasably engage with a transport device, for movement of the vessel relative to a processing station.

In some embodiments, the vessel comprises a handling feature for releasably securing the vessel to a transport device.

In some embodiments, the transport device comprises a guide and the handling feature comprises an adapter configured to engage the vessel and the guide.

In some embodiments, the seal assembly is part of the adapter.

An example method of transporting molten molding material comprises: receiving molten molding material in an internal cavity of a vessel through an orifice; moving the vessel along a transport path; preventing flow of the material during the moving; mating the vessel with a mold; transferring the molten molding material to the mold by forcing the molten molding material out of the vessel.

In some embodiments, forcing the molten molding material out of the vessel comprises moving a piston in the internal cavity.

In some embodiments, the preventing flow comprises sealing the orifice.

In some embodiments, the transferring comprises forcing material out of the vessel through the orifice.

In some embodiments, the method comprises regulating heat transfer with the vessel.

In some embodiments, the regulating heat transfer comprises insulating the vessel to regulate heat loss.

In some embodiments, the regulating heat transfer comprises removing heat from the vessel with a heat sink.

In some embodiments, the regulating heat transfer comprises introducing heat to the vessel with a heating element after the receiving.

In some embodiments, the method comprises releasably engaging the vessel with a transport device for the moving.

In some embodiments, the transport device comprises a guide and the releasably engaging comprises attaching the vessel to the guide with an adapter.

In some embodiments, the method comprises sealing the orifice with the adapter.

An example apparatus for transferring a flowable molding material between a container and a processing station comprises: a holder for supporting a container having an internal cavity for holding flowable molding material, the holder comprising a nest configured to matingly receive the container; a coupling device for selectively engaging the container with the processing station, to thereby establish a flow path for the flowable molding material between the container and the processing station; a flow actuator for causing flow of the flowable molding material through the flow path.

In some embodiments, the nest comprises an interlocking feature for maintaining a position of the container.

In some embodiments, the apparatus comprises a locking actuator for biasing the container against the interlocking feature.

In some embodiments, the apparatus comprises a seal actuator for operating a seal of the container.

In some embodiments, the seal actuator is in a nested relationship with one or more of the flow actuator and the locking actuator.

In some embodiments, the holder comprises a triggering structure for releasing a seal of the container.

In some embodiments, the triggering structure comprises a guide and the releasing a seal comprises receiving a locking projection in the guide and moving the locking projection as it traverses the guide.

In some embodiments, the processing station comprises a dispensing station for transferring the flowable molding material to the container.

In some embodiments, the processing station comprises an injection molding station and the flow actuator is operable to force the flowable molding material from the container to the mold by displacement of a piston.

BRIEF DESCRIPTION OF DRAWINGS

In the drawings, which depict example embodiments.

DETAILED DESCRIPTION

Figure 1:
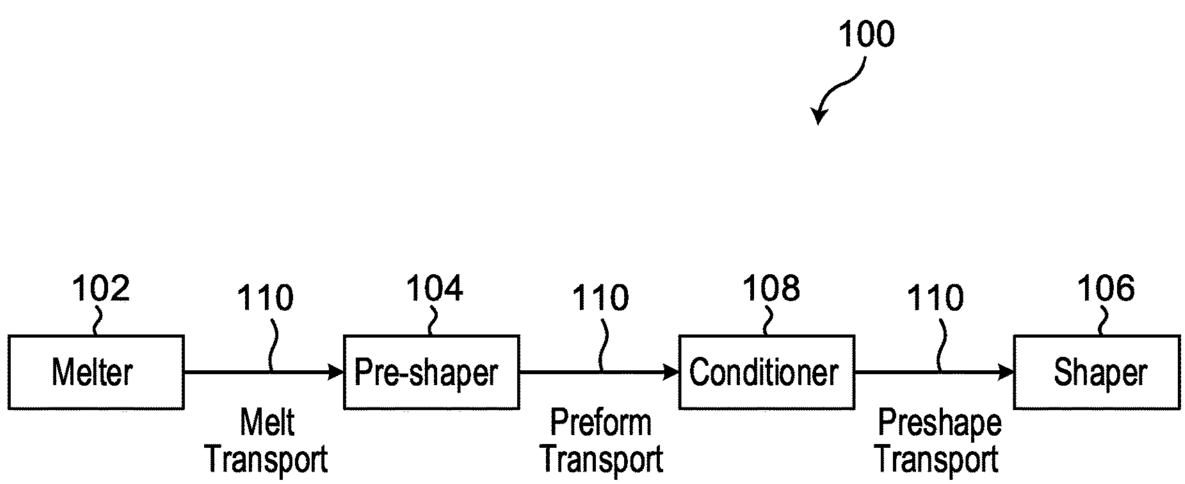
FIG. 1 is a schematic diagram of a molding system.

FIG. 1 schematically depicts an example plastic molding system 100 for producing plastic molded articles. As described in further detail below, plastic molding system 100 is capable of carrying out molding processes comprising dispensing, conditioning and shaping operations.

Plastic molding system 100 includes a plurality of process cells, each including one or more process stations at which an operation of a molding process can be performed. Specifically, the depicted embodiment comprises a dispensing cell 102, shaping cells 104, 106 and a conditioning cell 108. Other embodiments may include more or fewer cells and carry out molding processes with more or fewer process steps. Alternatively or additionally, plastic molding system 100 may include cells for other operations. For example, plastic molding system 100 may include cells for post-molding operations such as container filling, labelling or capping.

The process cells of plastic molding system 100 are connected by a transport subsystem 110.

Any of process cells 102, 104, 106, 108 may have more than one station of a given type. Transport subsystem 110 selectively connects stations of the process cells to one another. Transport subsystem 110 is configurable to define multiple possible process paths through process cells of molding system 100. For example, transport subsystem 110 may be capable of transporting an article from a given station in one process cell 102, 104, 106, 108, to a selected one of a plurality of possible stations in a another process cell 102, 104, 106, 108.

Figure 2:
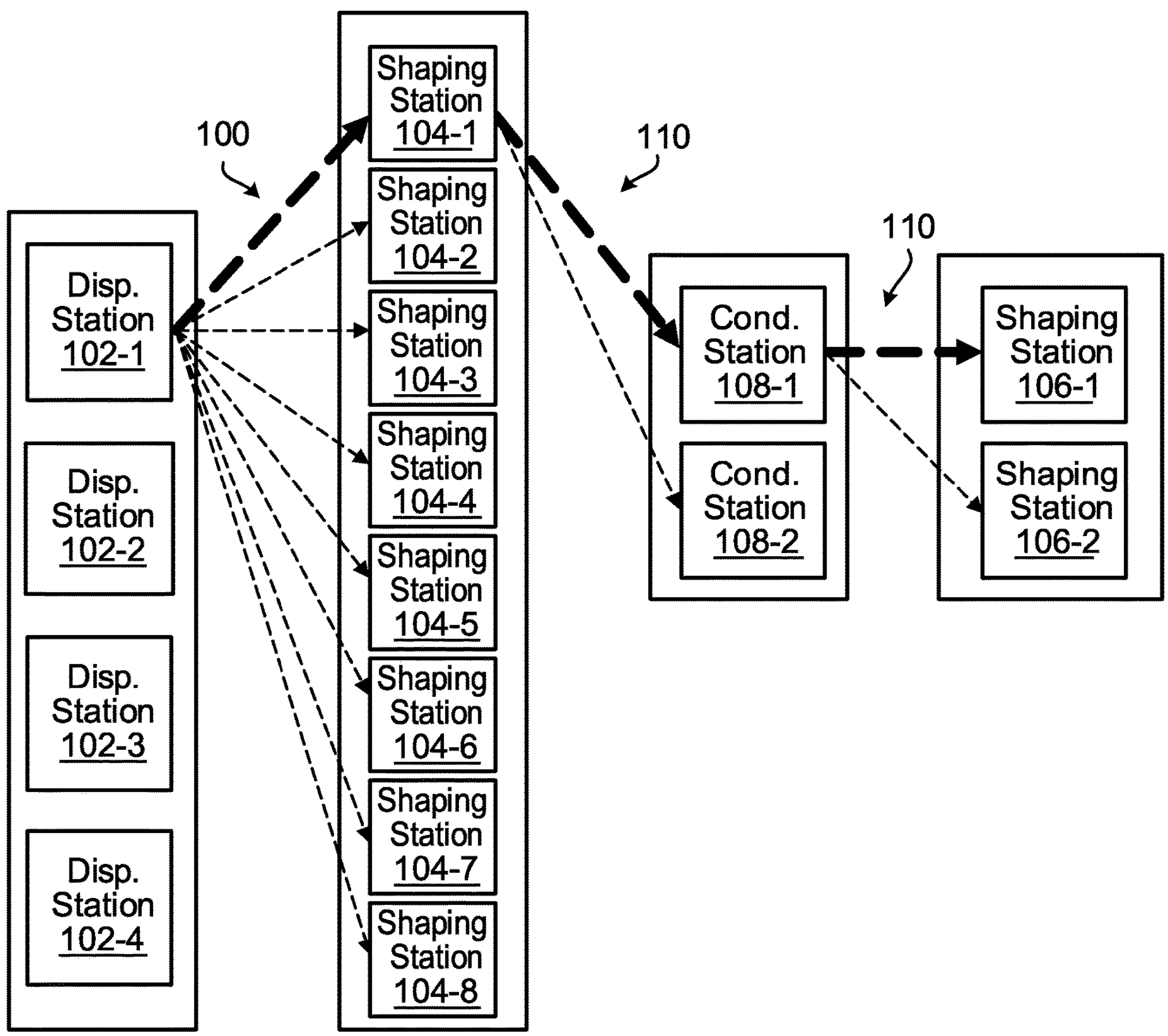
FIG. 2 is a schematic diagram of a molding system with process cells defining multiple paths through the system.

FIG. 2 schematically depicts an example embodiment with a dispensing cell 102 having 4 dispensing stations 102-1, 102-2, 102-3, 102-4; a shaping cell 104 having 8 shaping stations 104-1, 104-2, 104-3, 104-4, 104-5, 104-6, 104-7, 104-8; a shaping cell 106 having 2 shaping stations 106-1, 106-2; and a conditioning cell 108 having 2 conditioning stations 108-1, 108-2.

In the embodiment of FIG. 2, transport subsystem 110 is capable of connecting any of dispensing stations 102-1, 102-2, 102-3, 102-4 to any of shaping stations 104-1, 104-2, . . . 104-8; and of connecting any of shaping stations 104-1, 104-2, . . . 104-8 to any of conditioning stations 108-1, 108-2; and of connecting any of conditioning stations 108-1, 108-2 to any of shaping stations 106-1, 106-2. Thus, numerous possible paths are defined through molding system 100. As depicted, there exist 128 unique combinations of one dispensing station 102, one shaping station 104, one conditioning station 108 and one shaping station 106 and each unique combination corresponds to a possible path. In some embodiments, one or more of the process cells may be omitted from some paths, such that additional paths are possible. For example, conditioning at conditioning cell 108 or shaping at shaping cell 106 may not be required in all instances.

In other embodiments, more or fewer stations may be present in each process cell, and more or fewer paths through the molding system may be possible.

In some embodiments, process cells or stations of process cells may be physically separated from one another. Transport subsystem 110 may include apparatus for moving molding material through space between process cells or stations thereof. The apparatus may include one or both of vessels 124 (FIGS. 6A-6B) for holding molding material and carriers 125 (FIG. 7) for moving the vessels through space, e.g. along a guide or track, between the process cells or stations. In the embodiment described in detail herein, the vessel is selectively coupled to the carrier such that the vessel may be coupled and decoupled to the carrier at one or more process stations. In another embodiment, not shown, the vessel could otherwise be fixed to the carrier and the process stations configured to accommodate the vessel that remains connected with the carrier. In either case, the vessel may be thermally insulated from the carrier.

In the depicted embodiment, shaping cell 104 contains injection molding stations and shaping cell 106 contains blow molding stations. Conditioning cell 108 contains stations for thermally conditioning articles to prepare for blow molding. For example, injection molded articles formed at shaping cell 104 may cool after molding and be subsequently warmed to a temperature suitable for blow molding. Alternatively or additionally, stations of conditioning cell 108 may be configured to create a specific desired thermal profile in an article. For example, some shaping operations may call for an input article having a non-uniform temperature distribution. Stations of conditioning cell 108 may generate such temperature distribution by selectively heating specific regions, with or without a net transfer of heat into or out of the article. In some embodiments, articles may experience a net loss of heat in conditioning cell 108, despite warming of specific regions. Thus, stations of conditioning cell 108 may achieve thermal profiles not easily achieved by heat input at the dispensing cell 102.

As explained in further detail below, each station may have identical or unique characteristics. For example, the dispensing stations of dispensing cell 102 may each be configured to dispense the same or a different feedstock (e.g. a different material and/or colour). The shaping stations of shaping cells 104, 106 may be configured to mold articles having identical or different shapes, features or the like. The conditioning stations of conditioning cell 108 may each be configured to condition parts in common or to a different state. Accordingly, molding system 100 may be configured so that it is simultaneously capable of producing up to 128 identical or unique parts at any time. Alternatively or additionally, molding system 100 may be configured so that identical parts may be produced on multiple paths. For example, a single dispensing station can produce shots of feedstock to feed multiple stations of shaping cells 104, 106. In some embodiments, cells can be rapidly reconfigured. Accordingly, the number of system resources being used to produce parts of a given type may vary.

Each unique path through molding system 100 includes a unique combination of selected stations of dispensing cell 102, shaping cells 104, 106 and possibly other process cells such as, for example, the conditioning cell 108. Likewise, each unique combination of stations may produce finished articles with identical or unique characteristics. For example, different stations of dispensing cell 102 may produce articles having different colour material type or weight. Different stations of shaping cells 104, 106 may produce articles having different shapes. Different stations of conditioning cell 108 may produce articles having different shapes or other characteristics.

Figure 3:
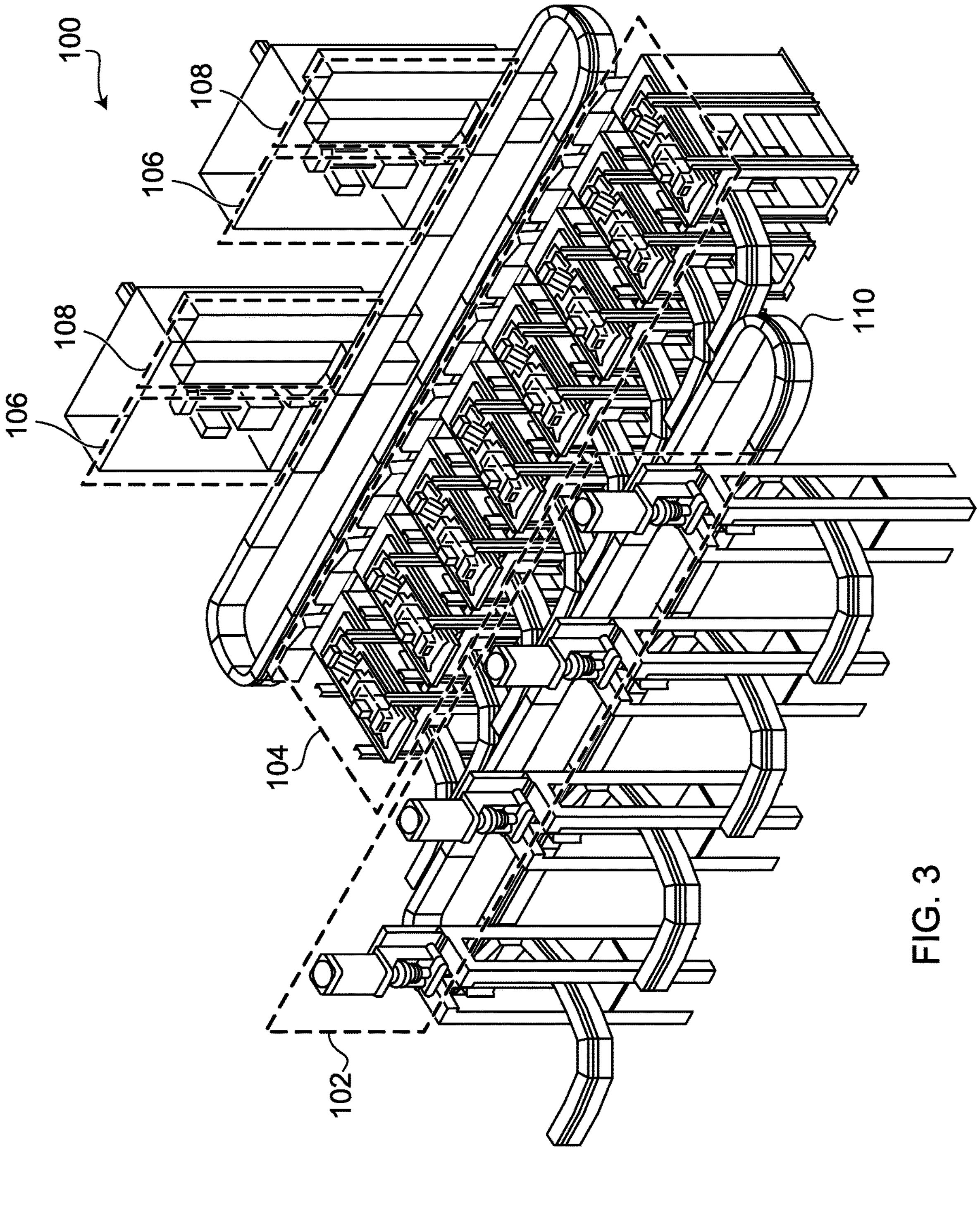
FIG. 3 is an isometric view of a molding system.

FIG. 3 is a perspective view of molding system 100. In the depicted embodiment, molding system 100 is for forming hollow plastic articles such as bottles or other containers. Molding system 100 has two shaping cells. Specifically, shaping cell 104 is an injection molding cell for molding a dose of feedstock material into a molded preform shape. Shaping cell 106 is a blow-molding cell (specifically, a stretch blow-molding cell) for transforming a preform of a particular shape into a finished hollow container of another, (e.g. a further-expanded) shape. Conditioning cell 108 prepare in-progress articles for operations performed at a shaping cell. Transport subsystem 110 links stations of the respective cells 102, 104, 106, 108. Links between cells are flexible. For example, in some embodiments, transport subsystem 110 links every station of each cell to every station of the neighboring cells. In other examples, some or all stations in a given cell are each linked to a plurality of stations in a neighboring cell. In some examples, some stations may be linked to stations of neighboring cells in a 1:1 manner. For instance, in the embodiment of FIG. 3, each station of dispensing cell 102 is linked to a plurality of stations of shaping cell 104, and each station of shaping cell 104 is linked to a plurality of stations of conditioning cell 108. However, each station of conditioning cell 108 is linked to one corresponding station of shaping cell 106.

Feedstock Dispensing

With primary reference to FIGS. 4A-4S, details of an example dispensing cell 102 will now be described.

Each station 102-1, 102-2, 102-3, 102-4 of dispensing cell 102 comprises one or more devices for melting a feedstock such as a plastic feedstock and for transferring the feedstock. In the depicted embodiment, the dispensing devices output molding material in doses of a specific size. However, in other embodiments, the dispensing devices may simply perform bulk transfer of molding material, without precise metering of dose size.

In the depicted embodiment, each station of dispensing cell 102 comprises an extruder 112. However, other types of dispensing devices are possible. For example, melting and dispensing doses of feedstock may be accomplished by use of a conduction melter. In the depicted example, extruders 112 receive feedstock material in the form of polyethylene terephthalate (PET) pellets. However, other feedstock materials and other forms are possible. For example, feedstock may be provided as a filament (e.g. on a spool), or as bars or blocks.

Extruders 112 may dispense different feedstock materials. In some examples, extruders 112 may dispense feedstock materials in differing volume, colors, different material types or grades, or at different temperatures. In some embodiments, extruders may be capable of dosing or blending additives, such as dyes or oxygen scavenging agents, into the feedstock material. In some embodiments, extruders 112 may be of different sizes, or may be configured to dispense feedstock at different rates or in different dose sizes. For example, system 100 may be set up to form containers of different size, with each extruder 112 being configured to dispense feedstock in doses corresponding to a specific size.

Figure 4A:
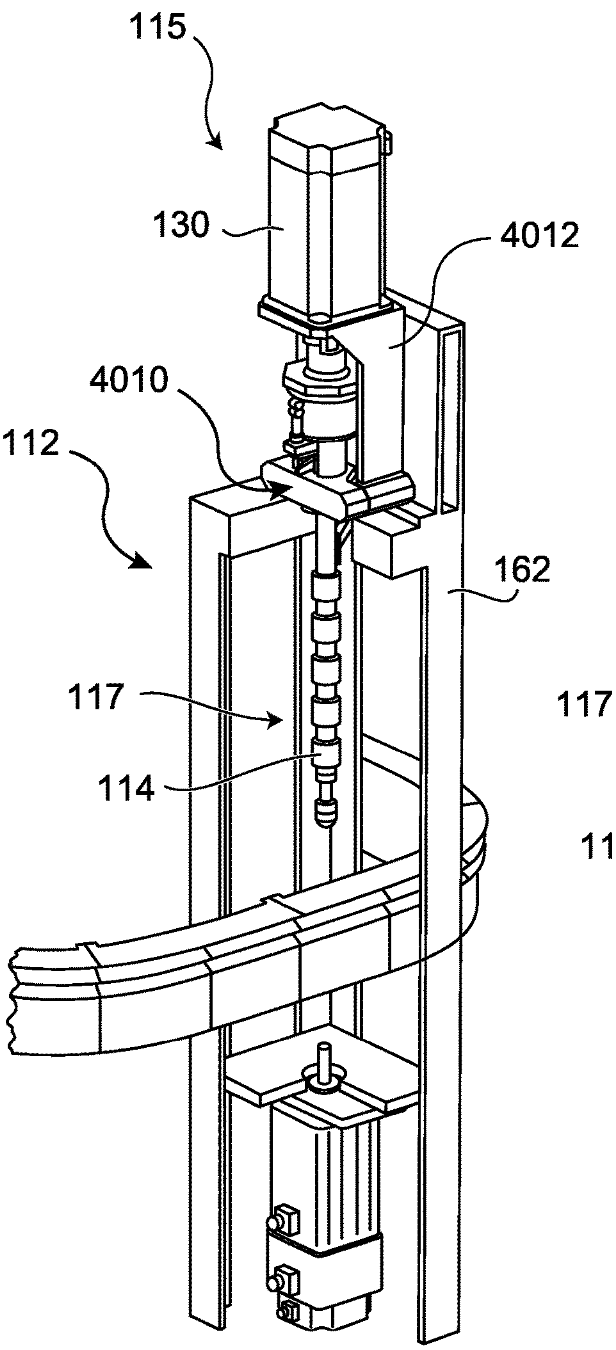
FIG. 4A-4B are isometric views of a dispensing station of the system of FIG. 3.
Figure 4B:
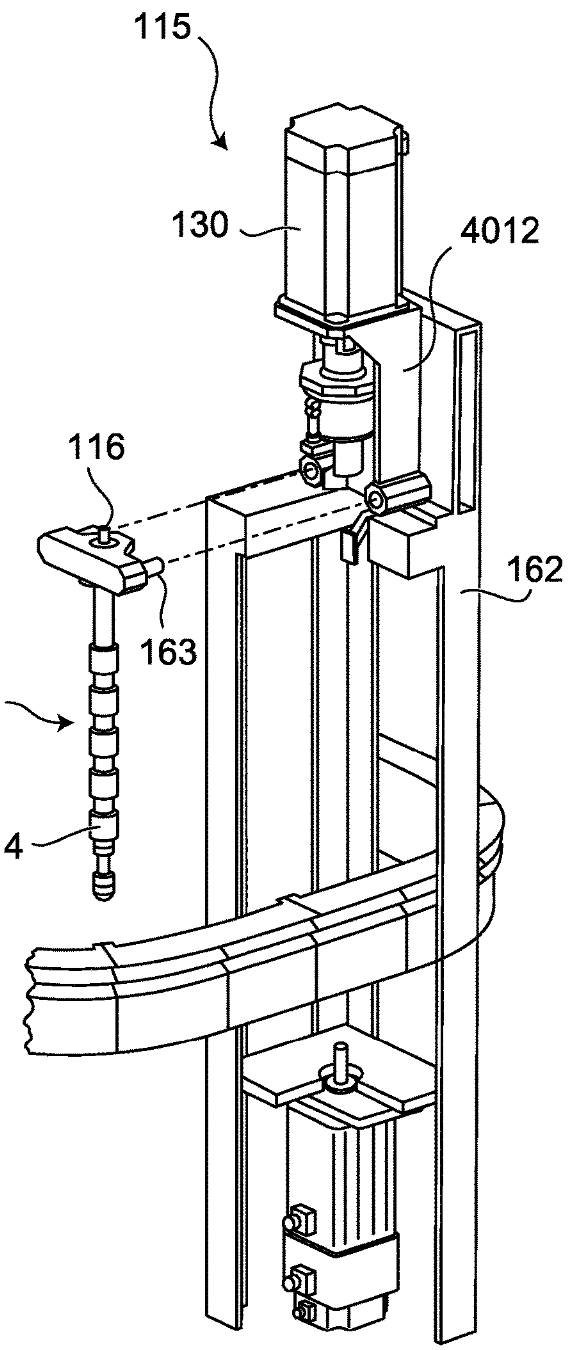

FIGS. 4A-4B are isometric and exploded views, respectively of an extruder 112 showing components thereof in greater detail. As depicted, extruder 112 has a barrel 114, in which a screw 116 (FIG. 5) is housed, and a drive unit 115 for driving rotation of the screw 116. Rotation of the screw 116 is driven by a drivetrain 130 within drive unit 115, which may include an electric motor. Barrel 114 has an inlet opening for supply of feedstock and an outlet orifice 122 (FIG. 5) for dispensing of molten feedstock into a vessel 124.

Referring to FIG. 4B, in the depicted embodiment, extruders 112 are mounted to supports 162 within dispensing cell 102. A set of supports 162 may be provided for each dispensing station 102-1, 102-2, 102-3, 102-4. As depicted, barrel 114 and the screw 116 within barrel 114 (collectively referred to as barrel unit 117) are releasably coupled to drive unit 115. Specifically, a coupling 161 rotationally couples the screw 116 to drivetrain 130 and one or more locating features 163 are received in corresponding recesses of supports 162 to position and secure barrel 114 relative to the support 162. Alternatively, alignment features 163 may be part of supports 162 and may be received in corresponding recesses on barrel 114. Supports 162 may include actuators for selectively engaging or releasing locating features 163. Thus, barrel 114 and screw 116 may be released and removed as a unit and replaced by another barrel 114 and screw 116. Coupling 161 and locating features 163 are located on one or both of a coupling block 4010 of barrel unit 117 and a frame 4012 of drive unit 115. References herein to removal, replacement or installation of extruders 112 are intended to include removal, replacement or installation of a barrel 114 and screw 116 as an assembly. In this way, extruder characteristics or characteristics of a feedstock may be rapidly and easily changed.

In some embodiments, removal, replacement or installation of extruders 112 may be affected automatically. For example, extruders 112 may be gripped and removed from supports 162 and may be moved by one or more robots under computer control. The computer control may be part of an overall control system of system 100, and releasing or engaging of locating features such as locating features 163 on barrel 114 may be coordinated with operation of the robot, such that extruders 112 are securely retained upon installation by a robot, and until subsequent removal by a robot.

Figure 4E:
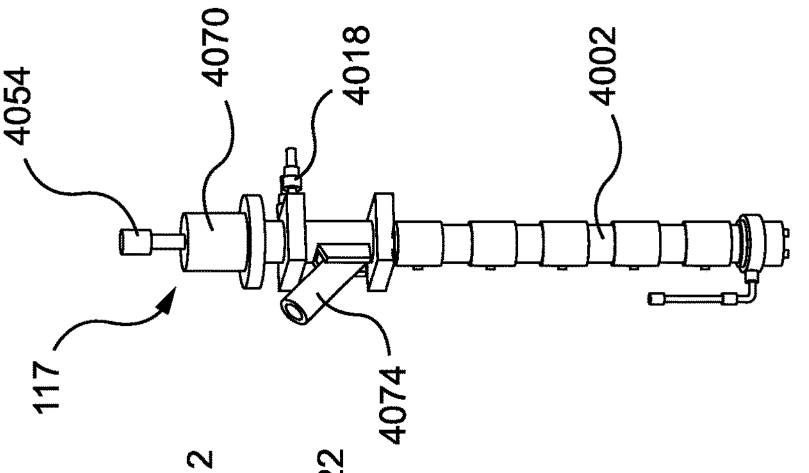
FIGS. 4C-4E are isometric views of sub-assemblies of the dispensing station of FIG. 4A.
Figure 4D:
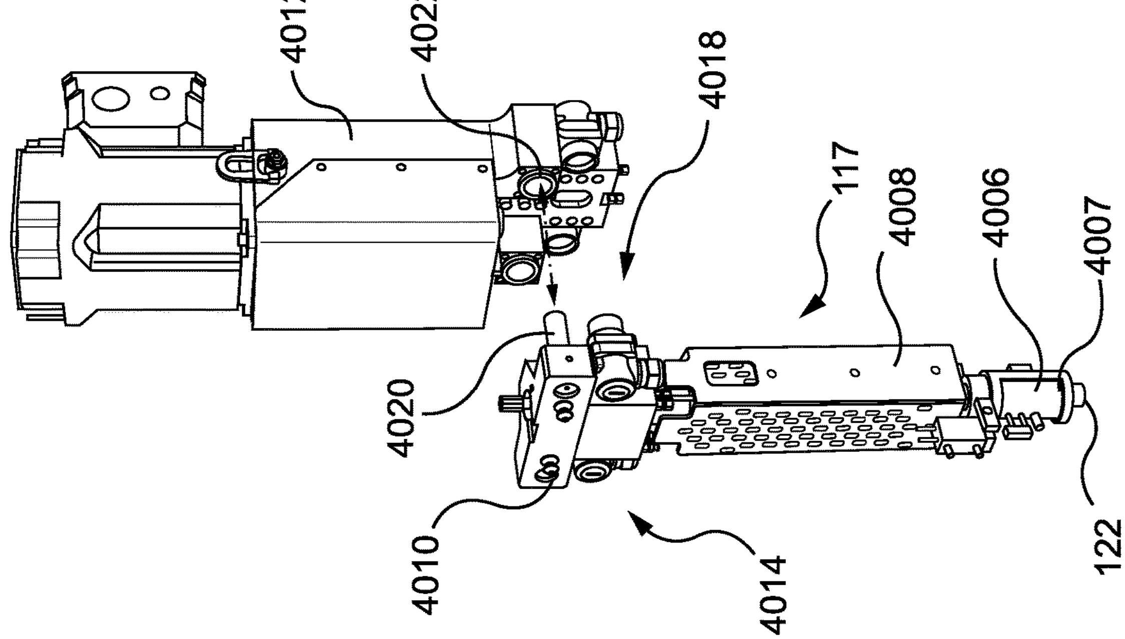
Figure 4C:
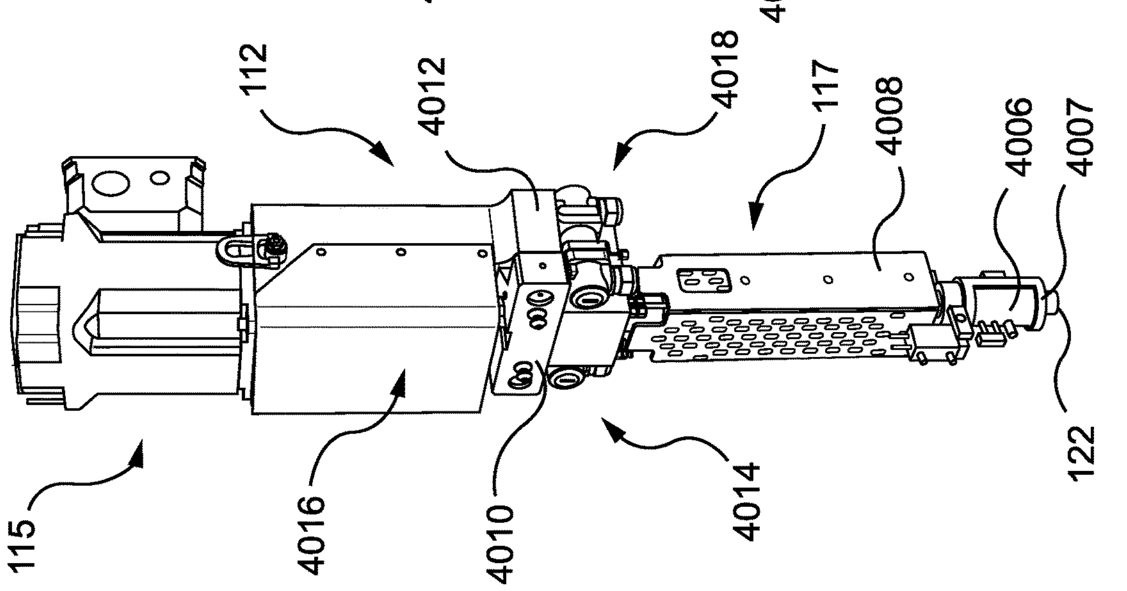

FIGS. 4C and 4D depict barrel unit 117 and drive unit 115 of an extruder 112 in greater detail. In the configuration of FIG. 4C, barrel unit 117 is coupled to drive unit 115. In the configuration of FIG. 4D, barrel unit 117 is released from drive unit 115.

As depicted, barrel unit 117 includes a barrel 4002 and a screw 116 within barrel 4002. A nozzle assembly 4006 is positioned at the distal end of barrel 4002, in which outlet orifice 122 is defined. Rotation of screw 116 within barrel 4002 causes heating and melting of molding material, and conveys the molding material towards outlet orifice 122 in nozzle assembly 4006. A shroud 4008 is positioned around barrel 4002. During operation, barrel 4002 may become very hot. Shroud 4008 serves as a barrier to guard against damage to surrounding components and to protect against injury to operators.

Barrel 4002 is mounted to coupling block 4010. For example, barrel 4002 may have a flange (not shown) which interfaces with block 4010 and is secured thereto by fasteners. As will be described in greater detail, screw 116 is received in and supported by barrel 4002.

Nozzle assembly 4006 includes a thermal conditioning element 4007 proximate outlet 122. Thermal conditioning element 4007 maintains nozzle assembly 4006 at a desired temperature, to in turn control the temperature of molding material in nozzle assembly 4006 and molding material exiting nozzle assembly 4006 through outlet 122. One or more temperature measurement devices such as thermocouples may be positioned at nozzle assembly 4006, and thermal conditioning element 4007 may be controlled based on measurements from such devices.

Drive unit 115 and barrel unit 117 are connected by way of a coupling system operated by one or more actuators. The one or more actuators are operable to couple and decouple the drive unit 115 and barrel unit 117 using the coupling system. That is, the coupling system is operable to physically fix barrel unit 117 in position relative to drive unit 115. The coupling system is further operable to connect screw 116 with the drive unit 115 for driving rotation of the screw 116. In the depicted embodiment, the coupling system includes a retaining mechanism 4014 and a drive mechanism 4016. Retaining mechanism 4014 is operable to physically hold barrel unit 117 in place against drive unit 115. Drive mechanism 4016 rotationally connects drive unit 115 to screw 116 for rotating the screw.

In the depicted embodiment, retaining mechanism 4014 and drive mechanism 4016 are operated by separate actuators. In other embodiments, a single actuator may operate both of retaining mechanism 4014 and drive mechanism 4016. In other embodiments, a single mechanism may provide both the retention and drive functions.

In the depicted embodiment, the actuators for retaining mechanism and drive mechanism 4016 are pneumatic. However, other types of actuators may be used, including electromechanical actuators such as solenoids, magnetic actuators, or hydraulic actuators.

Barrel unit 117 further includes one or more service ports 4018, each for connecting to a corresponding port of drive unit 115 or proximate drive unit 115. Service ports may include, for example, conduits for circulation of coolant such as water to and from barrel unit 117, conduits for supply of air, e.g. pressurized air for pneumatic actuation systems, and electrical connections. Electrical connections may, include, for example, any of power supplies, controls, and signal wiring. Drive unit 115 also includes a resin feed port 4076 (FIG. 4I). Resin feed port 4076 receives a feed of molding material, e.g. pelletized molding material, and communicates with barrel unit 117 to supply molding material to the barrel. Service ports 4018 may be configured for quick connection to and disconnection from the corresponding ports of drive unit 115. In an example, service ports 4018 may couple using push-to-connect pneumatic or hydraulic connectors, magnetic connectors, barb fittings or the like. Thus, service ports 4018 may automatically connect or disconnect from the corresponding ports by application of force, e.g. due to movement of barrel unit 117, or in response to a control signal.

FIG. 4E depicts barrel unit 117, with coupling block 4010 and shroud 4008 removed to show internal features. Barrel unit 117 has a resin input port 4074 which communicates with the interior of barrel 4002 to deliver molding material to the interior of barrel 4002. Molding material is typically input to barrel 4002 in solid granular form and may be delivered, e.g. from a hopper (not shown). The hopper may be mounted to drive unit 115 or proximate drive unit 115 and deliver molding material to resin input port 4074 by way of a corresponding resin feed port 4076 on drive unit 115. In some embodiments, resin input port 4074 and resin feed port 4076 abut one another. In other embodiments, one of input port 4074 and feed port 4076 may be received within the other. In some embodiments, input port 4074 and feed port 4076 may be positively coupled to one another, for example, using quick connect fittings such as push-to-connect pneumatic or hydraulic connectors, magnetic connectors, barb fittings or the like. Connection and disconnection of such fittings may be automatically affected by application of force, e.g. due to movement of barrel unit 117, or in response to a control signal.

Figure 4G:
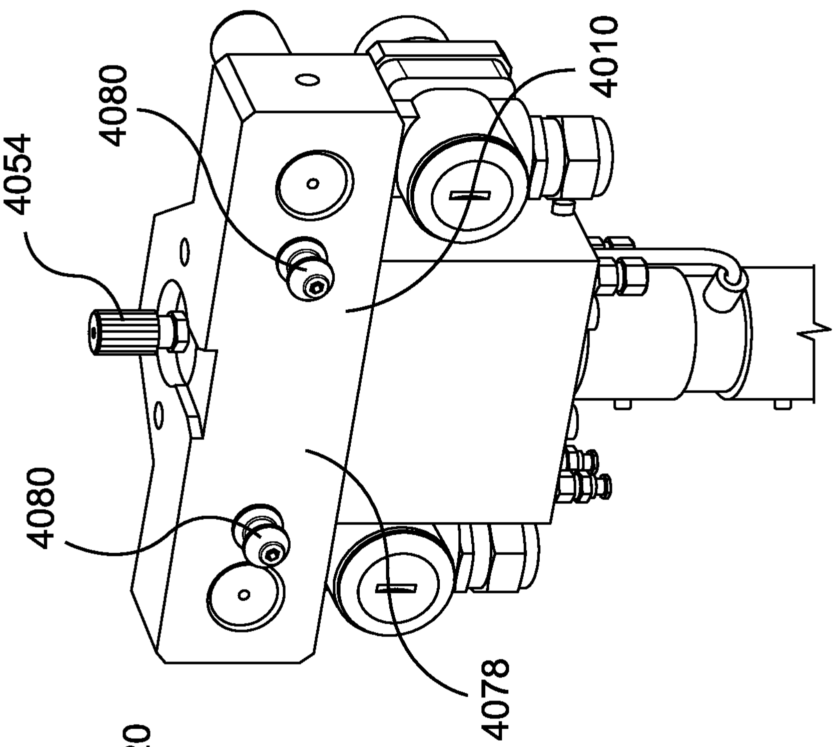
FIGS. 4F-4G are enlarged partial isometric views of a barrel unit.
Figure 4F:
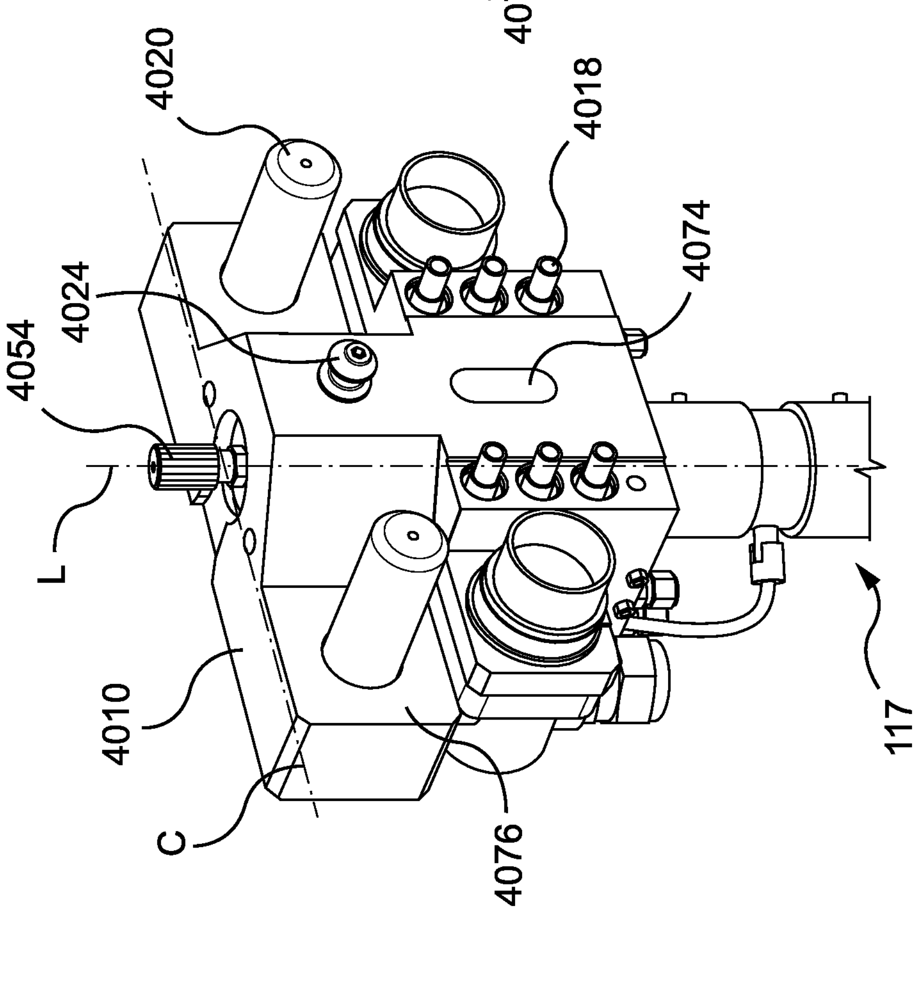

As best shown in FIG. 4F-4G, one or more locating devices may be provided to position drive unit 115 and barrel unit 117. The locating devices position barrel unit relative to drive unit 115 as the barrel unit is moved toward a coupling position. Specifically, the locating devices guide barrel unit 117 so that it seats against drive unit 115 in a coupling position, in which retention mechanism 4014 and drive mechanism 4016 can be engaged. That is, in the coupling position, components of the retaining mechanism 4014 and drive mechanism 4016 on barrel unit 117 align with the corresponding components on drive unit 115. The locating devices may progressively bias barrel unit 117 into its correct alignment as the barrel unit 117 is moved towards drive unit 115. In the depicted embodiment, the locating devices comprise leader pins 4020 and mating recesses 4022 (FIG. 4D). As shown, leader pins 4020 project from coupling block 4010 of barrel unit 117 and are received in recesses 4022 in frame member 4012 of drive unit 115.

Leader pins 4020 and recesses 4022 engage one another as barrel unit 117 is moved toward drive unit 115. Such engagement aligns barrel unit 117 relative to drive unit 115 such that the barrel unit 117 and drive unit 115 can be coupled by actuation of retaining mechanism 4014. In the depicted example, the alignment devices engage one another prior to engagement of the coupling system.

Figure 4H:
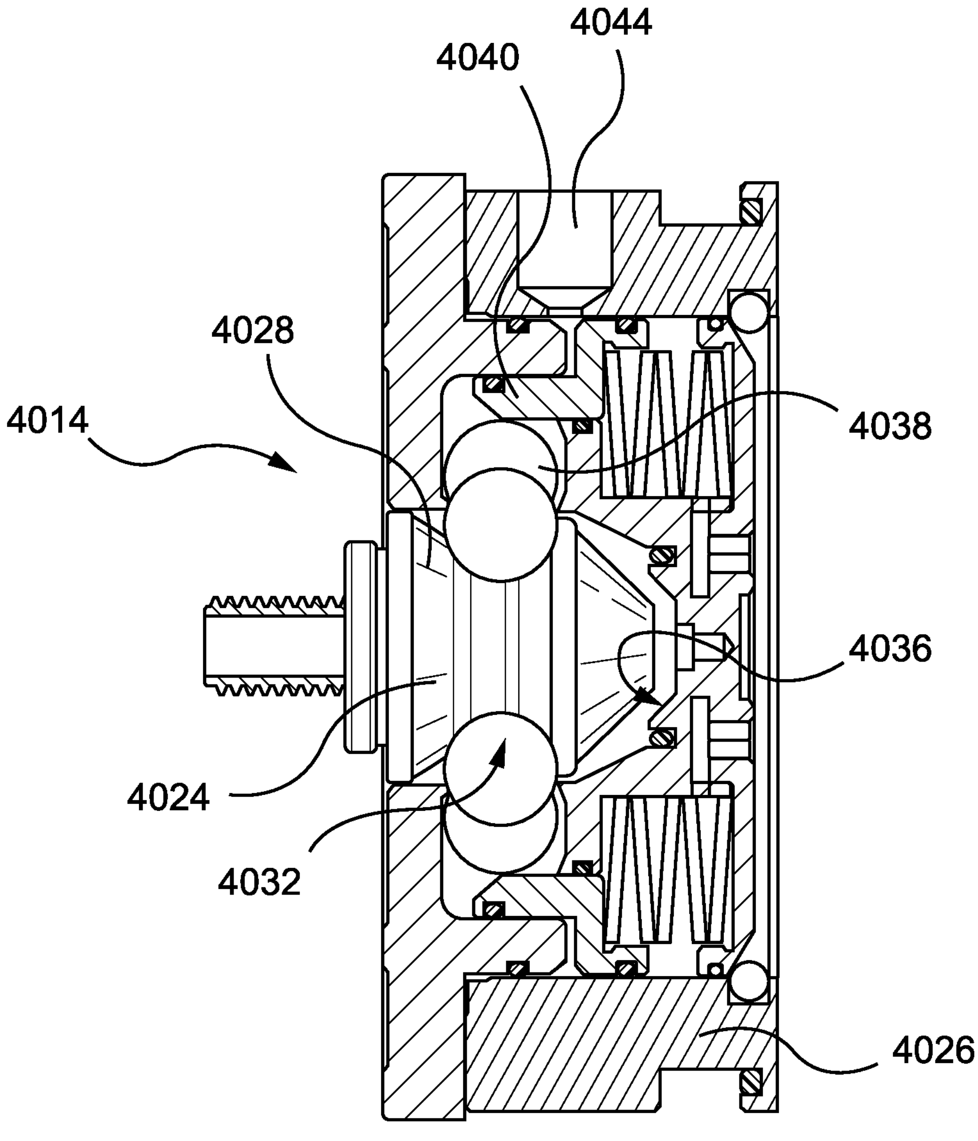
FIG. 4H is a schematic view of a coupling for holding the barrel unit of FIGS. 4F-4G to a drive unit.

FIG. 4H depicts retaining mechanism 4014 in greater detail. In the depicted embodiment, retaining mechanism 4014 includes a stud 4024 and a socket 4026 which can selectively interlock with stud 4024. As shown, stud 4024 is part of barrel unit 117 and socket 4026 is part of drive unit 115. Stud 4024 may, for example, be threaded to coupling block 4010. Socket 4026 may be a recess cut into frame 4012 or an insert attached (e.g. threaded) to frame 4012. However, socket 4026 may instead be part of barrel unit 117 and stud 4024 may instead be part of drive unit 115.

Stud 4024 has inner and outer flanges 4028, defining a channel 4032 therebetween. Socket 4026 has an opening 4034, sized to receive stud 4024, and a gripping device 4036. Gripping device 4036 is configured for reception in channel 4032, in interlocking engagement with flanges 4028.

Gripping device 4036 is movable between engaged and disengaged states. In the disengaged state, gripping device 4036 clears flanges 4028 of stud 4024 such that stud 4024 may be freely inserted in or withdrawn from socket 4026. In the engaged state, gripping device interlocks with stud 4024, preventing stud 4024 from being withdrawn from socket 4026.

In the depicted embodiment, gripping device 4036 comprises a series of balls 4038 and a movable locking collar 4040. In the engaged state, locking collar 4040 holds balls 4038 against channel 4032. Balls 4038 bear against the distal flange 4028 of stud 4024, urging stud 4024 (and barrel unit 117) against drive unit 115. In the disengaged state, locking collar 4040 is withdrawn, allowing balls 4038 to shift away from stud 4024.

As shown, locking collar 4040 is spring-biased to the engaged state. An actuator is provided to selectively overcome the spring bias and thereby release locking collar 4040 and balls 4038. In the depicted embodiment, the spring bias is overcome by pneumatic pressure provided by a retention control line 4044, which is controlled by a valve (not shown).

Figure 4J:
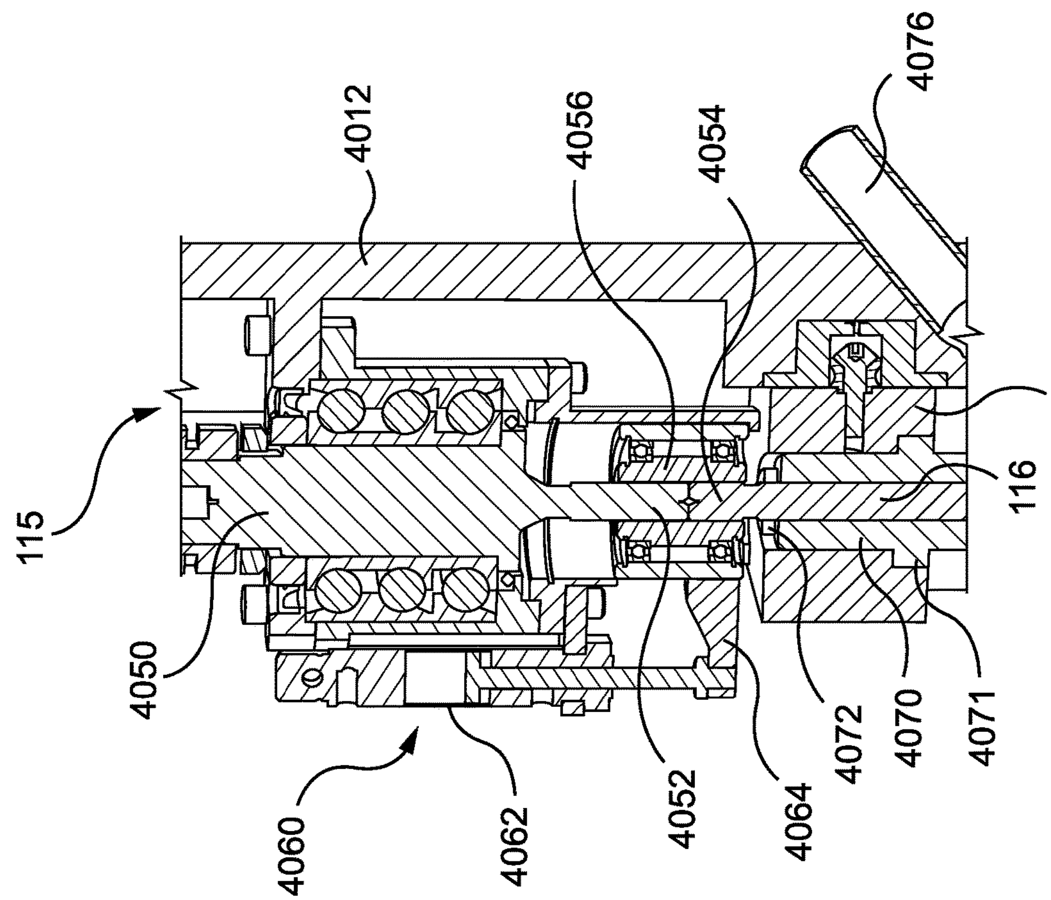
FIGS. 4I-4J are enlarged partial isometric views of the barrel unit of FIG. 4F with a drive unit.
Figure 4I:
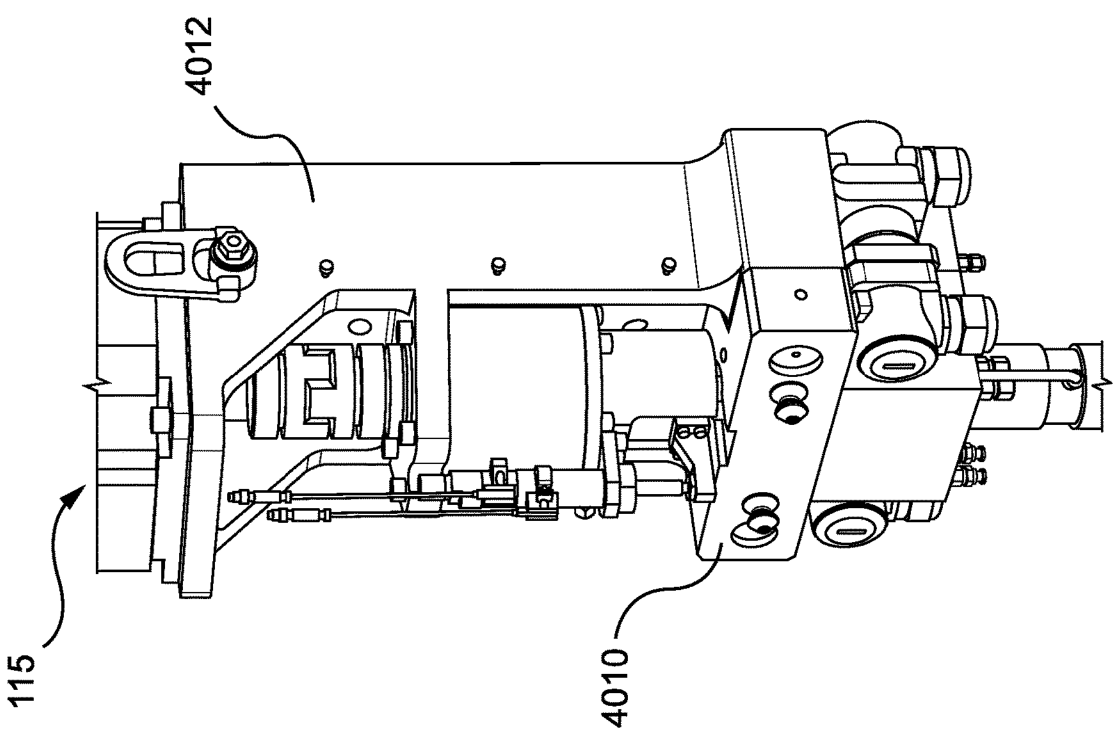

Drive mechanism 4016 is shown in detail in FIGS. 4I-4J. Drive mechanism 4016 includes a driveshaft 4050 driven by an electric motor (not shown). Driveshaft 4050 has an end with a toothed connector, e.g. spline 4052. The connector interfaces with a mating connector of screw 116, namely, spline 4054. As shown, spline 4052 of drive unit 115 and spline 4054 of screw 116 interface by way of a spline insert 4056.

Spline insert 4056 mates to both of splines 4052, 4054. Spline insert 4056 is movable along the axis of rotation of driveshaft 4050, between an engaged position and a retracted position.

In the engaged position, spline insert 4056 meshes with splines 4052, 4054 and rotationally couples driveshaft 4050 and screw 116. In the retracted position, spline insert 4056 is retracted along the axis of driveshaft 4050, to disengage from spline 4054 of screw 116. Thus, in the retracted position of spline insert 4056, driveshaft 4050 and screw 116 are de-coupled from one another. Retraction of spline insert 4056 may occur without any movement of driveshaft 4050. That is, spline insert may move along a longitudinal axis relative to both of driveshaft 4050 and spline 4054 of screw 116 to disengage.

The position of spline insert 4056 is controlled by an actuator, namely, drive actuation assembly 4060. As shown, drive actuation assembly 4060 includes a pneumatic cylinder 4062. The piston of pneumatic cylinder 4062 is connected to spline insert 4056 by way of a link 4064. Movement of the piston through its stroke in a first direction moves spline insert 4056 to its engaged position. Movement of the piston through its stroke in the opposite direction moves spline insert 4056 to its disengaged position.

A shroud is also coupled to link 4064 and moves along with link 4064 and spline insert 4056. In the engaged position, the shroud is positioned around the mating interface between spline insert 4056 and spline 4054 of screw 116. The shroud guards against ingress of objects or contaminants such as dust or other particulates, which may cause premature wear or reduced performance of the splines 4052, 4054.

Splines 4052, 4054 and spline insert 4056 define mating interfaces, namely interfaces between mating teeth at which torque can be transferred. The mating faces have relatively large axial length, such that the mating interfaces can accommodate some movement of driveshaft 4050 and screw 116 along their longitudinal axes. In other words, screw 116 and driveshaft 4050 can shift axially relative to one another without interfering with meshing of splines 4052, 4054 and spline insert 4056.

Screw 116 is rotationally supported by a bearing 4070 which is in turn supported on coupling block 4010 by a flange 4071. A support ring 4072 is secured to screw 116 above bearing 4070, by press-fit or other suitable technique.

In operation, screw 116 may be vertically supported at least in part by friction between spline insert 4056 and spline 4054 and by pressure of molding material within barrel 114. In this condition, there may be clearance between support ring 4072 and bearing 4070. When operation is terminated, screw 116 may fall until support ring 4072 abuts bearing 4070. Support ring 4072 is positioned such that, when screw 116 falls in this manner, a clearance gap opens between the ends of screw 116 and drive shaft 4050. In this state, drive unit 117 may be moved without rubbing and consequent wearing of drive shaft 4050 and screw 116 against one another.

Conveniently, in the depicted embodiment, engagement and disengagement of drive mechanism 4016 and retaining mechanism 4014 may occur independently of one another. That is, drive mechanism 4016 may be engaged or disengaged without changing the state of retaining mechanism 4014. Engagement of drive mechanism 4016 occurs by movement along the longitudinal axis of screw 116, and barrel unit 117 is physically located relative to drive unit 115 by movement in a perpendicular direction. Likewise, physical fixation of barrel unit 117 to drive unit 115 occurs by clamping in a direction perpendicular to the axis of screw 116, i.e. in a direction perpendicular to that in which engagement of drive mechanism 4016 occurs. Alignment of barrel unit 117 relative to drive unit 115 also occurs by movement along an axis perpendicular to that of screw 116. That is, leader pins 4020 extend in a direction perpendicular to the axis of screw 116. Independent operation of drive mechanism 4016 and retaining mechanism 4014 could also be achieved in other configurations. For example, the mechanisms could be configured to engage by movement along parallel axes, but the movements could be independent of one another.

Coupling block 4010 comprises at least one mating surface 4076. When barrel unit 117 is coupled to drive unit 115, mating surface 4076 abuts a corresponding face of drive unit 115 (i.e. a corresponding face of frame 4012). Mating surface 4076 may bear against frame 4012 to hold barrel unit 117 square to drive unit 115.

In some embodiments, mating surface 4076 may be located so as to limit stress on drive mechanism 4016. For example, as shown in FIG. 4F, mating surface 4076 is located at a central plane C of coupling block 4010. Longitudinal axis L of screw 116 lies within central plane C.

In operation, forces may be exerted on the tip of barrel 114. Such forces may include axial forces, i.e. forces parallel to longitudinal axis L, and transverse forces perpendicular to longitudinal axis L. Transverse forces may for example be caused by misalignment. The length of barrel 114 may act as a moment arm, such that transverse forces exert torque on barrel 114.

Contact between mating surface 4076 and frame 4012 may resist torque on barrel 114. That is, frame 4012 may exert reaction forces on mating surface 4076 which resist movement or twisting of barrel unit 117.

Alignment of plane C and longitudinal axis L may limit stress on barrel 114 and on spline 4054. Conversely, if place C and longitudinal axis L were spaced apart, transverse forces could also act around a secondary moment arm, perpendicular to longitudinal axis L. Alignment of mating face 4076 and longitudinal axis L avoids such secondary moment arms and therefore limits the torque to which spline 4054 and barrel 114 may be subjected.

Coupling block 4010 has a rear surface 4078 opposite mating surface 4076. When barrel unit 117 is coupled to drive unit 115, rear surface 4078 faces outwardly, away from drive unit 115. At least one pull stud 4080 is fixedly attached (e.g. threaded) to coupling block 4010. Each pull stud 4080 protrudes from coupling block 4010 for engagement by a removal tool to remove barrel unit 117 from drive unit 115.

Figure 4K:
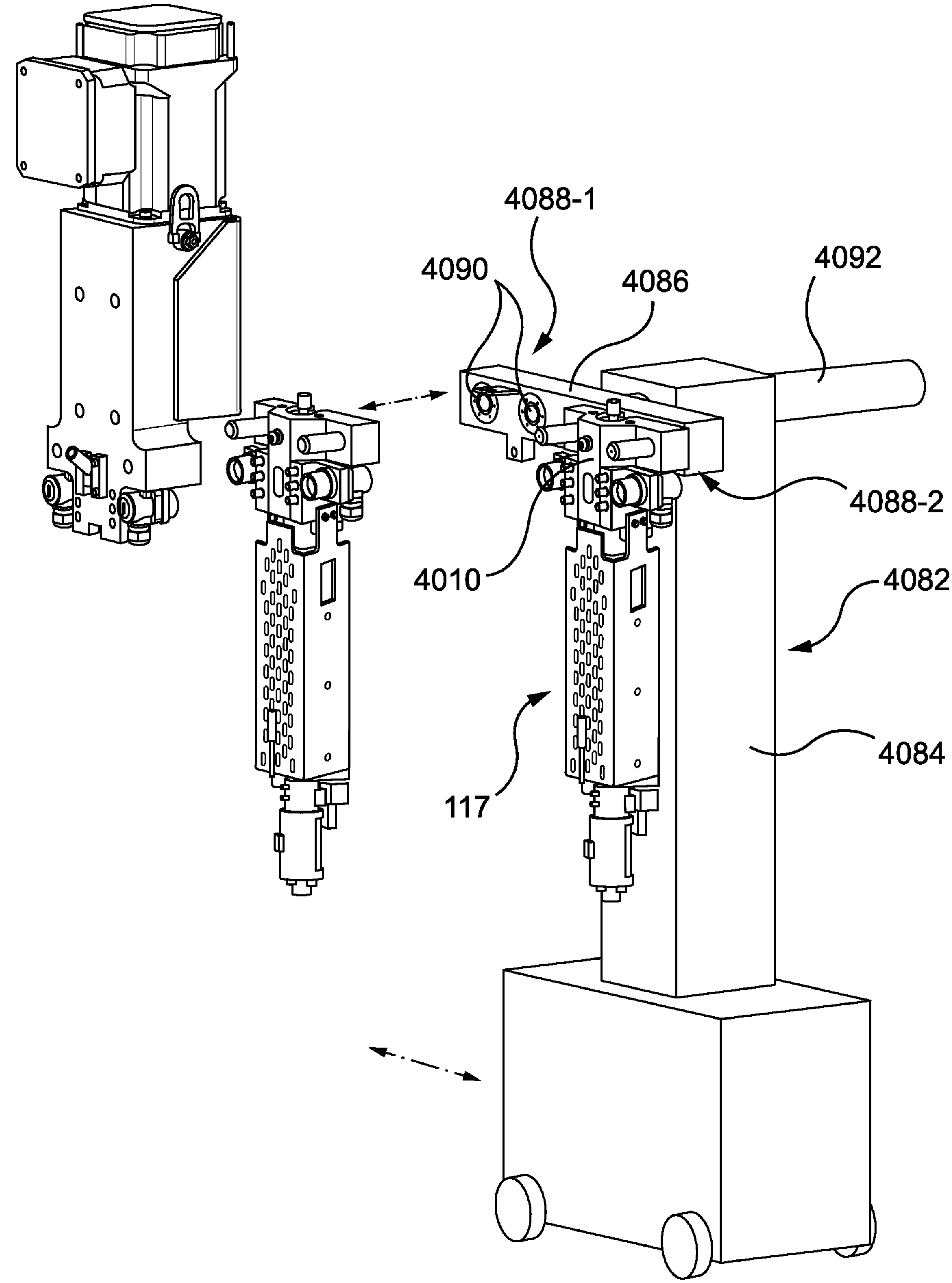
FIG. 4K is a schematic diagram of a removal tool for removing a barrel unit from a drive unit.

FIG. 4K shows an example removal tool 4082. Removal tool 4082 is an automated (e.g. robotic) transportation device. Removal tool 4082 has a base 4084 and a rack 4086 supported on the base. Rack 4086 has a plurality of nests 4088, each capable of engaging and retaining a barrel unit 117. Two nests 4088-1 and 4088-2 are shown in FIG. 4K. However, any number of nests may be present.

Each nest 4088 has one or more couplings 4090 operable to selectively engage pull studs 4080. In some embodiments, couplings 4090 may be identical to gripping devices 4036 of drive unit 115 and pull studs 4080 may be identical to studs 4024 of barrel unit 117. Couplings 4090 are controlled by actuators (not shown). The actuators may be, for example, electronic, pneumatic or hydraulic actuators.

Rack 4086 may be mounted to base 4084 with a movable arm 4092. Arm 4092 is operable to extend to engage a barrel unit 117 for removal from drive unit 115, and to retract for transportation once the barrel unit is secured in a nest 4088. Arm 4092 may, for example, be drive by an electric servomotor or by a hydraulic or pneumatic cylinder.

As noted, plastic molding system 100 may include a plurality of barrel units 117, which may be interchangeably mountable to one or more drive units 115. For example, each barrel unit 117 may contain a different type of molding material, such as a different resin type different colour of material or the like.

Interchangeability of barrel units 117 may allow for rapid setup of molding system 100 to produce a specific variety of molded part. Removal tool 4082 may allow for automated changing of barrel units 117 at a drive unit 115. That is, removal tool 4082 may be capable of automatically approaching a drive unit 115, engaging a barrel unit 117 installed at that drive unit 115, removing the barrel unit 117 and retaining it, and installing a new barrel unit 117. Removal tool 4082 may then be capable of automatically transporting the removed barrel unit to a storage or cleaning area.

FIGS. 4L-4O depict a process of installing a barrel unit 117 to a drive unit 115.

Figure 4M:
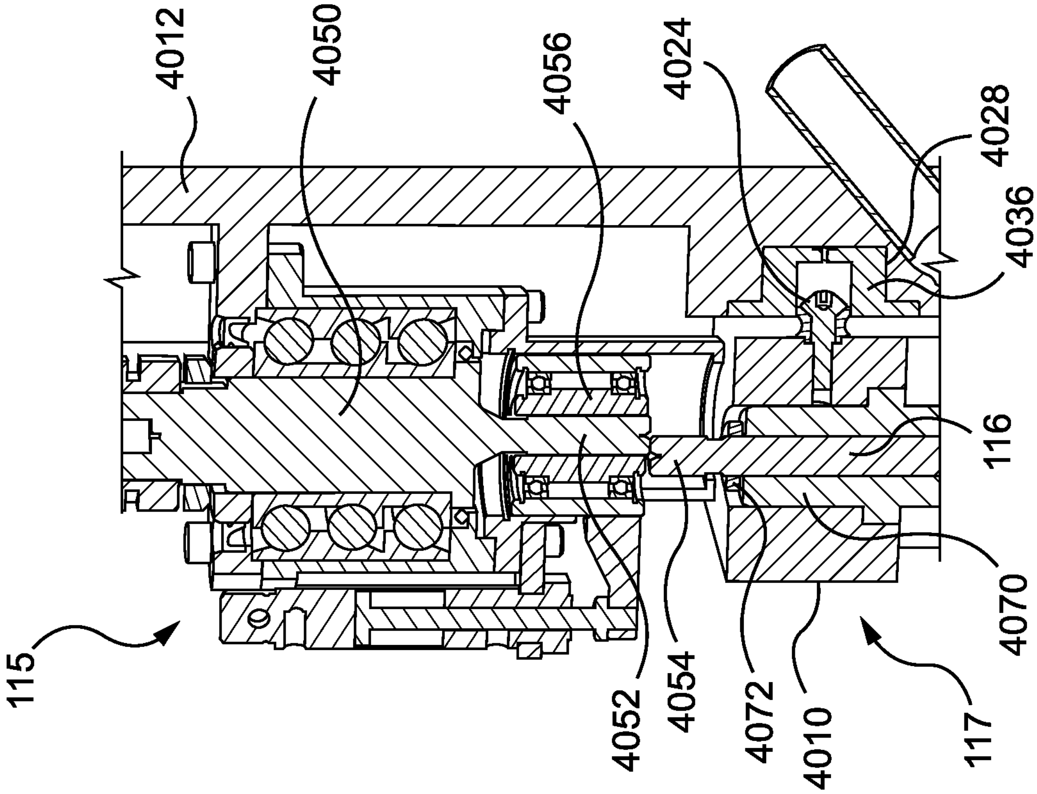
FIGS. 4L-4O are enlarged partial cutaway views showing a process of coupling a barrel unit to a drive unit.
Figure 4L:
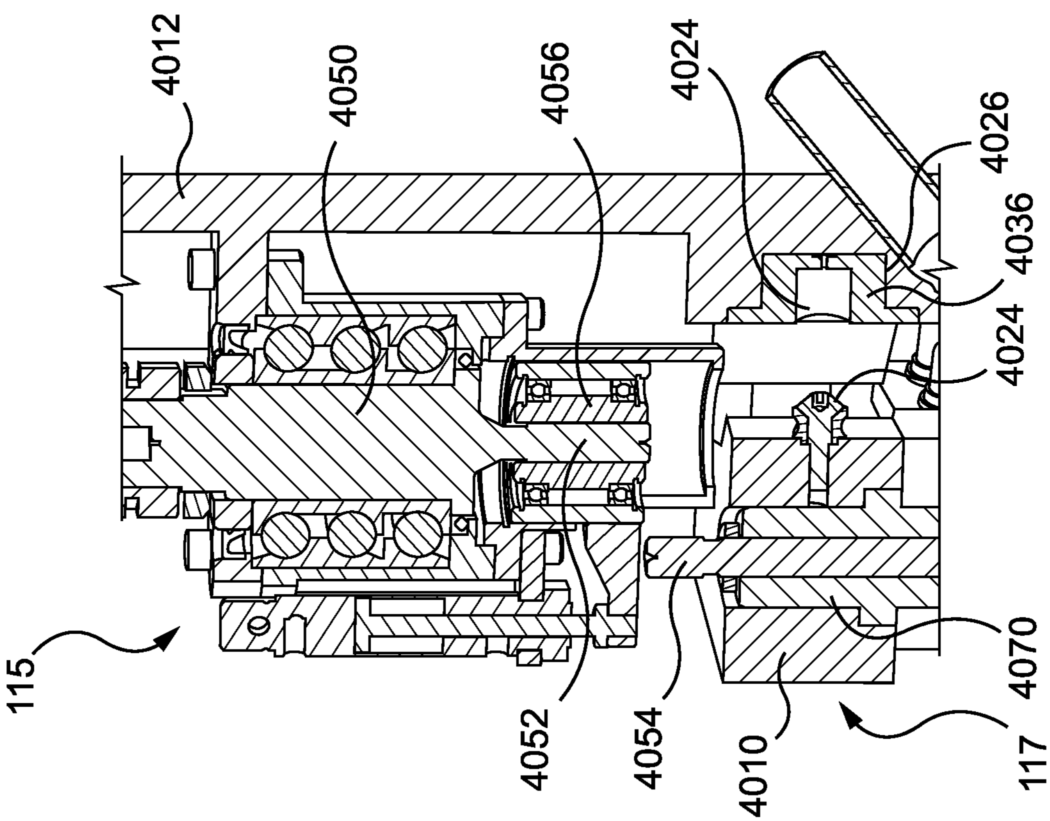

As shown in FIG. 4L, a barrel unit 117 is carried by removal tool 4082 to a position facing drive unit 115. In some embodiments, removal tool 4082 may be guided into position relative to drive unit 115. For example, a beacon, such as an infra-red or other light-based beacon, or a radio-frequency (RF) beacon may be installed at drive unit 115 or barrel unit 117 and corresponding sensors may be installed at removal tool 4082. Removal tool 4082 may be programmed to detect signals from the beacon and move toward the detected signals. In other embodiments, removal tool 4082 may be programmed to monitor and record its position. For example, removal tool 4082 may initially be manually moved into position at a particular drive unit 115 and may record coordinates corresponding to that position. Thereafter, on receipt of a specific instruction, removal tool 4082 may automatically return to the recorded position. In some embodiments, removal tool 4082 may be programmed in this manner to retain a number of transfer positions, each for engaging with a respective drive unit 115.

With removal tool 4082 aligned with drive unit 115, arm 4092 is extended to move the barrel unit 117 towards drive unit 115.

As barrel unit 117 approaches drive unit 115, gripping devices 4036 of barrel unit 117 are opened. In the depicted embodiment, opening of gripping devices 4036 entails energizing the gripping device to overcome a spring bias towards the closed state. Energizing may be by providing a stream of pressurized air or water, or by an electrical signal.

Alignment devices on the barrel unit 117 and drive unit 115 engage one another to position barrel unit 117 relative to drive unit 115. Specifically, leader pins 4020 are received in recess 4022 and guide barrel unit 117 onto drive unit 115.

As shown in FIG. 4M, stud 4024 is received in socket 4026. The tapered leading end of stud 4024 may bear against walls of socket 4026 or against gripping device 4036 to provide fine alignment of stud 4024.

What barrel unit 117 is being installed, screw 116 is supported by support ring 4072 resting atop bearing 4070. In this condition, with barrel unit 117 positioned so that stud 4024 aligns with socket 4026 of drive unit 115, a clearance gap exists between the ends of screw 116 and drive shaft 4050. Thus, as barrel unit 117 is moved into position, screw 116 passes below drive shaft 4050 and spline insert 4056 without contacting either the drive shaft or the spline insert.

Figure 4O:
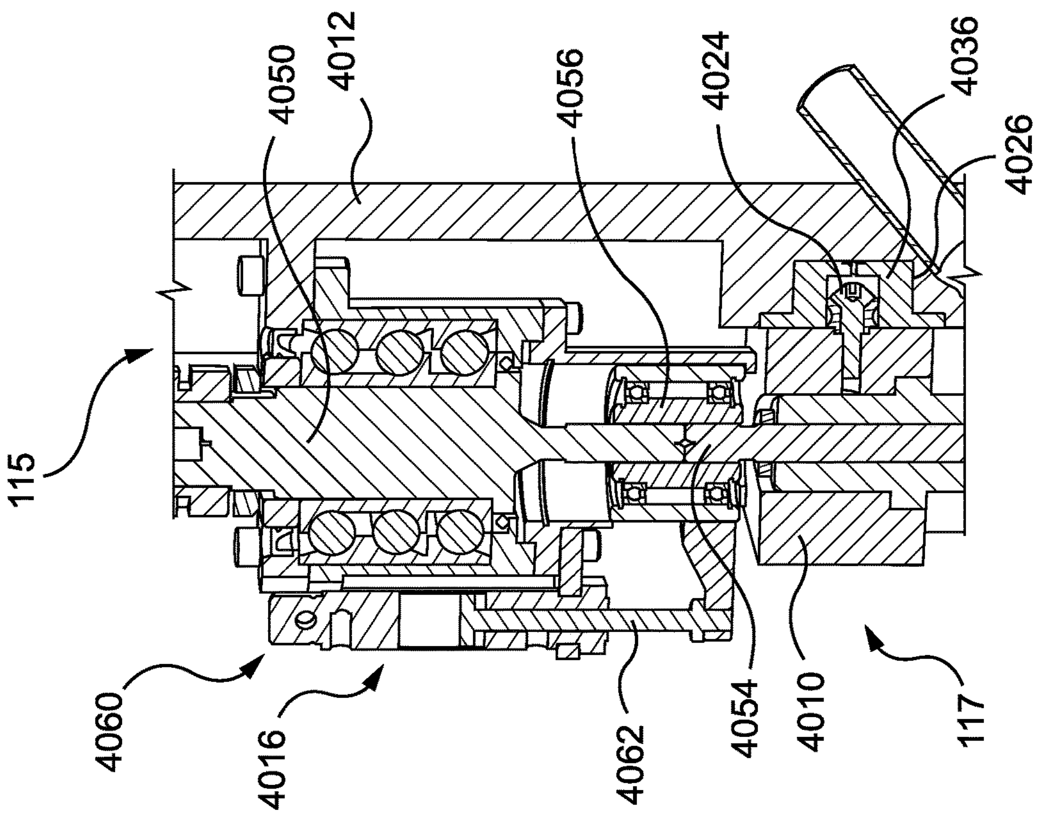
Figure 4N:
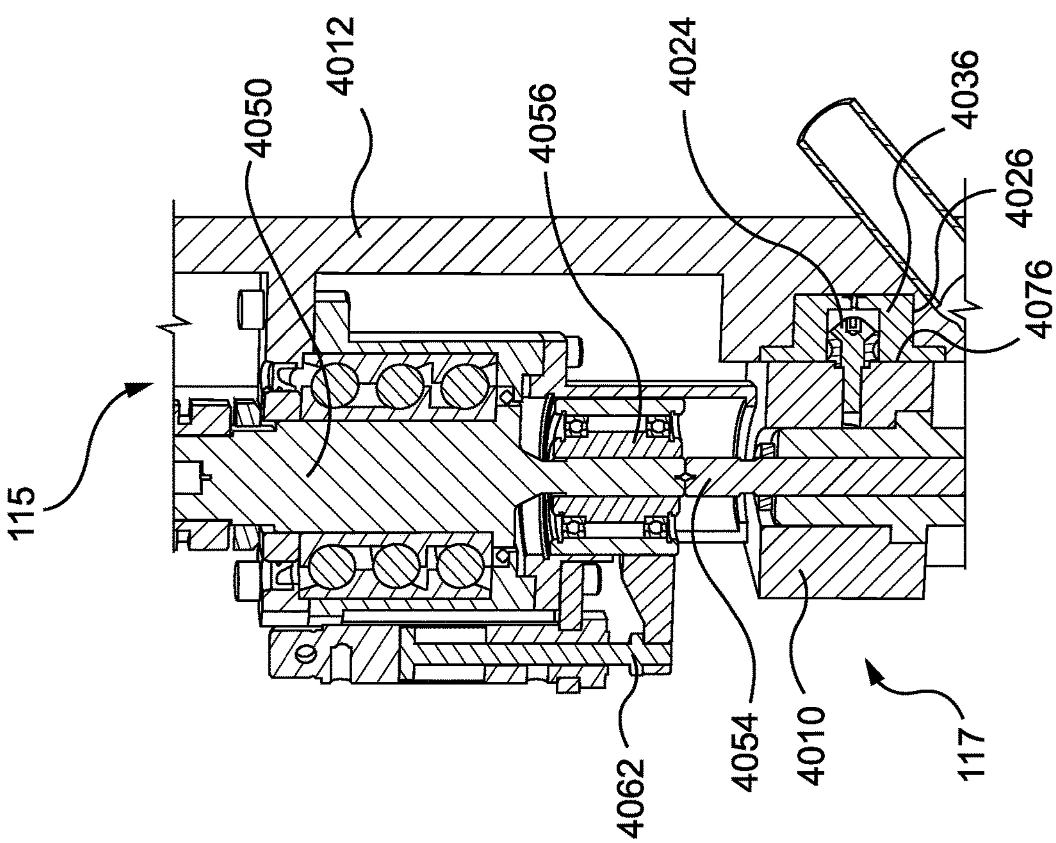
Figure 4Q:
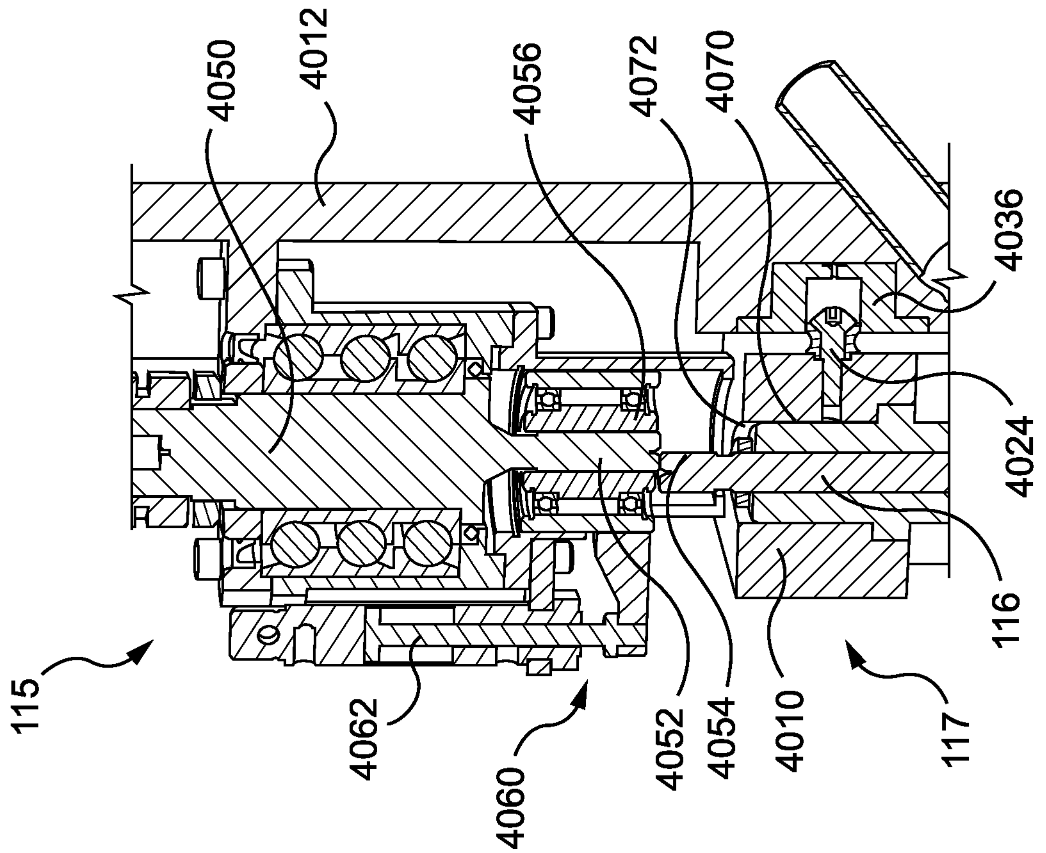
FIGS. 4P-4R are enlarged partial cutaway views showing a process of removing a barrel unit from a drive unit.

As shown in FIG. 4N, Barrel unit 117 is moved towards drive unit 115 until stud 4024 is fully received within socket 4026. The retaining actuator is activated to close gripping device 4036, thereby locking stud 4024 and barrel unit 117 in place relative to the drive unit 115. Engagement of stud 4024 by gripping device 4036 pulls stud 4024 and barrel unit 117 towards drive unit 115. With stud 4024 so engaged, mating surface 4076 of coupling block 4010 is clamped tightly against drive unit 115. In some embodiments, gripping device 4036 remains closed, engaging stud 4024 unless energy is applied to release it, for example, in the form of hydraulic or pneumatic pressure.

As shown in FIG. 4O, with barrel unit 117 physically fixed to drive unit 115, drive mechanism 4016 may be activated to rotationally couple screw 116 to a motor by way of drive shaft 4050. A signal is provided to drive actuation assembly 4060, causing pneumatic cylinder 4062 to extend and move spline insert 4056 to its engaged position. Extension of spline insert 4056 causes spline insert 4056 to mesh with spline 4054, thereby rotationally coupling screw 116 to drive shaft 4050 and the motor driving drive shaft 4050.

FIGS. 4P-4R and 4S depict a process of removing a barrel unit 117 from a drive unit 115.

Figure 4P:
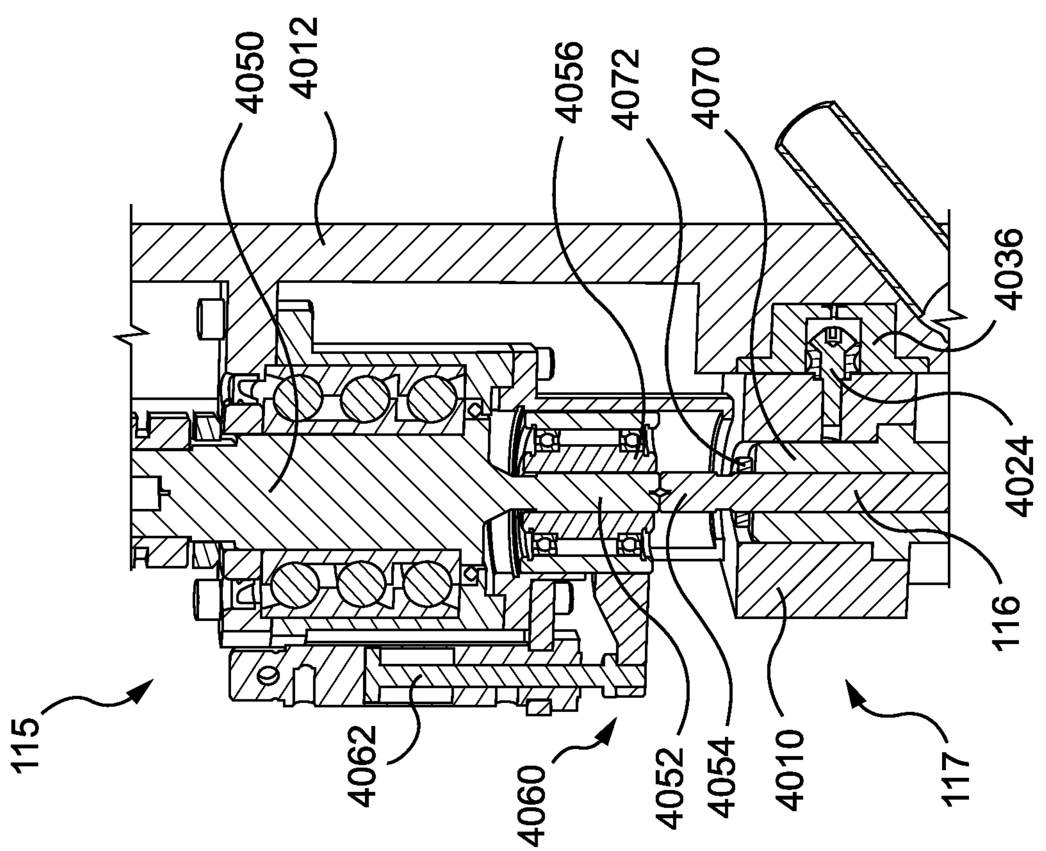
Figure 4R:
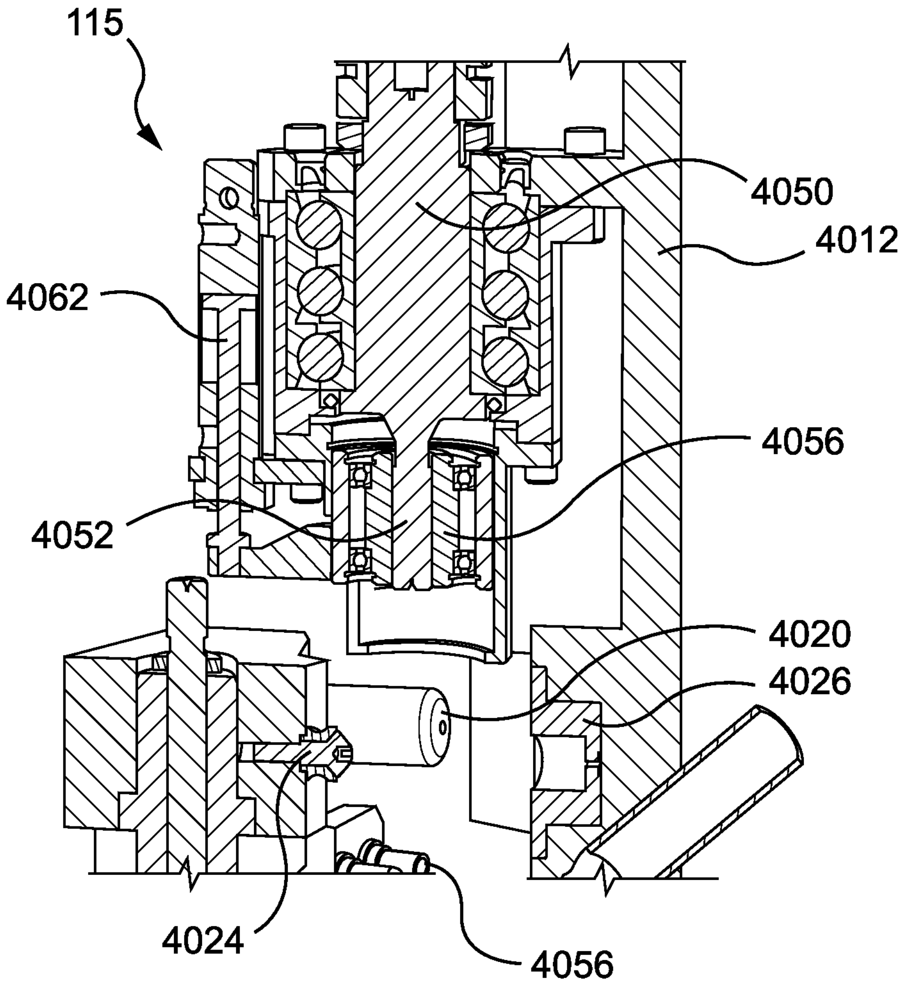

As shown in FIG. 4P, drive actuation assembly 4060 disengages drive mechanism 4016 prior to movement of barrel unit 117. Drive actuation assembly 4060 receives a signal causing retraction of cylinder 4062 and thus, of spline insert 4056. Retraction of spline insert 4056 releases the mesh between spline insert 4056 and spline 4054 so that screw 116 and drive shaft 4050 can rotate independently of one another.

Screw 116 may fall so that support ring 4072 supports drive screw 116 on bearing 4070. Screw 116 may fall immediately after retraction of spline insert 4056, or after pressure of molding material within barrel 114 is reduced. When supported by support ring 4072 on bearing 4070, and with spline insert 4056 retracted, screw 116 does not contact drive shaft 4050 or spline insert 4056 and barrel unit 117 is clear of drive shaft 4050 and spline insert 4056 for removal.

Figure 4S:
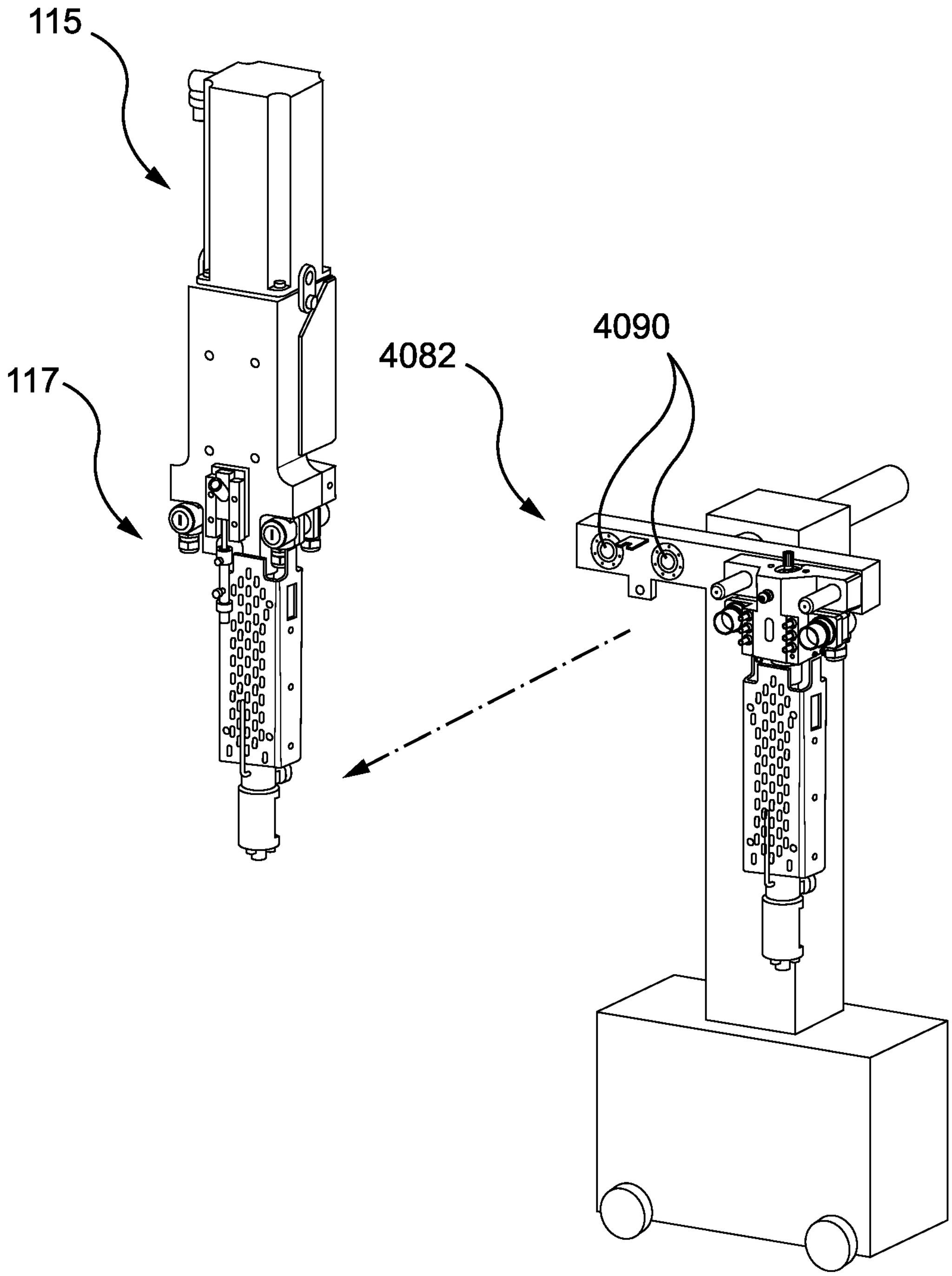
FIG. 4S is a schematic view of the removal tool of FIG. 4K installing a barrel unit to a drive unit.

As shown in FIG. 4S, removal tool 4082 approaches barrel unit 117 and arm 4092 extends into contact or nearly into contact with barrel unit 117.

Gripping devices 4036 of drive unit 115 are energized so that they release stud 4024. Couplings 4090 of removal tool 4082 are positioned on pull stud 4080 of barrel unit 117 and are locked in a closed position engaging the pull studs. Locking of couplings 4090 holds the barrel unit 117 to nest 4088 and to rack 4086 of removal tool 4082.

With barrel unit 117 locked to arm 4092, removal tool 4082 retracts the arm to pull barrel unit 117 away from drive unit 115. Stud 4024 is withdrawn from socket 4026 and service ports 4018 and resin input port 4076 decouple from the corresponding ports of drive unit 115. The alignment mechanism also decouples, as leader pins 4020 are withdrawn from recesses 4022 (not shown).

After barrel unit 117 is removed from drive unit 115, a new barrel unit may be installed. In some examples, removal tool 4082 moves the new barrel unit into alignment with drive unit 115. Specifically, removal tool 4082 may shift a nest 4088 carrying the new barrel unit into alignment with drive unit 115.

With the new barrel unit aligned, removal tool 4082 extends arm 4092 to couple the new barrel unit to drive unit 115, as described above with reference to FIGS. 4L-4O.

In some examples, the removed barrel unit 117 may remain in its nest 4088 on arm 4092 while a new drive unit at another nest 4088 is installed to drive unit 115. Removal tool may arrive at drive unit 115 carrying a first barrel unit, and may automatically remove a second barrel unit from the drive unit 115 and replace the second barrel unit with the first barrel unit.

Upon removal from drive unit 115, a barrel unit may be stored. The barrel unit may, for example, be transferred from the removal tool 4082 to a rack or other storage area. Alternatively, the barrel unit may simply remain on the removal tool 4082 for storage. In some examples, a plurality of removal tools 4082 may be present, and each stored barrel unit may be stored on a removal tool having at least one vacant nest 4088. Accordingly, any stored barrel unit could be installed by sending its respective removal tool to a drive unit, and the removal tool would also be capable of removing the previous barrel unit from the drive unit.

Interchangeability of barrel units 117, and particularly, automated interchangeability, may allow for rapid configuration and reconfiguration of molding system 100. In particular, different barrel units may be used with different molding materials, e.g. different material types or colours. Molding system 100 can therefore be reconfigured for molding parts of different materials by simply swapping barrel units 117.

Transport Vessels

Details of transport vessels in which molten feedstock may be moved between process stations, as associated features at process stations will now be described, with primary reference to FIGS. 5-12.

Figure 5:
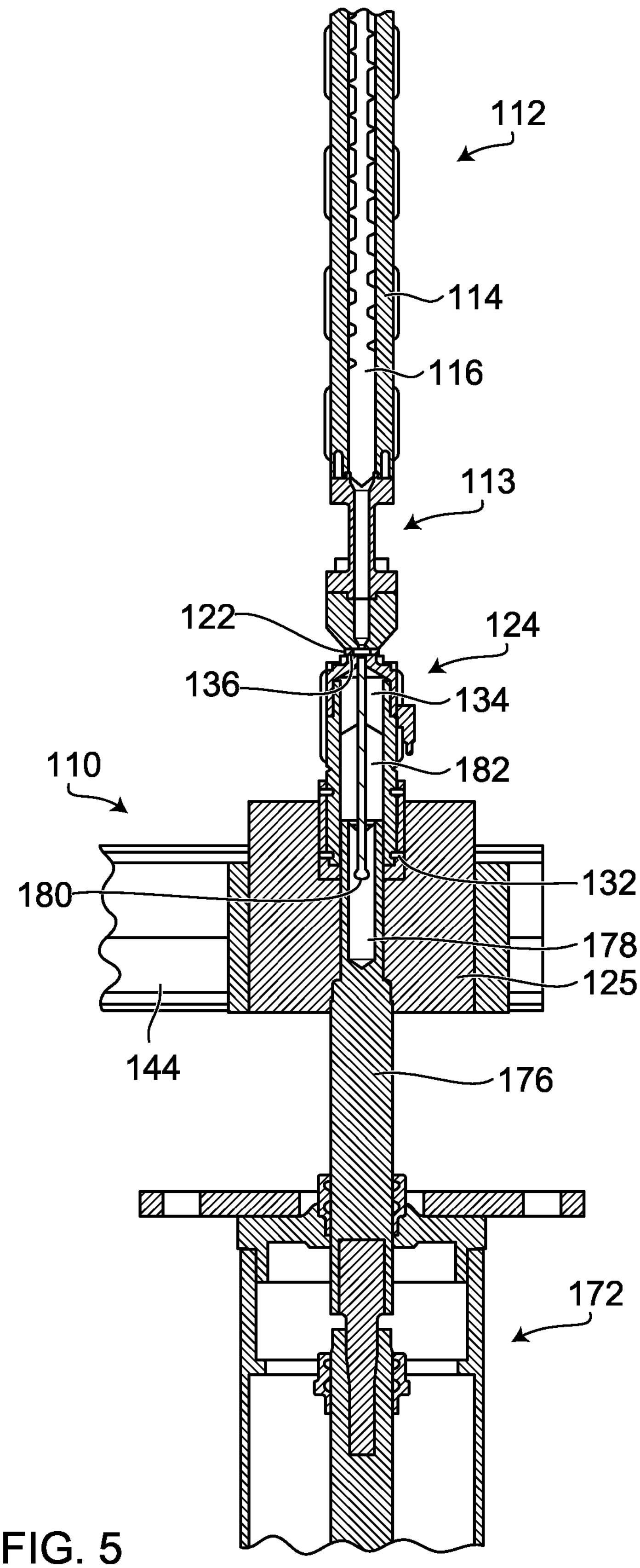
FIG. 5 is a longitudinal cross-sectional diagram of the dispensing station of FIG. 4.

FIG. 5 is an enlarged cross-sectional view of an extruder 112 and vessel 124 depicting components in greater detail.

Feedstock such as PET pellets is introduced into the cavity of barrel 114 and is urged toward outlet orifice 122 by rotation of screw 116. Rotation of screw 116 compresses the feedstock and thereby causes heating and ultimately melting of the feedstock for dispensing into a vessel 124.

Extruder 112 includes a nozzle assembly 113 positioned at the dispensing end of barrel 114. As will be explained in further detail, a vessel 124 may be positioned opposite nozzle assembly 113 to receive molten feedstock. A gate assembly 1130 may be interposed between the extruder and nozzle assembly.

In some embodiments, only a subset of available extruders may be installed at any given time. For example, molding system 100 may have four or more extruders 112 available for use, only a subset of which may be installed or in active use at any given time.

In such embodiments, each extruder 112 may be used with a specific feedstock (e.g. a specific combination of colour and material). Conveniently, this may reduce or eliminate the need to change feedstock in any given extruder 112. That is, a switch from a first to a second feedstock may be accomplished by removing an extruder containing the first feedstock and replacing it with another extruder containing the second feedstock. Optionally, the first feedstock may be left in its extruder 112 for the next time that feedstock is needed. Alternatively, the extruder may be subjected to a cleansing process, which may be automated, to remove the first feedstock and ready the extruder for its next use.

In contrast, changing a feedstock within a specific extruder 112 is relatively difficult, time consuming, expensive (wasted molding material) and labour intensive. Typically, the existing feedstock must be thoroughly purged from the extruder before a new feedstock can be introduced.

Vessel 124 is carried by transport subsystem 110 and is positioned adjacent extruder 112 to receive molten feedstock. In the depicted embodiment, vessel 124 is a cartridge with an outer wall 132 defining an internal cavity 134. Outer wall 132 may be insulated, or may be formed of a material with relatively high thermal resistance. In some embodiments, temperature control elements, such as heating and/or cooling devices, may be mounted to or integrated with wall 132 for maintaining thermal control of feedstock within internal cavity 134.

Vessel 124 may be thermally conditioned such that, prior to receiving molten feedstock, the vessel has a thermal profile consistent with a desired feedstock temperature. For example, vessel 124 may be heated prior to receiving feedstock, to limit head loss from the feedstock to vessel 124.

A buffering area may be defined, e.g. within or proximate dispensing cell 102, in which one or more vessels 124 may be collected and prepared for receiving feedstock, e.g. by thermal conditioning such as heating. Vessels may be carried to and from the buffering area by transport subsystem 110.

Figures 6A, 6B:
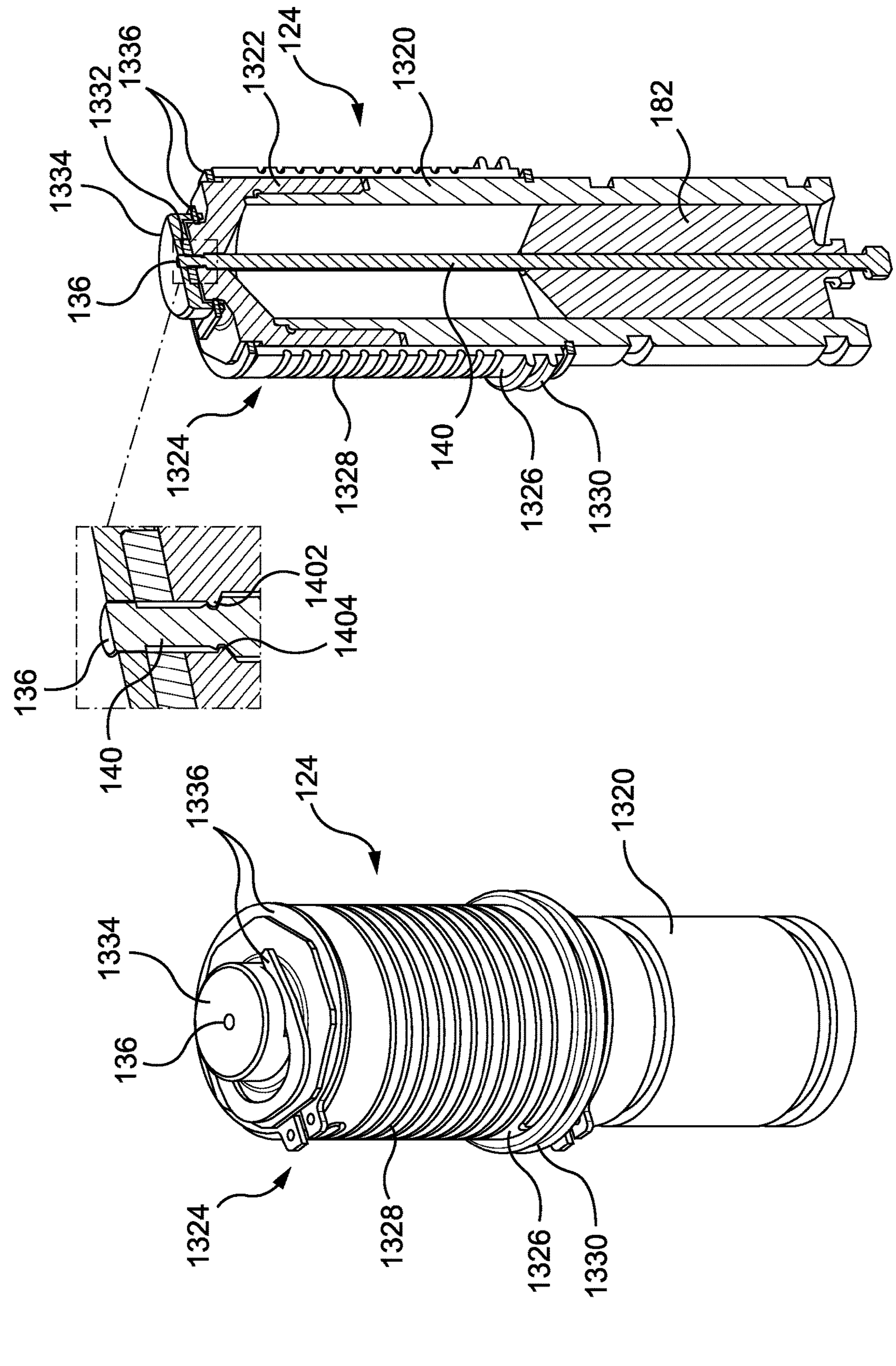
FIGS. 6A-6B are isometric and isometric cutaway views, respectively, of a vessel for transporting molding material.

FIGS. 6A and 6B depict isometric and cutaway isometric views, respectively, of a vessel 124. The vessel has a gate orifice 136 designed to matingly engage outlet orifice 122 of extruder 112 to receive flow therefrom. As further described below, in the depicted embodiment, gate orifice 136 also mates to a mold of a shaping station 104-1, 104-2, . . . 104-8 to deliver molten feedstock into the mold. In other embodiments, a separate orifice may be provided for permitting feedstock to exit vessel 124. In such embodiments, vessel 124 may be configured so that feedstock is handled in a first-in first-out manner That is, the first feedstock that enters vessel 124 through gate orifice 136 may also be the first feedstock that is pushed out of vessel 124 through an exit orifice. This may limit degradation of material within vessel 124.

Vessel 124 comprises a barrel 1320 and a tip 1322. Tip 1322 fits over and seals with an end portion of barrel 1320 and the barrel and tip cooperate to define inner cavity 134. Barrel 1320 and tip 1322 may be formed of different materials. For example, barrel 1320 may be formed of an alloy with high surface hardness for durability. Tip 1322 may be formed of an alloy with high thermal conductivity.

A sealing member 140 (FIG. 6B) is positioned within cavity 134. Sealing member 140 is operable to control flow through the gate orifice 136. Sealing member 140 is sized to occlude and substantially seal one or both of extruder outlet orifice 122 and vessel gate orifice 136. As depicted, sealing member 140 has a shoulder 1402 that contacts and forms a seal with a corresponding shoulder 1404 of the internal wall of tip 1322. Thus, sealing member 140 and tip 1322 may seal against one another with axial facing surfaces, rather than, or in addition to, sealing between complementary circumferential surfaces of the vessel gate orifice 136 and an end portion of the sealing member 140. Such axial sealing may be less prone to leakage and wear.

Sealing member 140 includes an elongate stem, also referred to as a valve stem, which is axially moveable relative to the gate orifice 136. Sealing member 140 may be moved by manipulation of the stem. Specifically, sealing member 140 may be retracted away from gate orifice 136 to permit flow therethrough, or may be extended to occlude and seal gate orifice 136. In some embodiments, when fully extended, sealing member 140 may protrude from vessel 124 and into outlet orifice 122 of extruder 112. In such embodiments, sealing member 140 may form seals with both of orifices 136 and 122.

Vessel 124 also includes an ejection mechanism for forcing material out of cavity 134. As depicted, the ejection mechanism includes a piston 182 received within cavity 134 and movable within the cavity between an extended position in which piston 182 is proximate orifice 136, and a retracted position (shown in FIG. 6B) in which piston 182 is displaced away from orifice 136 and cavity 134 is occupied by molding material. Piston 182 is configured to seal against the inner wall of vessel 124 as the piston moves between its extended and retracted positions. Thus, piston 182 may scrape molding material from the inner wall as it moves toward orifice 136.

A thermal regulating assembly 1324 may be positioned over at least a portion of barrel 1320 and tip 1322. As depicted, thermal regulating assembly 1324 includes a metallic sleeve 1326 and a heating device, namely, heating coil 1328.

In the depicted embodiment, sleeve 1326 is a thermal insulator and inhibits heat loss through underlying surfaces of barrel 1320 and tip 1322. Sleeve 1326 may, for example, be formed of an alloy with relatively low thermal conductivity. In other embodiments, sleeve 1326 may serve as a heat sink, such that it tends to promote heat transfer out of molding material within cavity 134.

Heating coil 1328 is configured to selectively introduce heat into barrel 1320 and tip 1322, and thereby, into molding material within cavity 134. Heating coil 1328 may be provided with contacts 1330, which may be external to sleeve 1326. Contacts 1330 are configured to interface with an external power source to activate heating coil 1328. The external power source may be provided at discrete locations. For example, contacts 1330 may connect with corresponding contacts at a station of dispensing cell 102, shaping cells 104, 106 or conditioning cell 108, or at a heating station between stations of cells 102, 104, 106, 108. Alternatively, contacts 1330 may interface with corresponding power lines along the length of track 144 such that vessel 124 is heated continuously or throughout a portion of its travel between stations.

Sleeve 1326 and heating coil 1328 may be configured to produce a desired thermal profile in molding material within cavity 134. Sleeve 1326 is positioned proximate tip 1322 and the inlet end of barrel 1320, and extends toward the base of vessel 124, i.e. toward the retracted position of piston 182. In some embodiments, sleeve 1326 does not reach to the retracted position of piston 182. That is, in some embodiments, in the retracted position of piston 182, sleeve 1326 does not overlie piston 182 or the portion of barrel 1320 that surrounds the piston 182.

In an alternative embodiment, not shown, heating of the vessel 124 may be indirect. For example, the vessels 124 may be induction heated, wherein the vessel includes a heating jacket formed of a suitable material, e.g. brass, aluminum, copper or steel, for coupling with an applied electromagnetic field emanating from a coil located at a heating station or otherwise arranged along a path of travel.

In the depicted embodiment, vessel 124 has an insulator 1332 positioned at the end of tip 1322. A cap 1334 fits tightly over insulator 1332. Orifice 136 is cooperatively defined by holes in tip 1322, insulator 1332 and cap 1334, which align with one another are which are sized to receive sealing member 140.

Insulator 1332 is formed of a material selected for sufficient mechanical strength and low thermal conductivity and may be, for example, plastic, ceramic or metallic. Cap 1334 is formed of a material selected for relatively high thermal conductivity. As will be explained in further detail, cap 1334 interfaces with a mold plate of a station of shaping cell 104, such that cap 1334 is interposed between the mold and tip 1322 of vessel 124. High thermal conductivity of cap 1334 promotes heat transfer from the cap to the mold. Thus, cap 1334 tends to be cooler than tip 1322. Cap 1334 cools the distal tip of sealing member 140, which in turn promotes solidification of molding material. Thus, at the end of an injection operation, the relatively cool cap 1334 and sealing member 140 tend to promote solidification of residual material in orifice 136. Such solidification may allow for clean parting of molded articles. Insulator 1332 tends to inhibit heat transfer between tip 1322 of vessel 124 and mold. Thus, the portion of tip 1322 and insulator 1332 that surround orifice 136 may remain at a temperature close to that of the molten molding material, such that the molding material experiences a large temperature gradient upon passing through cap 1334. In some embodiments, cap 1334 may have an internal profile configured to limit surface area of contact between cap 1334 and tip 1322. For example, cap 1334 may have ridges or castellation (not shown) to locate cap 1334 relative to tip 1322 without continuous contact between components.

Tip 1322, insulator 1332, cap 1334, orifice 136 and sealing member 140 cooperatively define a coupling assembly for mating of vessel 124 to stations of the dispensing and shaping cells. External features such as the outer diameter of cap 1334 and the shoulder of tip 1322 engage with corresponding locating features of the shaping or injecting station to position orifice 136 in alignment with a mold or extruder. The coupling assembly may also serve to seal vessel 124, e.g. by sealing member 140 sealing orifice 136.

In the depicted embodiment, transport subsystem 110 comprises a track 144. Vessel 124 is received in a carriage 125, which is slidably received on the track 144. Vessel 124 and carriage 125 may be moved along the tracks, e.g. by pneumatic or electromagnetic manipulation, or by a mechanical device such as a belt or chain. Transport subsystem 110 is capable of precisely indexing the position of each carriage 125 mounted to track 144. Thus, transport subsystem 110 may align a specific carriage 125 and vessel 124 with a specific extruder 112, such that gate orifice 136 of vessel 124 aligns with outlet orifice 122 of extruder 112.

Vessel 124 is movable with carriage 125, towards or away from extruder 112. In the depicted embodiment, movement of vessel 124 within carriage 125 is in a direction perpendicular to track 144. Carriage 125 may have a channel that defines a seat for the vessel and for otherwise defining a path of motion of vessel 124.

Movement of vessel 124 within carriage 125 and operation of sealing member 140 are effected by an actuator assembly 172.

Actuator assembly 172 includes a vessel positioning actuator, a piston actuator 176 and a sealing member actuator 178.

With vessel 124 in a dispensing (i.e. filling) position aligned with extruder 112, the vessel positioning actuator is likewise aligned with vessel 124 and is operable to extend into contact with vessel 124 and urge the vessel 124 into engagement with nozzle assembly 113 of extruder 112. So engaged, the outlet orifice 122 of extruder 112 and the gate orifice 136 of vessel 124 align in fluid communication with one another.

A piston 182 is movable by piston actuator 176 between an empty position in which piston 182 is located proximate orifice 136 and a filled position, in which piston 182 is displaced by feedstock within cavity 134. Piston 182 is biased towards its empty position, for example, by a spring or by mechanical force from actuator assembly 172.

Sealing member actuator 178 is operable to engage and retract sealing member 140 from gate orifice 136, thereby permitting flow of molten feedstock through gate orifice 136 and into cavity 134 of vessel 124. In the depicted embodiment, sealing member 140 includes a detent 180 for gripping by sealing member actuator 178, such that sealing member actuator 178 can push sealing member 140 into sealing engagement with gate orifice 136 or withdraw the sealing member 140 to permit flow.

Figure 7A:
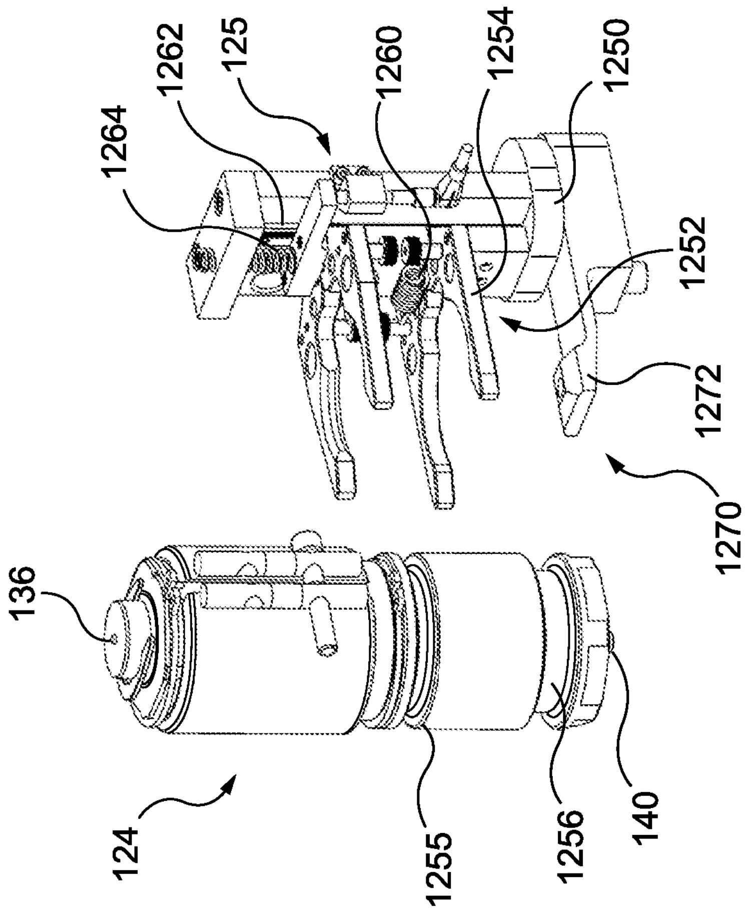
FIGS. 7A-7B are isometric views of the material vessel of FIGS. 6A-6B and a carrier.
Figure 7B:
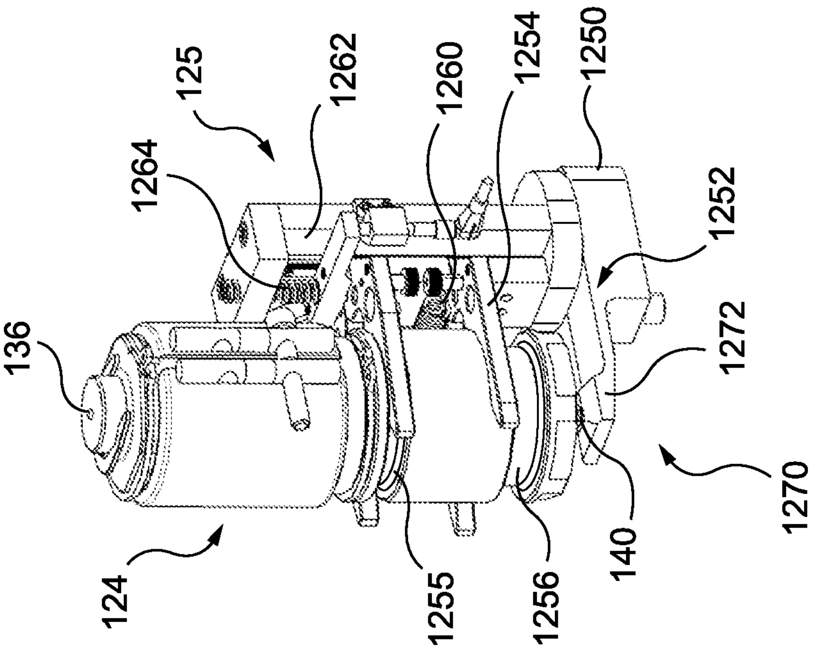

FIGS. 7A-7B show isometric views of vessel 124 and carriage 125. Carriage 125 has a base 1250 configured for mounting to track 144 and a retaining mechanism 1252 for releasably engaging vessel 124 to hold the vessel 124 to the base 1250.

Retaining mechanism 1252 has grips, e.g. tongs 1254 configured to securely hold vessel 124. In the depicted embodiment, retaining mechanism 1252 includes two sets of tongs 1254. However, more or fewer sets may be present. Tongs 1254 are mounted to a carrier plate 1262, which is in turn mounted to base 1250.

Tongs 1254 are movable between an open position (FIG. 7A) and a closed position (FIG. 7B). In the closed position, tongs 1254 retain vessel 124. Such retention may be achieved, for example, by friction or by interlocking or a combination thereof. In the depicted embodiment, one set of tongs 1254 interlocks with a corresponding detent 1255 in the surface of vessel 124. A second set of tongs 1254 frictionally grips an outer surface of the barrel 1320 of vessel 124. The second set of tongs 1254 is positioned above a second detent 1256 in vessel 124. As explained in detail below, detent 1256 is for engaging a locating feature at a processing station. Tongs 1254 are therefore positioned to avoid interfering with the locating feature. In the open position, clearance is provided between tongs 1254 and vessel 124, such that vessel 124 can freely pass between or be removed from tongs 1254.

Tongs 1254 may be biased toward a closed position. For example, tongs 1254 may be biased by a spring assembly 1260. In some embodiments, spring assembly 1260 may be double-acting such that, when tongs 1254 are partially opened, e.g. by a threshold amount, spring assembly 1260 instead biases tongs 1254 to the open position. Tongs 1254 may be configured so that insertion of vessel 124 between tongs 1254 toggles tongs 1254 to their closed position. For example, tongs 1254 may have a profile such that insertion of vessel 124 moves the tongs to an intermediate position between the open and closed positions, in which spring assembly 1260 biases tongs 1254 to snap to the closed position. The profile of tongs 1254 may be such that they tend to center vessel 124 as it is inserted between the tongs. Thus, some horizontal misalignment of vessel 124 may be tolerated and corrected during seating of the vessel inside tongs 1254 and closing of the tongs.

Tongs 1254 and carrier plate 1262 are suspended on base 1250 such that they have some vertical freedom of movement relative to base 1250. For example, tongs 1254 may be free to move vertically to align with detent 1255. Such freedom of movement may compensate for vertical misalignment of vessel 124.

Carrier 125 further includes a closure assembly 1270. In the embodiment of FIGS. 7A-7B, closure assembly 1270 is mounted proximate the bottom of base 1250.

Closure assembly 1270 has a movable arm 1272, which is movable between a sealing position, shown in FIGS. 7A-7B and an open position. In the embodiment of FIGS. 7A-7B, in the sealing position, arm 1272 contacts an end of sealing member 140 and urges it upwardly toward tip 1322 of vessel 124 to seal orifice 136.

Figure 8A:
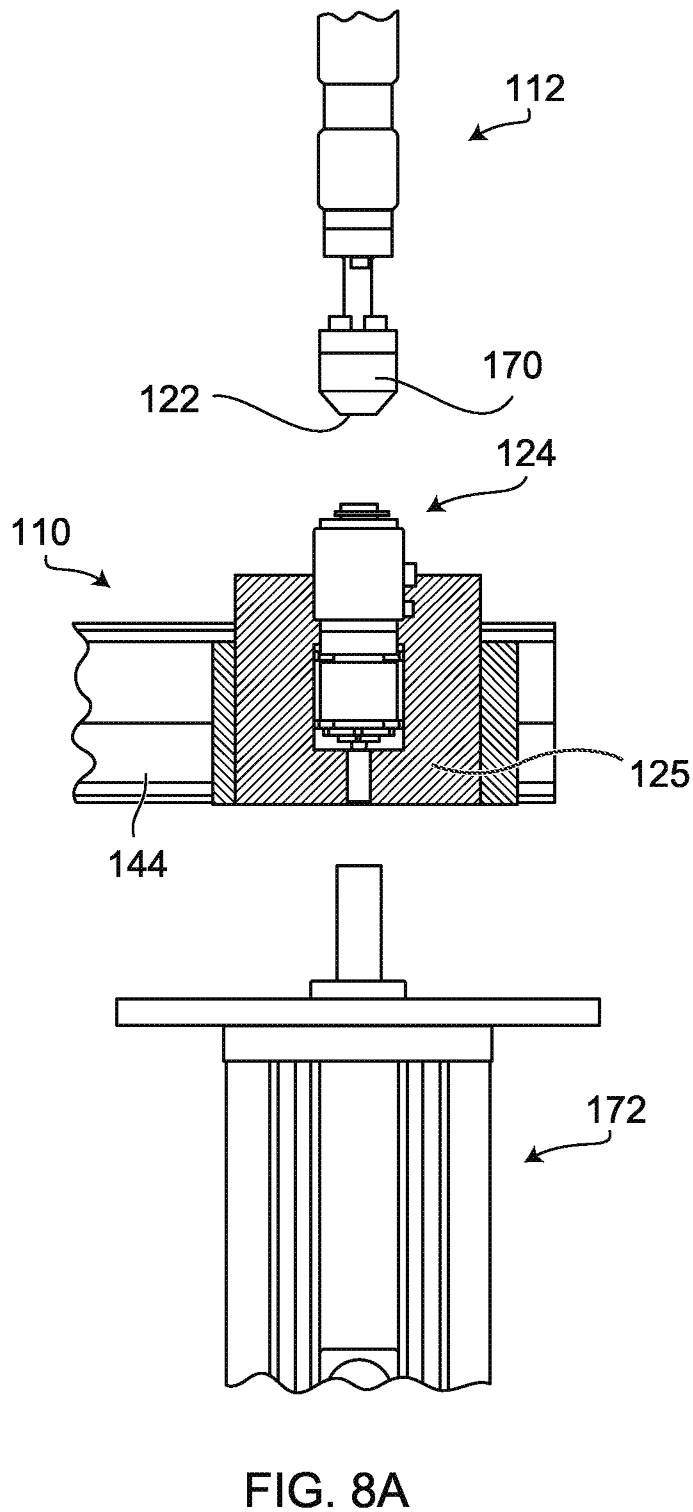
FIGS. 8A, 8B, 8C, and 8D are side and cross sectional views showing stages of a dispensing operation at the dispensing station of FIG. 4.
Figure 8B:
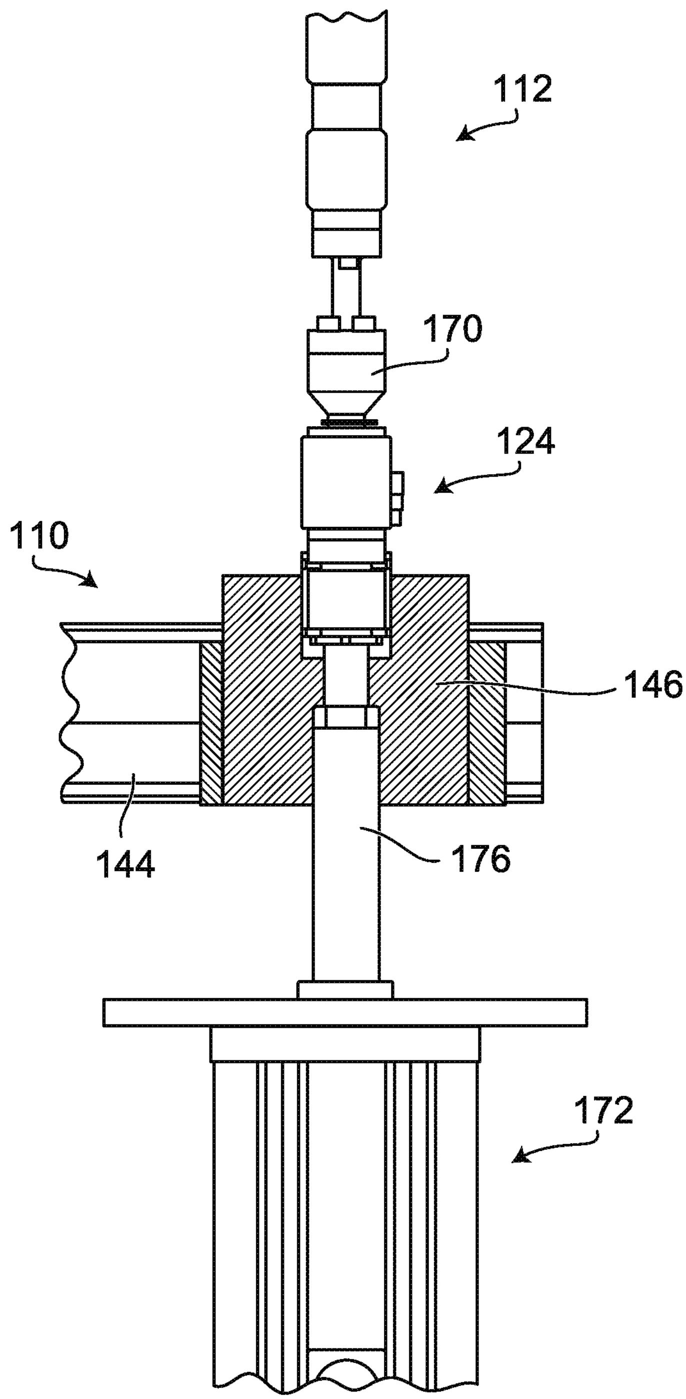
Figure 8C:
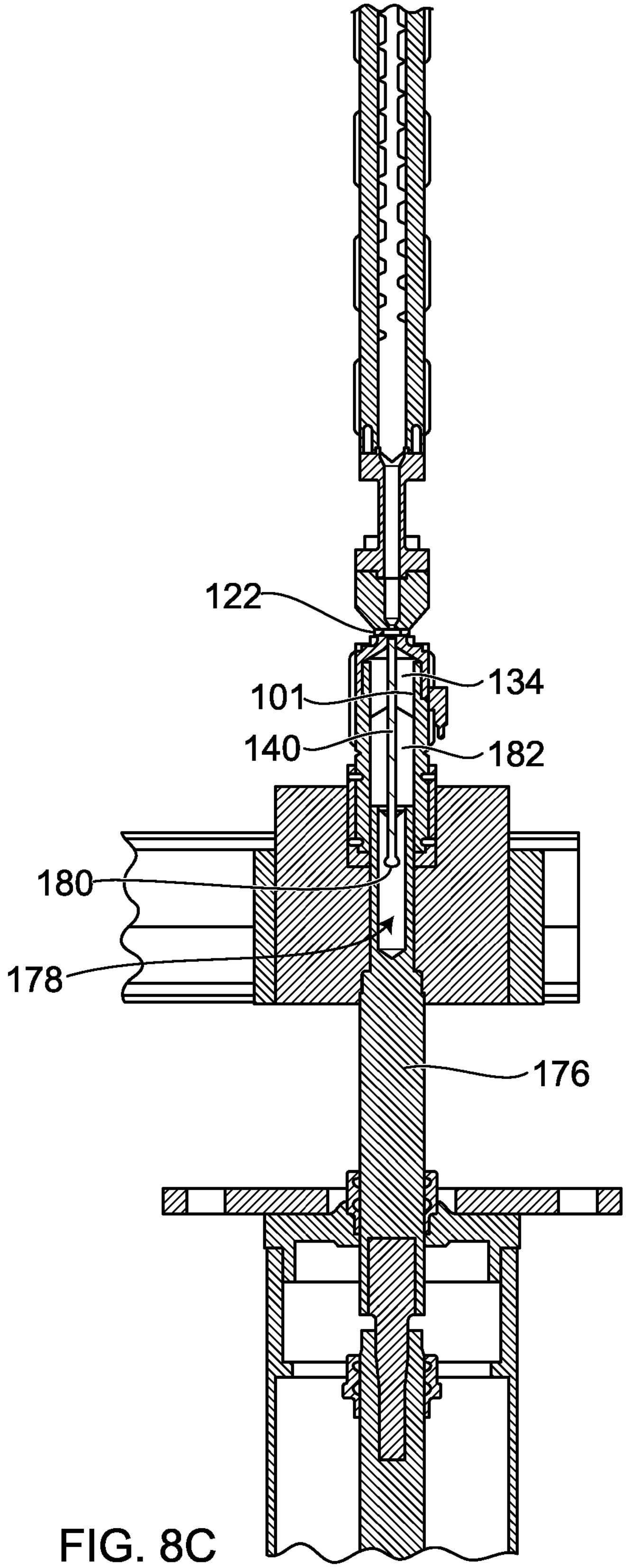
Figure 8D:
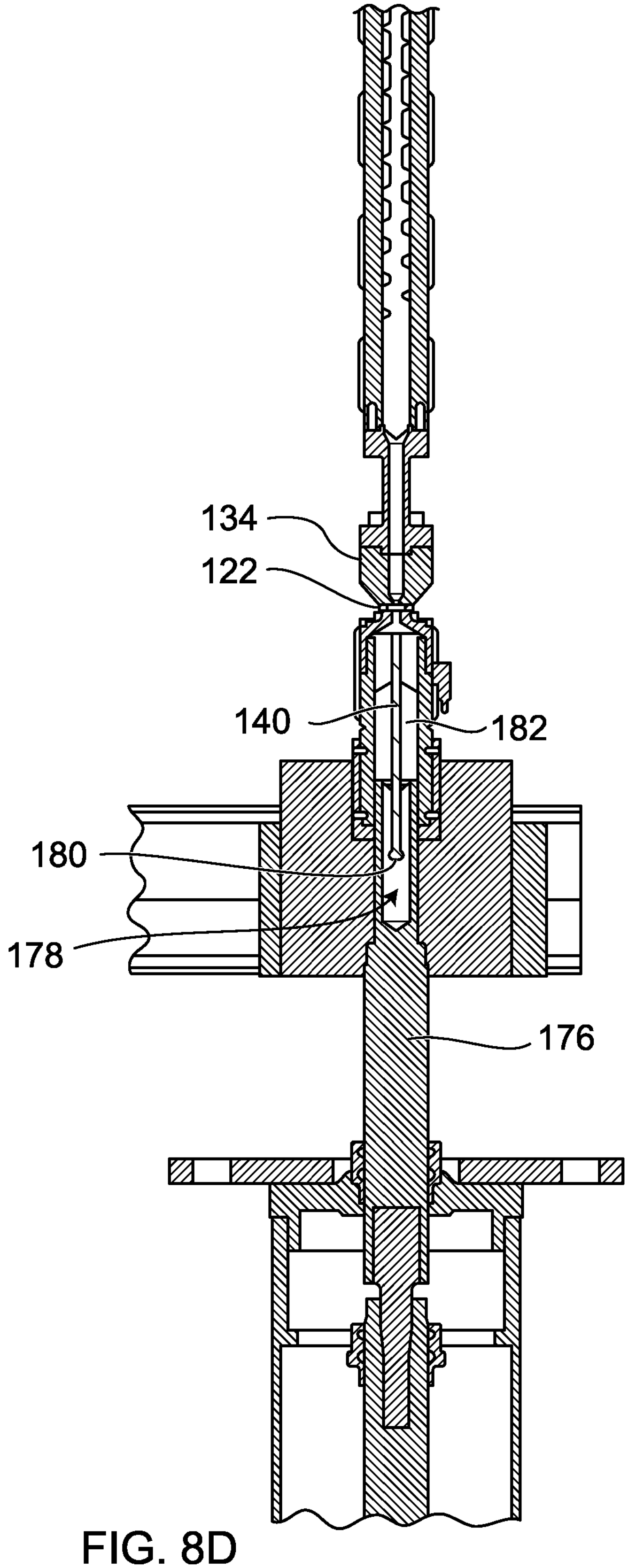

Referring to FIGS. 8A-8D, a sequence of operations for dispensing feedstock from extruder 112 to vessel 124 is shown in detail. FIG. 8A shows a side elevation view of part of extruder 112 and vessel 124 prior to engagement thereof. FIG. 8B shows a side elevation view of extruder 112 and vessel 124 after engagement and just prior to dispensing of feedstock. FIGS. 8C-8D show longitudinal cross-sectional views of extruder 112 and vessel 124 prior to and during dispensing.

As shown in FIG. 8A, vessel 124 is held in a carriage 125, movably mounted on track 144. Carriage 125 and vessel 124 are moved on track 144, into a dispensing position, between a dispensing nozzle of extruder 112 and actuator assembly 172. The vessel positioning actuator (not shown) extends to move vessel 124 into abutment with nozzle assembly 113 of extruder 112, as shown in FIG. 8B.

As shown in FIG. 8C, sealing member actuator 178 retracts sealing member 140 to permit flow of feedstock from extruder 112 into vessel 124. Piston 182 is displaced away from extruder 112, increasing the volume of cavity 134, as molten feedstock flows into vessel 124. In the depicted embodiment, vessel 124 has a stop (not shown) which limits displacement of piston 182 and thereby controls the amount of feedstock that is permitted to flow into vessel 124. The stop may be adjustable. Alternatively, extruder 112 may include a metering mechanism. For example, the extruder 112 may include a pumping device for dispensing a specific preset volume of feedstock. Screw 116 may itself function as such a pumping device. For example, rotation of screw 116 may be controlled to dispense a specific volume. Alternatively, screw 116 may be axially translated to dispense a specific volume.

A dose of feedstock is deposited in vessel 124. The dispensed dose may be referred to as a workpiece 101. As used herein, workpiece 101 refers to a dose of feedstock throughout its processing in system 100. Primes of the workpiece, i.e. 101', 101" denote changes in form of the feedstock dose as it is processed.

When filling of vessel 124 is complete, sealing member actuator 178 extends sealing member 140 to seal gate orifice 136, as shown in FIG. 8C. The vessel positioning actuator then retracts and vessel 124 moves away from extruder 112 and into carriage 125.

A vessel 124 filled with feedstock material may be transported to a shaping station of shaping cell 104 for a molding operation.

Figure 9:
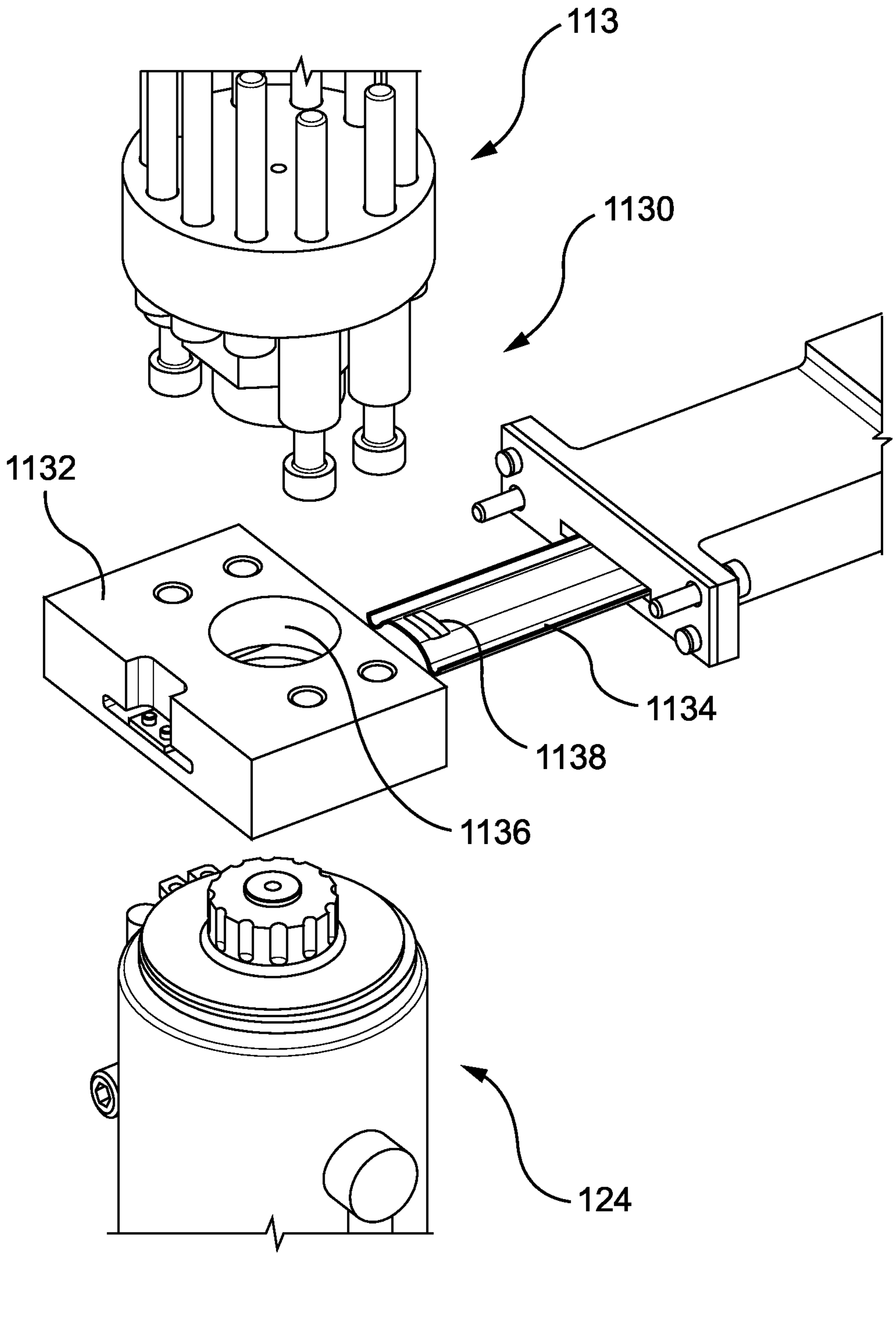
FIG. 9 is an exploded view of a gate assembly.

In some embodiments, a gate assembly 1130 may be interposed between nozzle assembly 113 and vessel 124. FIG. 9 shows an exploded view of nozzle assembly 113 and vessel 124 with gate assembly 1130. The gate assembly has particular utility when used in combination with a vessel without a sealing member 140 (FIG. 8B). Gate assembly 1130 may serve to locate orifice 136 of vessel 124 with nozzle assembly 113. Gate assembly 1130 may further serve to cut a stream of feedstock between nozzle assembly 113 and vessel 124 when filling of vessel 124 is complete.

Gate assembly 1130 includes a guide block 1132 and a blade 1134. Guide block 1132 has respective recesses 1136 for receiving and aligning each of nozzle assembly 113 and the tip of vessel 124. Blade 1134 can be extended through a pocket in guide block to cut off a stream of feedstock. As depicted, blade 1134 has an arched cross-sectional shape and is compressed within the pocket of guide block 1132 such that blade 1134 is biased against nozzle 113. A scraper 1133 is positioned opposing blade 1134, such that scraper 1133 contacts blade 1134 to dislodge molding material from the blade.

Figure 10A:
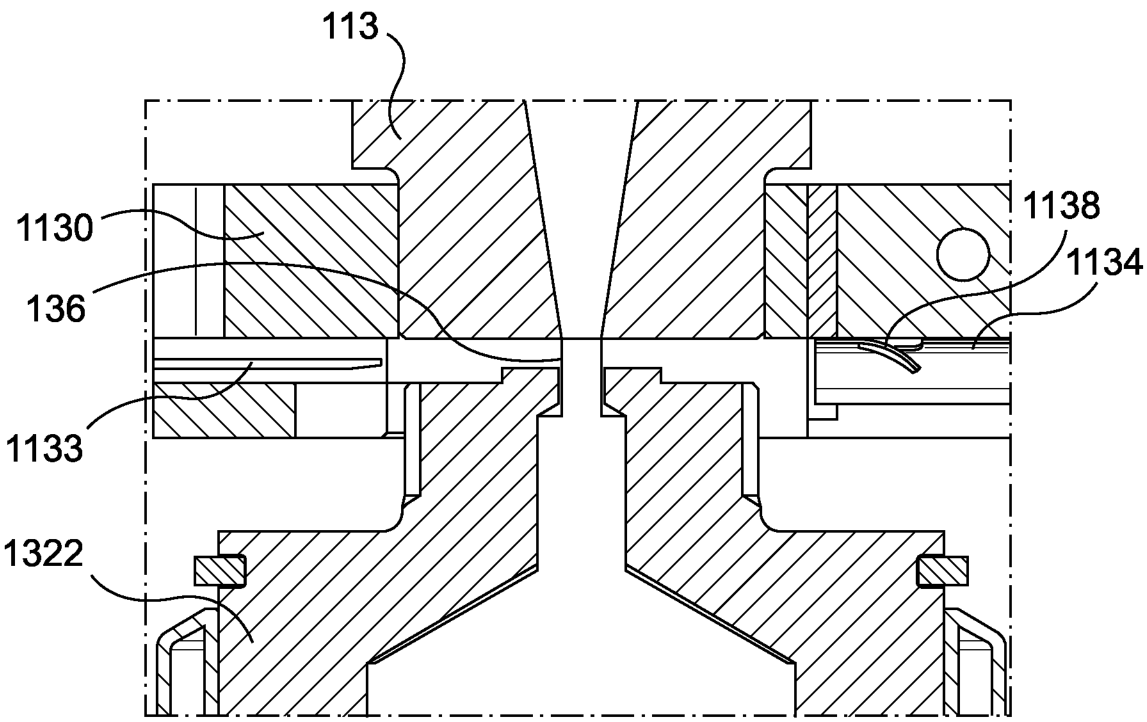
FIGS. 10A-10B are enlarged cross-sectional views showing operation of the gate assembly of FIG. 9.
Figure 10B:
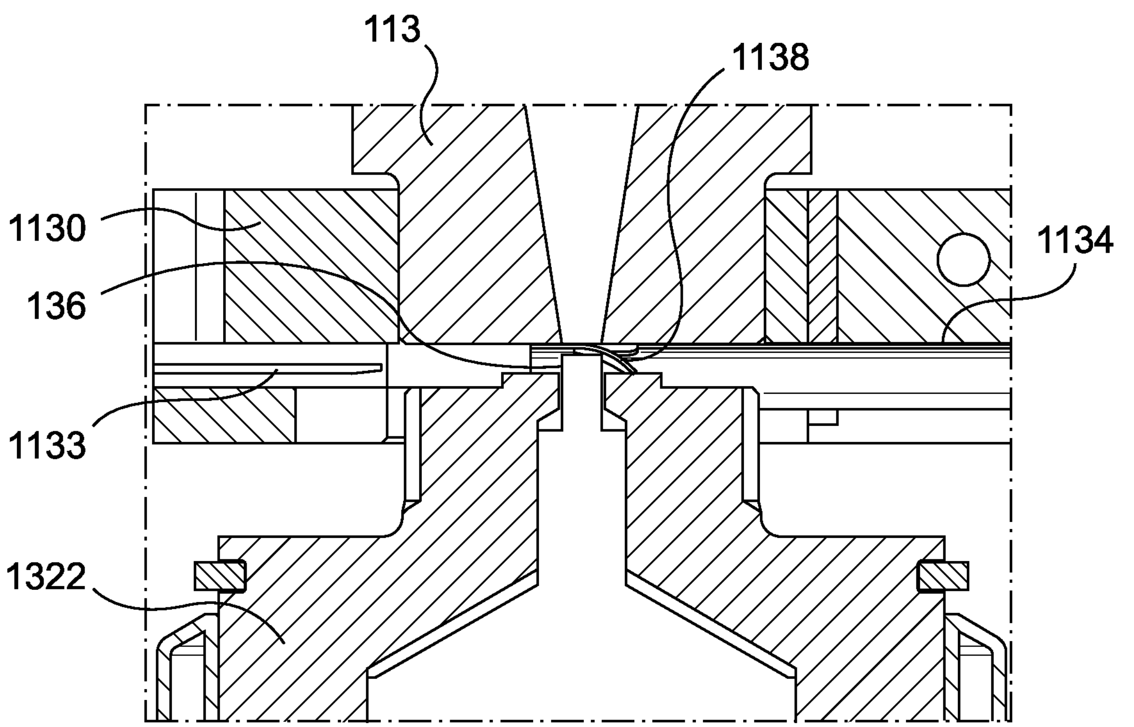

Blade 1134 may be extended to cut off a stream of feedstock when filling of vessel 124 is complete. FIGS. 10A-10B are enlarged cross-sectional views of nozzle assembly 113, vessel 124 and gate assembly 1130 during cutting of a feedstock stream.

As shown in FIG. 10A, a stream of feedstock is dispensed from nozzle assembly 113 into vessel 124 through orifice 136. When filling of vessel 124 is complete, blade 1134 is advanced toward the stream.

As shown in FIG. 10B, blade 1134 is biased against nozzle assembly 113. As blade 1134 is advanced into the feedstock stream, blade 1134 parts the stream. Blade 1134 fits tightly against nozzle assembly 113 such that feedstock is substantially prevented from leaking between blade 1134 and nozzle assembly 113. Blade 1134 has a tab 1138 which extends downwardly into contact with vessel 124. As blade 1134 advances across vessel 124, tab 1138 scrapes feedstock away to limit or eliminate residue on the exterior of the vessel.

Primary Shaping

With primary reference to FIGS. 11-24, features and operation of example stations of shaping cell 104 will now be described in detail. In the depicted embodiments, the example stations are for injection molding of plastic articles. However, many features of the described embodiments are not limited to injection molding, as will be apparent.

Figure 11:
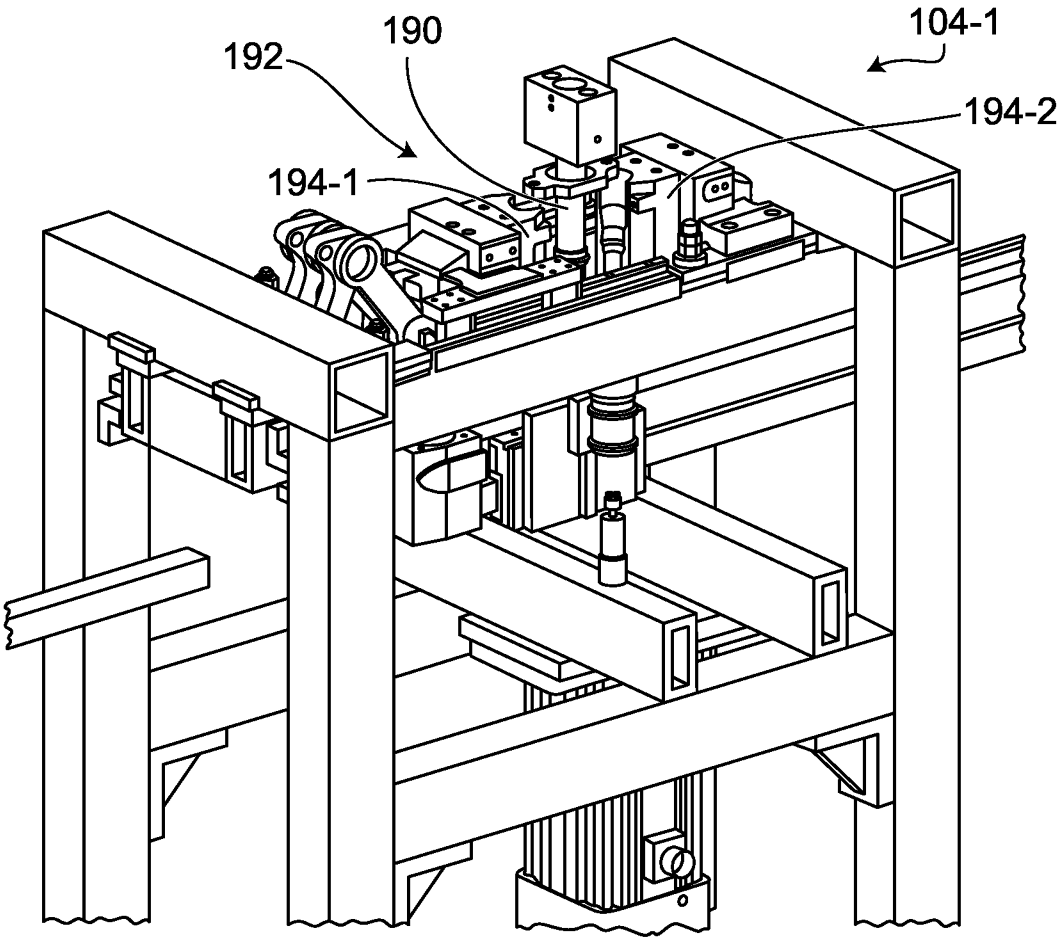
FIG. 11 is an isometric view of a shaping station of the system of FIG. 3.

FIGS. 11-12 show an enlarged isometric view and a side cross-sectional view, respectively, of a shaping station 104-1 of shaping cell 104. Shaping station 104-1 cycles between an open state for discharging a molded workpiece and a closed state for receiving a dose of feedstock to form a molded workpiece 101'. As shown in FIGS. 11-12, shaping station 104-1 is in an open state.

Shaping station 104-1 has a mold defined by a core assembly 190 and a cavity assembly 192. Cavity assembly 192 has two cavity plates 194-1, 194-2 (individually and collectively, cavity plates 194), mounted to platens 196-1, 196-2 (individually and collectively, platens 196). Platen 196-1 is mounted to a clamping mechanism, such as a hydraulic or electro-mechanical piston. Platen 196-1 is movable relative to platen 196-2, the latter of which is fixedly mounted to a base structure.

Figure 12A:
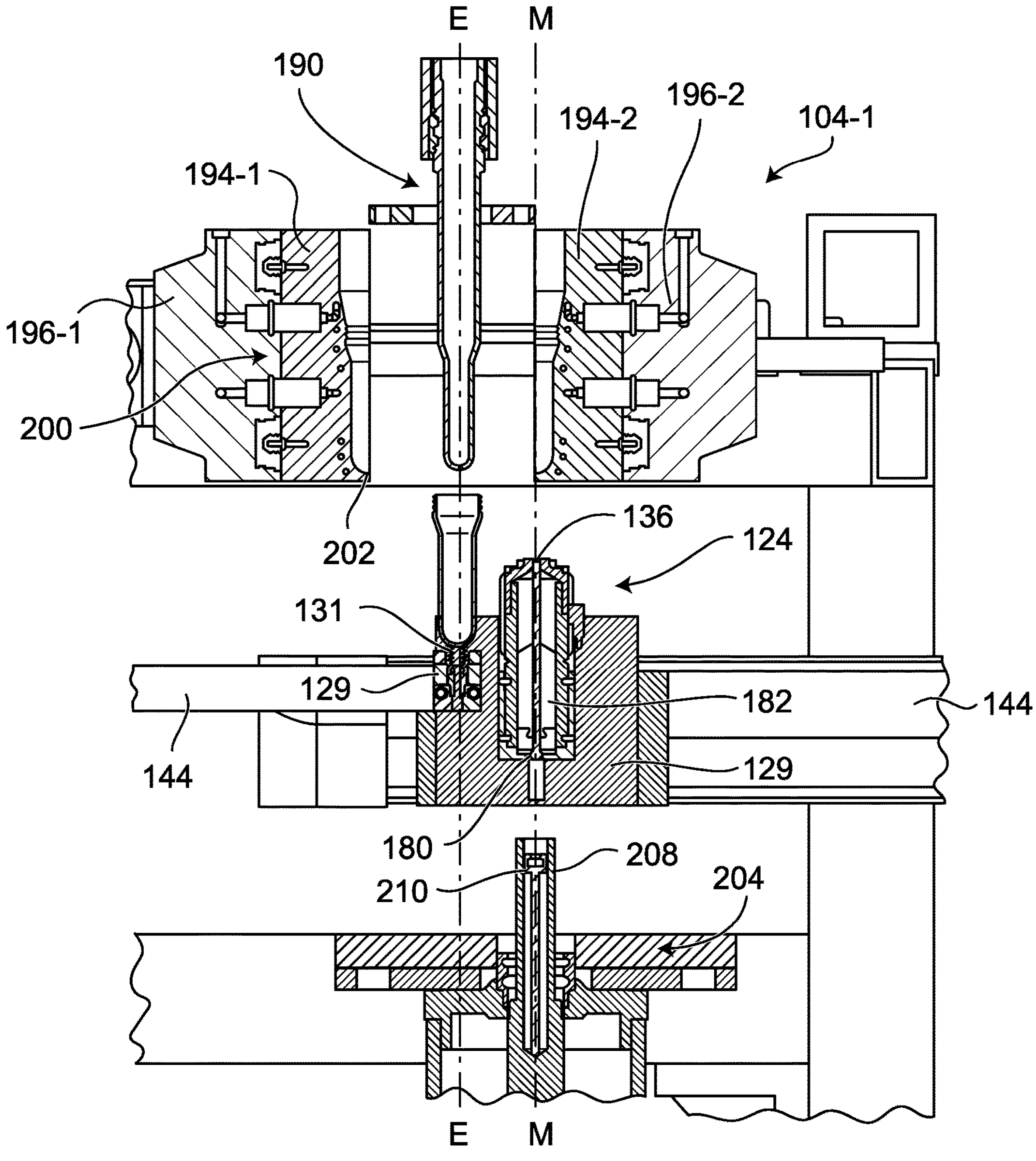
FIGS. 12A-12D are cross-sectional and isometric views of the shaping station of FIG. 11.

As shown in FIG. 12A, in the open state of shaping station 104-1, platen 196-1 is withdrawn from platen 196-2. Cavity plate 194-2 is aligned with a mold axis M-M and core assembly 190 is aligned with an ejection axis E-E.

Figure 12B:
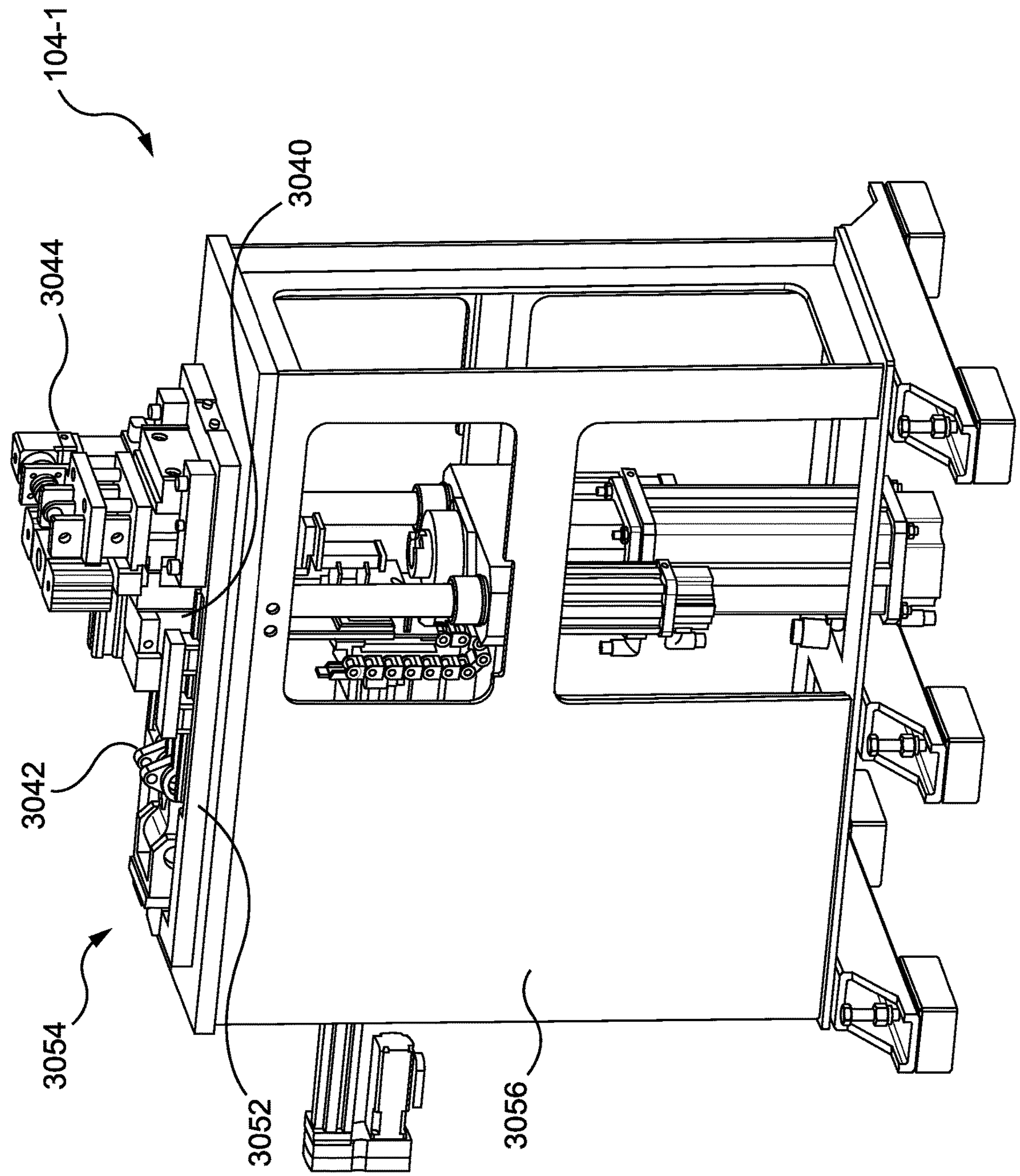
Figure 12C:
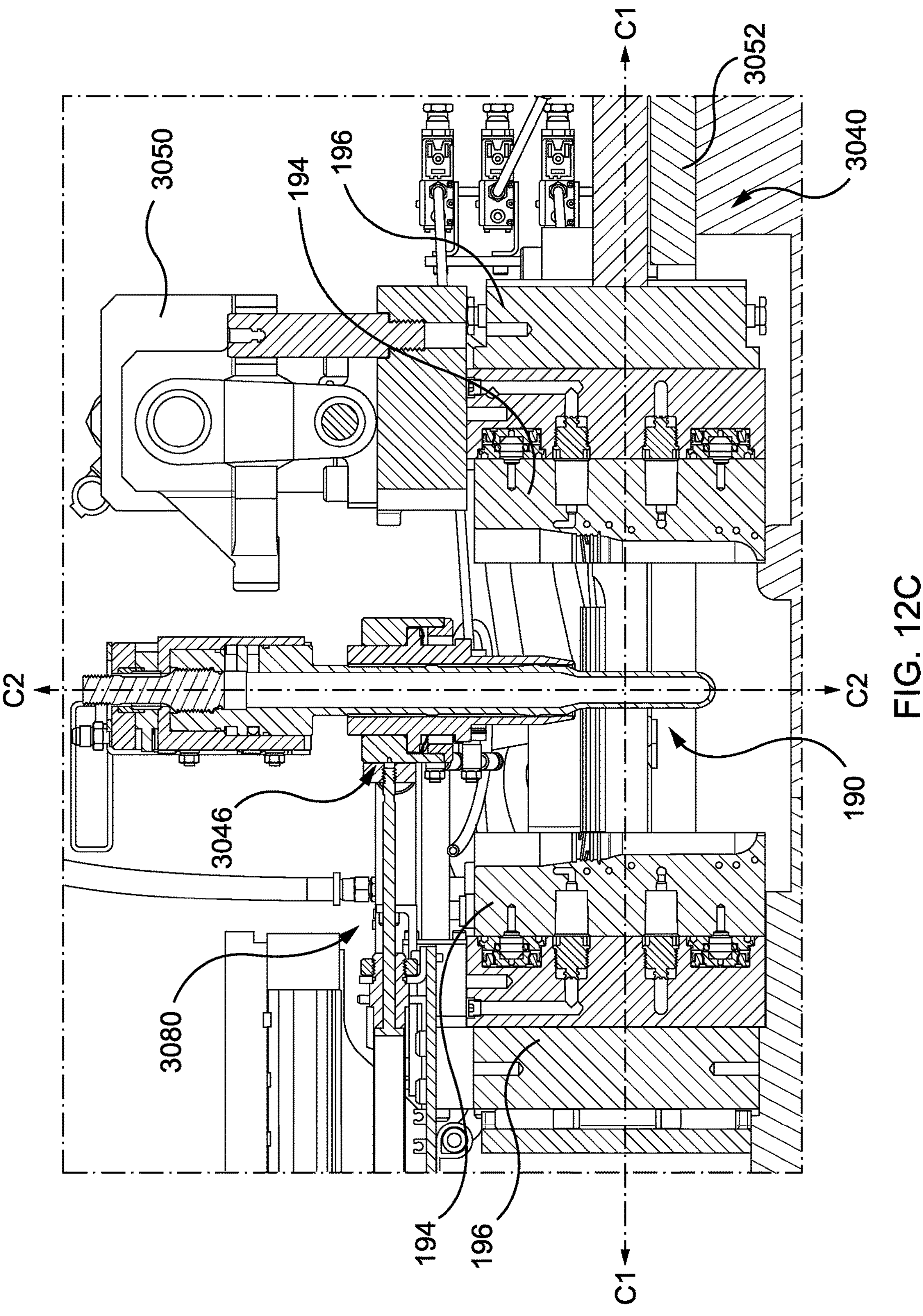
Figure 12D:
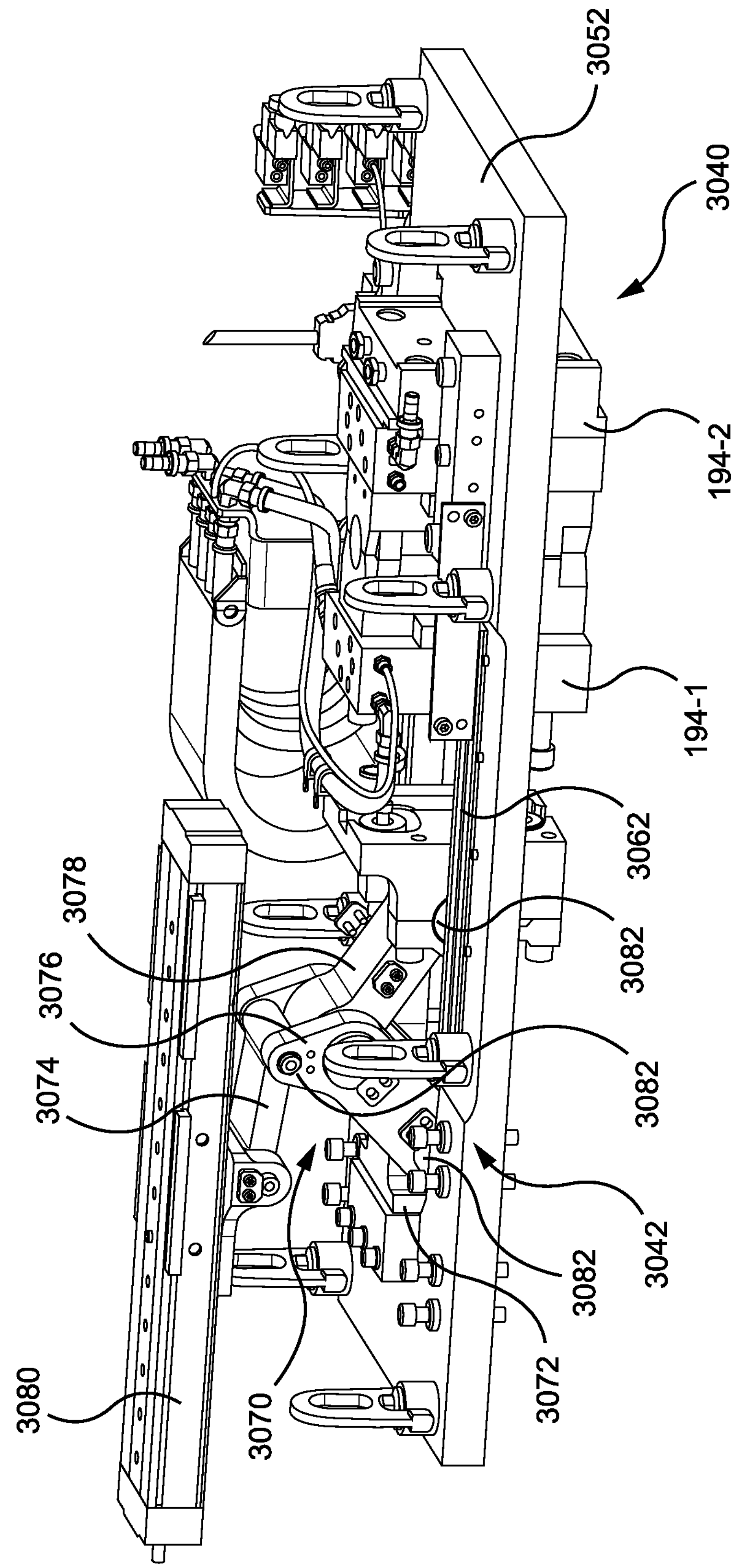

FIGS. 12B-12D depict components of shaping station 104-1 in greater detail. In the depicted example, shaping station 104-1 includes a mold subassembly 3040, a clamp subassembly 3042 and a core actuation subassembly 3044, the latter of which includes a core positioning actuator 3046 and a load actuator 3050. For simplicity, core actuation assembly is omitted from FIG. 12D.

Each of mold subassembly 3040, clamp subassembly 3042 and core actuation subassembly 3044 are mounted to a shaper frame 3052. Mold subassembly 3040, clamp subassembly 3042, core actuation subassembly 3044 and shaper frame 3052 collectively define a shaper module 3054. The shaper frame 3052 may be removably mounted to a support base 3056 of shaping station 104-1, such that shaper module 3054 may be installed or removed as a unitary assembly.

As best shown in FIG. 12C, mold subassembly 3040 may be opened and closed along multiple axes. That is, platens 196, with cavity plates 194, may be opened and closed along a clamping axis C1-C1. Core assembly 190 may be moved towards or away from cavity plates 194 along core axis C2-C2. Opening and closing along clamping axis C1-C1 may be affected by clamp subassembly 3042. Movement of core assembly 190 along core axis C2-C2 may be affected by core actuation subassembly 3042.

FIG. 12D shows details of coupling between clamp subassembly 3042 and shaper frame 3052. For simplicity, core actuation subassembly 3044 is omitted from FIG. 12D.

Platens 196 may be supported by shaper frame 3052. Platens 196 and shaper frame 3052 may have mating guide features which maintain position and alignment of platens 196 during opening and closing. In the depicted embodiment, the guide features include guide rails 3062 on shaper frame 3052 which matingly receive pins (not shown) on platens 196. In other embodiments, the guide features may be interlocking tracks. Other guide structures are possible, as will be apparent.

As depicted, platen 196-1 is slidably mounted to support frame 3052 using the guide features. Platen 196-2 is rigidly mounted to support frame 3052 in a fixed position. In this embodiment, clamp subassembly 3042 causes opening and closing by movement of platen 196-1 relative to platen 196-2 along clamping axis C1-C1. In other embodiments, opening and closing is achieved by movement of both platens toward and away from one another.

Clamp subassembly 3042 includes a multi-bar linkage 3070. Linkage 3070 includes an anchor block 3072 rigidly mounted to support frame 3052, and a plurality of pivotably-connected links coupling a platen 196 to the anchor block 3072. In the depicted embodiment, the links include a drive link 3074 and first and second rockers 3076, 3078. Drive link 3074 is coupled to a crosshead 3080.

Crosshead 3080 may be reciprocated by a suitable linear actuator, such as a ballscrew. Drive link 3074 may pivot relative to crosshead 3080 and relative to rockers 3076, 3078 as the crosshead moves through its stroke, likewise causing rockers 3076, 3078 to pivot relative to one another to drive platen 196 in either direction along clamping axis C1-C2.

Clamp subassembly 3042 has a plurality of pivotable connections 3082, each of which may be formed by press-fitting a pin and a bushing (not shown) through holes in the links or in support frame 3052. Other connection types may be used, provided they have sufficient strength and provide adequate range of motion.

Anchor block 3072 is mounted to support frame 3052 such that the center axis of anchor block 3072 aligns with the center axis of support frame 3052. Guide rails 3062 maintain the position of platen 196 such that the center axis of platen 196 aligns with the center axis of support frame 3052. Thus, anchor block 3072 and platen 196 are coupled to linkage 3070 at the center axes of anchor block 3072, platen 196 and support frame 3052. In other words, pivotable connection 3082 between the anchor block 3072 and rocker 3076 is located along the center axis of anchor block 3072 and along the center axis of support frame 3052. Likewise, pivotable connection 3082 between platen 196 and rocker 3078 is located along the center axis of anchor block 3072 and along the center axis of support frame 3052.

Movement of crosshead 3080 causes platens 196 to move between open and closed positions. In the closed (molding) position, a clamping force may be applied through crosshead 3080 and linkage 3070 to urge the platens together. The clamping force may be substantial—in some embodiments, the clamping force may be on the order of 300 kN. As will be apparent, a reaction force is applied to support frame 3052. In the depicted embodiment, platen 196 and anchor block 3072 are loaded substantially in pure compression, and that support frame 3052 is loaded substantially in pure tension because linkage 3979 is coupled to platen 196 and anchor block 3072 at the center axis of platen 196, anchor block 3072 and frame 3052. In contrast, location of any of the pivotable connections away from the center of a given component could produce significant shear force or bending moment. For example, platens in conventional injection molding machines tend to be closed by rams (e.g. hydraulic rams or ball screws) positioned proximate the corners of a platen. Exerting of clamping force in such configurations may produce a bending moment in the platens and may in some cases lead platens to deflect.

In some embodiments, the stroke length between the open and closed positions of platen 196 is relatively short. The length of the stroke is influenced by the amount of clearance required to remove (de-mold) a finished part. De-molding may be possible with a relatively small opening along an axis perpendicular to the longitudinal axis of the part. Thus, some example embodiments have a mold-opening stroke on the order of 60-120 mm Conversely, if parts were to be de-molded by opening along the longitudinal axis of the part, a longer opening stroke may be required, to create a larger amount of clearance.

Figure 13B:
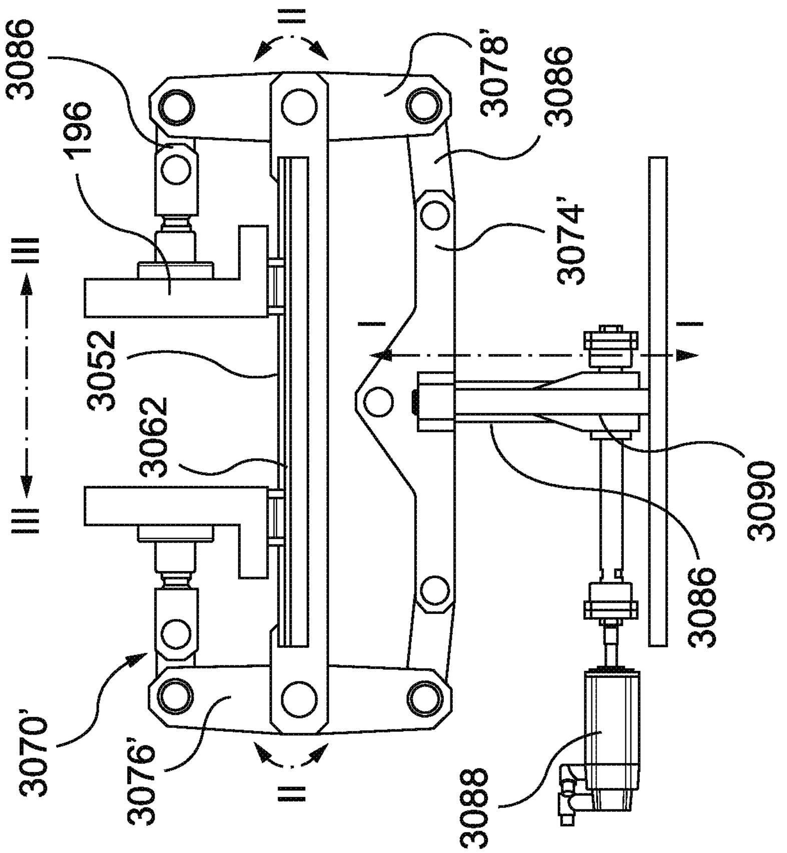
FIGS. 13A-13B are isometric and side views, respectively, of a linkage for a clamping assembly.
Figure 13A:
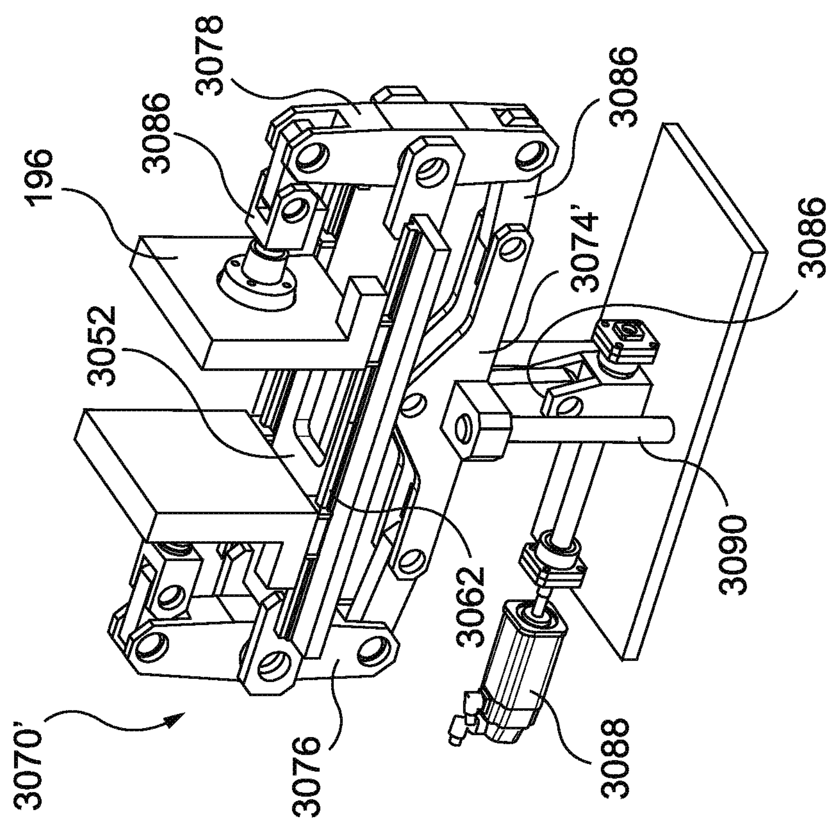
Figure 13C:
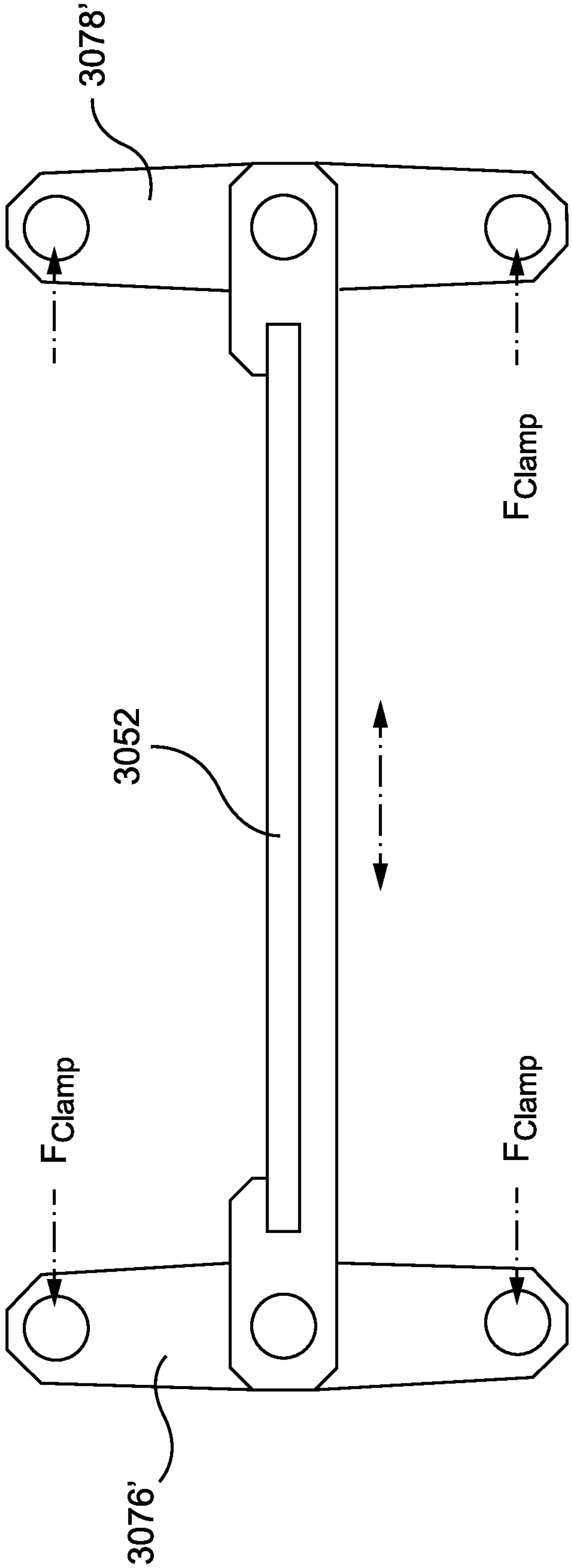
FIG. 13C is a diagram of forces on the linkage of FIGS. 13A-13B.

Other linkage configurations are possible. For example, in some embodiments, the linkage may include one or more rockers which are pivotably connected to support frame 3052. FIGS. 13A-13C show a linkage 3070' exemplary of such a configuration.

Linkage 3070' has a drive link 3074' anchored to a linear actuator 3088 (as shown, a ball screw driven by an electric motor) with one or more intermediate links 3086. Drive link 3074 is mounted on a linear guide 3090. As depicted, the linear guide constrains drive link 3074' to move in a single direction, namely, vertically. Specifically, linear actuator 3088 reciprocates horizontally, and intermediate links 3086 pivot to move the drive link through reciprocating vertical path I-I defined by linear guide 3090 (FIG. 13B).

Drive link 3074' is pivotably connected to two rockers 3076', 3078' by way of further intermediate links 3086. Each rocker 3076', 3078' is mounted to a respective platen 196 for driving the platen through a reciprocating open-close motion. Each rocker 3076', 3078' is pivotably mounted to support frame 3052. Reciprocation of drive link in direction I-I (FIG. 13B) causes rockers 1-76', 3078' to pivot about their connection to support frame 3052, i.e. in direction II-II. Such pivoting in turn drives reciprocation of platens 196 along direction III-III. The position and orientation of platens 196 during such reciprocation is maintained by guide rails 3062 on support frame 3052. FIG. 13C shows an example loading state of linkage 3070' and support frame 3052 when platens 196 are in a mold-closed position. As depicted, drive link 3074' applies a force to rockers 3076', 3078'. The rockers 3076', 3078' pivot to around their connections to drive platens 196 together and apply a clamping force against the platens. Because rockers 3076', 3078' pivot about their midpoints, the clamping force and the force applied by drive link 3074 are substantially equal in magnitude. Equal reaction forces are applied against rockers 3076', 3078', which are resisted by support frame 3052. Transfer of forces between rockers 3076', 3078' and support frame 3052 occurs at pivotable connections 3082, which are located at the center axis of support frame 3052. Accordingly, application of clamping force loads support plate 3052 substantially in pure tension.

The length of the opening/closing stroke of platens may be determined by geometric specifications of linkage 3070'. Specifically, the stroke may be determined by a combination of the lengths of drive link 3074', rockers 3076', 3078', intermediate link 3086, and the length of stroke of linear actuator 3088.

Figure 14A:
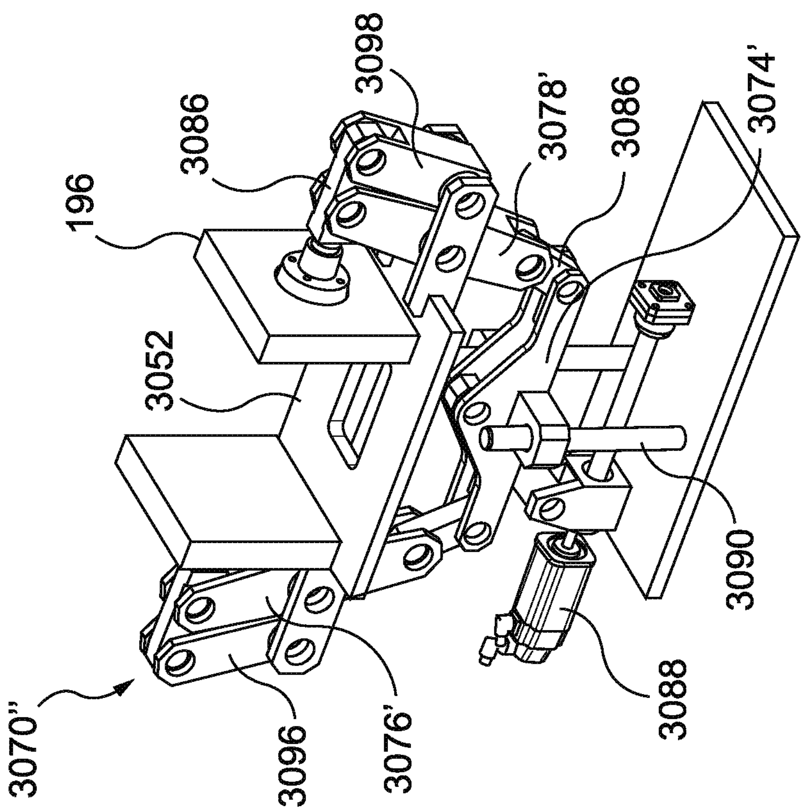
FIGS. 14A-14B are isometric and side views, respectively, of another linkage for a clamping assembly.
Figure 14B:
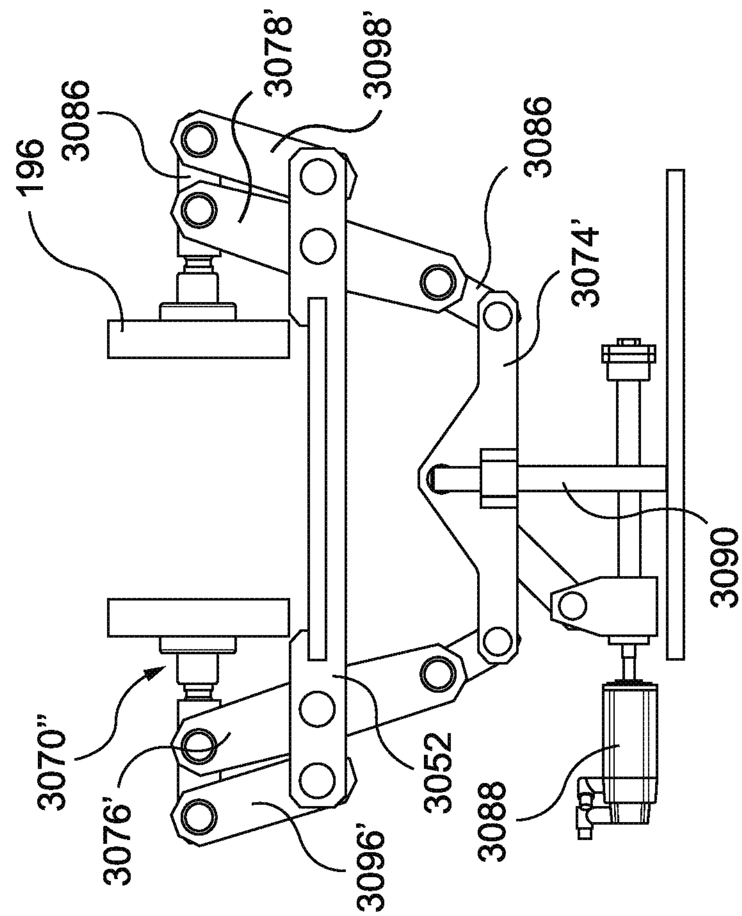

In some embodiments, the linkage may be configured to maintain position and alignment of platens 196 without the use of guiding structures such as guide rails 3082. FIGS. 14A-14B show an example of one such linkage 3070".

Linkage 3070" is generally identical to linkage 3070', except that linkage 3070" further includes secondary rockers 3096, 3098, and that support plate 3052' is somewhat larger than support plate 3052 in order to accommodate the extra rockers.

Secondary rocker 3096 cooperates with rocker 3076' to control a first platen 196 and secondary rocker 3098 cooperates with rocker 3078' to control a second platen 196. Each pair of rockers constrains the position and alignment of platens 196 during opening and closing. Secondary rockers 3096 and 3098 are connected at one end to drive link 3074' and at the other end to an intermediate link 3086, which is also connected to the corresponding rocker 3076'/3078' and to a platen 196. The multiple connections between platens 196 and support frame 3052 hold platens 192 square to support frame 3052 and to one another. Likewise, rockers 3076'/3078' and secondary rockers 3096/3098 cooperate to align the positions of platens 196 at the end of the closing stroke.

Figure 15B:
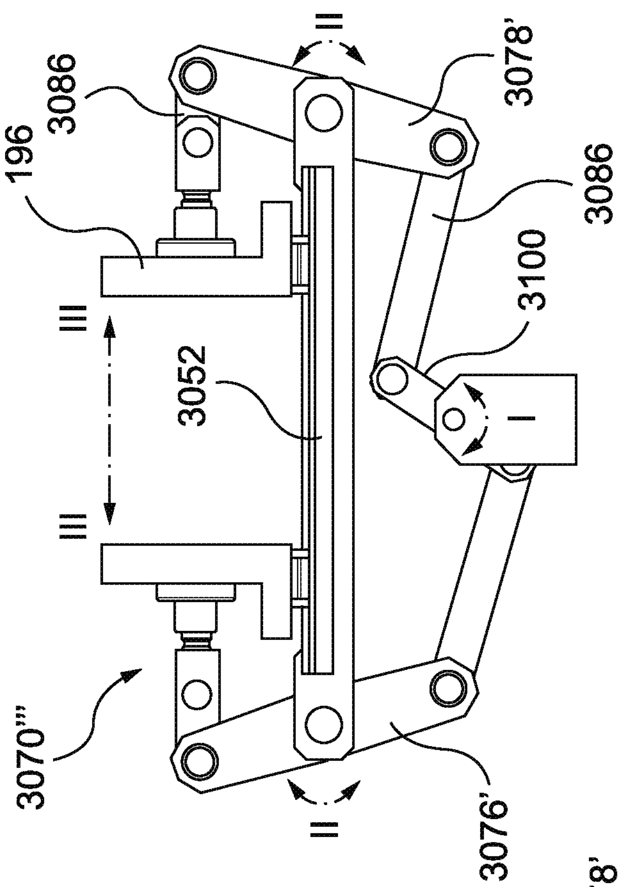
FIGS. 15A-15B are isometric and side views, respectively, of another linkage for a clamping assembly.
Figure 15A:
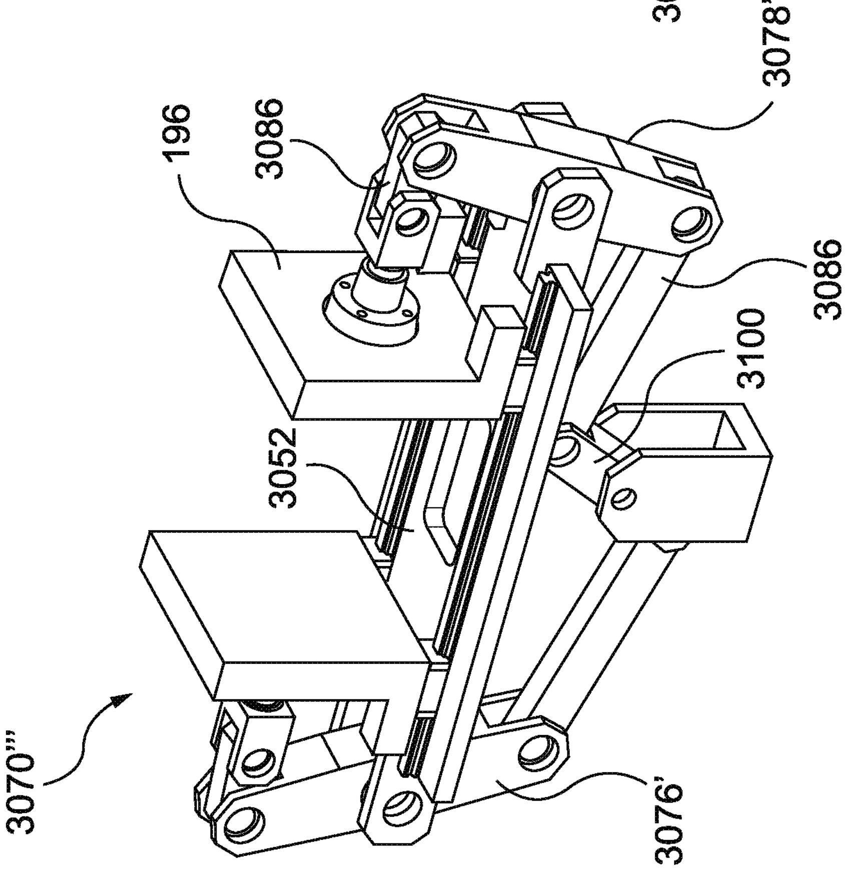

In some embodiments, the clamp assembly 3042 may be driven by a rotary actuator rather than a linear actuator. For example, clamp assembly 3042 may be driven by the crank of an electric motor. FIGS. 15A-15B show a linkage 3070''' exemplary of such an embodiment. Linkage 3070''' is generally similar to linkage 3070', but drive link 3074' is replaced by a rotor 3100. Rotor 3100 is driven by a crank shaft, e.g. a crank shaft of an electric motor. Rotor 3100 may be coupled to the crank shaft by way of a gearset, such as a planetary gearset, to provide a suitable speed reduction.

Rotor 3100 is driven to rotate around its midpoint, and the ends of rotor 3100 are coupled to rockers 3076', 3078' by way of intermediate links 3086, such that rotation of rotor 3100 causes rockers 3076', 3078' to pivot about their connections 3082 to support frame 3052. When the mold is closed and clamping pressure is applied to platens 196, rockers 3076', 3078' and support frame 3052 are subjected to a loading condition similar to that of FIG. 13C. That is, the clamping force is equivalent to the force exerted on rockers 3076', 3078' by rotor 3100 and intermediate links 3086, and support frame 3052 is loaded substantially in pure tension.

Linkage 3070''' may be relatively easily adjustable. For example, the length of rotor 3100 and its associated intermediate links 3086 may be changed to adjust the length of the opening/closing stroke of platens 196. Increasing the length of rotor 3100 may increase the stroke. Clamping force may be adjusted by changing the length of rockers 3076', 3078' or by changing the torque applied to rotor 3100 (e.g. by changing ratio of the set to which it is coupled). Accordingly, linkage 3070''' may be relatively easily adapted for use with a range of molds.

Figure 16:
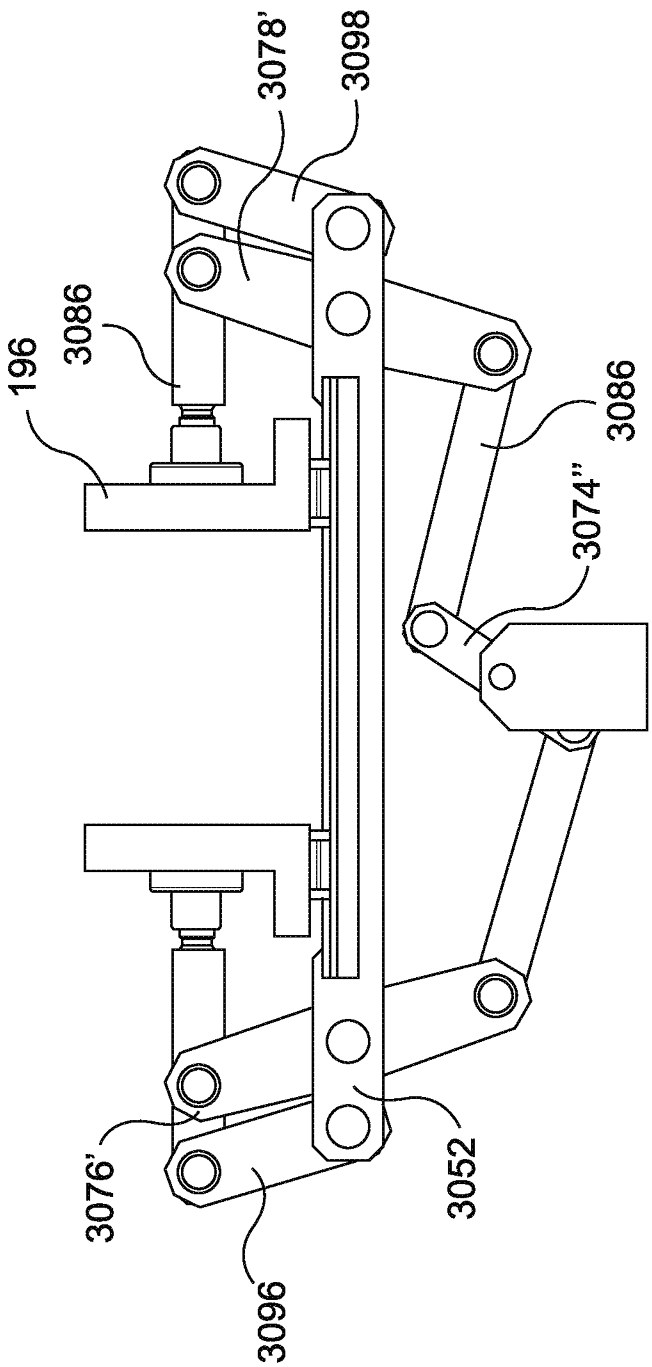
FIG. 16 is a side view of another linkage for a clamping assembly.

Embodiments may include combinations of features of the above-described crank assemblies and linkages. For example, FIG. 16 shows a linkage which includes a crank-driven clamp assembly and has multiple rockers connected to each platen to provide positional stability.

In the embodiments depicted in FIGS. 12-15, rockers 3076', 3078' are mounted to support frame 3052 at their midpoint, so that they rotate symmetrically. In some embodiments, the pivot point may be off-center. For example, the pivot point may be moved closer to the driven end of the rockers 3076', 3078' in order to increase the clamping force or to increase the length of the opening-closing stroke. Conversely, the pivot point may be moved closer to the opposite end to decrease the clamping force or stroke length.

As depicted in FIGS. 13-16, linkages 3070', 3070" and 3070''' of clamp subassembly 3042 act on both platens 196 to move them towards and away from one another. In other embodiments, the clamp subassembly may be configured to act on a single movable platen 196, while the other platen 196 is fixed. For example, drive link 3074' or rotor 3100 may be coupled to only a single rocker and platen 196.

Figure 17:
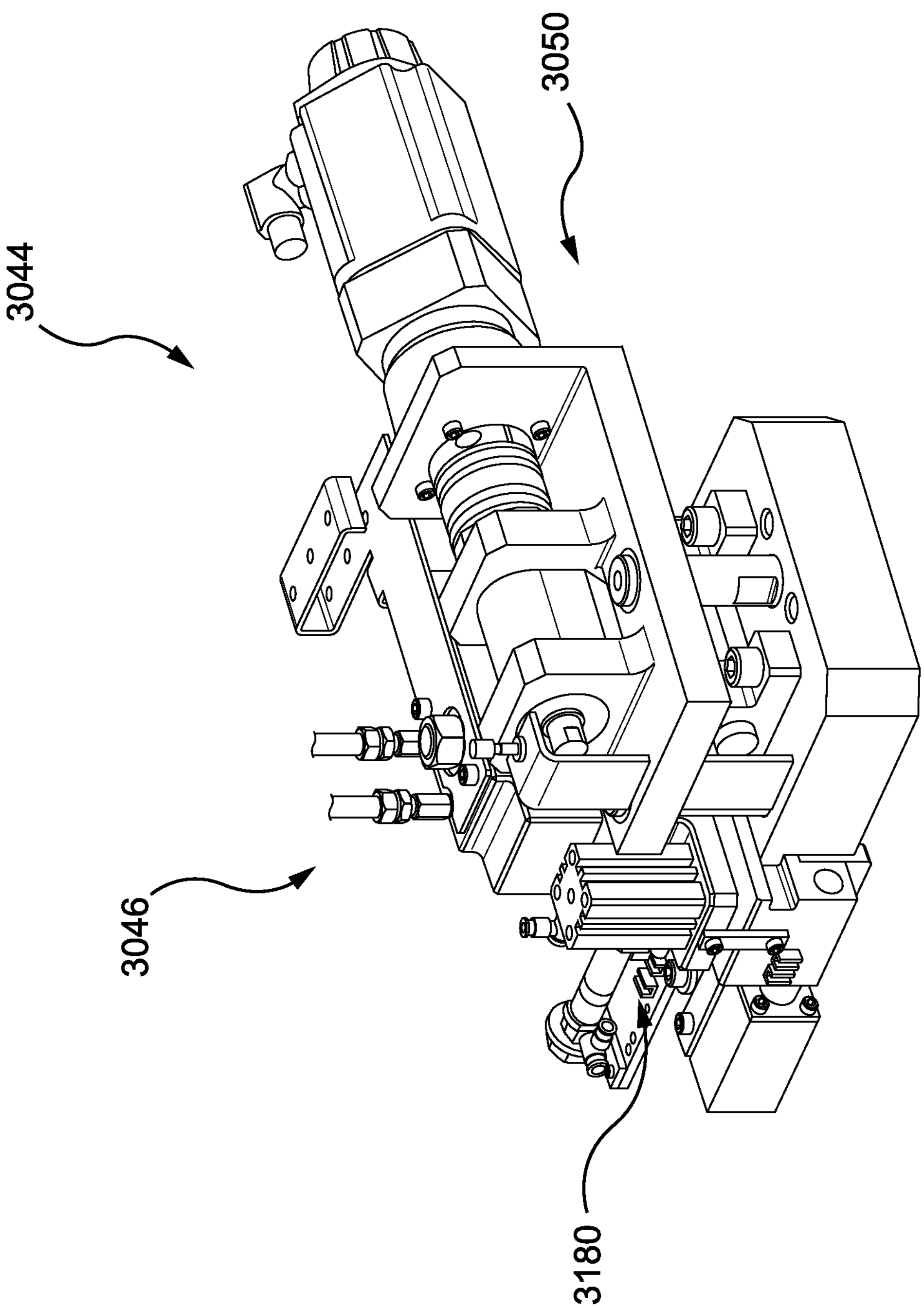
FIG. 17 is an isometric view of a core actuation assembly of the shaping station of FIG. 11.
Figure 18B:
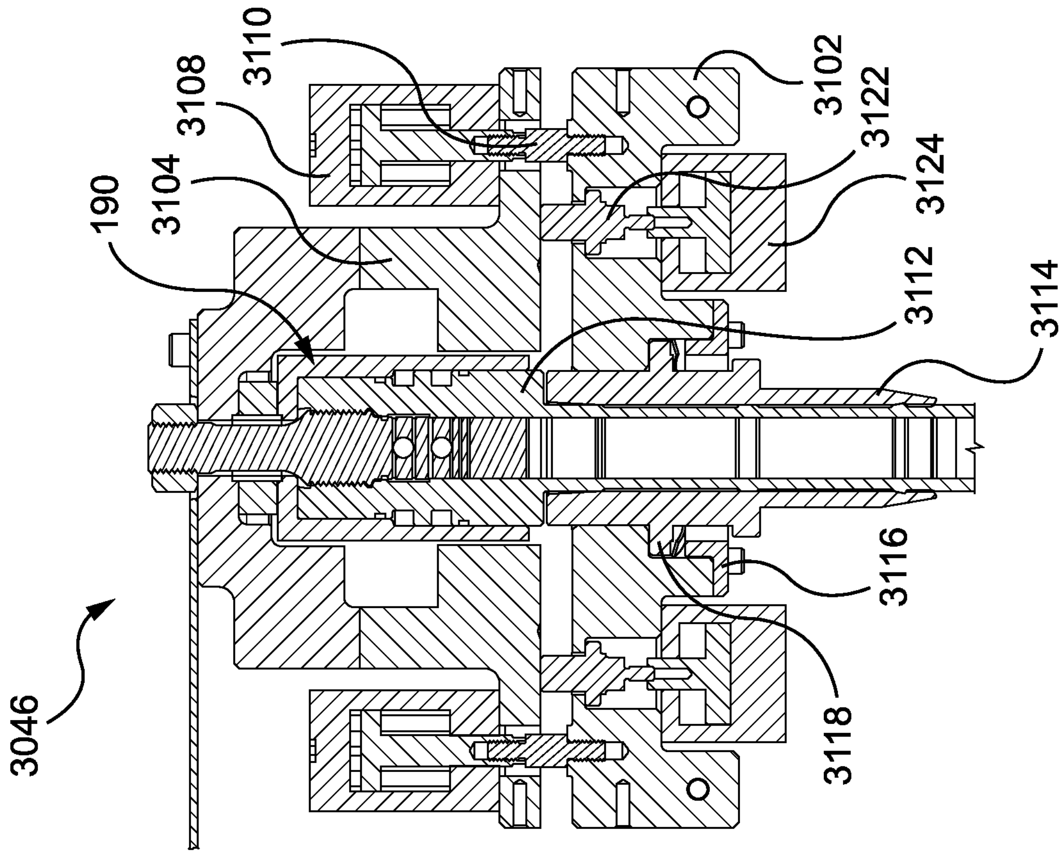
FIGS. 18A-18B are isometric and cross-sectional views, respectively, of a core positioning actuator of the core actuation assembly of FIG. 17.
Figure 18A:
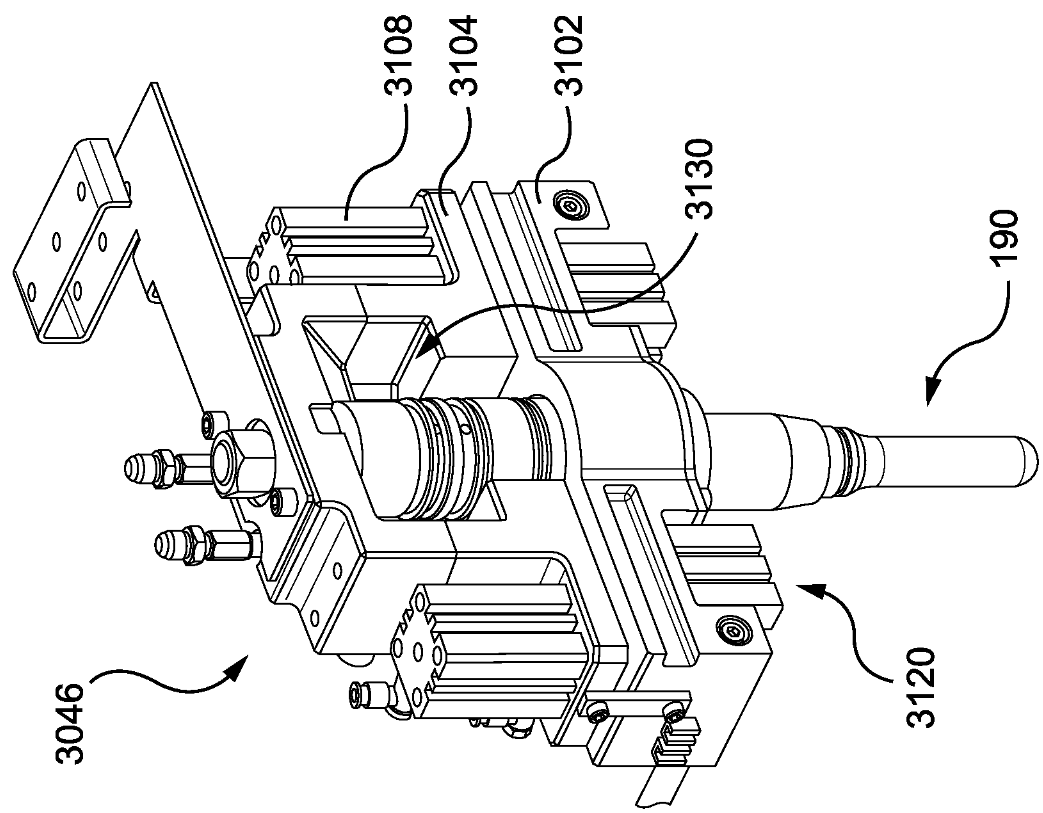

With reference to FIGS. 17, 18A-18B, 19, 20 and 21A-21B, components of core actuation subassembly 3044 are shown in greater detail. Core actuation subassembly 3044 is configured to move core assembly 190 along a core axis. In the depicted embodiment, core actuation subassembly 3044 comprises a core positioning actuator 3046 operable to move core assembly 190 through a first stroke between molding (closed) and de-parting (open) positions. Core positioning actuator 3046 may be mounted to a secondary mold opening actuator 3180. Core actuation subassembly 3044 further comprises a load actuator 3050 operable to exert force on core assembly 190 and move core assembly 190 through a shorter stroke to initiate de-parting after molding and to resist molding forces. FIGS. 18A-18B show isometric and cross-sectional views, respectively, of core positioning actuator 3046.

Core positioning actuator 3046 has a primary frame 3102 for securing to support frame 3052. Core positioning actuator further includes a loading frame 3104 positioned atop primary frame 3102. In the depicted embodiment, loading frame 3104 is mounted to primary frame 3102 using locating pins, such that loading frame 3104 may be moved vertically relative to primary frame 3102 while maintaining alignment.

Core positioning actuator 3046 may include one or more pneumatic pistons 3108 for moving loading frame 3104 relative to primary frame 3102. As best shown in FIG. 18B, pneumatic pistons 3108 are mounted to loading frame 3104 and act against primary frame 3102 to move loading frame 3104 towards or away from primary frame 3102. As depicted, pistons 3108 are coupled to an intermediate structure, namely pins 3110. In other embodiments, pistons 3108 may be coupled directly to primary frame 3102. Two hydraulic pistons 3108 are shown in FIG. 18B, however, any number of pneumatic pistons may be present. In some embodiments, other suitable linear actuators may be used instead of or in addition to pneumatic pistons. Primary frame 3102 has a central opening sized to receive core assembly 190. Core assembly 190 is mounted to loading frame 3104 and extends through the central opening. Core assembly 190 includes an inner core 3112 and an outer core 3114. During molding, inner core 3112 defines the inside surface of the part to be molded. Outer core 3114 seals the top of the mold defined by core assembly 190 and cavity assembly 192.

Inner core 3112 is mounted to loading frame 3104 and is received within outer core 3114 such that inner core 3112 is movable relative to outer core 3114. Specifically, inner core 3112 is movable relative to outer core 3114 along the core axis by motion of loading frame 3104. Outer core 3114 is fixedly mounted to primary frame 3102 by a retaining assembly 3116 which engages a flange 3118 of the outer core. Thus, relative movement of frames 3102, 3104 likewise causes relative movement of inner and outer cores 3102, 3104. After molding of a part, loading frame 3104 may be moved away from primary frame 3102, causing retraction of inner core 3112 to release the molded part.

A locating pin assembly 3120 is positioned on primary frame 3102 to align loading frame 3104 and primary frame 3102 (and thus, to align inner core 3112 with outer core 3114 and core assembly 190 with central opening 3106).

Locating pin assembly 3120 includes a pin 3122 and a pneumatic piston 3124. When loading frame 3104 is spaced apart from primary frame 3102, piston 3124 may extend pin 3122. Loading frame 3104 may have a recess (not shown) sized and positioned for registration with pin 3122. Thus, when loading frame 3104 is lowered against primary frame 3102 for molding, pin 3122 may register with the recess, guiding frame 3104 into proper alignment.

Referring again to FIG. 18A, loading frame 3104 defines an interlocking aperture 3130. Locking aperture 3130 is sized and positioned to engage a corresponding interlocking feature of loading actuator 3050.

Figure 19:
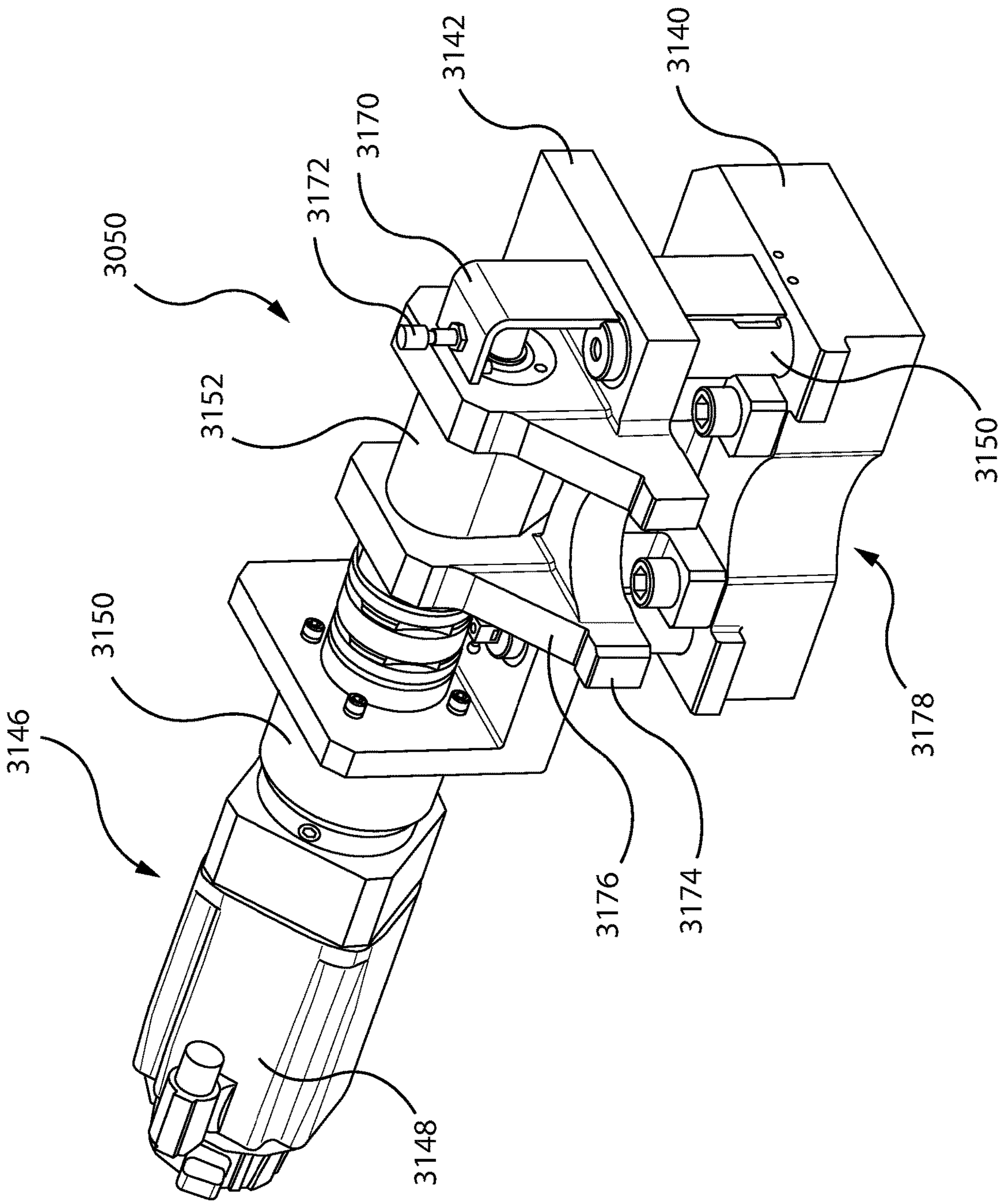
FIG. 19 is an isometric view of a loading actuator of the core actuation assembly of FIG. 17.

FIG. 19 depicts loading actuator 3050 in greater detail. Loading actuator 3050 includes a base plate 3140 and a moving plate 3142. Moving plate 3142 is movable relative to base plate 3140 and one or more guide rods 3144 are mounted to base plate 3140 and received in corresponding openings in moving plate 3142 to guide motion of the moving plate.

Loading actuator 3050 has a drive assembly 3146 comprising a motor 3148, gearset 3150, and rocker 3152. Motor 3148 is coupled to rocker 3152 through gearset 3150 and a camshaft 3154 to cause rotation of and impart torque on rocker 3152. Moving plate 3142 is mounted to one end of rocker 3152 and base plate 3140 is mounted to the other end of rocker 3152.

Rocker 3152 may be rotated by motor 3148 through gearset 3150 and camshaft 3154 to move moving plate 3142 relative to base plate 3140. Guide rods 3144 constrain the movement to a vertical axis, i.e. core axis.

Figure 20:
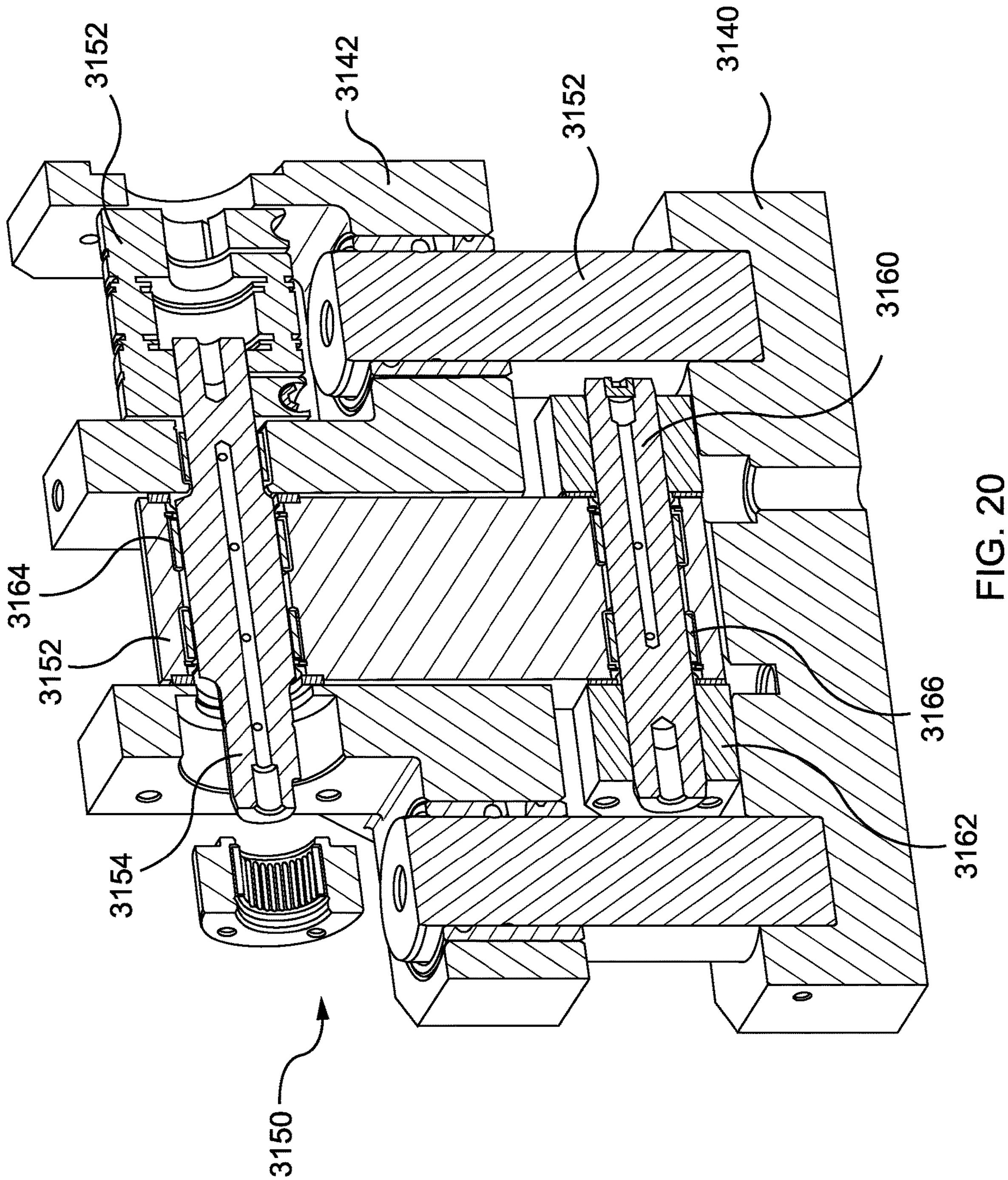
FIG. 20 is a partial cutaway view of the loading actuator of FIG. 19.

FIG. 20 is a cutaway view of load actuator 3150 showing coupling of motor 3148, gearset 3150 and camshaft 3154, to move rocker 3152 and plates 3140, 3142 in greater detail. As depicted, a camshaft 3154 is supported on moving plate 3142. Camshaft 3154 is received through one end of rocker 3152. Ends of camshaft 3154 are received in fittings 3155 in movable plate 3142. Rocker 3152 supports moving plate 3142 by way of camshaft 3154 and fittings 3155.

The opposite end of rocker 3152 is mounted to base plate 3140 by a retainer shaft 3160. Retainer shaft 3160 is received by a pair of blocks 3162 which are rigidly fixed to base plate 3140.

Camshaft 3154 is supported by bearings 3164 within rocker 3152 and within fittings 3155. Likewise, retainer shaft 3160 is supported by bearings 3166 within blocks 3162. Camshaft 3154 and retainer shaft 3160 may therefore rotate relative to plates 3140, 3142 with relatively little resistance.

Camshaft 3154 is rotationally coupled to gearset 3150 (not shown) by way of a coupling 3156. Gearset 3150 may be configured to drive camshaft to rotate with relatively low speed and relatively high torque. Camshaft 3154 has an offset lobe such that the radius to from the center of rotation of shaft 3154 to the outside of its offset lobe is greater than the radius from the center of rotation to any other part on the periphery of the crankshaft. As crankshaft 3154 turns with gearset 3150, its offset lobe engages with a bearing 3166 within rocker 3152. As the offset lobe falls, camshaft 3154 bears against rocker 3152 and urges moving plate 3142 upwardly. As the offset lobe falls, rocker 3152 and moving plate 3142 are allowed to fall.

As shown in FIG. 19, a measurement device, namely, proxy bracket 3170 may be installed to provide an indication of the position of camshaft 3154. Proxy bracket 3170 is fixed to base plate 3140 and extends upwardly past camshaft 3154. A sensor 3172 is mounted to proxy bracket 3170 and provides a signal representative of the rotational position of camshaft 3154. Alternatively or additionally, a sensor may provide a signal representative of the vertical position of moving plate 3142. Alternatively or additionally one or more position transducers could be mounted between base plate 3140 and moving plate 3142 to provide a signal representative of the relative positions of the plates.

Figure 21A:
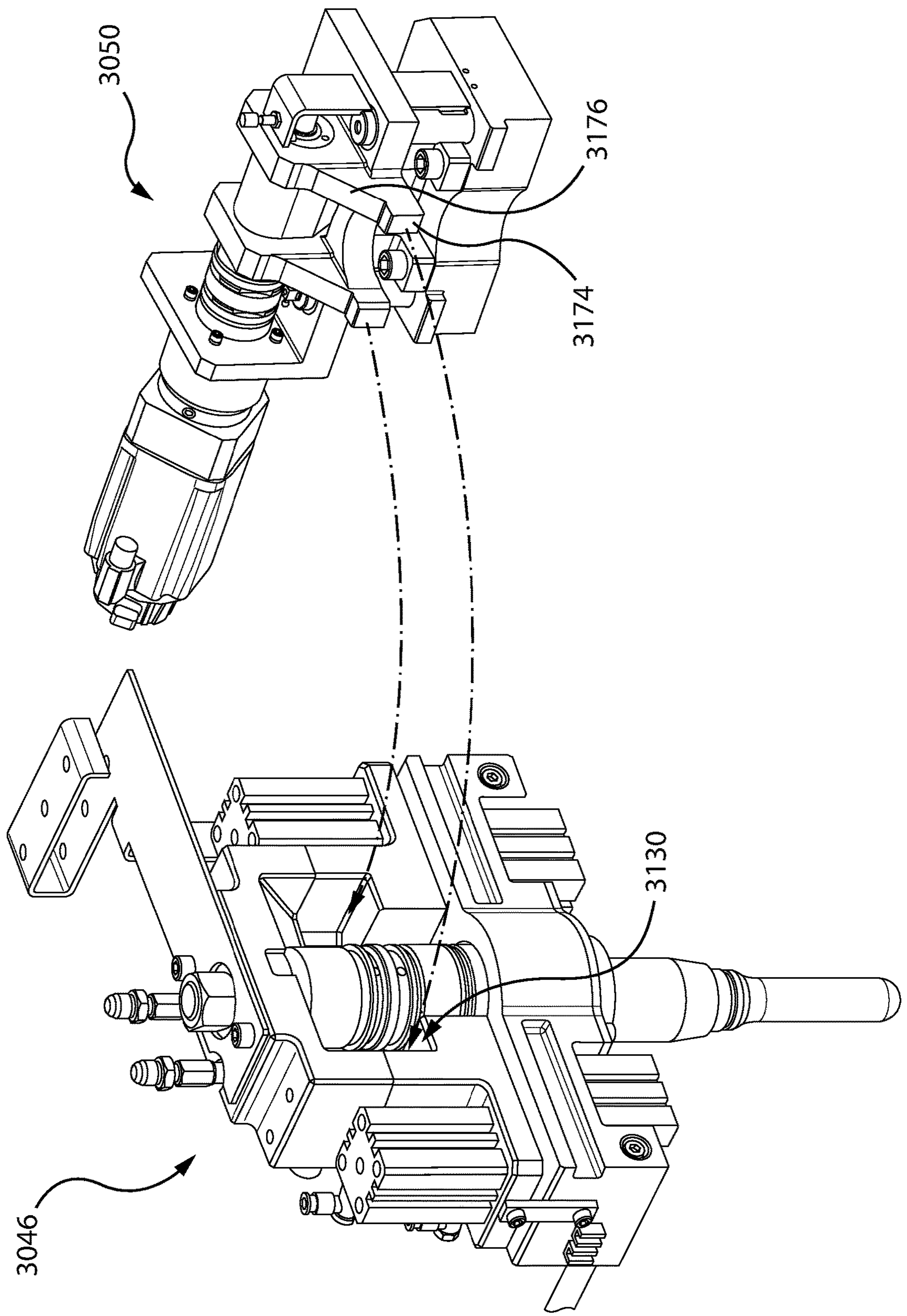
FIG. 21A is a schematic view showing interlocking between the core positioning actuator of FIGS. 18A-18B and the loading actuator of FIG. 17.
Figure 21B:
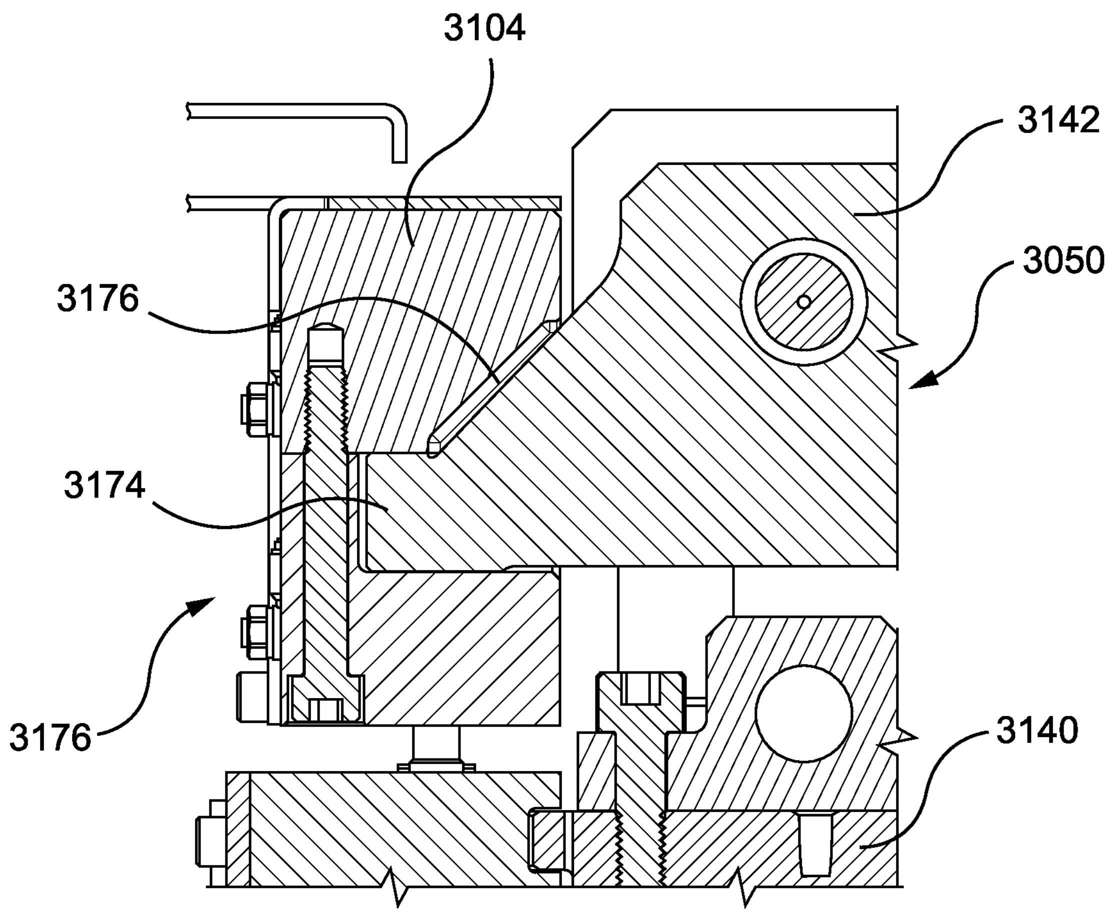
FIG. 21B is a partial cross-sectional view of the core positioning actuator of FIGS. 18A-18B and the loading actuator of FIG. 17, showing interlocking.

As best shown in FIGS. 19 and 21A-21B, moving plate 3142 has projections 3174 for engaging loading frame 3104 of core positioning actuator 3046. Projections 3142 are sized, shaped and positioned for engagement with interlocking recess 3130 defined by loading frame 3104. With the mold in a closed position, projections 3174 are received in recess 3130. Projections 3174 have upward-facing surfaces 3176 which abut corresponding surfaces of loading frame 3104 in the mold-closed position. In the depicted embodiment, upward-facing surfaces 3176 are inclined, such that they may bear on the corresponding surfaces of loading frame 3104 during closing and guide the projections 3174 into mating alignment with the recess 3130. Projections 3174 further include downward-facing surfaces 3178 which abut corresponding faces of loading frame 3104.

Movement of moving plate 3142 while projections 3174 are received in apertures 3130 causes projections 3174 to bear against frame 3104. Specifically, upward movement of moving plate 3142 causes surfaces 3176 to bear against frame 3104, urging the frame upwardly. Downward movement of moving plate 3142 causes surfaces 3178 to bear against frame 3104, urging the frame downwardly.

Rotation of camshaft 3154 may therefore selectively cause an upward or downward force to be exerted against frame 3104, in turn causing frame 3104 to move through a short stroke. Rotation of camshaft 3154 to urge plate 3142 upwardly by way of rocker 3152 (FIG. 20) causes a short upward movement of frame 3104, and therefore, a short upward movement of inner mold core 3112 (FIG. 18B). Such upward movement may serve to dislodge or break a seal between a molded part and mold core 190.

The depicted configuration may eliminate the need for a separate stripper plate to remove molded articles, and may thus reduce mechanical complexity of the molding apparatus relative to a typical configuration including a stripper plate.

Rotation of camshaft 3154 to urge plate 3142 downwardly by way of rocker 3152 (FIG. 20) causes a downward force to be exerted on frame 3104 and a short downward movement of frame 3104. The force and short movement are transferred to inner mold core 3112 and may function as a pre-load to resist pressure exerted by molding material against mold core 190 during molding.

Core positioning actuator 3046 may be mounted to one of platens 196. Loading actuator 3050 may be mounted to the other of platens 196. Loading actuator 3050 may be rigidly mounted, such that base plate 3140 does not move relative to the platen 196 to which it is mounted.

Figure 22:
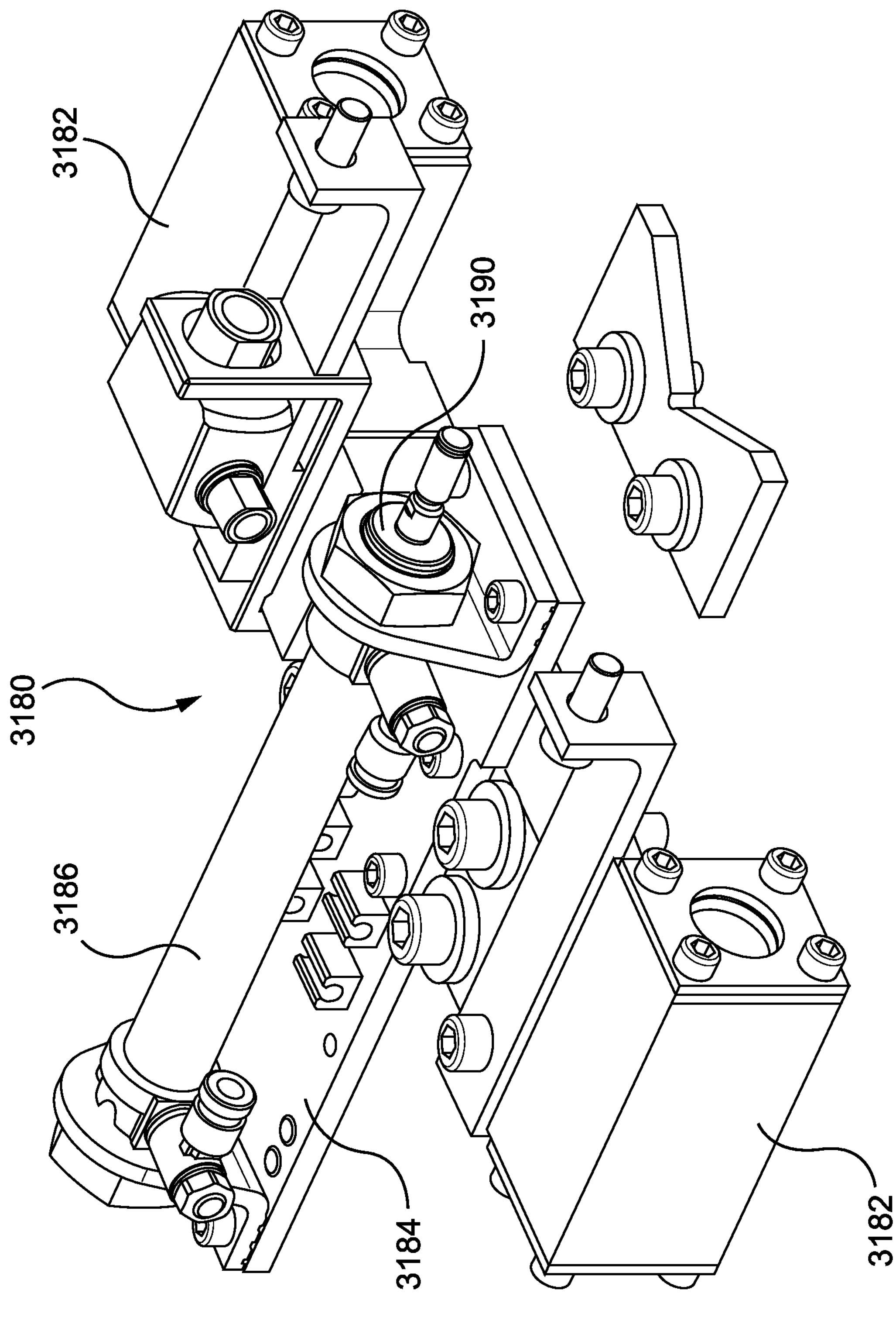
FIG. 22 is an isometric view of a secondary mold opening actuator of the core actuation assembly of FIG. 17.

Core positioning actuator 3046 may be mounted by way of a secondary mold opening actuator 3180, shown in FIGS. 17 and 22. Secondary mold opening actuator 3180 includes one or more blocks 3182 rigidly mounted to a platen 196. Secondary mold opening actuator 3180 further includes a pneumatic cylinder 3186 carried on a plate 3184 mounted to the block 3182. Pneumatic cylinder 3186 has a coupling 3190 for fixation to primary frame 3102 of core positioning actuator 3046. Pneumatic cylinder 3186 is operable to move core positioning actuator between a retracted position in which the mold core 190 is located in its molding position relative to the mold cavity portions, and an extended position in which it is spaced apart from the mold cavity portions for removal of molded parts.

As noted, shaper module 3054 may be capable of installation or removal from support base 3056 of shaping station 104-1 as a unitary assembly. Installation and removal features of shaper module 3054 are shown in greater detail in FIGS. 23A-23C.

In the depicted embodiment, the shaper module 3054 includes a drive unit, namely, electric motor 3190. When installed in an operational position, there may be insufficient clearance between components of shaper module 3054 and support base 3056 to remove shaper module 3054. Likewise, there may be insufficient clearance to remove mold components. Accordingly, shaper module 3054 includes a position adjustment mechanism 3192 operable to move the shaper module 3054 relative to support base 3056 along an adjustment axis indicated as A-A in FIG. 23A. Shaper module 3054 may be moved between an operational position, as depicted in FIGS. 12A-12D, and a removal position, in which shaper module 3054 can pass without interference through a removal opening 3194 defined by support base 3056. As depicted, adjustment axis A-A is parallel to the longitudinal axis of shaper frame 3052. However, in some embodiments, shaper module 3054 may be adjustable along a different axis, or along multiple axes. Likewise, in the removal position, a mold may be removed and replaced. That is, the mold may be removed from shaper module without contacting support base 3056. Accordingly, such removal and replacement may be effected automatically, e.g. using a robot Once in its removal position, shaper module 3054 may be removed from base 3056. For example, a lifting tool such as a crane or a lift truck may engage couplings on shaper module 3054. In an example, the couplings may be hooks rigidly mounted to shaper frame 3052 for secure engagement by a crane. The lifting tool may remove the shaper module by vertical or horizontal translation or a combination thereof.

Figure 23A:
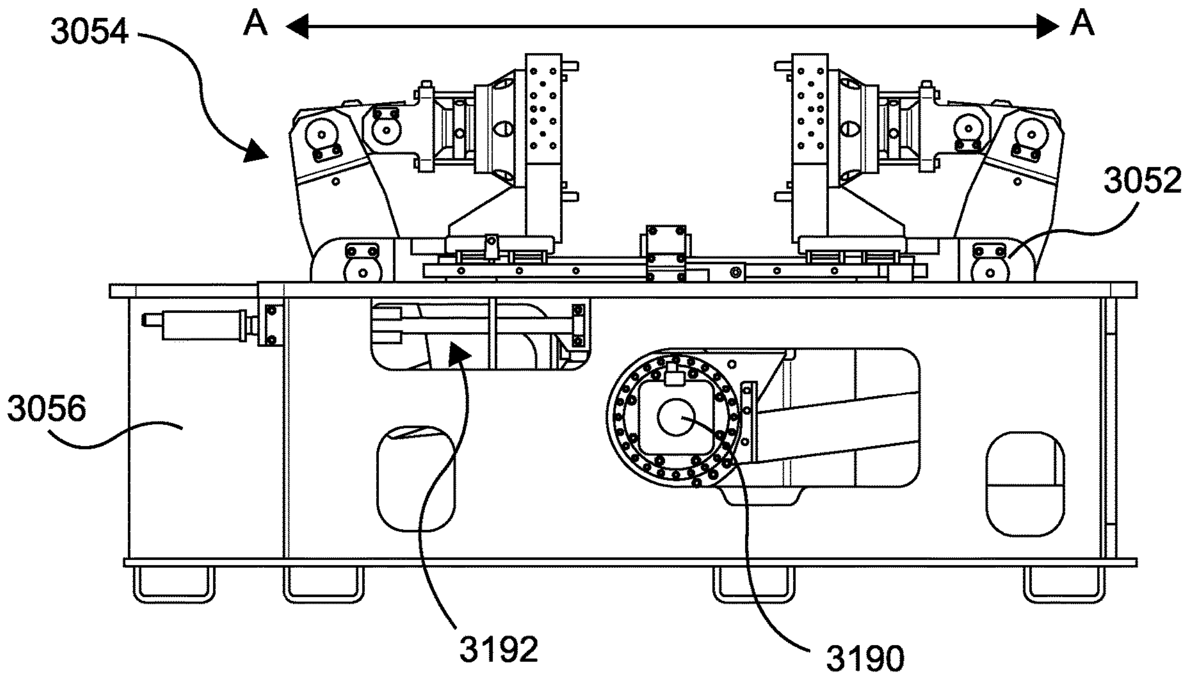
FIGS. 23A-23D are side, isometric, enlarged top and enlarged perspective views, respectively, of a shaper module of the shaping station of FIG. 11.
Figure 23B:
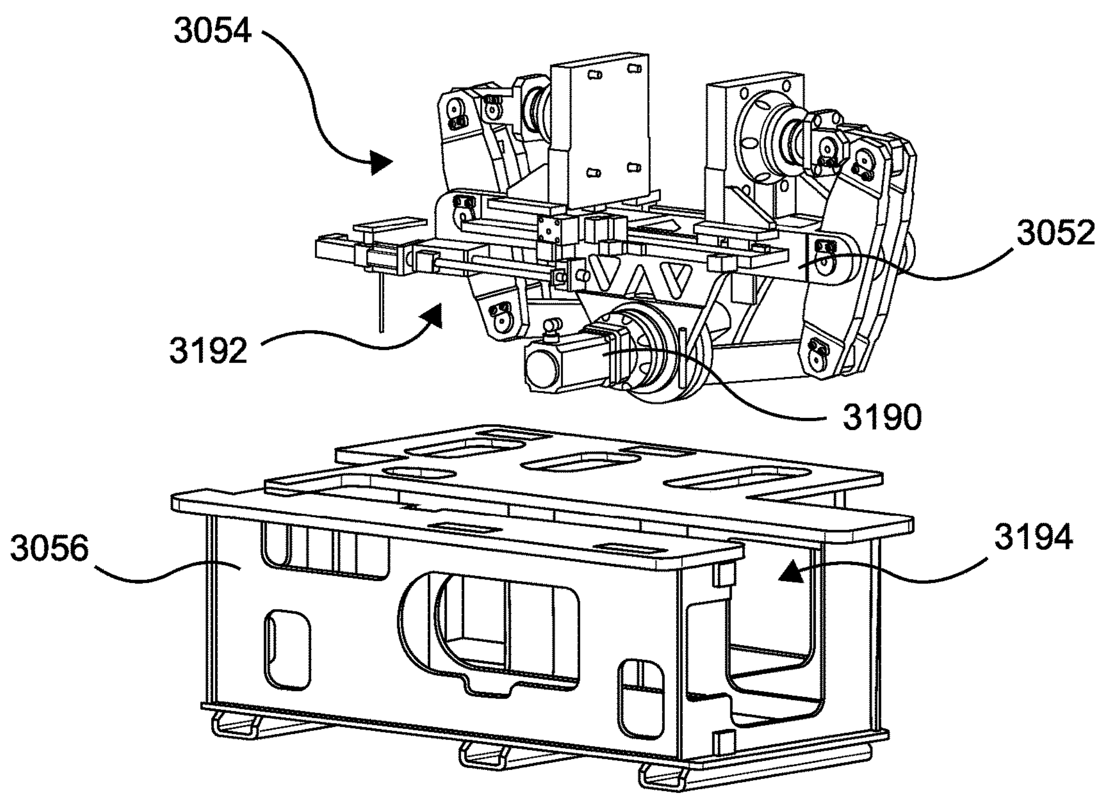
Figure 23C:
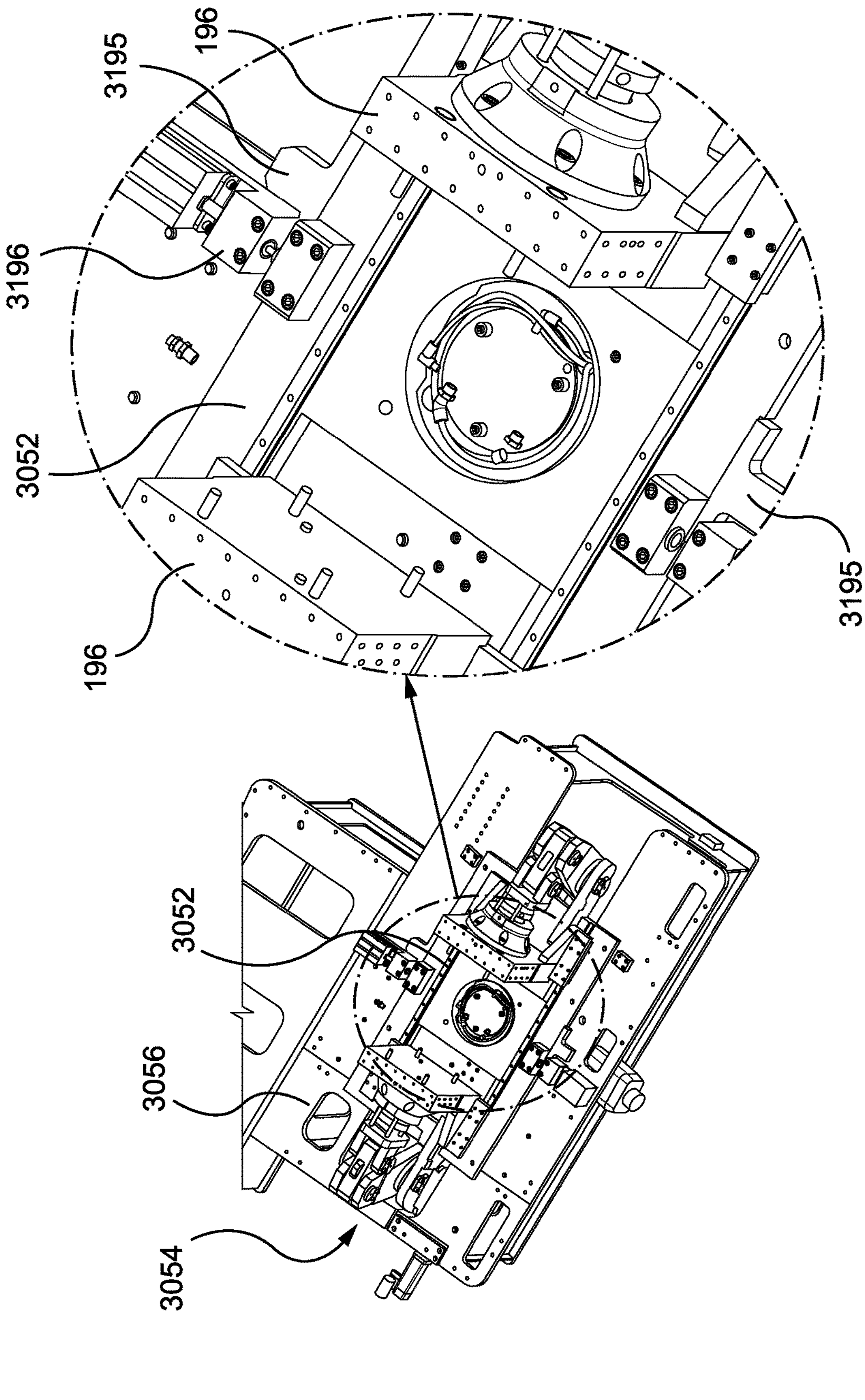
Figure 23D:
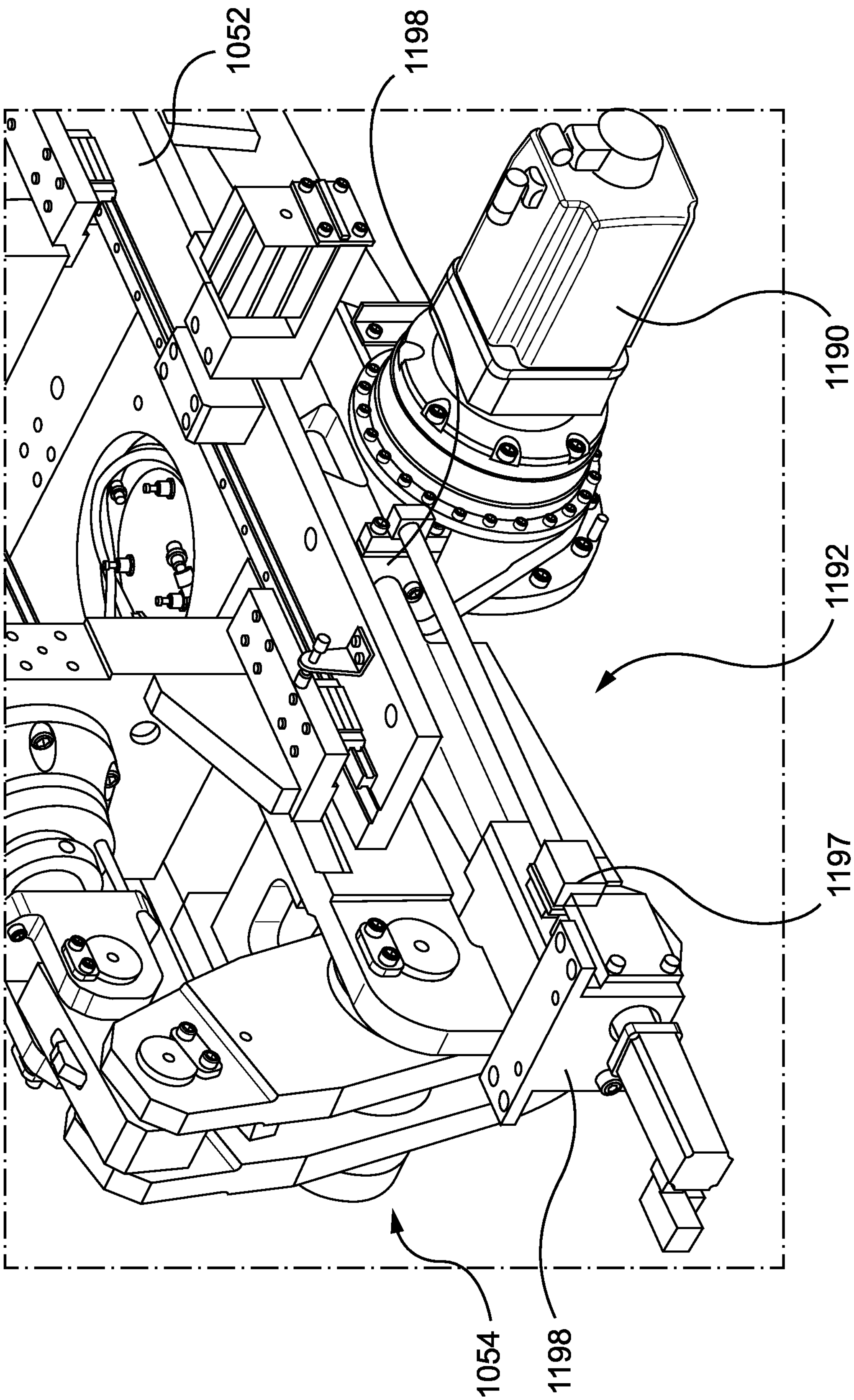

As shown in FIG. 23C, support base 3056 may include one or more guide blocks 3196 for locating the shaper module 3054 in its operational position. Shaper module 3054 may include corresponding locking pins 3195, rigidly mounted to shaper frame 3052. Locking pins 3195 may selectively engage guide blocks 3196 to prevent movement of shaper module 3054 relative to support base 3056. Locking pins may be operated, for example, by an electric motor or using manual tools. Other modes of actuation are possible, such as pneumatic.

FIG. 23C shows adjustment mechanism 3192 in greater detail. As depicted, adjustment mechanism has a linear actuator, such as ballscrew 3197, positioned between two anchor plates 3198. One anchor plate 3198 abuts support base 3056 and the other is rigidly coupled to shaper frame 3052. Actuation of the ballscrew 3197 in a first direction pushes the anchor plates 3198 away from one another, such that shaper module 3054 moves relative to support base 3056 in a first direction along the adjustment axis. Actuation of the ballscrew 3197 in the opposite direction moves shaper module 3054 relative to support base 3056 in the opposite direction along the adjustment axis.

In some embodiments, adjustment mechanism 3192 may be configured such that shaper module is in its operational position at either the maximum extension or the minimum extension of ballscrew 3197, and the shaper module 3054 is in its removal position at the other of the maximum extension and the minimum extension of ballscrew 3197. Alternatively or additionally, adjustment mechanism may be equipped with a sensor to report the position of shaper module 3054 to confirm when it is in its operational and removal positions. For example, ballscrew 3197 may be driven by an electrical motor with a position encoder, or the position may be measured by a sensor such as an optical, mechanical or magnetic sensor.

Installation and removal of shaper module 3054 as a unitary assembly may permit relatively easy changes of tooling in shaping station 104-1. For example, if it is desired to change a mold, the associated clamping assembly, drive unit and core actuation assembly may be removed as a unit with the mold, and a new unit may be installed to base 3056. Mold-specific setup may be minimized or eliminated entirely. For example, because a clamping assembly may remain assembled to a mold after removal from base 3056, it could be reinstalled without requiring adjustments for mold shut height or the like.

In the closed state of shaping station 104-1 (FIG. 12B, FIGS. 29B-29F), core assembly 190 is aligned to axis M-M and cavity plates 194-1, 194-2 are clamped together by platens 196-1, 196-2. Core assembly 190 and cavity plates 194-1, 194-2 collectively form a mold 200 for producing a molded workpiece from molten feedstock material. Core assembly 190 defines an inner surface of the molded workpieces. Cavity plates 194-1, 194-2 collectively define the outer surface of the molded workpiece. Mold 200 has an inlet gate 202, aligned with axis M-M.

Track 144 of transport subsystem 110 passes through an injection position aligned with mold axis M-M.

Figure 24A:
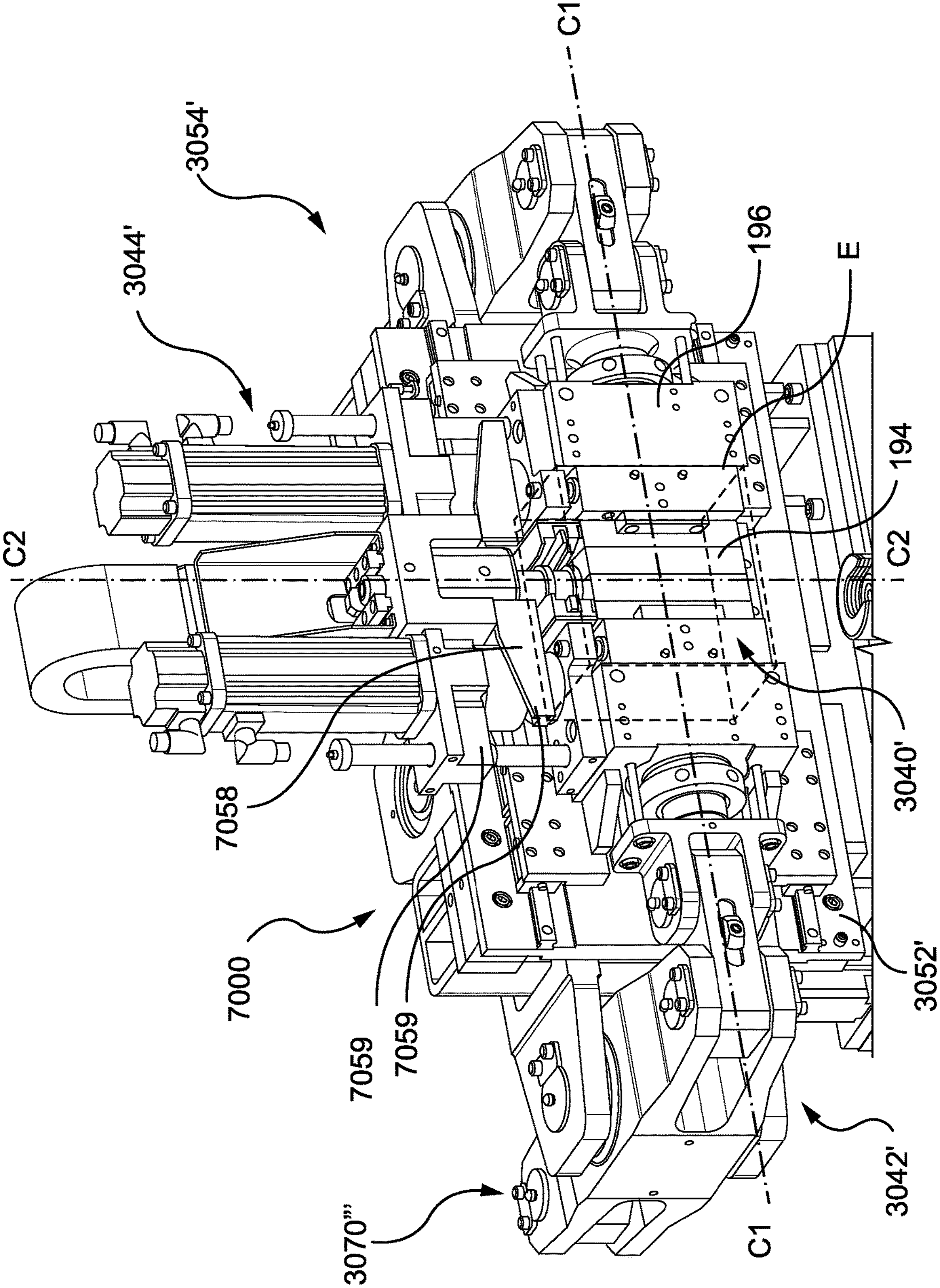
FIG. 24A-24B are front isometric and top elevation views of another shaping station.
Figure 24B:
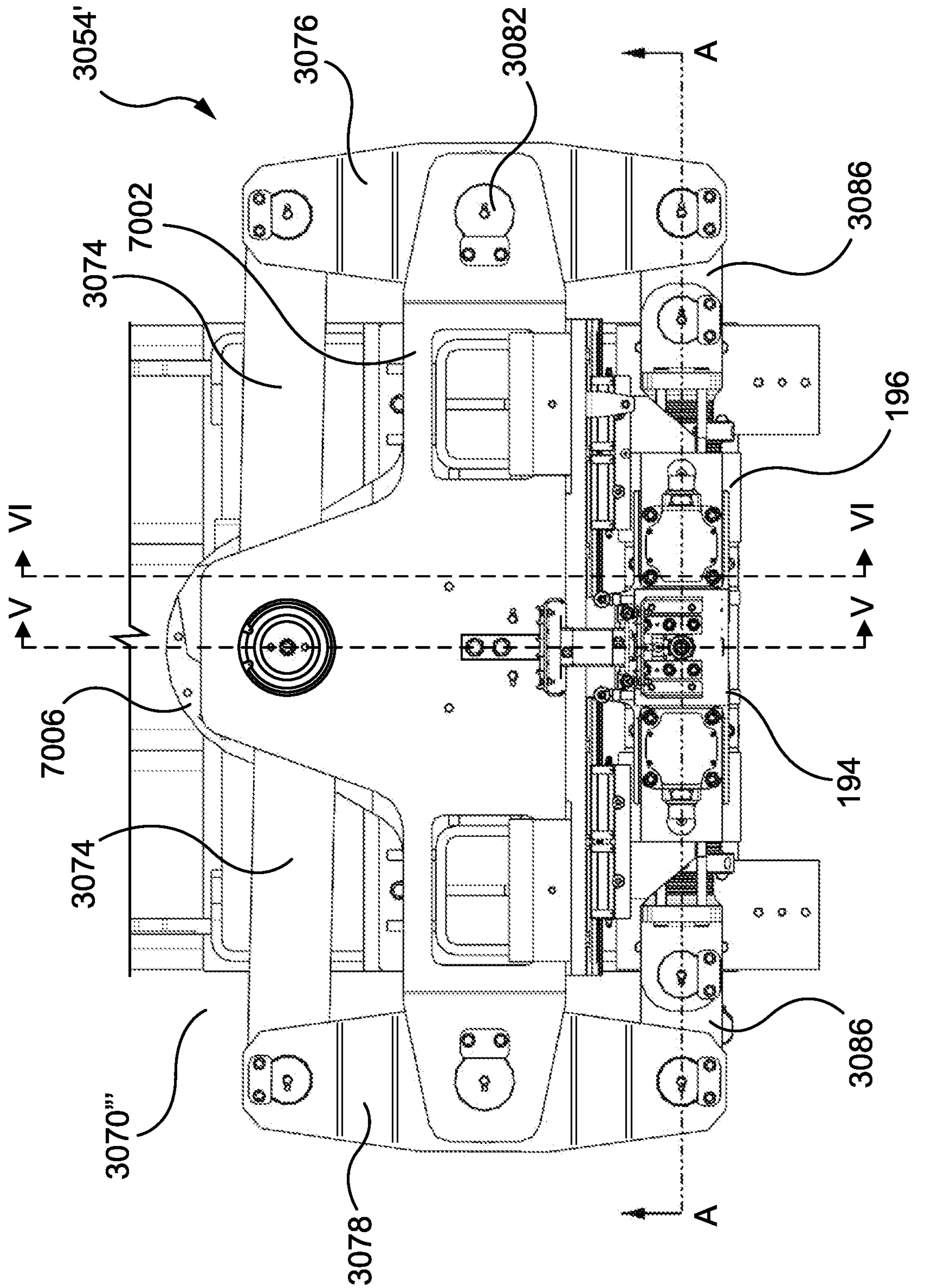
Figure 24D:
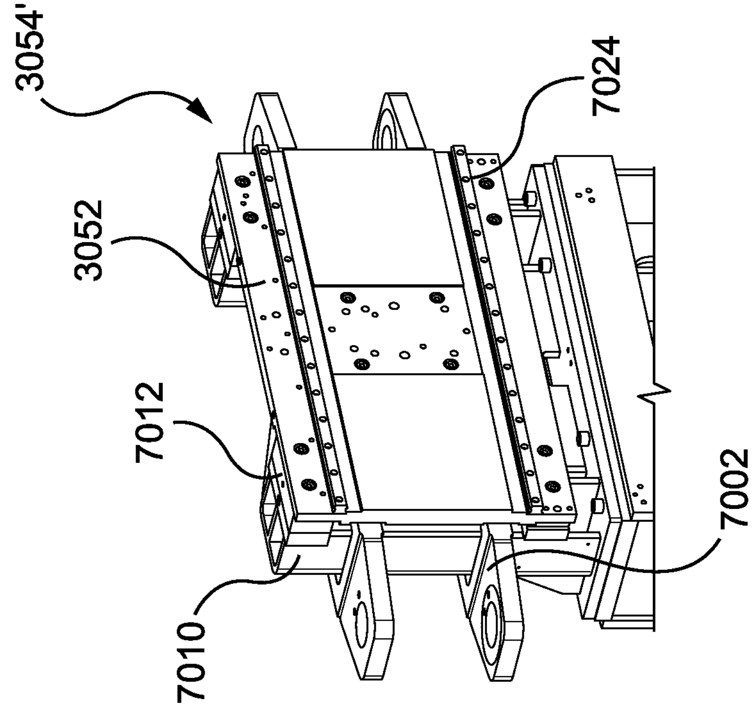
FIG. 24D is front isometric view of support structures of the shaping station of FIG. 24A.
Figure 24C:
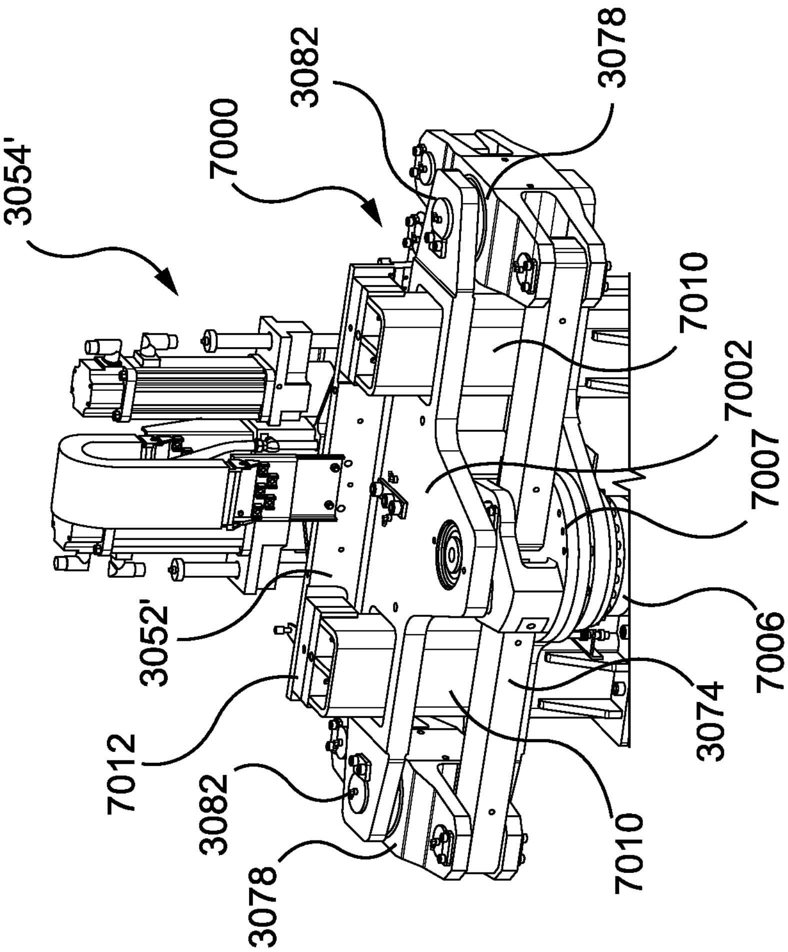
FIG. 24C is a rear isometric view of the shaping station of FIG. 24A.
Figure 24E:
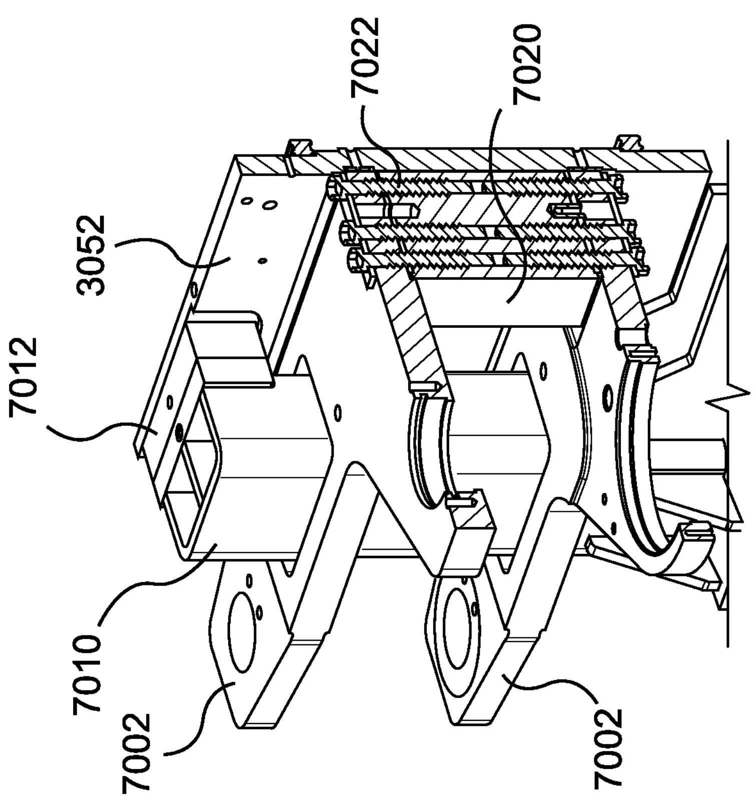
FIGS. 24E-24F are isometric views of the support structures of FIG. 24D, cutaway at lines E-E and F-F in FIG. 24B.
Figure 24F:
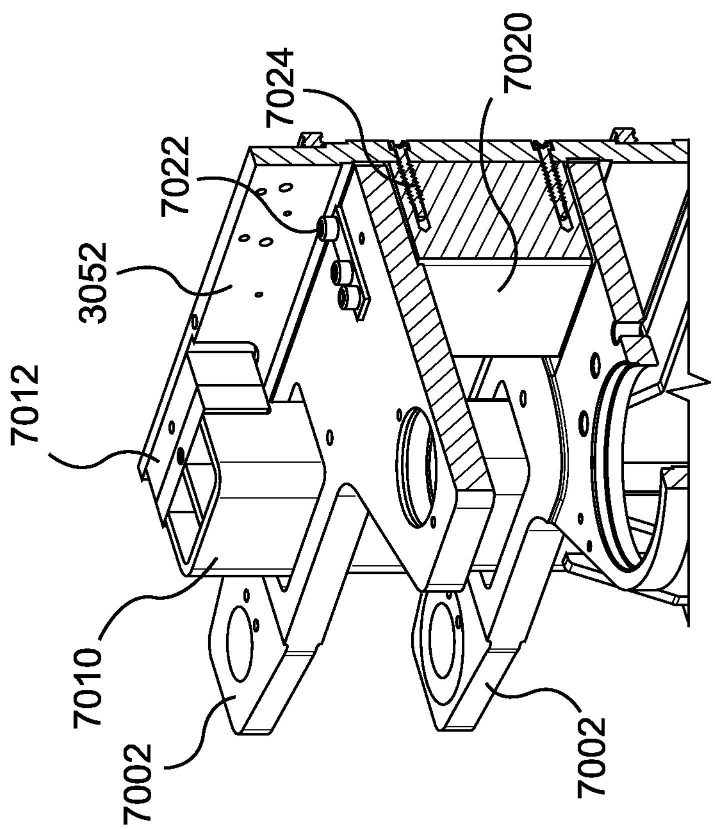
Figure 24G:
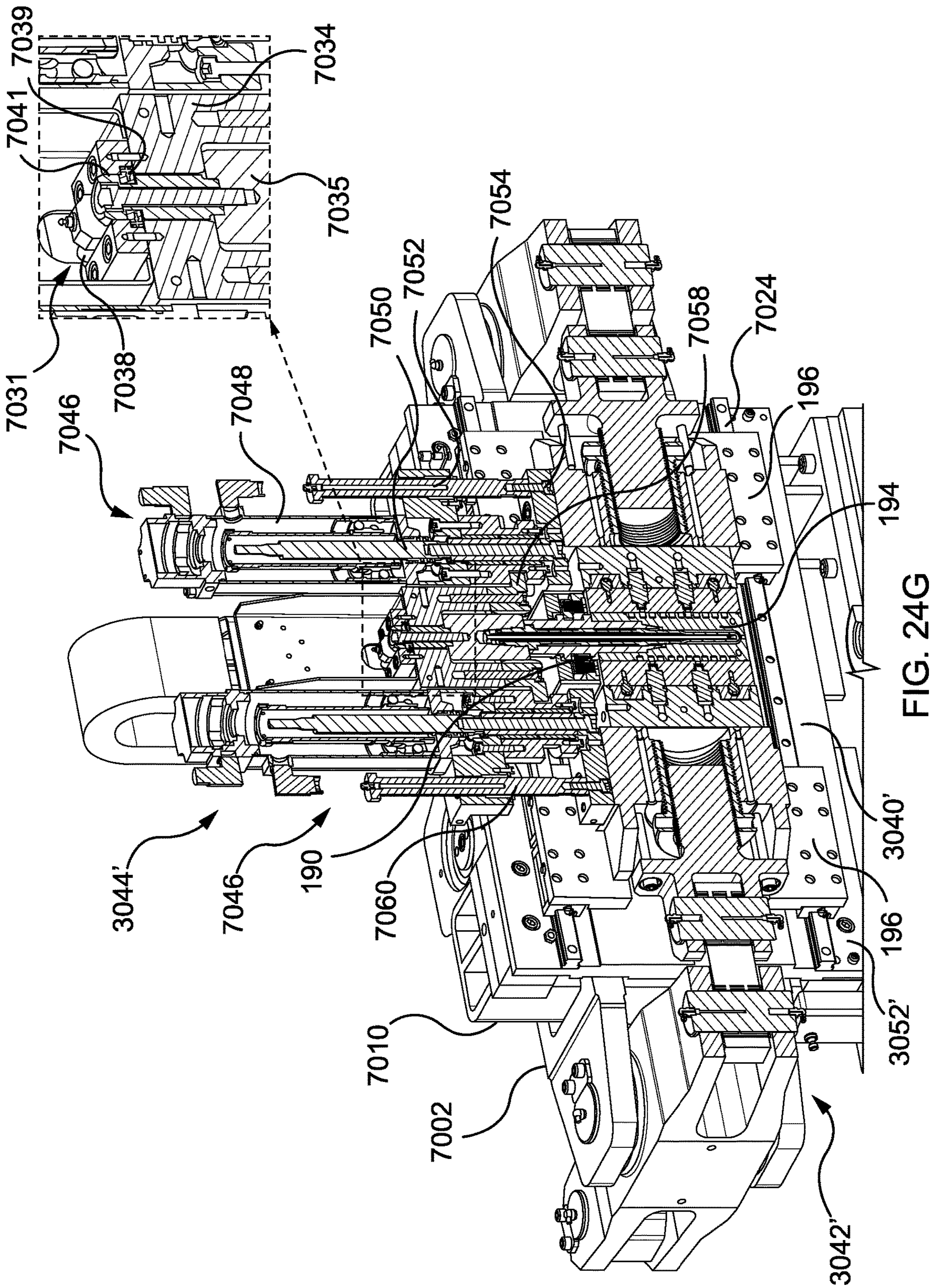
FIG. 24G is an isometric view of the shaping station of FIG. 24A, cutaway to show internal components.
Figure 24H:
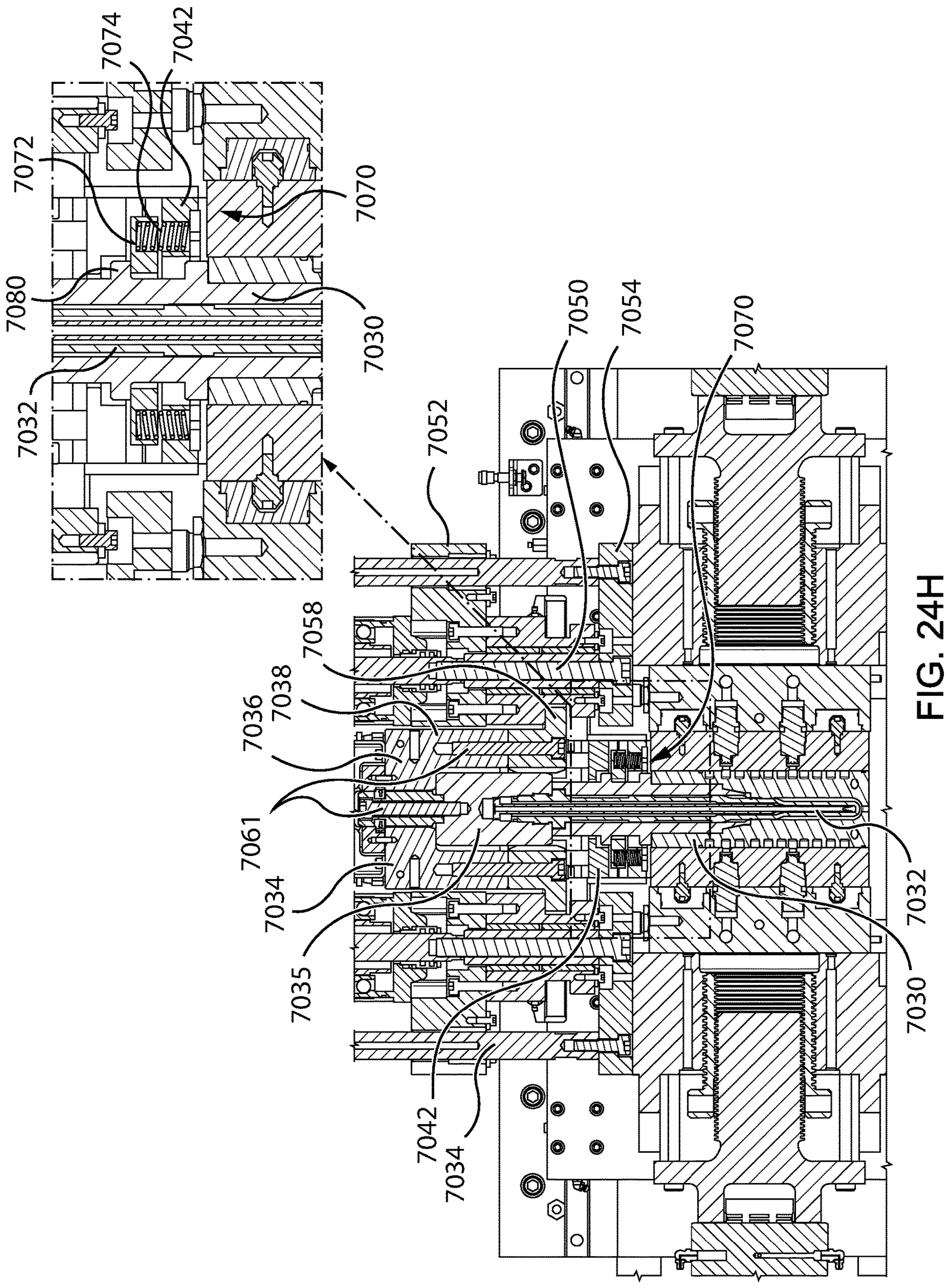
FIG. 24H is an enlarged partial cross-sectional of the shaping station of FIG. 24A.
Figure 24I:
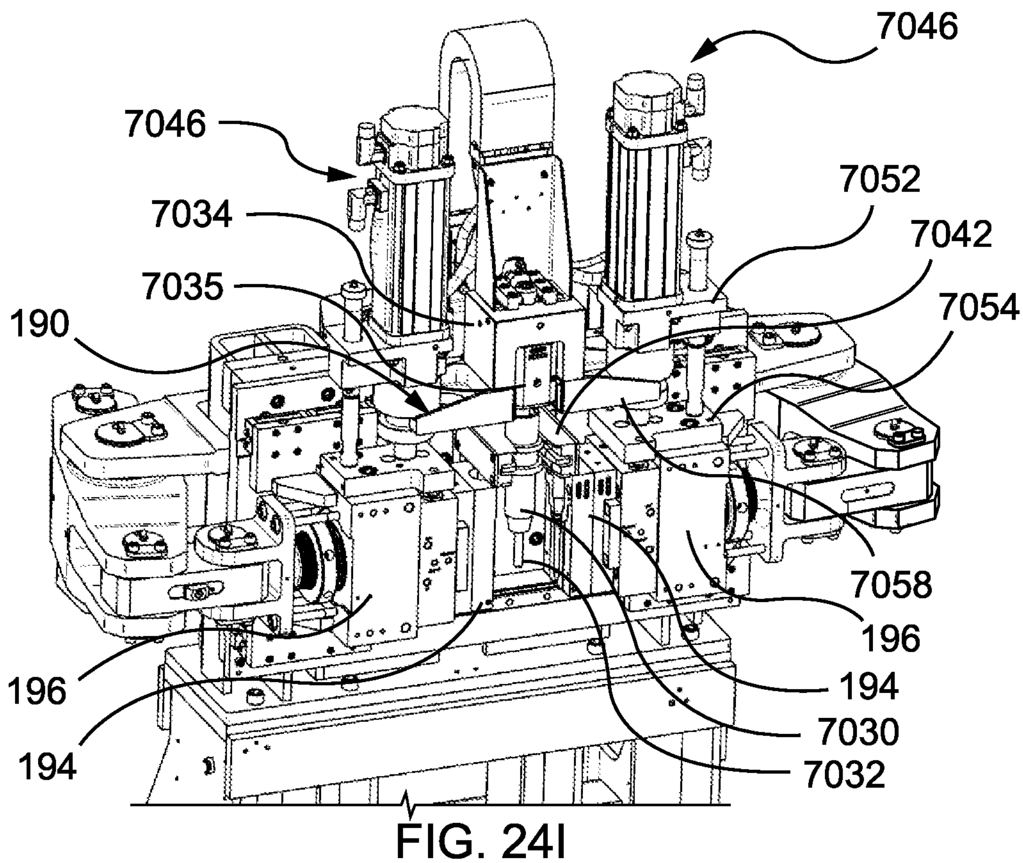
FIGS. 24I-24J are isometric and cross-sectional views of the shaping station of FIG. 24A in a mold-open state.
Figure 24J:
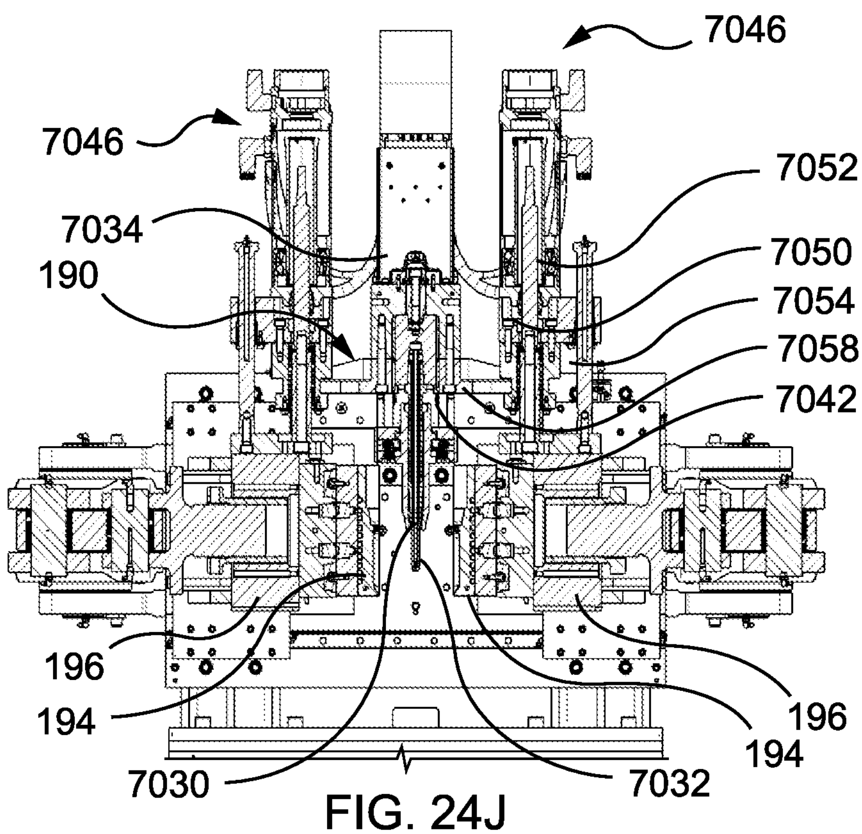
Figure 24K:
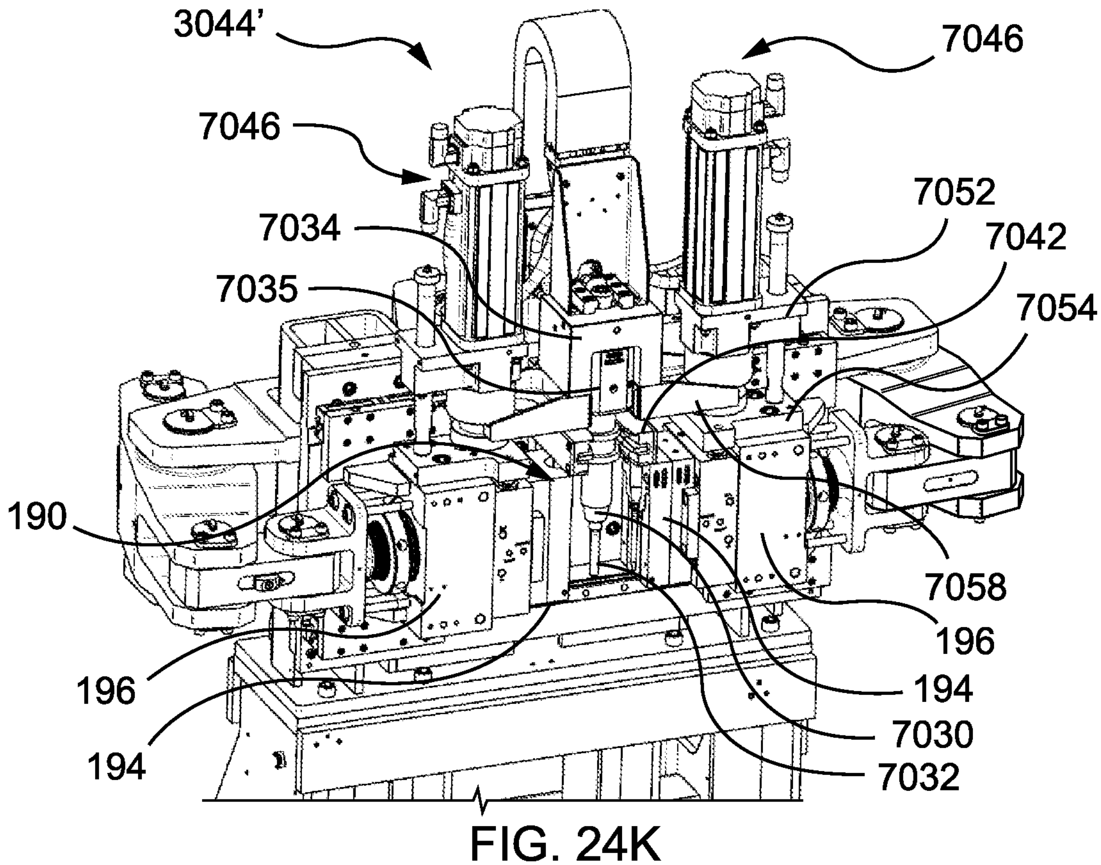
FIGS. 24K-24L are isometric and cross-sectional views of the shaping station of FIG. 24A in a mold-open state, with the mold core in a molding position.
Figure 24L:
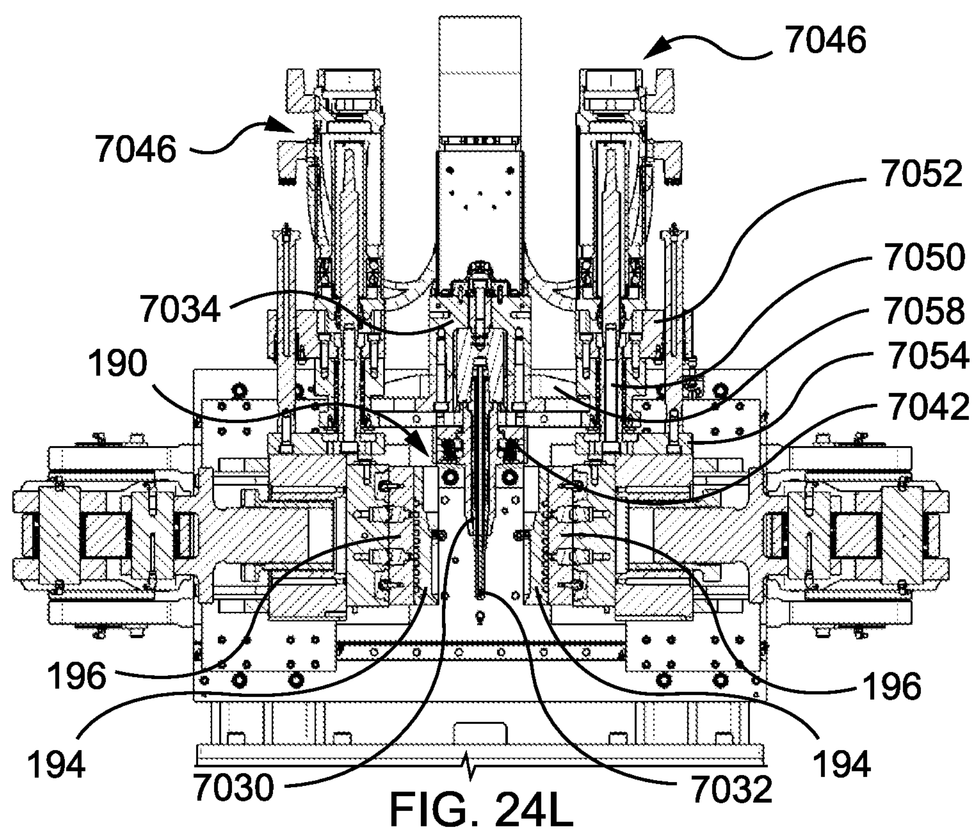
Figure 24M:
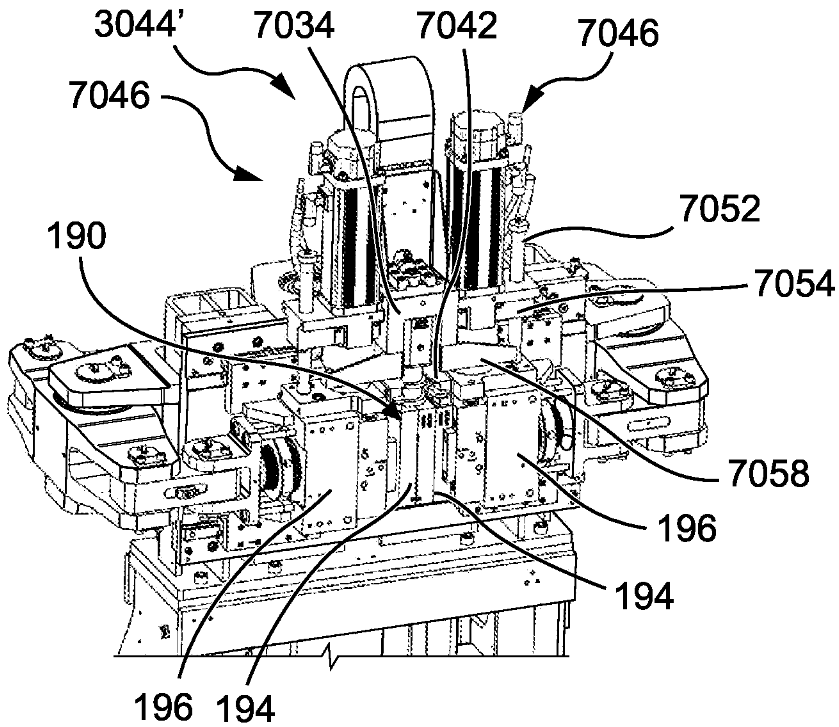
FIGS. 24M-24N are isometric and cross-sectional views of the shaping station of FIG. 24A in a mold-closed state.
Figure 24N:
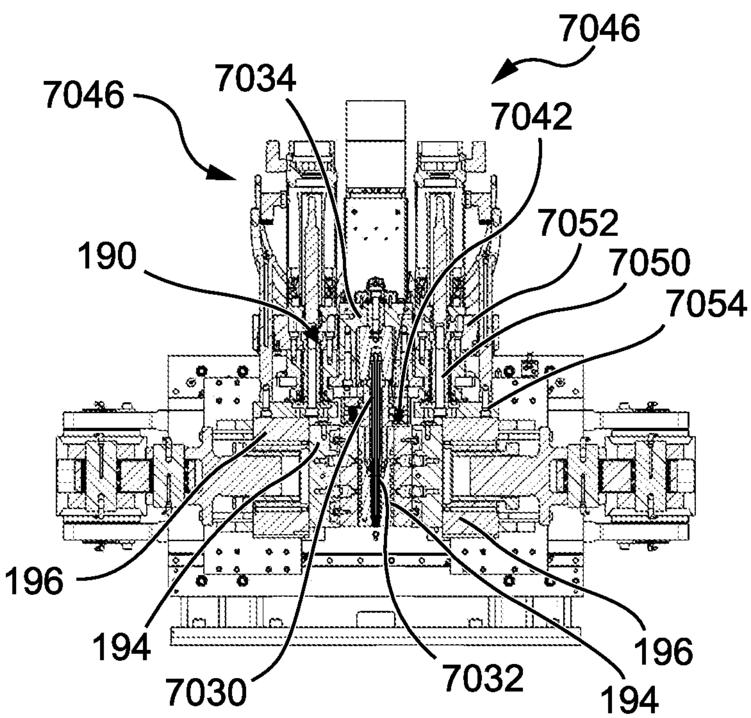
Figure 24O:
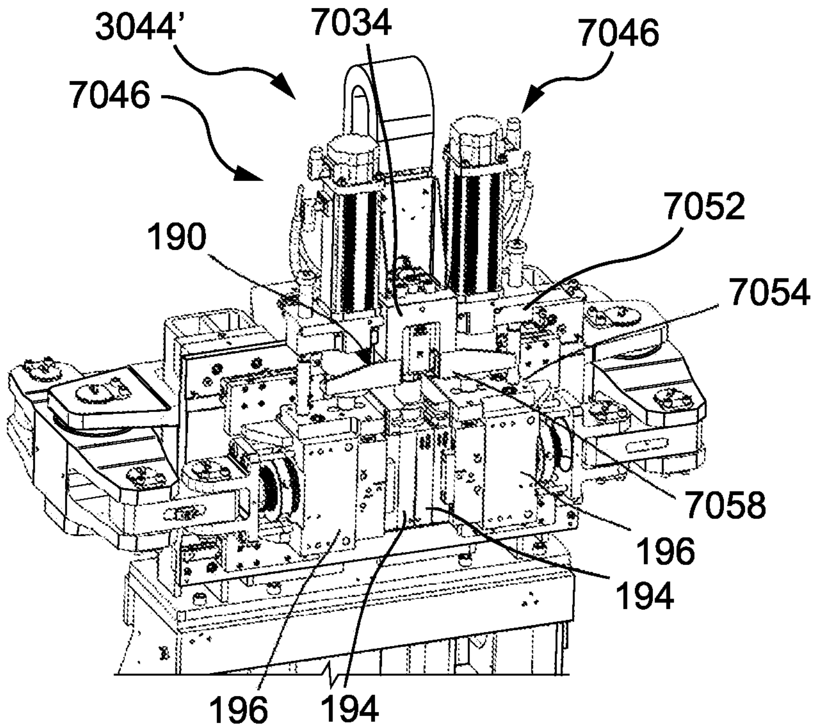
FIGS. 24O-24P are isometric and cross-sectional views of the shaping station of FIG. 24A in a mold-closed state, with a preload force applied to the mold core.
Figure 24P:
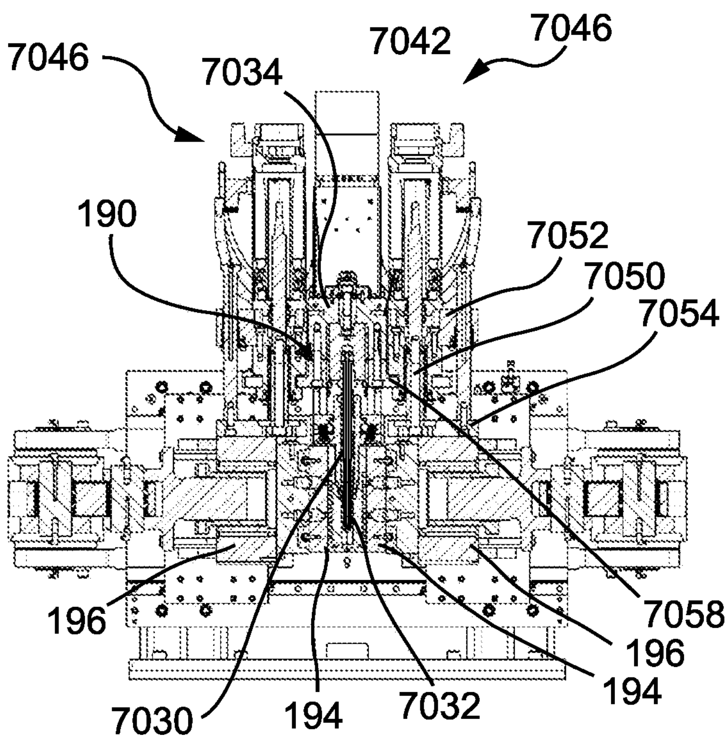
Figure 24Q:
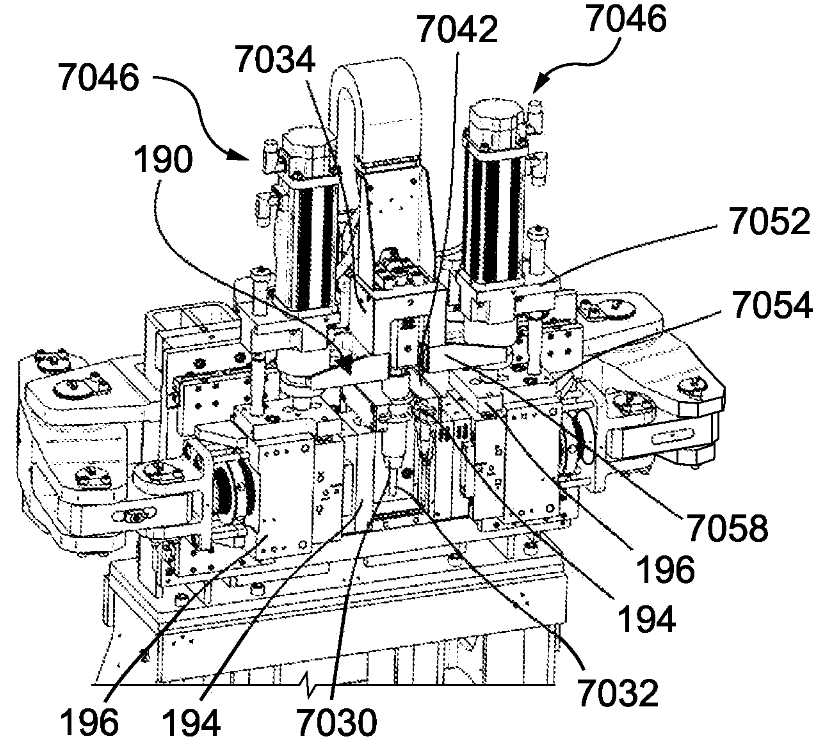
FIGS. 24Q-24R are isometric and cross-sectional views of the shaping station of FIG. 24A in a mold-open state.
Figure 24R:
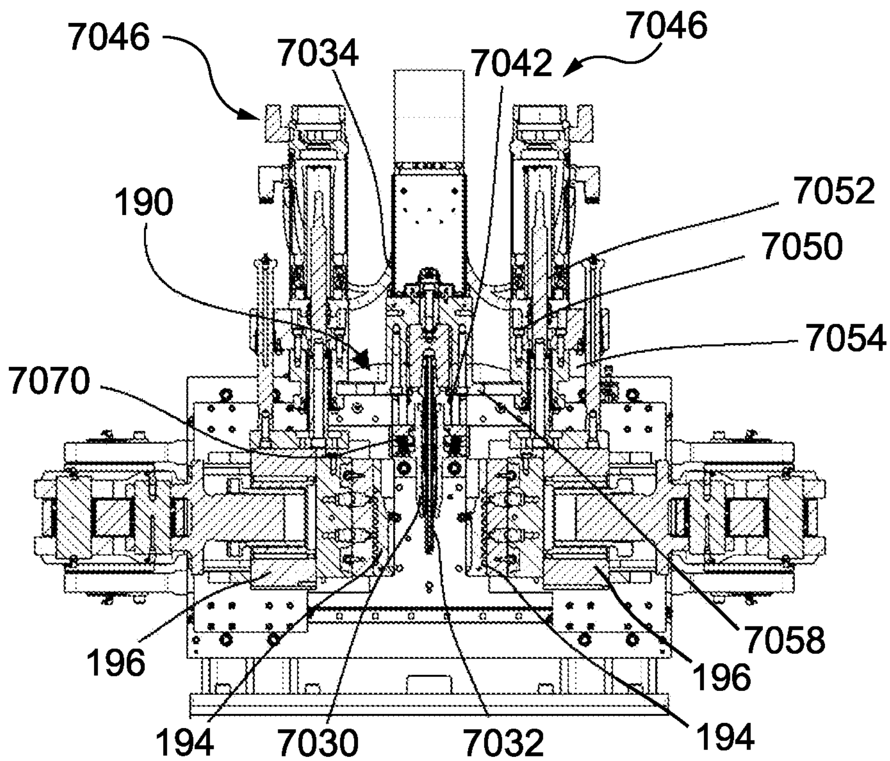
Figure 24S:
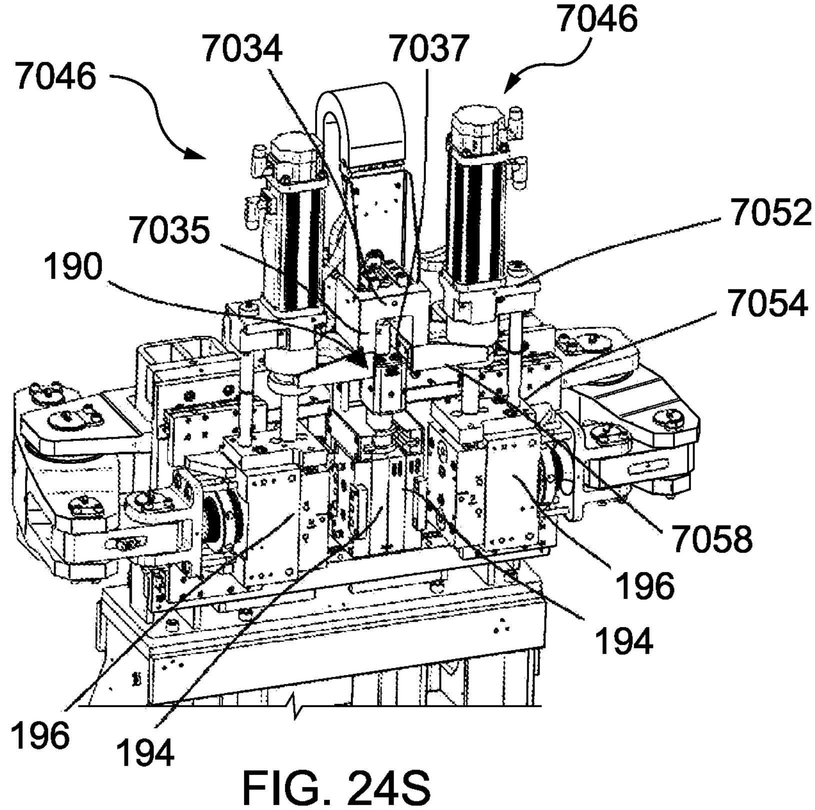
FIGS. 24S-24T are isometric and cross-sectional views of the shaping station of FIG. 24A during mold removal.
Figure 24T:
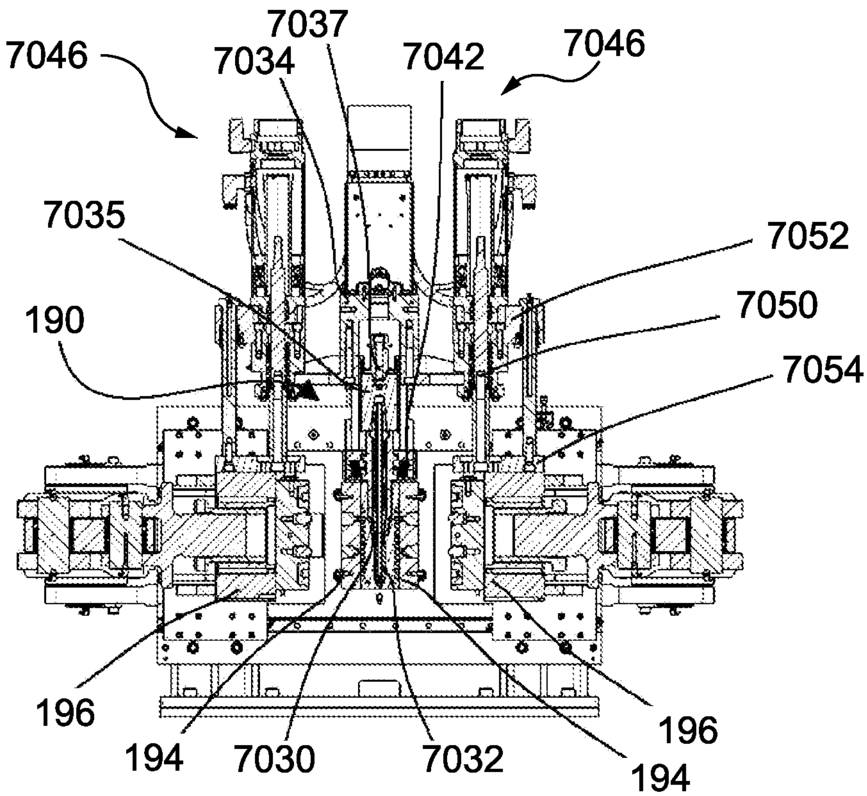

FIGS. 24A-24T depict an alternate shaper module 3054'. As shown in FIGS. 12-23, shaper module 3054 is configured so that mold opening and closing is effected by linkage 3070, 3070', 3070", 3070'" pivoting about a horizontal axis. As depicted in FIGS. 24A-24L, shaper module 3054' is configured so that its linkage generally lies in a horizontal plane and pivots about a vertical axis.

Shaper module 3054' is supported by a tower structure 7000, depicted in greater detail in FIGS. 24C-24F Shaper module 3054' has a support plate 3052' that is structurally identical to the support plate of shaper module 3054, except that it is mechanically suspended on tower structure 7000 and is oriented in a vertical plane.

Shaper module 3054' has a mold subassembly 3040', a clamp subassembly 3042' including a linkage 3070"", and a core actuation subassembly 3044'.

Like mold subassembly 3040, mold subassembly 3040' may be opened and closed along multiple axes, namely, vertical and horizontal axes. Specifically, platens 196 and mold cavity plates 194 open and close along clamping axis C1-C1 and core assembly 190 is movable along core axis C2-C2. In the depicted embodiment, core axis C2-C2 is vertical. Accordingly, with reference to this embodiment, "up" refers to a direction along core axis C2-C2 away from mold cavity plates 194, and "down" refers to a direction along core axis C2-C2 toward cavity plates 194. However, other orientations of shaper module 3054' are possible. For example, in some embodiments, shaper module 3054' could be rotated 90 degrees such that clamping axis C1-C1 and core axis C2-C2 lie in a common horizontal plane.

Mold cavity plates 194 and mold core 190 lie within a bounding envelope E between platens 196. The ends of the bounding envelope are defined by platens 196. The top and bottom of the bounding envelope are defined by the top and bottom edges of platens 196, and the lateral sides of the bounding envelope are defined by the sides of platens 196.

Throughout molding and throughout movement of platens 196 through their opening-closing stroke, mold cavity plates 194 lie entirely within the bounding envelope.

The tower structure 7000, shaper frame 3052', and linkage 3070'''' are located on one side of bounding envelope E. That is, all of the tower structure 7000, shaper frame 3052' and linkage 3070'''' are adjacent the same lateral side of bounding envelope E. Conveniently, the opposite lateral side of bounding envelope E is substantially unobstructed, as is the bottom of bounding envelope E.

FIG. 24B is a top elevation view of shaper module 3054', showing linkage 3070'''' in greater detail. Linkage 3070'''' includes a pair of drive links 3074 and rockers 3076, 3078.

Each drive link 3074 is pivotably supported at one end by tie bars 7002 of tower structure 7000 and is pivotably connected at the other end to a rocker 3076 or 3078. Drive links 3074 are coupled to and reciprocated through a stroke by a drivetrain 7006. Drivetrain 7006 is supported on tower structure 7000 and may include an electric motor and one or more gear reductions.

Each of rockers 3076, 3078 is pivotably attached to one of drive links 3074 at one end, and to a respective platen 196 at the other end. In the depicted embodiments, rockers 3076, 3078 are connected to platens 196 by way of intermediate links 3086. Rockers 3076, 3078 are supported on tie bars 7002 of tower structure 7000 at pivotable connections 3082, so that drive links 3074 cause rockers 3076, 3078 to rotate around pivotable connections 3082. As depicted, pivotable connections 3082 are approximately at the mid-point of rockers 3076, 3078, but could be located at a different positions along the length of the rockers. Moving the pivotable connection 3082 toward the connection with drive link 3074 would result in a longer stroke of platen 196 while the rocker is rotated. Conversely, movement of the pivotable connection 3082 away from the drive link 3074 would result in a shorter stroke of platen 196.

FIGS. 24C-24F depict tower structure 7000 in greater detail. FIG. 24C is an isometric view of shaper module 3054' from a rear perspective, opposite the mold. FIG. 24D is an isometric view of shaper module 3054' from a front perspective, with components other than tower structure 7000 and shaper frame 3052' omitted. FIGS. 24E, 24F are cross-sectional views of tower structure 7000 along planes E-E and F-F shown in FIG. 24B.

Tower structure 7000 includes a pair of vertical columns 7010. Columns 7010 are supported on a base (not shown) and bear the weight of components of tower structure 7000 and of mold assembly 3040', clamping assembly 3042' and core actuation assembly 3044'.

Shaper frame 3052' is coupled to columns 7010 by way of mounting blocks 7012. Shaper frame 3052' is oriented in a vertical plane. Tracks 7024 are mounted to shaper frame 3052'. Tracks 7024 are configured to slidably support platens 196. Tracks 7024 are oriented in a vertical plane, such that connections between platens 196 and shaper frame 3052' are likewise in a vertical plane.

As will be apparent, platens 196 hang on tracks 7024. Tracks 7024 are therefore configured to interlock with platens 196 in order to retain the platens. For example, platens 196 may have runners with cross-sectional shapes that interlock with the cross-sectional shapes of tracks 7024.

Tower assembly 7000 further includes tie bars 7002. Components of linkage 3070'''' of clamping assembly 3042' are coupled to tie bars 7002. For example, drivetrain 7006 is partly supported by tie bars 7002. A rotor 7007 of drivetrain 7006, which is directly coupled to drive links 3074, is rotatably mounted between tie bars 7002. Rockers 3076. 3078 are also rotatably mounted between tie bars 7002. Pivotable connections 3082 at which rockers 3076, 3078 are connected to tie bars 7002, permit rotation of the rockers, but substantially prevent translation of the rockers in any direction. Thus, stresses such as tensile or compressive stresses may be transferred between the rockers and the tie bars.

In the depicted embodiment, tie bars 7002 are not coupled directly to columns 7010. Rather, tie bars 7002 are mounted to a support block 7020. As shown in FIGS. 24E-24F, support block 7020 is positioned between tie bars 7002, abutting both of tie bars 7002 and shaper frame 3052. Support block 7020 braces tie bars 7002 relative to one another and relative to shaper frame 3052'. Fasteners 7022 are inserted through tie bars 7002 and received in support block 7020 to secure the tie bars against the support block. A second set of fasteners 7024 is inserted through shaper frame 3052' to secure the tie bars against shaper frame 3052'. As noted, shaper frame 3052' is in turn coupled to towers 7010 by way of mounting blocks 7012. Thus, tie bars 7002 are coupled to shaper frame 3052' by way of support block 7020, and to columns 7010 by way of support block 7020 and shaper frame 3052.

FIGS. 24G, 24H are cut-away and cross-sectional views, respectively, showing details of mold assembly 3040', clamping assembly 3042' and core actuation assembly 3044'.

Mold assembly 3040' has a pair of platens 196 movable by linkage 3070'''' toward and away from one another in a closing stroke and an opening stroke, respectively. Platens 196 are supported on tracks 7024 on shaper frame 3052. Platens 196 and tracks 7024 may be configured to interlock, such that platens 196 hang securely from tracks 7024, and can move freely along the tracks. For example, platens 196 may have runners which interlock with the tracks.

A mold cavity plate 194 is mounted to each platen. With platens 196 in a mold-closed position (FIG. 24A), mold cavity plates 194 abut one another to cooperatively define a mold cavity.

During molding, rockers 3076, 3078 exert a clamping pressure on platens 196 and mold assembly 3040' by way of intermediate links 3086. Clamping pressure generally acts along clamping axis C1-C1. A reaction force is applied to tie bars 7002 by way of rockers 3076, 3078 at pivotable connections 3082. This in turn causes a load to be transferred to shaper frame 3052' at pivotable connections 3082.

Because linkage 3070'''' is symmetrical, equal forces are applied to shaper frame 3052' by rockers 3076, 3078. Shaper frame 3052' experiences strain due to the tensile force applied by the rockers. That is, shaper frame 3052' tends to elongate in the direction of clamping axis C1-C1 due to tension.

In contrast, columns 7010 generally do not deflect during molding. Shaper frame 3052' is therefore coupled to columns 7010 so as to limit the deflection of shaper frame 3052' relative to columns 7010 at the points of attachment.

For example, elongation of shaper frame 3052' due to tensile stress during clamping is most pronounced at the ends of shaper frame 3052'. In other words, a feature at an end of shaper frame 3052' may move more between stressed and un-stressed conditions of shaper frame 3052' than would a feature located at the center of shaper frame 3052'.

Thus, fasteners 7024 couple shaper frame 3052 to support block 7020 near the center of shaper frame 3052 in order to limit stress due at the connections.

A mold core assembly 190 is positioned between mold cavity plates 194 and defines the mold core when cavity plates 194 are in their closed position. Mold core assembly 190 substantially does not move in the direction of the clamping axis C1-C1, but can be moved along a perpendicular core axis C2-C2.

Mold core assembly 190 includes an outer core 7030 and an inner core 7032. The outer core 7030 is generally annular in cross-section, and the inner core 7030 is received through the outer core and is movable relative to outer core 7030 along core axis C2-C2.

A core cap 7034 is positioned atop inner core 7032 and is coupled to inner core 7032 by way of a mounting block 7035. Coupling of inner core 7032 to core cap 7034 is achieved using quick-connect couplings 7037 (FIGS. 24R-24S). For example, the quick-connect couplings 7037 may be controlled by a locking device (not shown). With the locking device engaged, couplings 7037 retain the core such that it cannot move relative to core cap 7034. However, the locking device may be disengaged to release the connection of the core to core cap 7034. Movement of core cap 7034 selectively applies or releases a preload force against outer core 7030 and inner core 7032.

As best shown in FIG. 24G, in the depicted embodiment, a locking device 7031 includes an actuator, namely a piston 7038 that can be selectively extended or retracted (e.g. by electronic or pneumatic control). Extension or retraction of piston 7038 causes extension or retraction of a locking block 7039. In an extended (locked)_position, locking block 7039 interlocks with a flange of a retaining device 7041 fixed to mounting block 7035. Interlocking of block 7039 and retaining device 7041 prevents movement of core cap 7034, mounting block 7035 and retaining device 7041, relative to locking device 7031.

Inner core 7032 and outer core 7030 mate to a core support block 7042, which is in turn fixedly mounted to shaper frame 3052.

Core cap 7034 is movable by actuators 7046. In the depicted example, two actuators 7046 are present. However, in other embodiments, more or fewer actuators could be used.

In the depicted example, actuators 7046 are roller screws driven by electric motors. However, other types of linear actuators may be used, such as pneumatic or hydraulic cylinders.

Each actuator 7046 includes a housing 7048 and an output shaft 7050. Housing 7048 is rigidly coupled to a floating support plate 7052. Output shaft 7050 is coupled to housing 7048 and to a fixed support plate 7054.

Each fixed support plate 7054 is rigidly coupled (e.g., bolted) to respective platen 196. Each floating support plate 7052 is free to move relative to the corresponding fixed support plate 7054 in both directions along core axis C2-C2.

Movement of floating plates 7052 relative to fixed plates 7054 is caused by operation of actuators 7046. Specifically, extension of output shaft 7050 pushes housing 7048 and floating plate 7052 away from fixed plate 7054 and the platen 196 to which it is mounted. Conversely, retraction of output shaft 7050 pulls floating plate 7052 toward the corresponding fixed plate 7054 and the platen 196 to which it is mounted. One or more guide rods 7056 may be mounted to each fixed plate 7054 and extend through a corresponding slot in floating plate 7052 in order to constrain movement of floating plate 7052 relative to fixed plate 7054. Specifically, guide rods 7056 are parallel to core axis C2-C2 and constrain movement of floating plate 7052 to be parallel to that axis.

Because actuators 7046 and fixed plates 7054 are mounted to platens 196, they move along with the platens as clamping assembly 3042' is opened and closed. Thus, actuators 7046 move relative to core assembly 190 and core cap 7034 along clamping axis C1-C1.

A lifter 7058 may extend between floating plate 7052 and core cap 7034. Lifter 7058 couples floating plate 7052 and core cap 7034 in the direction of the core axis. In other words, lifter 7058 and floating plate 7052 engage one another so that movement of the lifter in either direction along core axis C2-C2 causes movement of core cap 7034 in the same direction, The connection between lifter 7058 and floating plate 7052 is slidable, such that floating plate 7052 can move along clamping axis C2-C2 while the lifer and the floating plate remain engaged with one another.

As best shown in FIG. 24A, lifter 7058 has a pair of arms 7059 and an extension of floating plate 7052 is received between the arms in a vertically interlocking relationship. In other embodiments, lifter 7058 may be permanently fixed to floating plate 7052 and project towards core cap 7034. In the depicted embodiment, lifter 7058 is a discrete structure that is coupled to core cap 7034. However, lifter 7058 may be integrally formed with one of core cap 7034 or floating plate 7052

Movement of floating plate 7052 causes the floating plate to contact lifter 7058, such that core cap 7034 can be forced upwardly or downwardly. In the depicted example, lifter 7058 contacts floating plate 7052 in an interlocking relationship.

Retraction of output shaft 7050 causes floating plate 7052 to move downwardly toward fixed plate 7054. Lifter 7058 contacts and bears against core cap 7034, forcing core cap 7034 and core cap 7034 downwardly against inner core 7032 and outer core 7030.

Extension of output shaft 7050 causes floating plate 7052 to move upwardly, away from fixed plate 7050. Lifter 7058 contacts and bears against core cap 7034, forcing core cap 7034 and core cap 7034 upwardly and away from inner core 7032 and outer core 7030.

A guide structure is provided to maintain alignment between floating plates 7052 and fixed plate 7054. Specifically, guide pins 7060 project upwardly from each fixed plate 7054 and extend through the corresponding floating plate 7052. Guide pins 7060 constrain the movement of floating plate 7052 such that the floating plate can only move along the axis of the guide pin.

FIG. 24H depicts mounting of inner core 7032 and outer core 7030 to core support block 7042 in greater detail. Core support block 7042 is rigidly mounted such that it does not move during operation of shaper module 3054'. For example, core support block 7042 may be mounted to shaper frame 3052 or to fixed platens.

Inner core 7032 and outer core 7030 are received through core support block 7042 and supported thereon with a core reset assembly 7070. During molding, core reset assembly 7070 is compressed under a preload force with which inner core 7032 and outer core 7030 are urged into the mold cavity to resist molding pressure. At mold opening, core reset assembly 7070 urges inner core 7032 and outer core 7030 into neutral positions for release of molded parts.

Core reset assembly 7070 includes a retainer ring 7072 and a core load spring 7074. Retainer ring 7072 cooperates with outer core 7030 and core support block 7042 to define a pocket in which core load spring 7074 is received. When inner core 7032 and outer core 7030 are urged downwardly by core cap 7034, retainer ring 7072 bears against load spring 7074 and compresses it. The downward (closing) force exerted on inner core 7032 and outer core 7030 may be referred to as a preload and exceeds the opening force due to pressure within the mold cavity during molding, such that the closing force on inner core 7032 and outer core 7030 is sufficient to resist the injection pressure.

When the preload on inner core 7032 and outer core 7030 is released, load spring 7074 rebounds and bears against retainer ring 7072, which in turn bears against a flange 7080 of outer core 7030, moving outer core 7030 slightly upwardly. Such movement brings outer core 7030 out of contact with mold cavity plates 194, such that the plates 194 may be opened without outer core 7030 and plates 194 rubbing against one another.

FIGS. 24I-24L depict an operational sequence of shaper module 3054'.

FIGS. 24I and 24J are isometric and cross-sectional views, respectively, of shaper module 3054' in a mold-open state. Drive links 3074 and rockers 3076, 3078 are positioned so that platens 196 (and thus, cavity plates 194) are spaced apart from one another.

As will be apparent, shaper module 3054' affords relatively unobstructed access to the mold area when the mold is open. Specifically, with the mold open, operators or machinery may access mold core assembly 190, cavity plates 194 or other components between platens 196 from a direction transverse to clamping axis C1-C1 and transverse to core axis C2-C2. Such access may simplify operations such as removal of molded parts, maintenance, or mold changes.

As shown in FIGS. 24I-24J, core actuation assembly 3042' is also in an open state, with the mold core assembly 190 withdrawn from its molding position. Actuators 7046 are extended, so that they urge floating plates 7052 away from fixed plates 7054. Floating plates 7052 in turn move linkages 7058 upwardly, thereby urging core cap 7034 upwardly away from inner core 7032 and outer core 7030.

Core reset assembly 7070 is in an unloaded state, with load spring 7074 extended. Extension of load spring 7074 causes retainer ring 7072 to bear against outer core 7030, thereby pushing the core along core axis C2-C2, away from its molding position.

After a completed part is removed, shaper module 3054' returns to its molding configuration for a new molding cycle. FIGS. 24K-24L are isometric and cross-sectional views, respectively, showing shaper module 3054' in an intermediate configuration, with cavity plates 194 and platens 196 open and mold core 190 approximately in its molding position.

Transition of shaper module 3054' from an open to a closed (molding) state begins with movement of core assembly 190 towards its molding position. Specifically, actuators 7046 of core actuation assembly 3042' retract output shafts 7050. Retraction of output shafts 7050 draws floating plates 7052 downwardly towards fixed plates 7054. Floating plates 7052 in turn bear against lifters 7058, urging the lifters and core cap 7034 downwardly.

As lifter 7058 and core cap 7034 are pulled downwardly, core cap 7034 bears against inner core 7032 and outer core 7030. Downward movement of core cap 7034 therefore also causes downward movement of inner core 7032 and outer core 7030.

The position of core cap 7034 may be measured by an optical sensor, a physical probe or another suitable sensor. Additionally or alternatively, the position of core cap 7034 may be determined based on the status of actuators 7046. For example, actuators 7046 may be equipped with encoders to report the position of output shafts 7050.

When core assembly 190 reaches the molding position, shown in FIGS. 24K-24L, clamping assembly 3042' is activated to move platens 196 and cavity plates 194 to their molding positions. Drive links 3074 are extended by drivetrain 7006 and cause rockers 3076, 3078 to urge platens 196 towards one another.

Cavity plates 194 contact one another in their molding positions, i.e., in the closed position of clamping assembly 3042'. In the closed position, core assembly 190 is enclosed within the cavity defined by the cavity plates.

When cavity plates 194 reach their closed positions, shown in FIGS. 24M-24N, core cap 7034 is again urged downwardly by actuators 7046 to apply a preload to core assembly 190. Core cap 7034 is urged against inner core 7032 and outer core 7030. Outer core 7030 in turn bears against retainer ring 7072 and load spring 7074 of core reset assembly 7070. The load spring 7074 is compressed by retainer ring 7072. A compressive force is exerted against load spring 7074. As load spring 7074 compresses, shoulder 7033 of outer core 7030 are pressed into sealing contact with corresponding surfaces of cavity plates 194. The preload force is sufficient to resist movement of core assembly 190 due to pressure from injected molding material, and to prevent leakage of molding material at the sealing surfaces. The applied preload force is typically determined using the product of the injection pressure at which the mold will be operated and the projected area of the mold cavity. The applied preload force may be measured, for example, using a load cell, or inferred, for example, based on electrical current drawn by actuators 7046.

Drivetrain 7006 exerts closing pressure against platens 196 and cavity plates 194 by way of drive links 3074 and rockers 3076, 3078. The drive pressure exceeds the pressure expected from injection of molding material into the mold cavity, and maintains the cavity plates 194 in tight abutment during molding. As previously noted, application of closing pressure against platens 196 results in reaction forces being transferred through linkage 3070'''. Such transfer of forces results in tension being placed on tie bars 7002 by way of pivotable connections 3082.

Molten molding material is injected into the mold cavity defined by cavity plates 194 and core assembly 190. After injection, the molding material is allowed to cool and harden.

FIGS. 24O-24V depict operation of shaper module 3054' after forming of a molded article.

As shown in FIGS. 24O-24P, mold assembly 190 is moved by the mold actuation subassembly 3044' while clamp subassembly 3042' is maintained in its closed position. Actuators 7046 extend output shafts 7050, thereby urging floating plates 7052 away from fixed plates 7054.

As floating plates 7052 are forced upwardly, they push lifters 7058 and core cap 7034 upwardly. Once core cap 7034 moves slightly upwardly, core reset assembly 7070 is no longer restrained. Accordingly, load spring 7074 extends back to its uncompressed condition and urges retainer plate 7072 upwardly. Retainer plate 7072 bears against outer core 7030 and may push the outer core upwardly. Such upward movement brings outer core 7030 out of contact with cavity plates 194. Thus, platens 196 and core plates 194 may be withdrawn without causing damage due to friction between outer core 130 and cavity plates 194.

Once outer core 7030 is lifted out of contact with cavity plates 194, linkage 3070"", platens 196 and mold cavity plates 194 are moved to their open positions, shown in FIGS. 24Q-24R.

With the platens 196 and cavity plates 194 in the mold-open position, mold core assembly 190 is moved to its mold-open position, shown in FIGS. 24I-24J, and the molded part is removed. As shown, cavity plates 194 are opened with the molded part lightly held on inner core 7032. The released part may be removed from the mold using a handling device. In other embodiments, the part may be fully dislodged from core assembly 190 prior to opening cavity plates 194, such that the part falls out upon opening.

Core cap 7034 pulls inner core 7032 upwardly. Thus, inner core 7032 retracts along core axis C2-C2 relative to outer core 7030. Such relative movement of inner core 7032 and outer core 7030 dislodges the molded part from core assembly 190.

The molded part tends to have some resistance to removal from the core assembly. That is, the part tends to stay on the mold inner core 7030. However, when inner core 7032 is pulled upwardly, a top edge of the molded part abuts an annular edge of outer core 7030. The annular edge of the outer core prevents the molded part from being withdrawn along with the inner core and dislodges the part from inner core 7032.

Retraction of inner core 7032 may occur in two stages, namely, an initial short movement, followed by a longer movement. The initial movement may be fast, in order to break the molded part loose from inner core 7032. For example, the initial movement may overcome suction that can occur between the molded part and inner core 7032. A second, longer, movement of inner core 7032 further withdraws the inner core from the molded part, until the molded part can freely fall or be easily removed from the core.

Conveniently, the configuration of shaper station 3054' provides flexibility for part removal. Because linkage 3070"", drive train 7006, shaper frame 3052' and tower structure 7000 are disposed on the same side of the mold, i.e. on one side of bounding envelope E (FIG. 24A), the opposite lateral side of bounding envelope E is substantially unobstructed, as is the bottom. Accordingly, material handling devices may freely access the space between platens 196 from the bottom or from the unobstructed lateral side to remove parts.

The access afforded by the configuration of shaper module 3054' also eases the process of changing or performing maintenance on mold components.

FIGS. 24S-24T depicts shaper module 3054' in a configuration for removal of mold cavity plates 194. Clamping assembly 3042' includes a wedge block (not shown), that is operable to selectively lock cavity plates 194 in their closed positions. The wedge block may, for example, be mounted to shaper frame 3052' and may be extended into contact with cavity plates 194 to bias the cavity plates to their closed positions. Some embodiments may include multiple wedge blocks, e.g. one per cavity plate.

As shown in FIG. 24S, with the wedge block engaged, cavity plates 194 remain in their closed positions when platens 196 are opened. Couplings (not shown) between cavity plates 194 and platens 196 are configured to release upon application of force away from the platens, such that opening of the platens with the wedge block engaged disconnects the mold cavity plates 194 from the platens.

As shown, cavity plates 194 are removed from platens 196 while core assembly 190 is positioned between the cavity plates. Thus, the mold may be removed from shaper module 3054' as an intact unit, i.e. cavity plates 194 may be removed with mold core assembly 190 captive between the cavity plates.

In order to permit removal of core assembly 190, it is detached from core cap 7034. Specifically, couplings 7037 are released so that mounting block 7035 and core cap 7034 can be separated from one another. After the couplings are released, actuators 7046 extend drive shafts 7050 to push floating plates 7052, lifters 7058 and core cap 7034 upwardly. The maximum extension of drive shafts 7050 is sufficient to raise core cap 7034 clear of mounting block 7035.

Once core cap is clear of mounting block 7035, cavity plates 194 and core assembly 190 can be removed from shaper module 3054' as a single assembly. Conveniently, shaper core 3054' provides sufficient clearance for machinery to access and remove the mold assembly from the side opposite shaper frame 3052' and linkage 3070"".

Primary Shaping Mold

With primary reference to FIGS. 25-28, details of example molds for use at a station of shaping cell 104 will now be described. The depicted embodiments are molds for injection molding, such as injection molding of preforms from which containers may be formed. However, many features of the described embodiments are not limited to injection molding, as will be apparent.

Figure 25A:
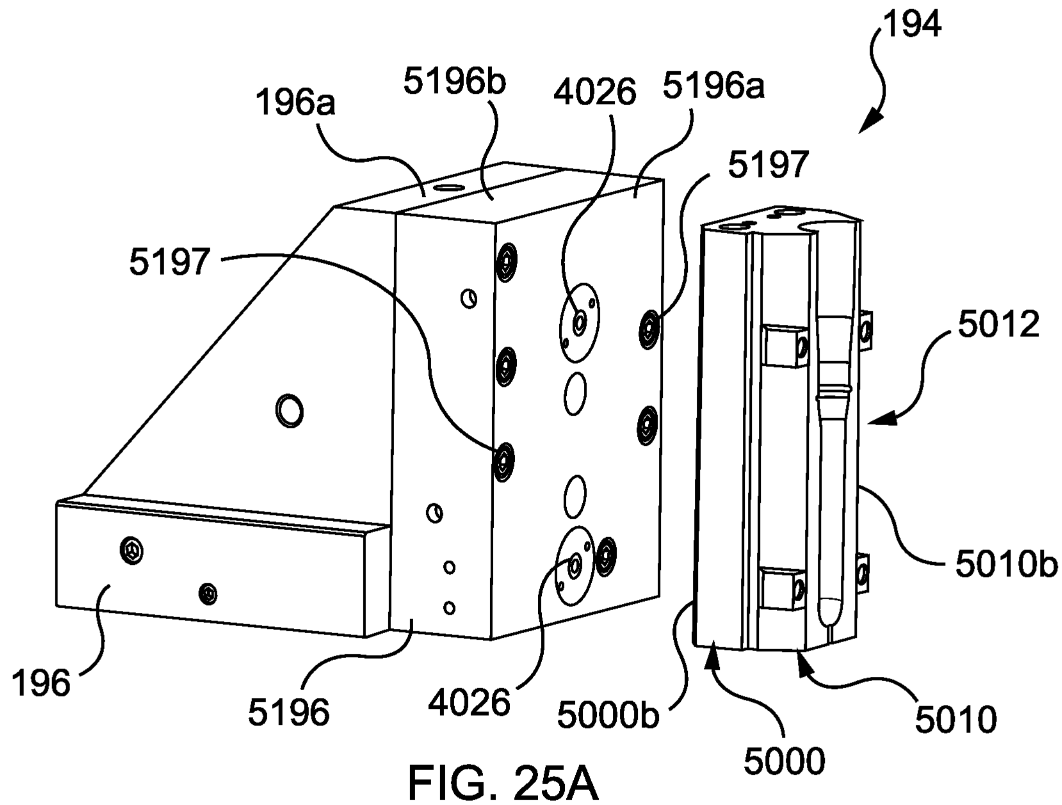
FIG. 25A is a side perspective view of a one embodiment of part of a mold assembly.
Figure 25B:
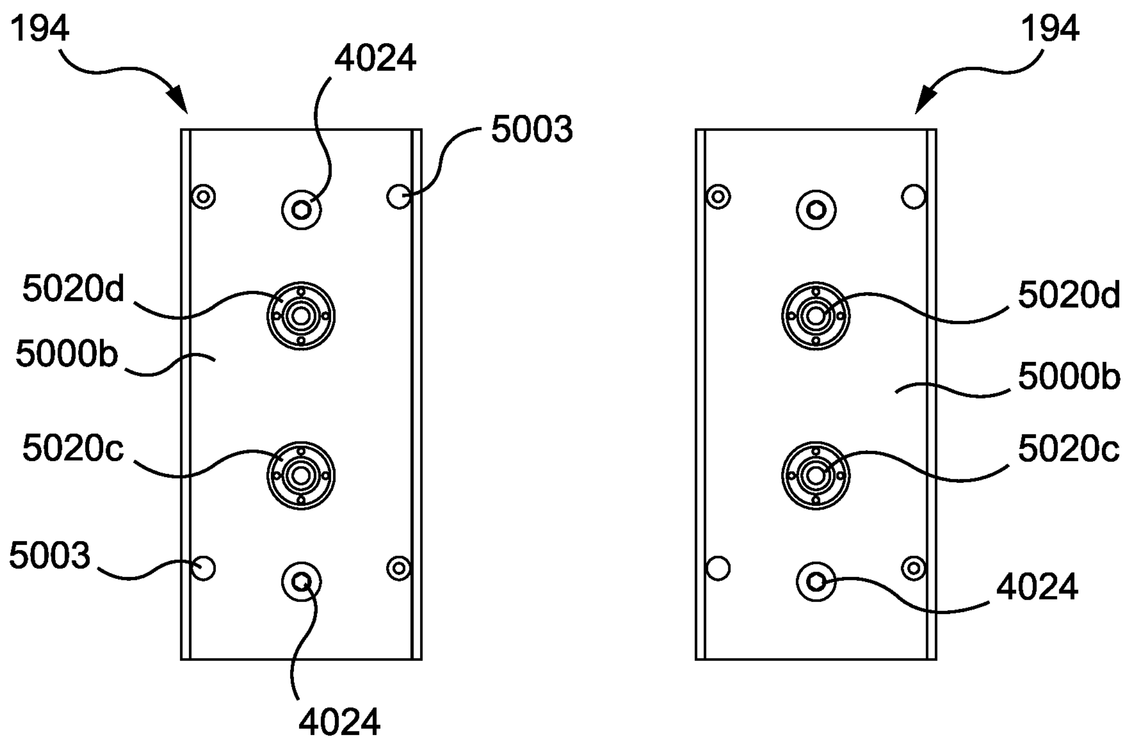
FIG. 25B is a front elevation view of a portion of the part of the mold assembly of FIG. 25A.
Figure 27A:
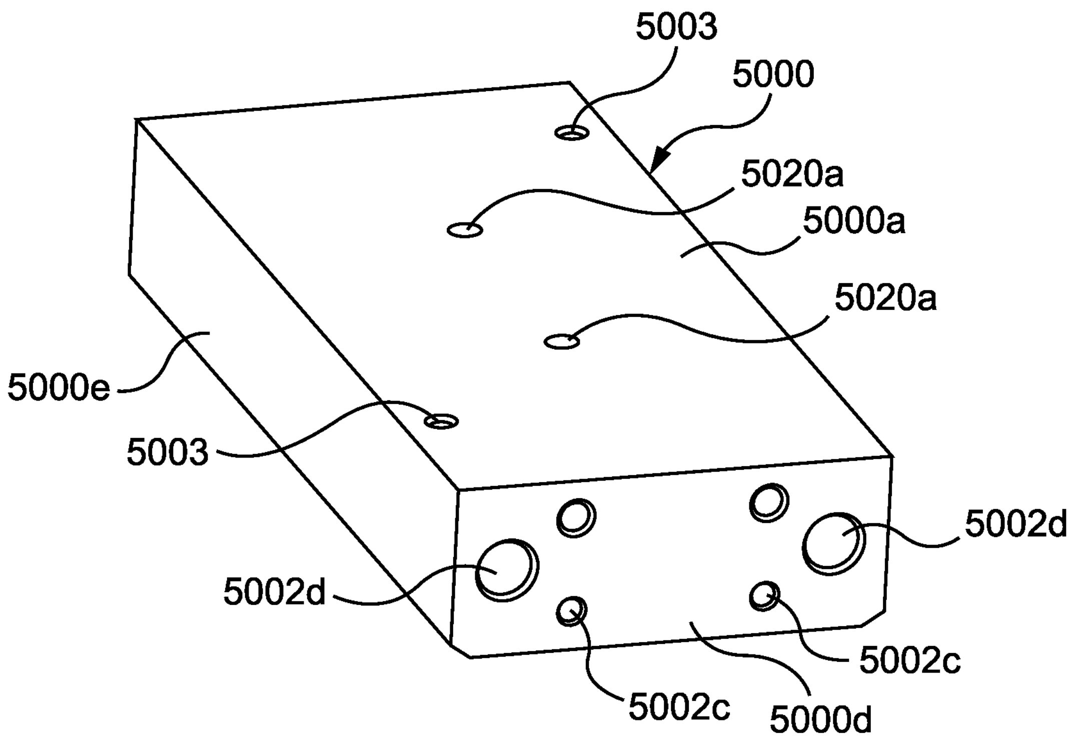
FIG. 27A is a top perspective view of a base block.
Figure 27B:
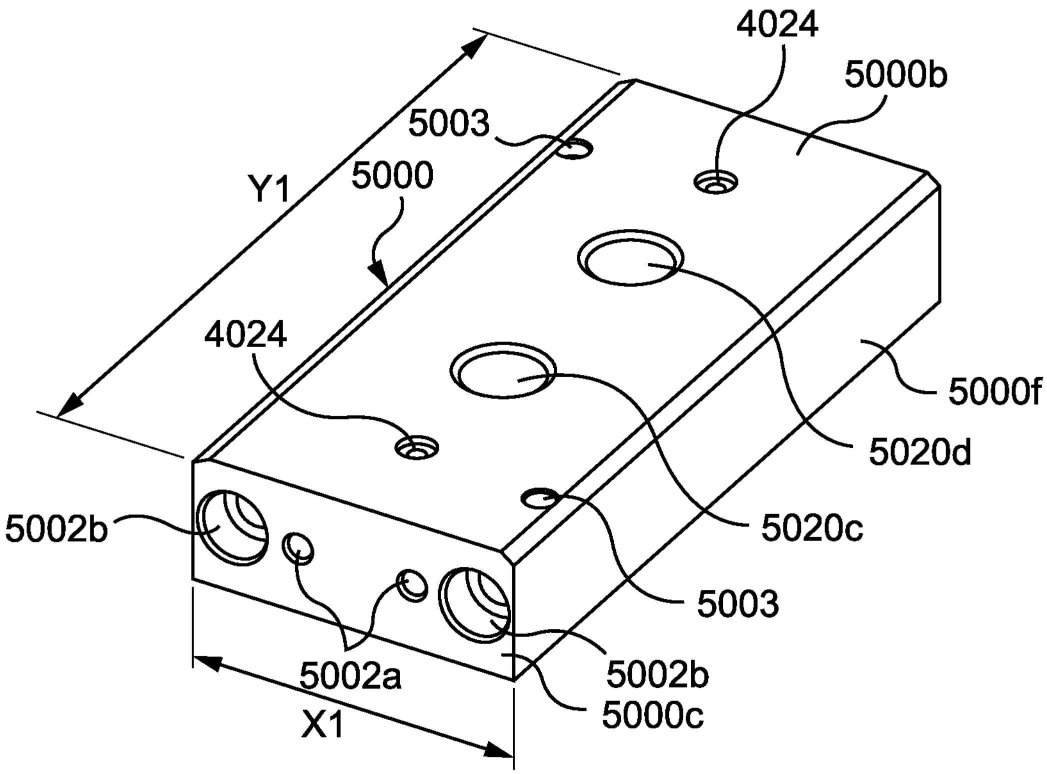
FIG. 27B is a rear perspective view of the base block of FIG. 27A.
Figure 28A:
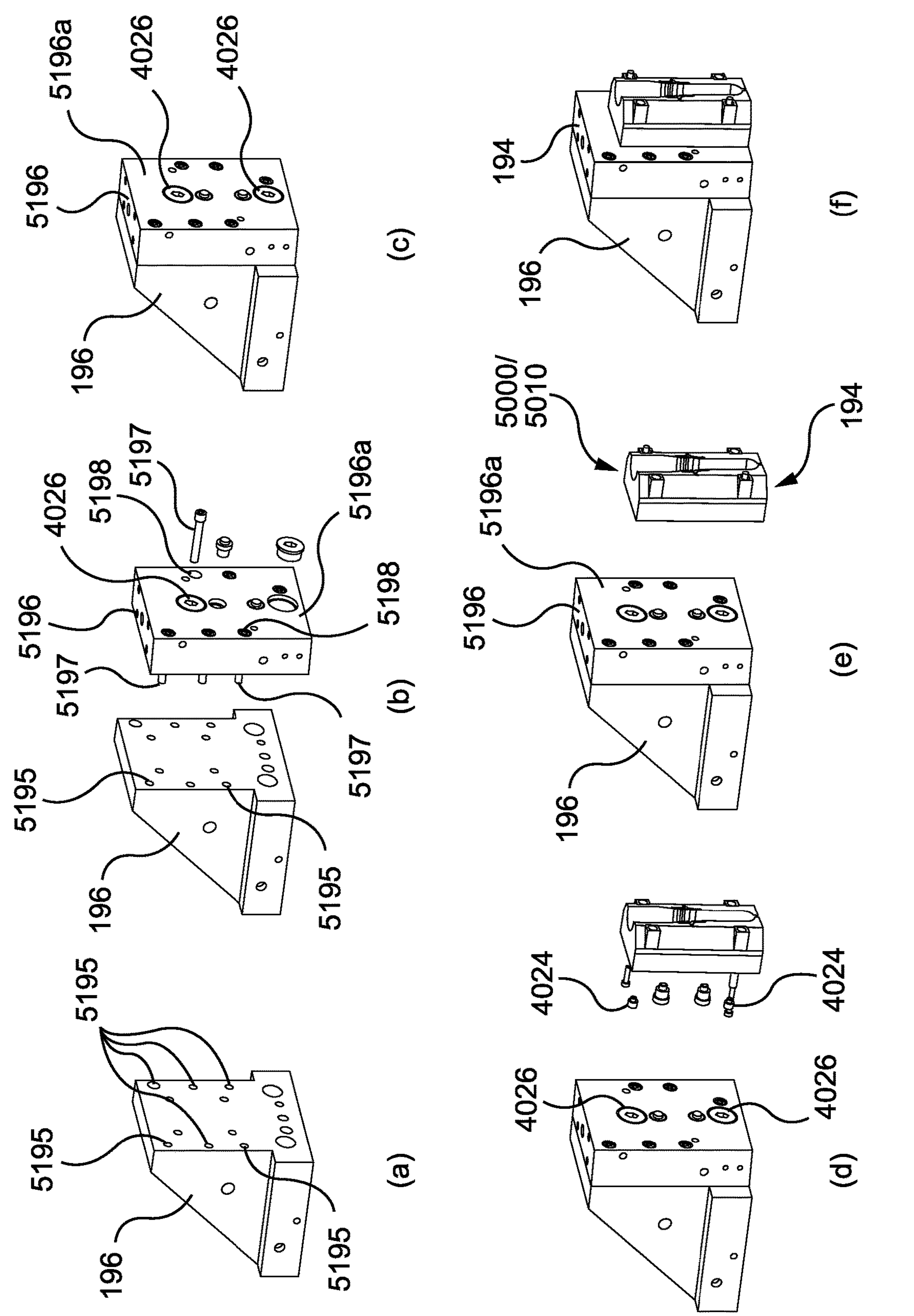
FIG. 28A is an assembly diagram for part of a mold assembly.

In mold sub-assemblies 3040 and 3040' as illustrated in FIGS. 12B-D and FIGS. 24A-T respectively, each platen 196 may have secured thereto one or more services blocks 5196 (see FIGS. 25A and 28A). Attached to each services block 5196 may be a cavity plate 194. Cavity plates 194 may take a wide range of configurations. Cavity plates 194 of different configurations may be interchangeable with one another on a services block 5196 within mold sub-assemblies 3040, 3040'. With particular reference to FIGS. 25A to 28B, examples of cavity plates 194 are illustrated and are described hereinafter in detail.

With reference to FIGS. 25A and 28A, services block 5196 may be connected to a platen 196 by threaded bolts 5197 received through openings 5198 in services block 5196 and into threaded openings 5195 in a platen 196.

Services block 5196 may have channels operable for delivering services such as pressurized air, cooling fluid, electrical/electronic services to a cavity plate 194. Services block 5196 may during operation of plastic molding system 100 remain connected to a platen 196.

In some embodiments, cavity plate 194 may be a single unitary body. In other embodiments, cavity plate 194 may have two separately identifiable portions. The two portions may be integrally formed to create a single continuous unitary body or the two portions may be configured as two separate units or parts and be connected to each other during operation of plastic molding system 100.

In the embodiments of FIGS. 25A to 25K, each cavity plate 194 comprises two separately identifiable portions: a base portion and a mold cavity portion. The base portion, which is identifiable as a base block 5000, may be first formed as a separate body, and then the mold cavity portion, which is identifiable as a mold cavity block 5010 or 5010', may be formed by a manufacturing process by which the two portions/blocks are melded or merged together into a cavity plate 194 that comprises a single unitary body.

In the embodiments of FIGS. 26A-J, each cavity plate 194 comprises two separate parts: a base part (also referred to herein as a base block 5000) and a mold cavity part (referred to herein as a mold cavity block 5010" or 5010"). In these embodiments of FIGS. 26A-J, base block 5000 and mold cavity block (5010" or 5010'") are formed as separate parts and then connected together by a connection mechanism.

Each mold cavity block 5010, 5010', 5010", 5010'" of a cavity plate 194 may be formed in a specific configuration that is adapted to provide one half of an outer mold cavity surface for an item to be molded having a particularly desired profile/shape. In a plastic molding system 100, a plurality of differently configured cavity plates 194, with differently configured mold cavity blocks 5010, 5010', 5010", 5010'" with differently configured mold cavity surfaces, may be available for selection and use in a mold sub-assembly 3040, 3040'.

In the embodiments of FIGS. 26A-J, each base block 5000 may be configured and operable to connect to, and disconnect from, a plurality of differently configured mold cavity blocks 5010", 5010'" which when used in a pair of mated mold cavity blocks 5010" or 5010'" may provide a differently shaped molding cavity surface to produce a differently shaped/configured molded item.

Each base block 5000 of a cavity plate 194 may have one or more "quick connection" mechanisms (as described further hereinafter) for coupling each cavity plate 194 to a services block 5196 and thus to a platen 196.

Figure 25C:
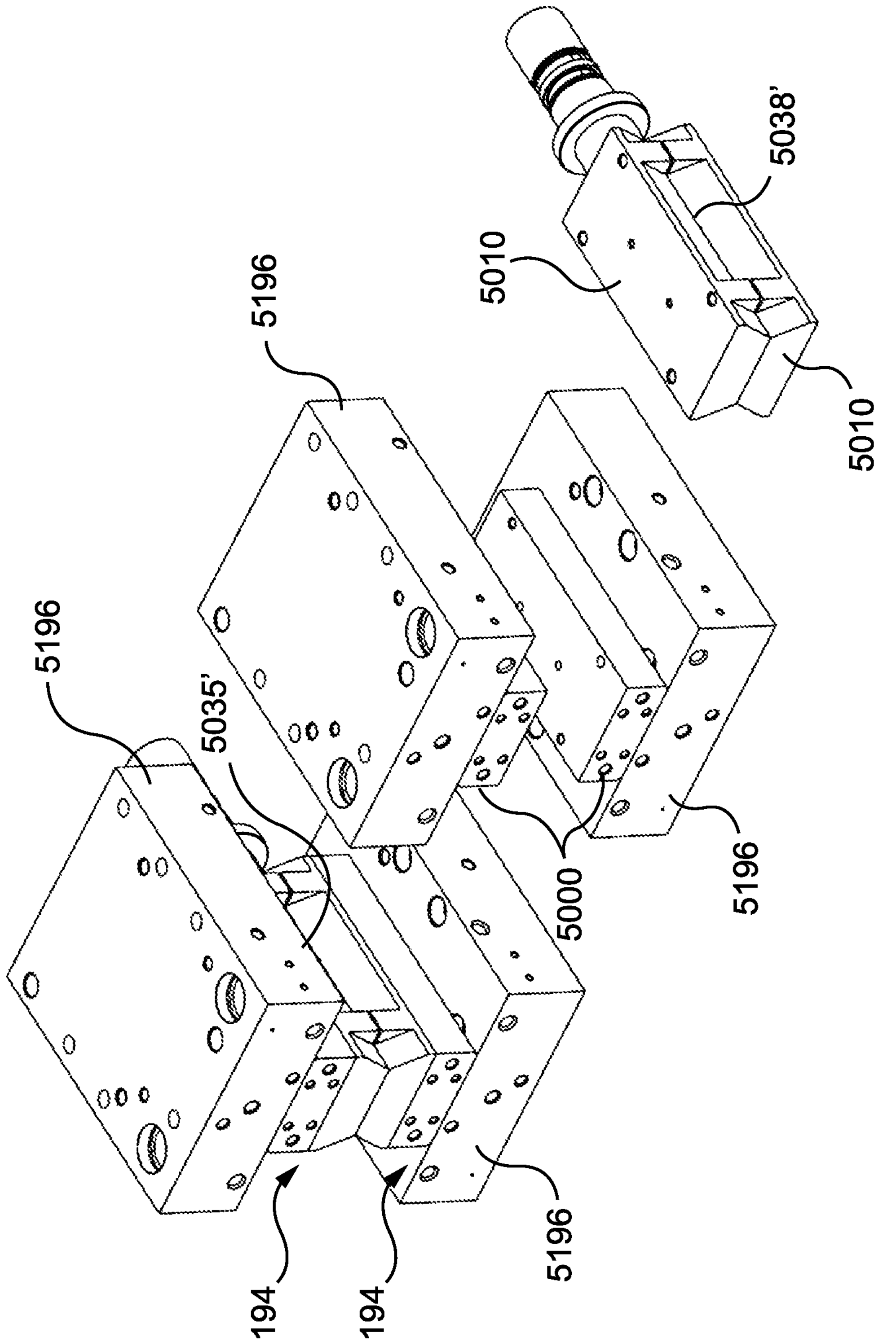
FIG. 25C are side perspective views of the embodiment of portions of the part of the mold assembly of FIG. 25A.
Figure 25D:
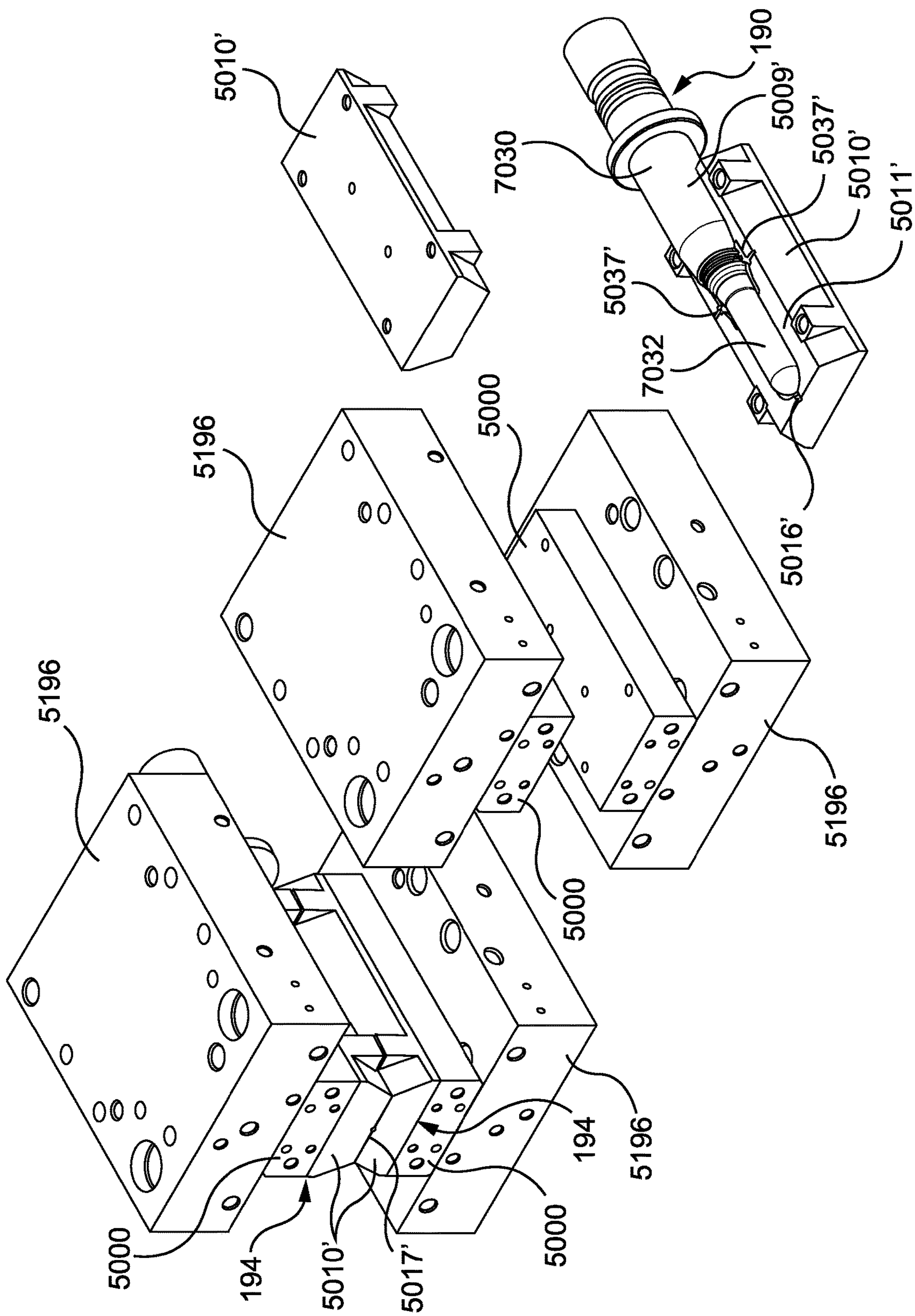
FIGS. 25D, E and F are similar side perspective views as FIG. 25C, of portions of the part of the mold assembly of FIG. 25A.
Figure 25E:
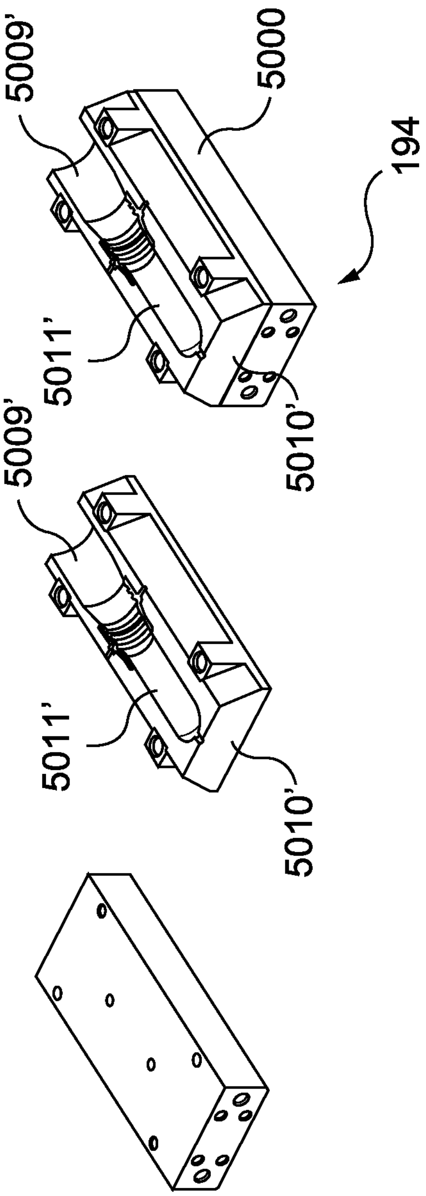
FIG. 25G is top perspective view of an embodiment of a mold cavity block.
FIG. 25H is a is top perspective view of an embodiment of a cavity plate that includes the mold cavity block of FIG. 25G.
FIG. 25I is top perspective view of an alternate embodiment of a mold cavity block.
FIG. 25J is top plan view of the mold cavity block of FIG. 25I
FIG. 25K is another top perspective view of the mold cavity block of FIG. 25I.
Figure 25F:
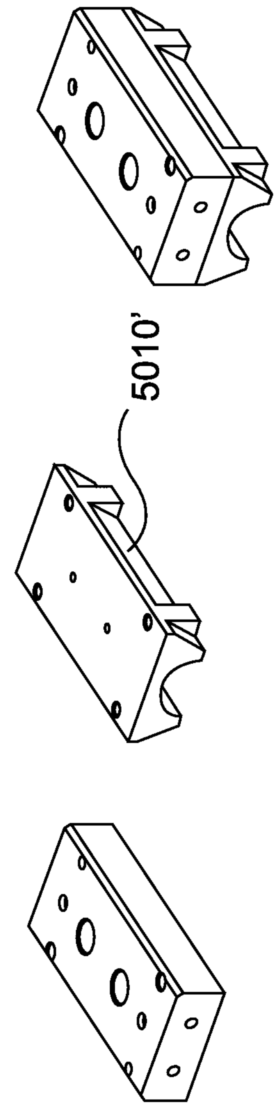

With reference again to the embodiment of cavity plate 194 depicted in FIGS. 25C-D, further details of base block 5000 and mold cavity blocks 5010, 5010' of a cavity block 194 are illustrated in FIGS. 25E-K and FIGS. 27A-B, as described hereinafter.

With particular reference to FIG. 27B, base block 5000 may be used with any of mold cavity blocks mold cavity blocks 5010, 5010', 5010", 5010'" to form a cavity plate 194. Base block 5000 may have a length Y1 and width X1.

Figure 25G:
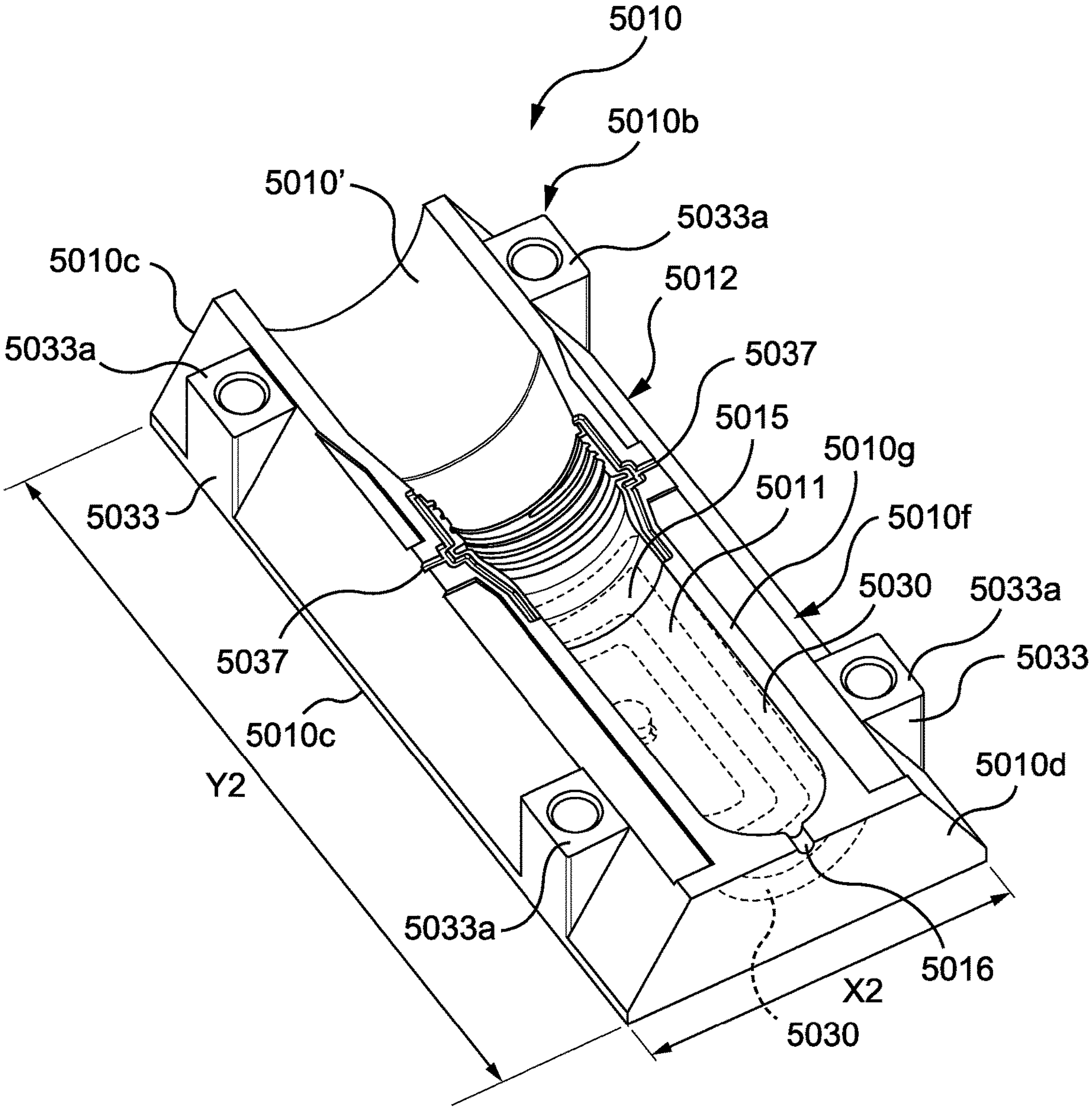

With reference to FIG. 25G, mold cavity block 5010' may have a length Y2 and width X2. X1 may be the same magnitude as X2, and Y1 may be the same magnitude as Y2. Mold cavity blocks 5000, (as well as mold cavity blocks 5000" and 5000'") may have the same length and width Y2 and X2.

With reference to FIGS. 27A and 27B, each base block 5000 may have a mold cavity block facing surface 5000*a* (FIG. 27A) that may be generally planar and extend vertically (direction Y) and transversely (direction X). Mold cavity block 5010, 5010' of FIGS. 25A to 25K may be formed by an additive manufacturing process whereby by deposition of a material on top of mold cavity block facing surface 5000*a* the material bonds to the material of base block 5000 at mold cavity block facing surface 500*b* of base block 5000.

In other embodiments, mold cavity block 5010" (FIG. 26B), may have a base block facing surface 5010'*a* that may be generally planar and extend vertically (direction Y) and transversely (direction X). Base block facing surface 5010*a*" of mold cavity block 5010 and mold cavity block facing surface 5000*a* of base block 5000 may be configured to be able to connected together and be held in face to face, flush mating contact with each other. Base block 5000 may also have, on the opposite side to mold cavity block facing surface 5000*a*, a services block facing surface 5000*b* (FIG. 27B) that may also be generally planar and extend transversely. Services block facing surface 5000*b* of base block 5000 of cavity plate 194 may be operable to be able to be connected and be held in face to face flush mating contact with a generally planar and transversely extending surface 5196*a* of a services block 5196 associated with a platen 196 (FIGS. 25A, 25C, 25D, 26A, 26B, and 28A).

The connection mechanism employed between the base block 5000 of a cavity plate 194 and the mold cavity block 5010", to hold surfaces 5000*a* and 5010*a*" in face to face, flush mating contact and in engagement may be, or may not be, a mechanism that provides for a relatively easy and quick connection to, and disconnection from, each other. Each base block 5000 may be disconnected from, and connected to, a mold cavity block 5010" when the cavity plate 194 is removed from mold sub-assemblies 3040 and 3040'. It is contemplated in the embodiments of FIGS. 26A-J each base block 5000 may be connected to and disconnected from, a mold cavity block 5010", 5010'" using threaded bolts 5025 received through open holes 5026 that pass through base plates 5000 and extend longitudinally (direction Z) into threaded holes (not shown) appropriately positioned in cavity block 5010" (see FIGS. 26D and 26G).

With reference again to FIGS. 27A and 27B, counter-bore openings 5003 may be provided which extend longitudinally through the body of each base block 5000. Openings 5003 are adapted to receive therein and secure threaded base portions of alignment dowels (5004 (FIG. 25B) which may have portions that pass through openings in the mold cavity block 5010' to which the base block 5000 is attached (in the embodiments of FIGS. 26A-J) and extend longitudinally outwards. A protruding end of an alignment dowel/pin may be received in a corresponding opening in the mold cavity block (as for example as described further below).

Additionally, each base block 5000 may have upper clamp connection openings 5002*a*, 5002*b* on upper horizontal surface 5000*c* and lower clamp connections have lower clamp connection openings 5002*c*, 5002*d* on lower horizontal surface 5000*d* (FIGS. 27A, 27B). These clamp connection openings may be utilized to connect to fixtures during manufacturing of the base blocks 5000 themselves (eg. when clamping of base blocks 5000 is required) or when combining the base block with a mold cavity block 5010, 5010', 5010" or 5010'". Such clamp connecting openings may also be used to connect to fixtures associated with a handling robot when it is required to conduct tooling maintenance activities. Additionally, lower clamp connection openings 5002*c*, 5002*d* may also be used for retaining gate cutter assembly 2200 as referenced above.

Another connection mechanism is employed between base block 5000 and services block 5196 to releasably but securely hold surfaces 5000*b* and 5196*a* in face to face, flush contact and engagement. This connection/retaining mechanism may be a quick connection/disconnection mechanism (referred to herein as a "quick connection" or "quick connect" mechanism) that facilitates relatively easy and quick connection and disconnection of each base block 5000 of a cavity plate 194. A "quick connection" or "quick connect" mechanism may be considered herein to be a mechanism whereby the connection and disconnection between the two components can be affected relatively easily and it has one or more of the following functional characteristics.

One characteristic indicative of a quick connection is that the connection and disconnection mechanism is selectively engageable to hold the base block 5000 against the services block 5196.

Another characteristic indicative of a quick connection is that the mechanism has the capability of selectively interlocking the base block 5000 and the services block 5196.

Another characteristic indicative of a quick connection is that the mechanism is operable to provide a clamping action when connecting base block 5000 and the services block 5196.

Another characteristic indicative of a quick connection is that the mechanism is switchable between connected and disconnected states to connect and disconnect the base block 5000 and the services block 5196.

Another characteristic indicative of a quick connection is that the connection and/or disconnection is made by way of a spring activated force operating between a part on the base block 5000 and the services block 5196.

Another characteristic indicative of a quick connection is that the connection and/or disconnection does not require the installation of fasteners eg. does not involve twisting or turning forces to be applied to screws, bolts, nuts, or the like.

By way of example, a quick connect mechanism like retaining mechanism 4014 illustrated in FIG. 4H as described above may be employed to releasably connect a base block 5000 to a services block 5196. A connection/retaining mechanism such as the model 306019 zero point pull-stud and model 305979 zero point clamping module socket available from AMF (Andreas Maier GmbH & Co KG referred to herein as "AMF"—see www.amf.de/en). Thus, the connection/retaining mechanism may include a plurality of vertically spaced studs 4024 and a corresponding plurality of mating sockets 4026 which can selectively interlock with the studs. The studs 4024 (FIGS. 25B, 27B) may be mounted on and extend longitudinally (direction Z) outward from services block facing surface 5000*b* of base block 5000 of cavity plate 194 and engage with a socket 4026 formed in base block facing surface 5196*a* of services block 5196 (FIG. 25A) and which extends longitudinally (direction Z) into the body of services block 5196 (see also FIG. 28A).

Other features of this retaining mechanism shown in FIG. 4H are described above. By providing a quick connect mechanism whereby different molding cavity plates 194 can be readily interchanged on a services block 5196, the mold sub-assemblies 3040, 3040' can be easily and quickly changed from one particular set-up to another set-up without significant changeover downtime.

Each base block 5000 and services block 5196 may each be made from any suitably strong and rigid material or combination of materials, such as for example 1.2085 grade steel or AISI 422 stainless steel.

A suitably sized, generally cuboid shaped block may be initially formed such as by casting using known techniques and methods, and then the particular features of the base block 5000 and services block 5916 as described herein may be formed in the cast block using known manufacturing techniques and methods such as conventional machining apparatuses and methods.

Each mold cavity block 5010, 5010', 5010", 5010'" may also be made from suitably strong and rigid material(s) such as for example 1.2085 or AISI 422 steel.

In the embodiments of FIGS. 26A-J, a suitably sized, generally cuboid shaped block may be initially formed such as by casting using known techniques and methods, and then the particular features of the mold cavity block 5010", 5010'" as described herein may be formed in the cast block using known manufacturing techniques and methods such as conventional machining apparatuses and methods.

One technique that may be employed for forming a mold cavity block 5010, 5010', including forming the shape of its mold cavity wall surface 5011, 5011' and interior core alignment surface 5009, 5009' (FIG. 25D-K) is a 3D printing process, and in particular direct metal laser sintering (DMLS). Such a process can be employed in which the material is directly applied and deposited on top of surface 5000*a* of a base block 5000 such that the 3D profile of the mold cavity block 5010, 5010' is built on top of the base block. Such a process has flexibility in terms of the shape of the mold cavity wall surface 5011, 5011' that can be formed and allowing the formation of internal hollow features, such as providing hollow service channels therein (eg. fluid cooling channels). Such an additive manufacturing process provides a high level of flexibility in being able to provide an optimized cooling fluid channel which can surround/cover the entire molding cavity surface. Traditional manufacturing techniques may not be able to achieve the same configuration/placement of cooling channels or if they can, it may be very difficult to achieve and incur extremely high cost.

Figure 28B:
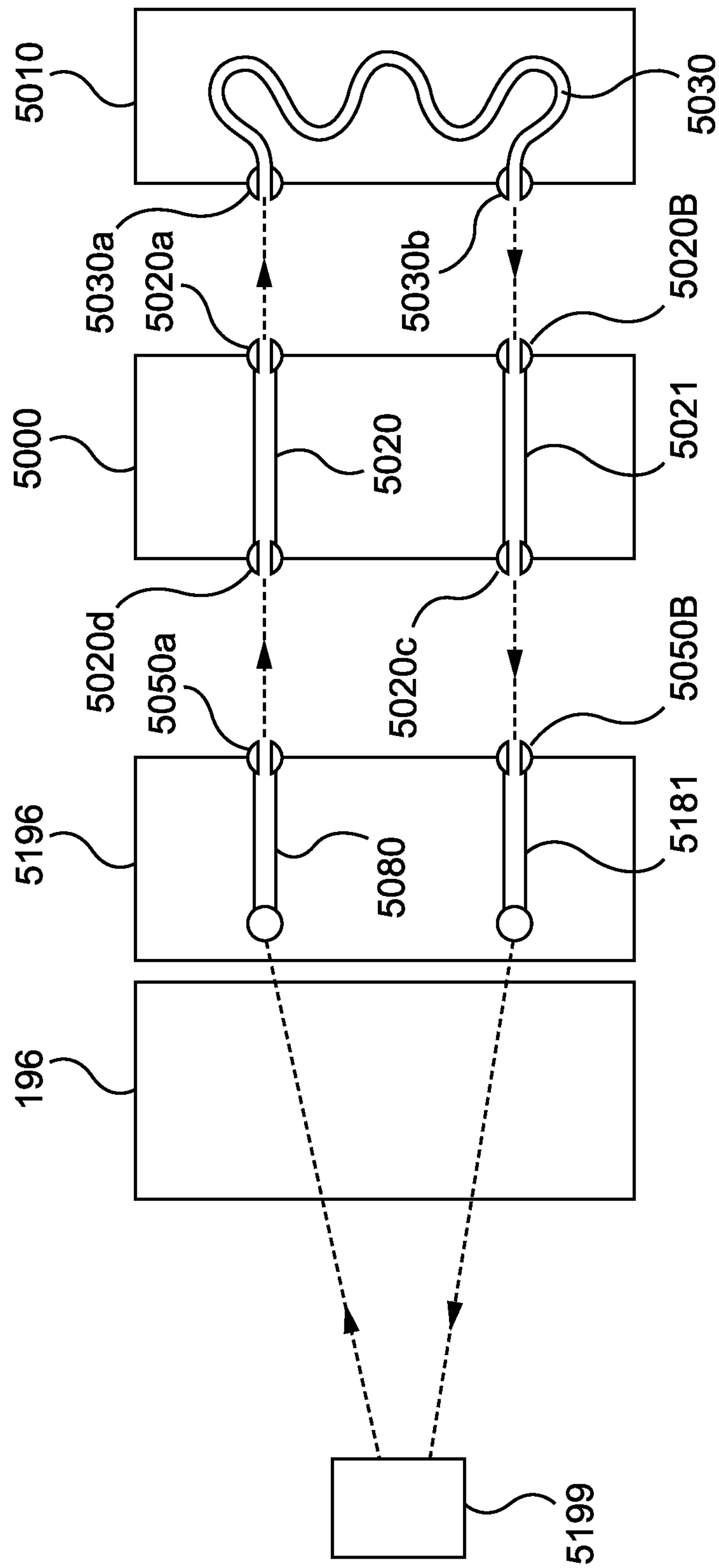
FIG. 28B is a schematic view of a cooling fluid circuit.

With particular reference now to FIGS. 27A-B and FIG. 28B, base block 5000 may be provided with one or more service channels extending there through. Such services may include pressurized air (which can be used to operate a quick connection mechanism operating between a base block 5000 and a services block 5196), electrical/electronic wiring (eg. for electronically/electronically connecting to sensors such as temperature sensors), and fluid cooling (eg. cooled gas; cooled water) channels.

By way of example, in the embodiment of FIGS. 26A-J, where each base block 5000 is configured and operable to connect to, and disconnect from, a plurality of differently configured mold cavity blocks 5010", 5010'", base block 5000 may have a fluid cooling channel 5020 (FIG. 28B) that is a part of a cooling fluid circuit 5200 that delivers cooling fluid from a cooling fluid reservoir 5199 to a services block 5196, then into the base block 5000 and then into a mold cavity block 5010" (or mold cavity block 5010'") so as to promote rapid cooling and solidification of melted material after injection into a mold cavity formed by a pair of mated, clamped mold cavity blocks 5010 (or mold cavity blocks 5010', 5010", 5010'"). The cooling fluid circuit 5200 returns the cooling fluid to a fluid channel 5181 in the services block 5196 for return to the cooling fluid reservoir 5199. Examples of cooling fluid are chilled water, liquid $CO_2$ and other fluids with different heat exchange characteristics.

Figure 26A:
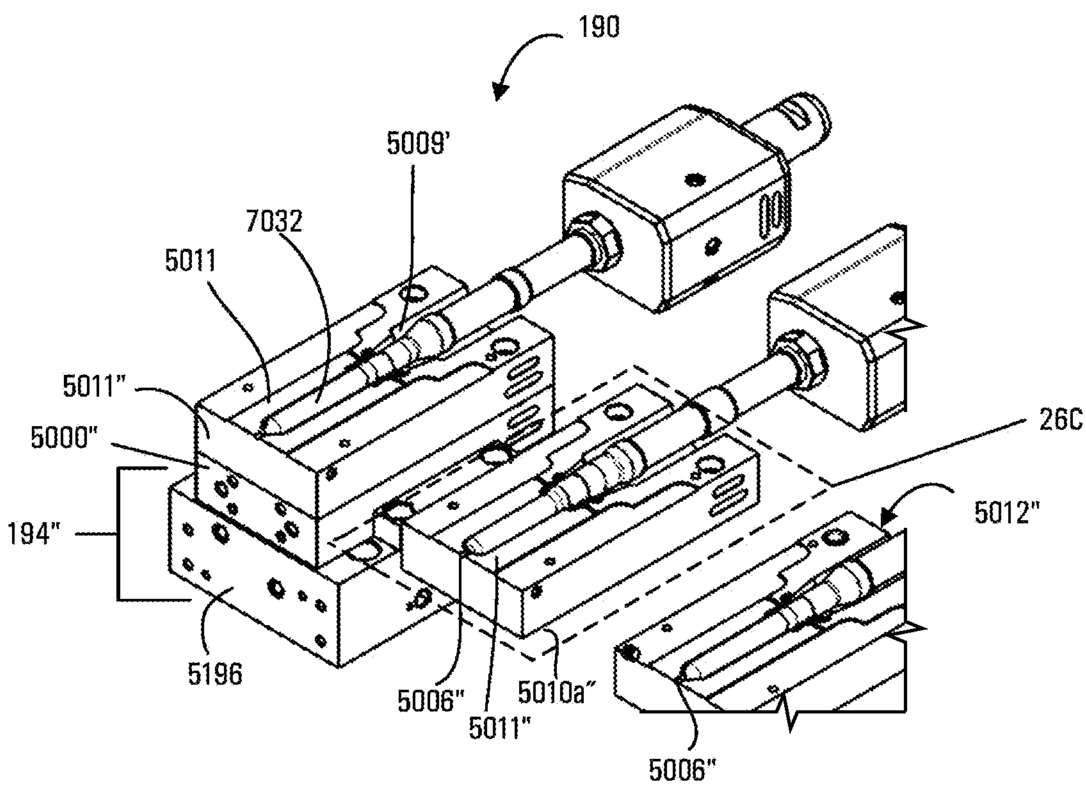
FIGS. 26A and 26B are side perspective views of an alternate embodiment of portions of a mold assembly.
Figure 26B:
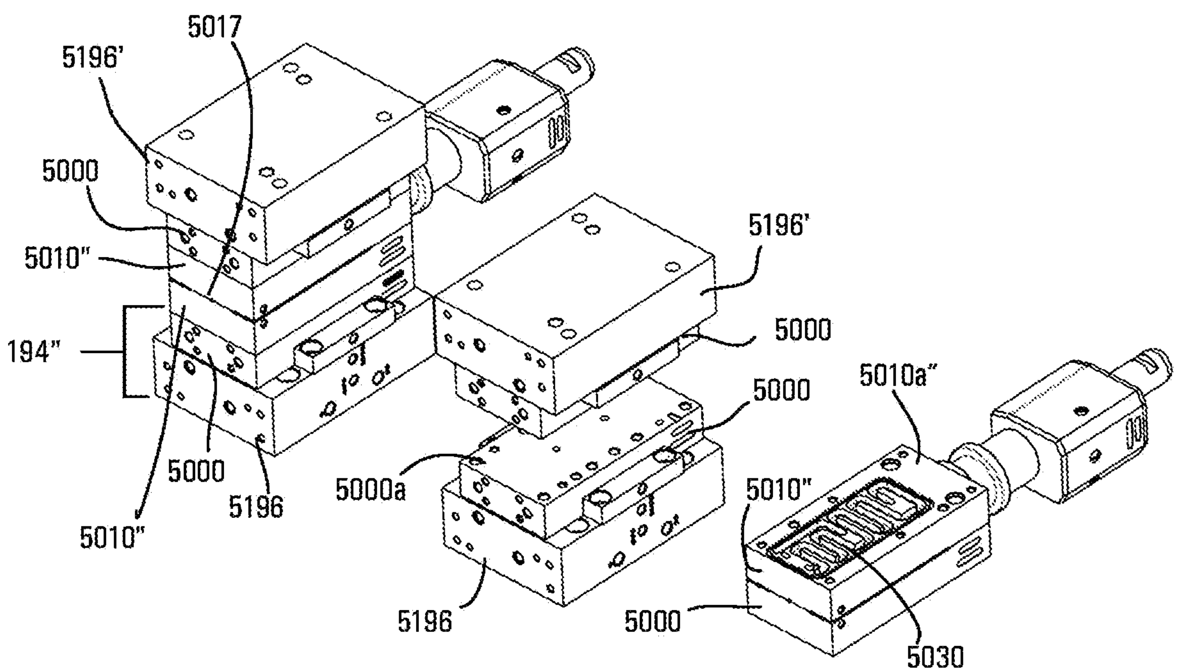

Services block 5196 may have a cooling channel 5080 with an output port 5050*a*. Cooling channel 5020 in base block 5000 may have an input port 5020*d* in surface 5000*b* of base block 5000 which is in fluid communication with an aligned output port 5050*a* in surface 5196*a* of services block 5196, when the base block 5000 is engaged with the services block 5196 as shown in FIGS. 26A and 26B. Fluid channel 5020 passes through base block 5000 to an output port 5020*a* in surface 5000*a* of base block 5000 which is in fluid communication with an aligned input port 5030*a* in surface 5010*a* of mold cavity block 5010 (FIG. 25B) (or the corresponding surface of mold cavity block 5010', 5010", 5010'"). Input port 5030*a* provides an intake for a cooling channel 5030 (FIG. 28B) that that passes through the body of the mold cavity block 5010 (or mold cavity block 5010', 5010", 5010'"). Cooling channel 5030 may be formed to allow cooling fluid to flow along a tortuous path through the body of mold cavity block 5010 (or mold cavity block 5010', 5010", 5010'") to an output port 5030*b*. The tortuous path have portions that are configured to conform at least in part to the mold cavity wall surface to enhance the cooling effect of the cooling fluid within the mold cavity block 5010. In some example embodiments, the cooling channel 5030 may, at least in part, be formed as an indented groove that may be milled into base block facing surface 5010_a_" of mold cavity block 5010". The groove may be fully enclosed at its top by the opposed mating surface 5000_a_ of base block 5000 when mold cavity block 5010" is engaged with a base block 5000 and surface 5000_a_ in mating contact with surface 5010_a"_.

Output port 5030_b_ in surface 5010_a_ of mold cavity block 5010 (or corresponding surface of mold cavity block 5010', 5010", 5010'") is in fluid communication with an aligned input port 5020_b_ in surface 5000_b_ of base block 5000 (FIG. 27A). A second fluid channel 5021 passes through base block 5000 from input port 5020_b_ to an output port 5020_c_. The output port 5020_c_ is in fluid communication with an input port 5050_b_ in services block surface 5196_a_ of services block 5196.

Services block 5196 has a services channel 5081 that provides communication between input port 5050_b_ and is in fluid communication with cooling fluid reservoir 5199 so that cooling fluid can be returned to the reservoir.

With reference to the cooling fluid circuit 5200 depicted in FIG. 28B, cooling fluid may be communicated from the cooling fluid reservoir 5199 by various cooling fluid channels passing through other components of the mold sub-assembly 3040, 3040' into the cooling channel 5080 in the services block 5196, then pass into the cooling channel 5020 in base block 5000 and then into the cooling channel 5030 in mold cavity block 5010" (or mold cavity block 5010'"). Cooling fluid may then flow through the cooling channel 5030 and exit output port 5030_b_ into input port 5020_b_ into the cooling channel 5021 in base block 5000 where it can flow through channel 5021 exiting into input port 5050_b_ in services block surface 5196_a_ of the services block 5196. Then the cooling fluid can flow through cooling fluid channel 5181 to be returned to the cooling fluid reservoir 5199 by various channels passing through other components of the mold sub-assembly 3040, 3040'. As part of the cooling fluid circuit 5200, in addition to the cooling fluid reservoir 5199 and the flow channels, an apparatus for cooling the fluid is required as well as a pump and possibly valves to provide for a cooling fluid flow to and from the mold cavity blocks 5010.

Each of cooling fluid input port/output port couplings 5020_a_/5030_a_; 5030_b_/5020_b_; and 5020_c_/5050_b_ may be any suitable cooling fluid communication fittings. For example, suitable water fittings for couplings 5020_c_/5050_b_ may be the model AMF 6989N [164988, built-in coupling nipple] and 6989M [164996, built-in coupler] water fittings made by AMF. Couplings 5030_a_/5020_a_; and 5030_b_/5020_b_ may be suitable sealing O-rings between the mated surfaces of base block 5000 and mold cavity block 5010" (or mold cavity block 5010'") of cavity plate 194 and in particular in the vicinity of where channels 5020 and 5021 connect with channel 5030.

In such water fittings, there may be provided a valve mechanism that opens and closes the channel of fluid flow. When the male part of such a cooling fluid fitting is received into the female part, the valve mechanism is opened. When the male part is removed from the female part, the valve mechanism is closed. The valve mechanism may be provided on the cooling fluid source side of the fluid circuit supply arrangement, such as for example, at the output port 5050_a_ on a services block 5196. Accordingly, when a base block 5000 is removed from connection to services block 5196, cooling fluid will not flow out of output port 5050_a_ on the services block 5196.

It is also noted that with male/female type couplings (both cooling fluid fittings and fittings associated with the connection/retaining mechanism referenced above) between the base blocks 5000 and the services blocks 5196, there will be a male part and a female part. In some embodiments, the female part of the couplings may be formed in the services block 5196 and the male part of the coupling on the base block 5000. This is because the male part of such a coupling is typically a less expensive component and in any molding system 100, there may be a much greater number of base blocks 5000 that are utilized compared to the number of service blocks 5196, it may be cost effective to provide the male parts of such cooling fluid fittings and retention/connection mechanisms, on the base blocks 5000. In other embodiments, the male part of the couplings may be formed in the services block 5196 and the female part of the coupling on the base block 5000.

Similarly, in the embodiments of FIGS. 25A-25K, where each base block 5000 is integrally connected with a mold cavity block 5010 (or a mold cavity block 5010'). Again each base block 5000 may have a fluid cooling channel 5020' (FIG. 28C) that is a part of a cooling fluid circuit 5200' that delivers cooling fluid from a cooling fluid reservoir 5199 to a services block 5196, into the base block 5000 and then into a mold cavity block 5010 (or mold cavity block 5010') so as to promote rapid cooling and solidification of melted material after injection into a mold cavity formed by a pair of mated, clamped mold cavity blocks 5010 (or mold cavity block 5010'). The cooling fluid 5200' returns the cooling fluid to a fluid channel 5181' in the services block 5196 into a fluid channel in platen 196 for return to the cooling fluid reservoir 5199.

Services block 5196 may have a cooling channel 5080' with an input port 5051_a_ and an output port 5050_a_. Cooling channel 5020' in base block 5000 may have an input port 5020_d_ in surface 5000_b_ of base block 5000 which is in fluid communication with an aligned output port 5040_a_ in surface 5196_a_ of services block 5196, when the base block 5000 is engaged with the services block 5196 as shown in FIGS. 26A and 26B. Fluid channel 5020' passes through and is integrally connected for fluid communication with a cooling channel 5030' (FIG. 28C) that that passes through the body of the mold cavity block 5010 (or mold cavity block 5010'). Like cooling channel 5030, cooling channel 5030' may be formed to allow cooling fluid to flow along a tortuous path through the body of mold cavity block 5010 (or mold cavity block 5010') and then fluidly connect with a second fluid channel 5021' passes through base block 5000 to an output port 5020_c_. Output port 5020_c_ is in fluid communication with an input port 5050_b_ in services block surface 5196_a_ of services block 5196.

Services block 5196 has a services channel 5081' that provides communication between input port 5050_b_ and output port 5051_b_. Output port 5051_b_ is in communication with an input port 5040_b_ in platen 196.

Figure 28C:
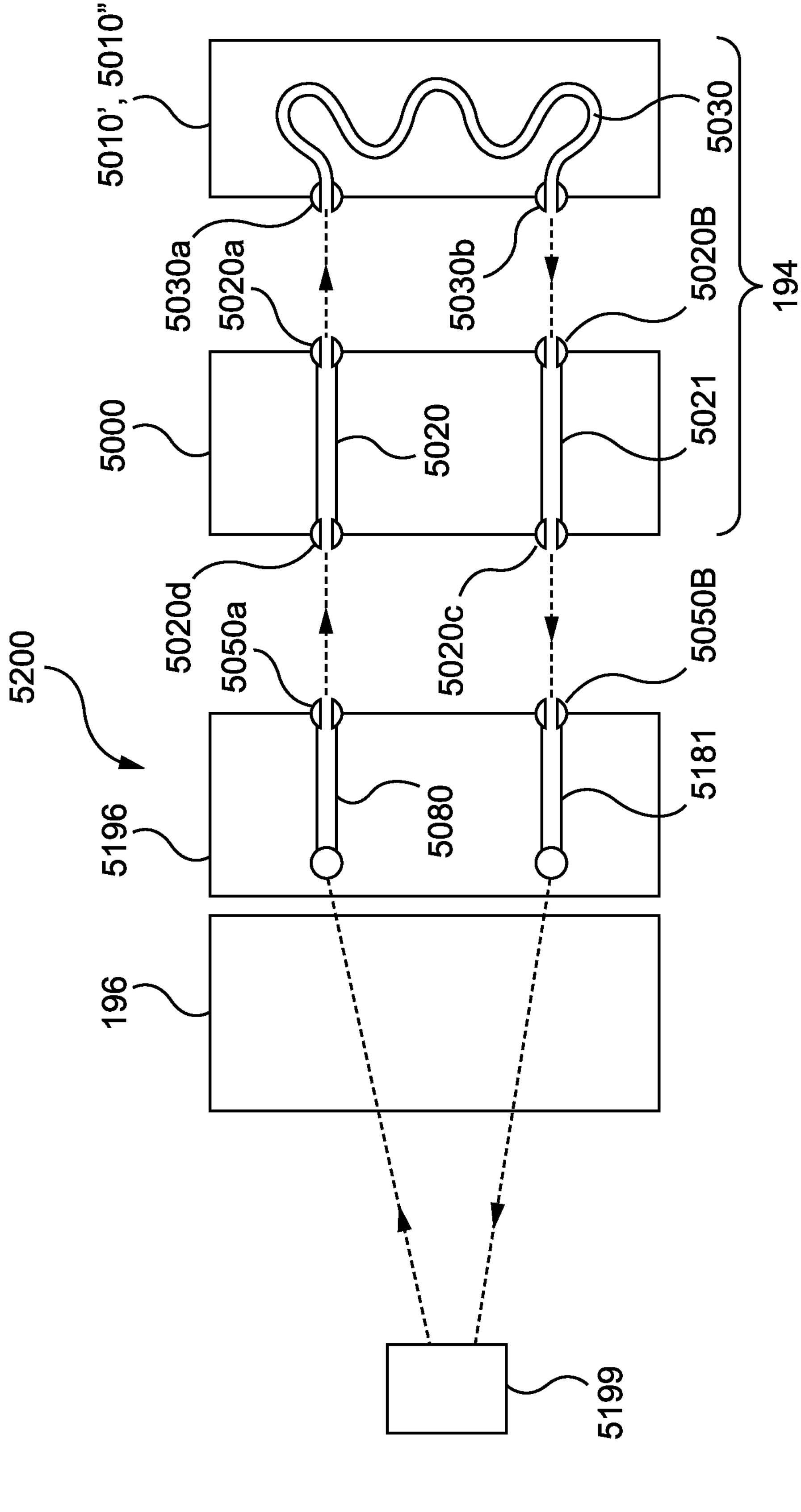
FIG. 28C is a schematic view of a cooling fluid circuit.

With reference to the cooling fluid circuit 5200' depicted in FIG. 28C, cooling fluid may be communicated from the cooling fluid reservoir 5199 by various cooling fluid channels passing through other components of the mold sub-assembly 3040, 3040' into the platen 196 and then exit from an output port 5040_a_ at platen surface 196_a_ of platen 196, and pass into and through the cooling channel 5080 in the services block 5196, then pass into the cooling channel 5020' in base block 5000 and then into the cooling channel 5030' in mold cavity block 5010 (or mold cavity block 5010'). Cooling fluid may then flow through the cooling channel 5030' and then flow through channel 5021' exiting into input port 5050_b_ in services block surface 5196_a_ of the services block 5196. Cooling fluid can then flow through cooling fluid channel 5181' to an input port 5040_b_ in platen surface 196*a* of the platen 196 to which service block 5196 is mounted. Cooling fluid may then flow through the platen 196 and be returned to the cooling fluid reservoir 5199 by various channels passing through other components of the mold sub-assembly 3040, 3040'. As part of the cooling fluid circuit 5200', in addition to the cooling fluid reservoir 5199 and the flow channels, an apparatus for cooling the fluid is required as well as a pump and possibly valves to provide for a cooling fluid flow to and from the mold cavity blocks 5010.

Each of cooling fluid input port/output port couplings 5051*a*/5040*a*; 5050*a*/5020*d*; 5020*c*/5050*b* and 5051*b*/5040*b* may be any suitable cooling fluid communication fittings. For example, suitable water fittings for couplings 5051*a*/5040*a*; 5050*a*/5020*d*; 5020*c*/5050*b* and 5051*b*/5040*b* may also be the model AMF 6989N [164988, built-in coupling nipple] and 6989M [164996, built-in coupler] water fittings made by AMF.

Figure 25H:
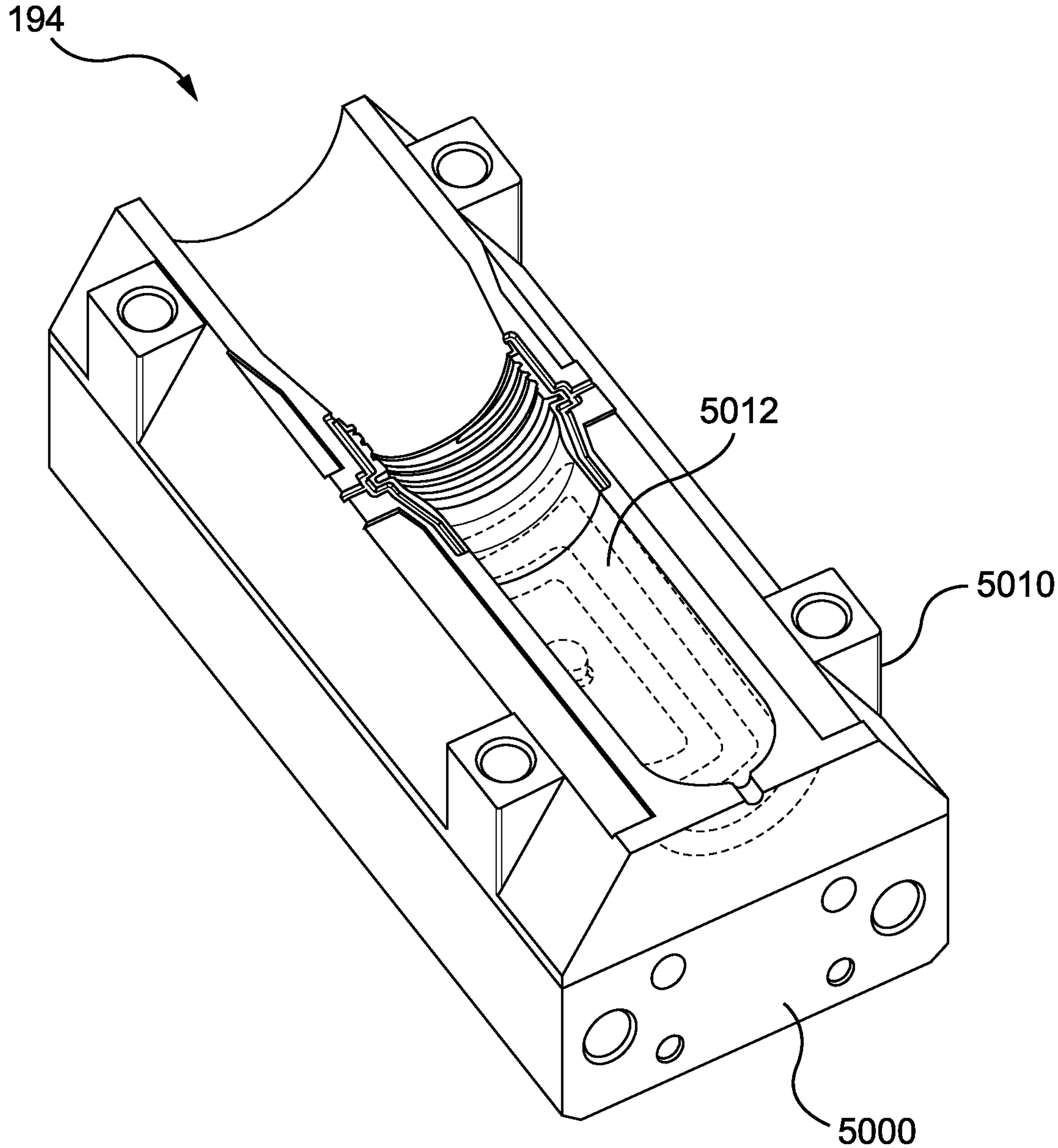

In addition to base block facing surface 5010*a*, in the embodiments of FIGS. 25G-H, mold cavity blocks 5010 have an upper horizontal surface 5010*c* and a lower horizontal surface 5010*d*, which are generally parallel to each other and orthogonal to surface 5010*a*. On the opposite side of base block 5000 to base block facing surface 5010*a*, may be a cavity side 5010*b* with a surface topography generally designated 5012, which may vary in its configuration depending upon one or more of several factors including the configuration of the item which is desired to be molded between a pair of mated mold cavity blocks 5010 and the type of molding material that is going to be injected into the cavity. Cavity side surface topography 5012 typically includes at least a surface area for forming half of a mold cavity and a contact surface area that is configured to engage an opposite contact surface on a corresponding mating mold cavity block. In mold cavity block 5010, a contact surface area 5010*g* may be provided that is generally parallel to base block facing surface 5010*a*. Extending interiorly of contact surface area 5010*g* is a cavity wall surface 5011 which defines the outer surface of a cavity half 5015. The orientation of cavity wall surface 5011 is such that the lengthwise axis of the cavity wall surface (in the Y direction) that leads to the top open end of the mold cavity is vertical such that the split line is a longitudinal line on either side of the item to be molded. In other words, the cavity wall surface 5011 provides a longitudinal sectional surface profile of the item to be molded with the item to be molded having an opening at a vertical end of the profile.

Figure 25I:
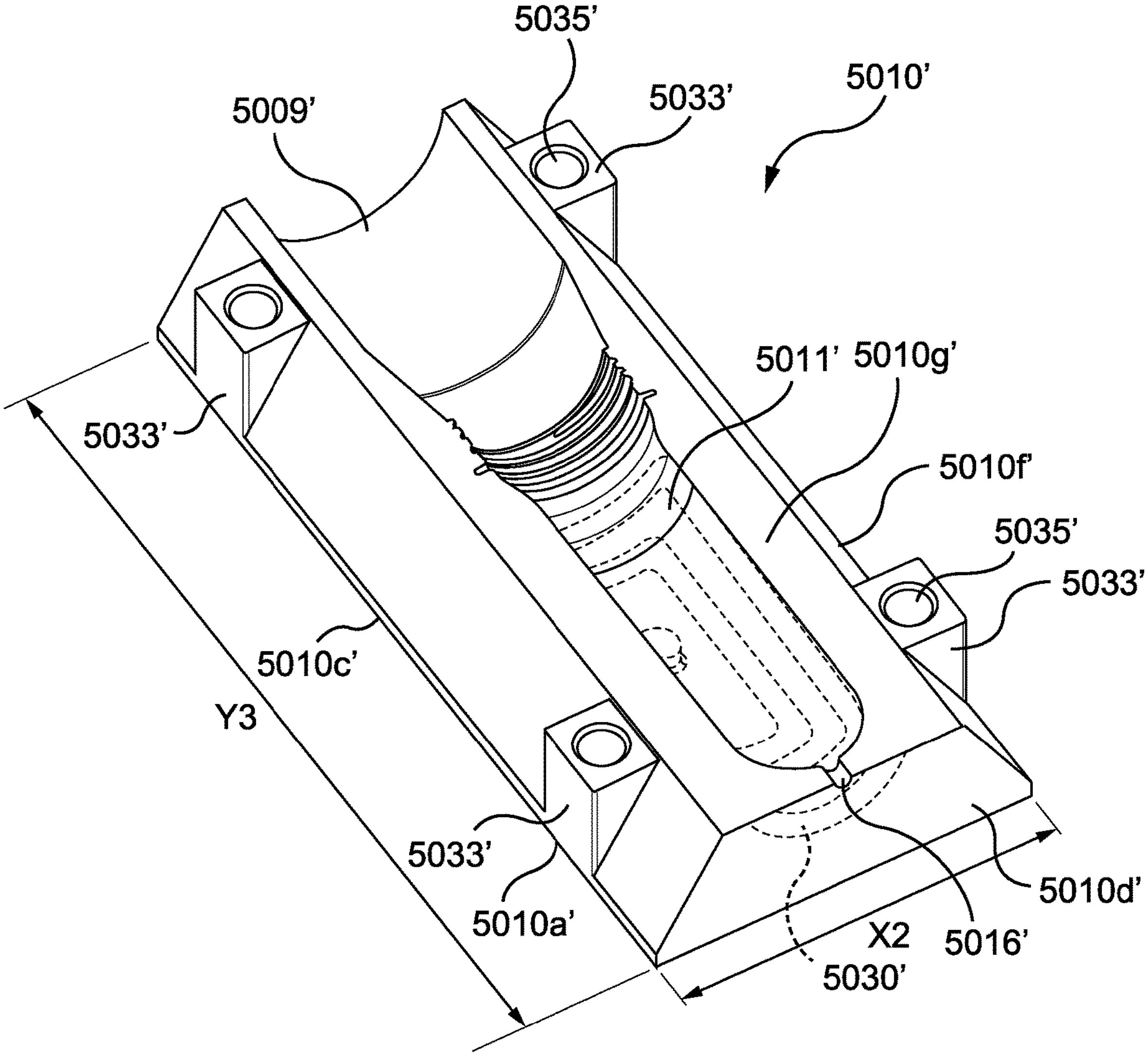
Figure 25K:
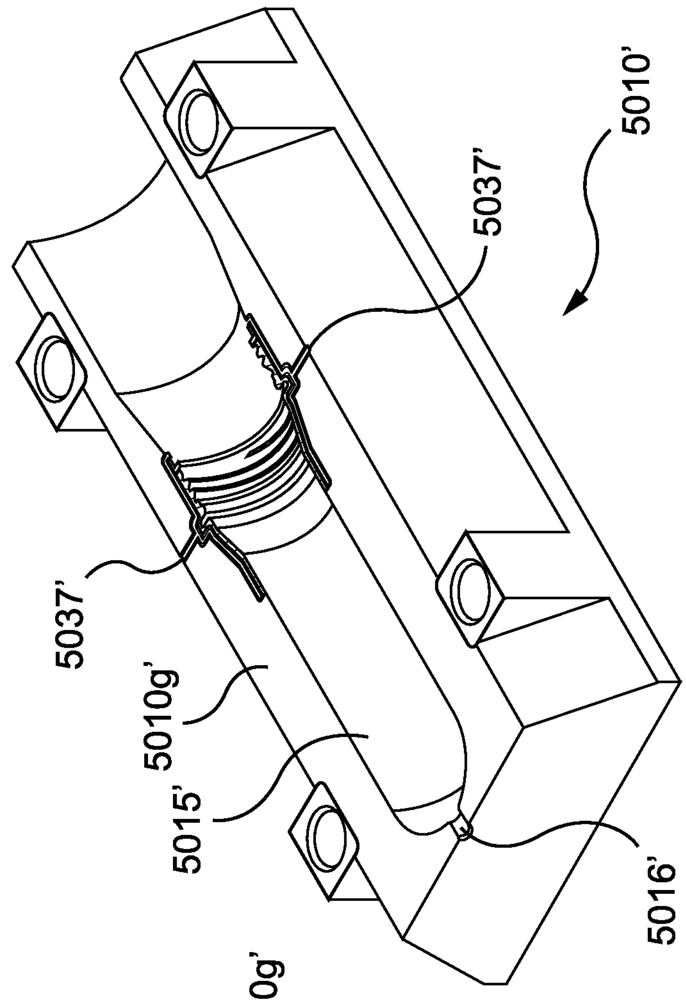
Figure 25J:
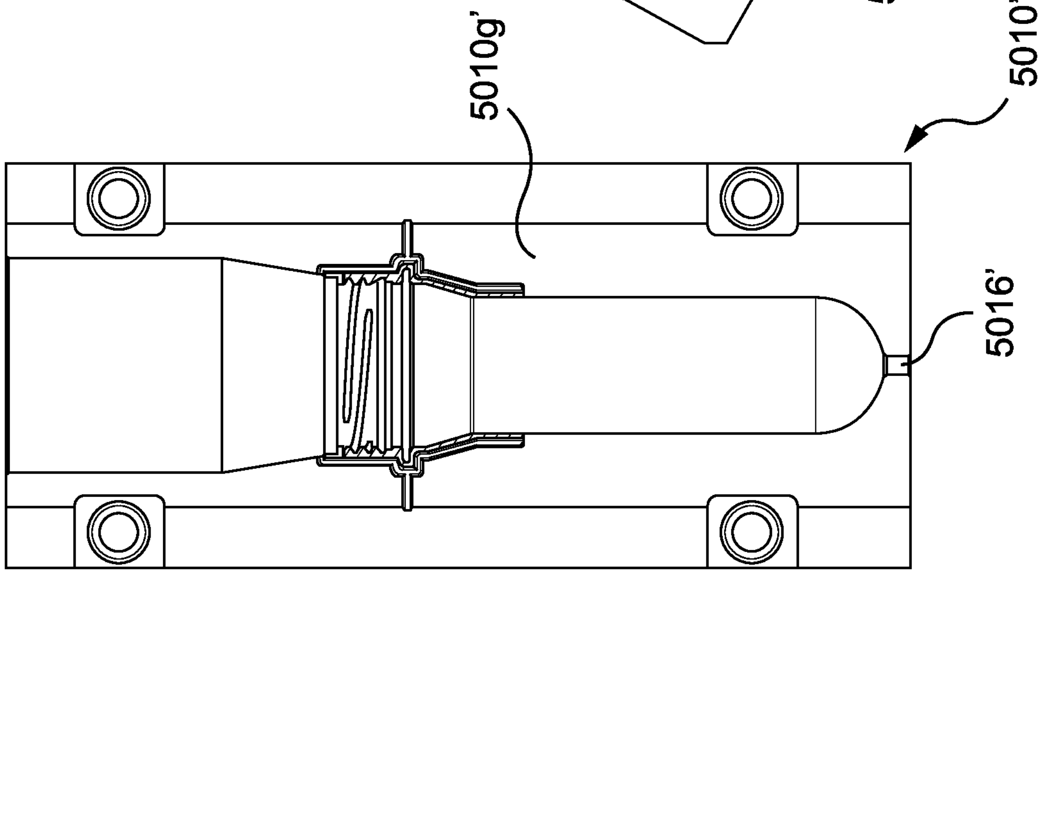

Mold cavity block 5010' is similar in configuration as shown in FIGS. 25I-K. in which a contact surface area 5010*g'* may be provided that is generally parallel to base block facing surface 5010*a'*. Extending interiorly of contact surface area 5010*g'* is a cavity wall surface 5011' which defines the outer surface of a cavity half.

In each mold cavity block 5010, 5010', located above cavity wall surface 5011, 5011' is a core alignment surface area 5009, 5009' which in generally tapered inwardly towards the cavity wall surface 5011, 5011", and which defines half of the cavity adapted to receive and align the outer core 7030 and an upper part of the inner core 7032 of a mold core assembly 190 (see FIGS. 25D, 25E) that is received within the cavity formed by cavity wall surfaces 5011, 5011'.

During operation of system 100, the inner core 7032 extends vertically into the mold cavity formed by opposed cavity wall surfaces 5011, 5011' of opposed mating mold cavity blocks 5010, 5010' and the wall surface of inner core 7032.

A gate area 5016, 5016' may be formed vertically through a lower portion the body of each mold block cavity 5010, 5010' to provide a channel from the exterior of the mold cavity block into the cavity half 5015 and into the mold cavity formed when the inner core 7032 and outer core 7030 of the mold core assembly 190 are received into cavities formed by interior core receiving surfaces 5009, 5009' and cavity wall surfaces 5011, 5011' of mated mold cavity blocks 5010 (or mated mold cavity blocks 5011'). It is to be noted that the two opposed, face-to-face gate areas 5016, 5016' of opposed pairs of mold cavity blocks 5010, 5010' cooperate to define a gate structure 5017, 5017' (FIG. 25D) when, in operation of a mold sub-assembly 3040, 3040', a pair of mold cavity blocks 5010 (or pair of mold cavity blocks 5010') are mated with each other. It is through the formed gate structure 5017' (FIG. 25D) that molding material may be injected into the formed mold cavity as generally described herein.

A vent area 5037, 5037' may also be formed through sides of the body of each mold block cavity 5010, 5010' to provide opposed vent channels between the exterior of the mold cavity block and the interior of the cavity half 5015, 5015'. It will be appreciated that when during operation of system 100, two mold cavity blocks 5010 (or mold cavity blocks 5010') are oriented in face-to-face mated relation with each other, with opposed contact surface areas 5010*g*, 5010*g'* being in contact with, and forced towards, each other, a pair of complete opposed vent structures 5038' (FIG. 25C) will be formed by the two opposed, face to face vent areas 5037' of the opposed mold cavity blocks 5010'. It is through the formed vent structures 5038' (FIG. 25C) that air may escape from the interior of the mold cavity as molding material is injected into the formed mold cavity.

It will be appreciated that when during operation of system 100, two mold cavity blocks 5010 are oriented in face to face mated relation with each other, with opposed contact surface areas 5010*g* being in contact with and forced towards each other, the outer surface of a complete mold cavity will be formed by the opposed cavity wall surfaces 5111. This will result in a longitudinal split line being present between the two mating mold cavity blocks 5010 at the inward edges defined by the boundary between cavity wall surfaces 5011 and contact surface areas 5010*g*. It is important that the mating edges of the two cavity wall surfaces be in tight, unbroken contact with each other and that the edges be flush with each other to avoid a discontinuity at the join of the adjacent cavity mold surfaces. To minimize problems associated with a visible longitudinal split line, it is important that the interface between a pair of mated and engaged mold cavity blocks 5010 be controlled with a very high degree of tolerance during operation of system 100.

Again with primary reference to FIGS. 25G and 25I, in some embodiments, extending from opposed sloped side surfaces 5010*e* and 5010*f* of mold cavity blocks 5010 may be generally wedge shaped abutments 5033. Abutments 5033 on a stationary mold cavity block 5010 may have longitudinally extending guide pin openings 5035 to receive a guide pin (not shown in FIG. 25G, but refer to FIG. 26D for similar guide pins 5007") that may be mounted on an opposed wedge shaped abutment 5033 on a moving mold cavity mold block 5010. For further clarity, it may be appreciated that of a pair of mating mold cavity blocks 5010, one mold cavity block 5010 may be stationary during operation of a mold sub-assembly, as it may be secured to a base block 5000 that is mounted to a stationary platen 196, whereas the opposite mold cavity block 5010 may move during operation, as it is secured to a base block 5000 that is mounted to a moving platen 196. In other embodiments, both mold cavity blocks 5010 may move during operation a mold sub-assembly, as each mold cavity block 5010 is secured to a base block 5000 that is mounted to a moving platen 196.

Guide pin openings 5035 and guide pins may be formed to very high tolerances to ensure that when two mold cavity blocks 5010 are brought together in face to face mated relation with each other, with opposed contact surface areas 5010*g* being in contact with each other, and forced towards each other, all the features of the desired outer surfaces of the mold cavity are formed properly (eg. the two mold cavity halves are accurately aligned with each other to assist in avoiding/minimizing visible longitudinal split lines on the molded items).

The upper surfaces 5033*a* of abutments 5033 are recessed below the level of contact surface areas 5010*g*. Accordingly, when during operation of system 100, two mold cavity blocks 5010 are oriented in face to face mated relation with each other, with opposed contact surface areas 5010*g* being in contact with and being forced towards each other at a specific known clamping force, the only surfaces that in contact with each other will be contact surface areas 5010*g*. Thus, the contact pressure at surfaces 5010*g* can be calculated as the clamping force divided by the area of a contact surface area 5010. Additionally, the contact pressure desired to ensure proper sealed formation of a mold cavity by two mold cavity blocks may be within a known range. It is possible that for a particular standard clamp tonnage that is applied by the clamping mechanism of a mold sub-assembly 3040', 3040', the acceptable range of contact surface area can be calculated and provided for a particular cavity mold block 5010. Thus instead of changing the clamp pressure for differently sized/shaped items to be molded, the surface contact area 5010*g* for a mold cavity block can be selected and the contact pressure on the surface contact areas 5010*g* may be appropriately maintained within a desired range.

An alternately configured mold cavity block 5010' is shown in FIG. 25I-K. Mold cavity block 5010' may generally configured the same as mold cavity block 5010 including having the same corresponding overall width X2 but different length Y3, a cooling channel 5030', and wedge shaped abutments 5033' with recessed top surfaces 5033*a'*. Abutments 5033' on a stationary mold cavity block 5010' may also have guide pin openings 5035' to receive a guide pin (not shown) that may be mounted on a mated opposed cavity mold block 5010'. However, the configuration of side surfaces 5010*e'* and 5010*f'* and cavity wall surface 5011' may be such that a larger contact surface area 5010*g'* is present in mold cavity block 5010' compared to the size of the contact surface area 5010*g* in mold cavity block 5010.

A mold cavity block 5010' having the same length Y2 as, or a shorter length Y3 than, the length Y2 of mold cavity block Y2 of mold cavity block 5010, for a standard clamping pressure, may require a different configuration of contact surface area 5010*g'* compared to contact surface area 5010*g* to ensure that the contact pressure is within an acceptable range.

Table 1 below, provides an example of how the configuration and size of contact surface areas can be selected/varied for a variety of different items to be molded, where a standard clamping load is applied to clamp together two opposed cavity mold blocks, and illustrates the resulting contact pressures from a variety of somewhat differently sized and shaped contact surface areas 5010*g*, with a clamping force of 30 tonnes (294 300 N).

TABLE 1

| | | | | | |
|---|---|---|---|---|---|
| Contact Surface | 6000 | mm^2 | Contact Pressure | 49.1 | N/mm^2 |
| Contact Surface | 5750 | mm^2 | Contact Pressure | 51.2 | N/mm^2 |
| Contact Surface | 5500 | mm^2 | Contact Pressure | 53.5 | N/mm^2 |
| Contact Surface | 5250 | mm^2 | Contact Pressure | 56.1 | N/mm^2 |
| Contact Surface | 5000 | mm^2 | Contact Pressure | 58.9 | N/mm^2 |

Therefore, if the size and shape of the mold cavity surface is different between mold cavity blocks, the shape of the contact surface area can be altered to some extent between the two mold cavity blocks, to ensure that with a given set clamping pressure, the contact pressure is held within a desired pressure range.

The ability to vary the shape of the surface contact areas 5010*g*, 5010*g'*, 5010*g"* also permits the pressure distributions applied across the contact surfaces on the mold cavity blocks to be adjusted having regard to the locations of the forces applied via the clamping mechanisms. In some situations the forces applied by the clamping mechanisms will not be evenly distributed. The size of the contact surfaces in a particular area can be adjusted to accommodate uneven application of force by the clamping mechanism, such that the pressure across the entire contact surface area is fairly even.

Figure 26C:
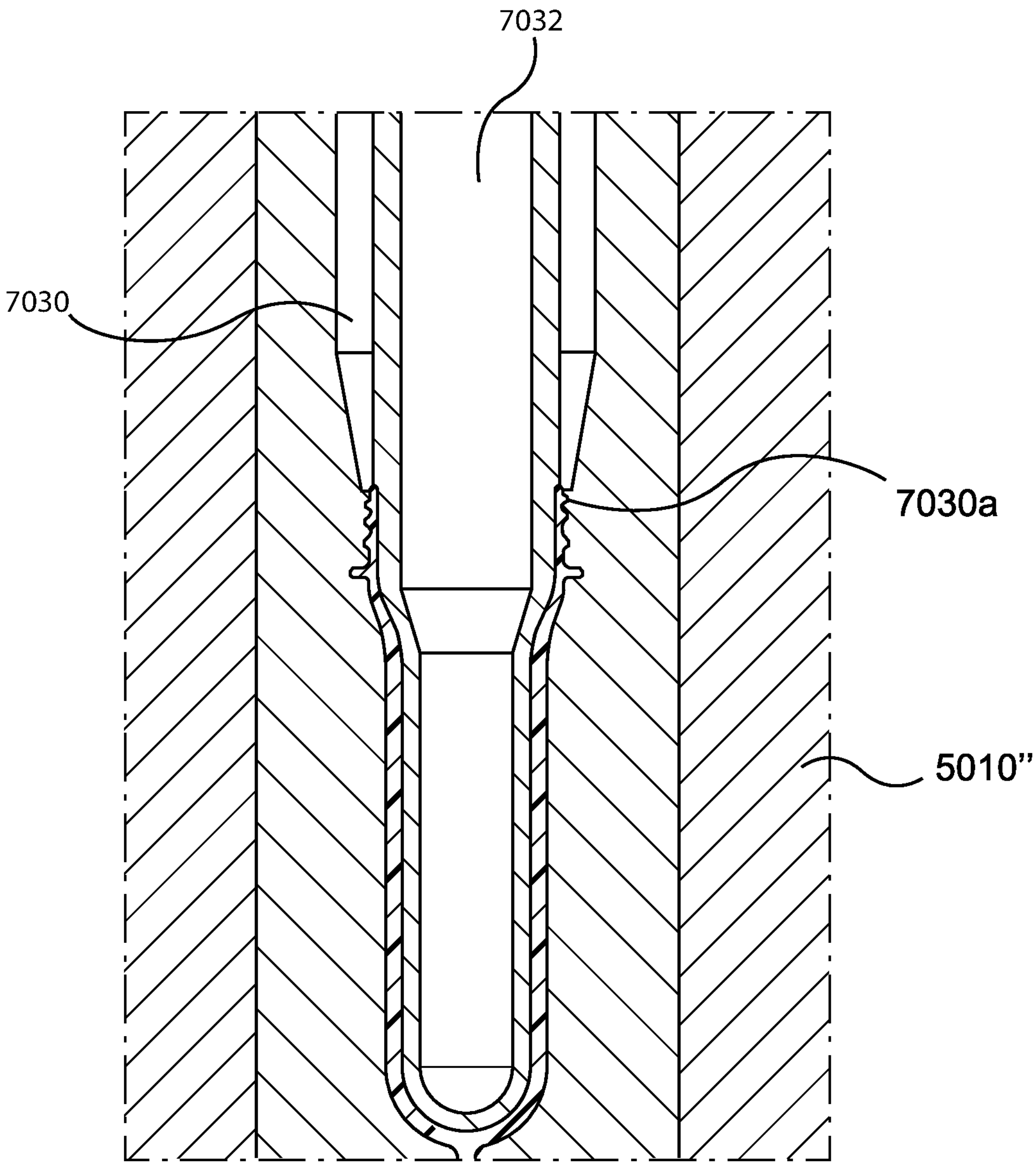
FIG. 26C is a top plan section view at part marked 26C in FIG. 26A.
Figure 26D:
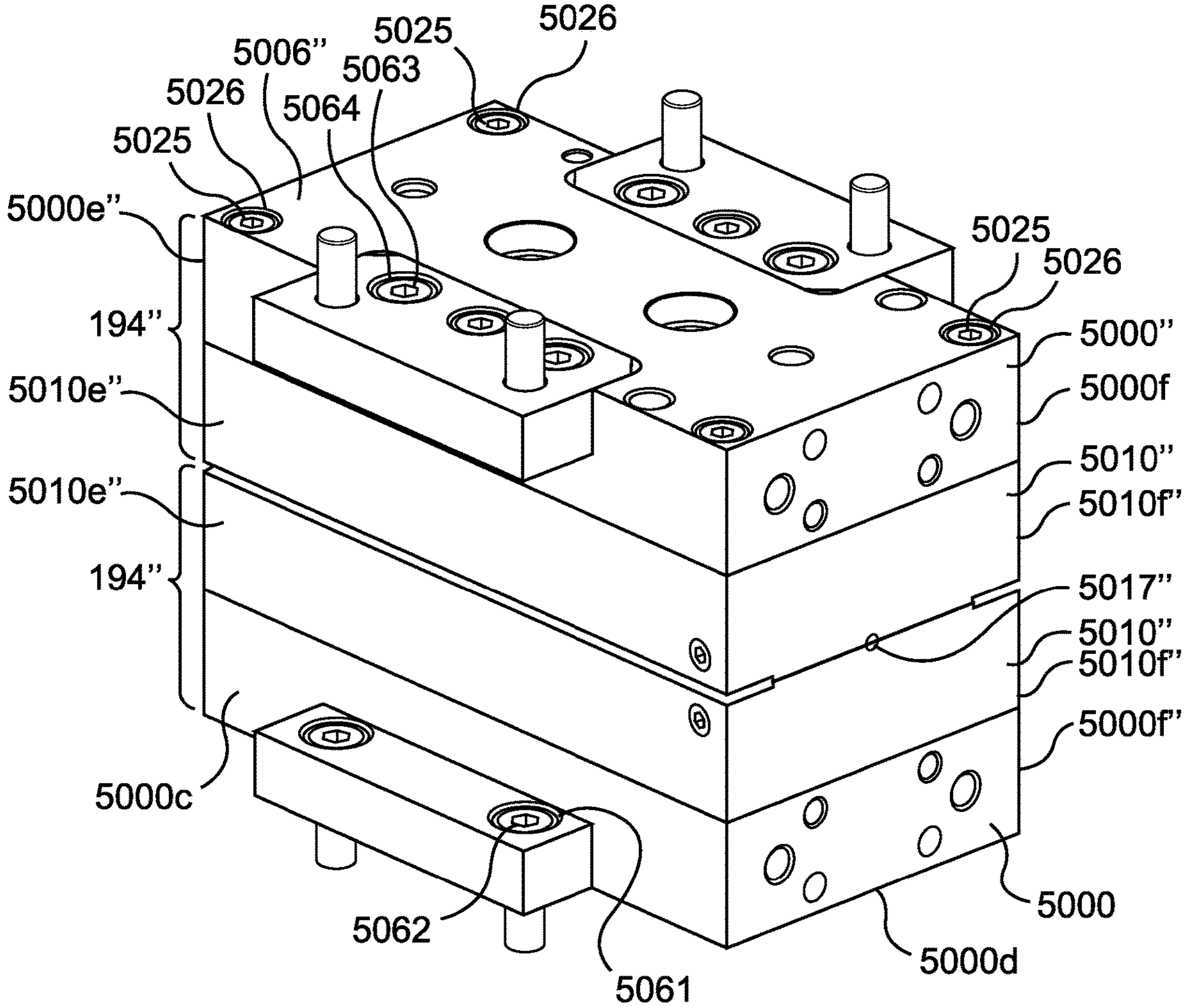
FIG. 26D is a side perspective view of part of the embodiment of the portions of the mold assembly of FIGS. 26A and 26B.
Figure 26E:
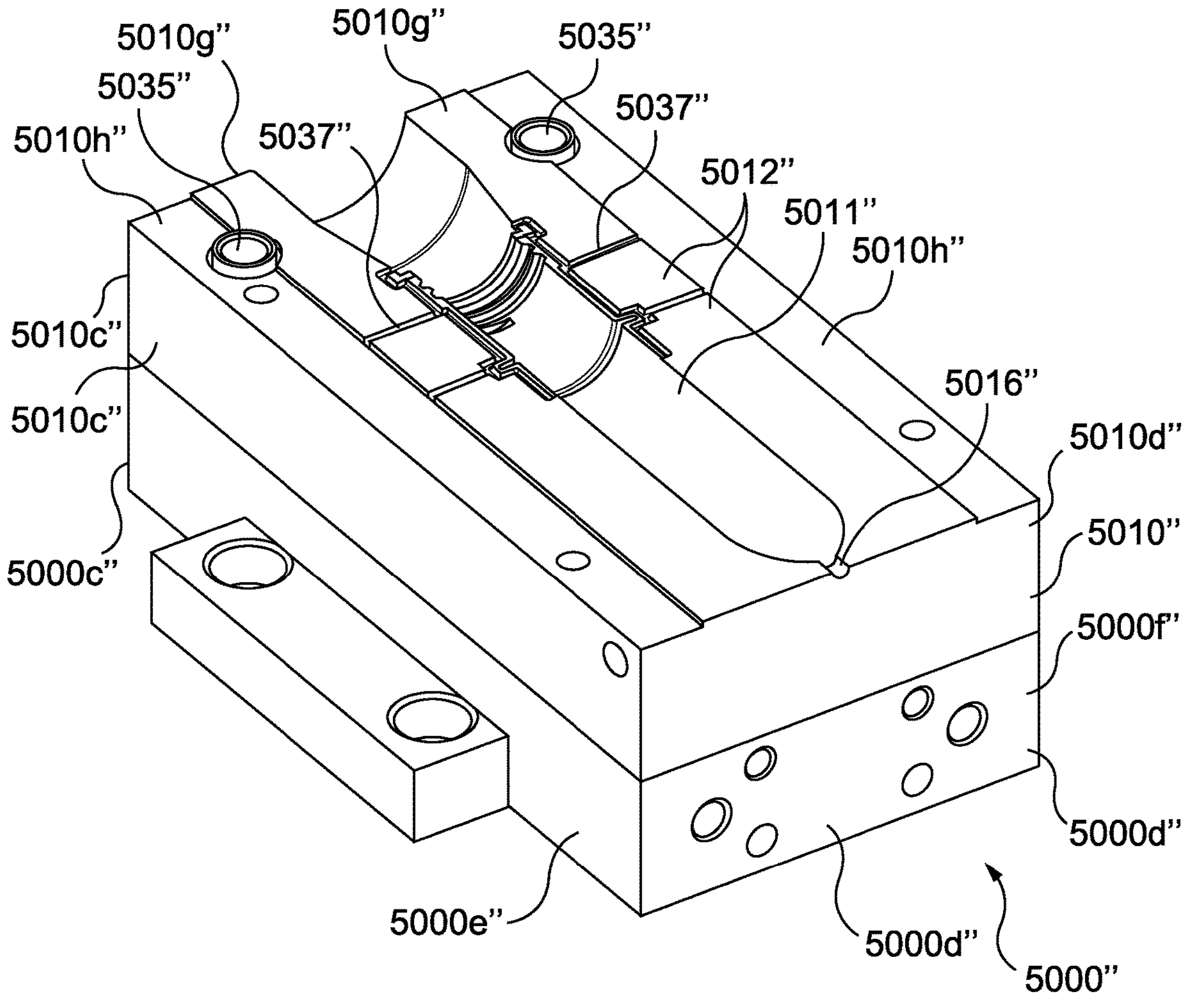
FIG. 26E is a perspective view of a disconnected components of the part shown in FIG. 26D.
Figure 26F:
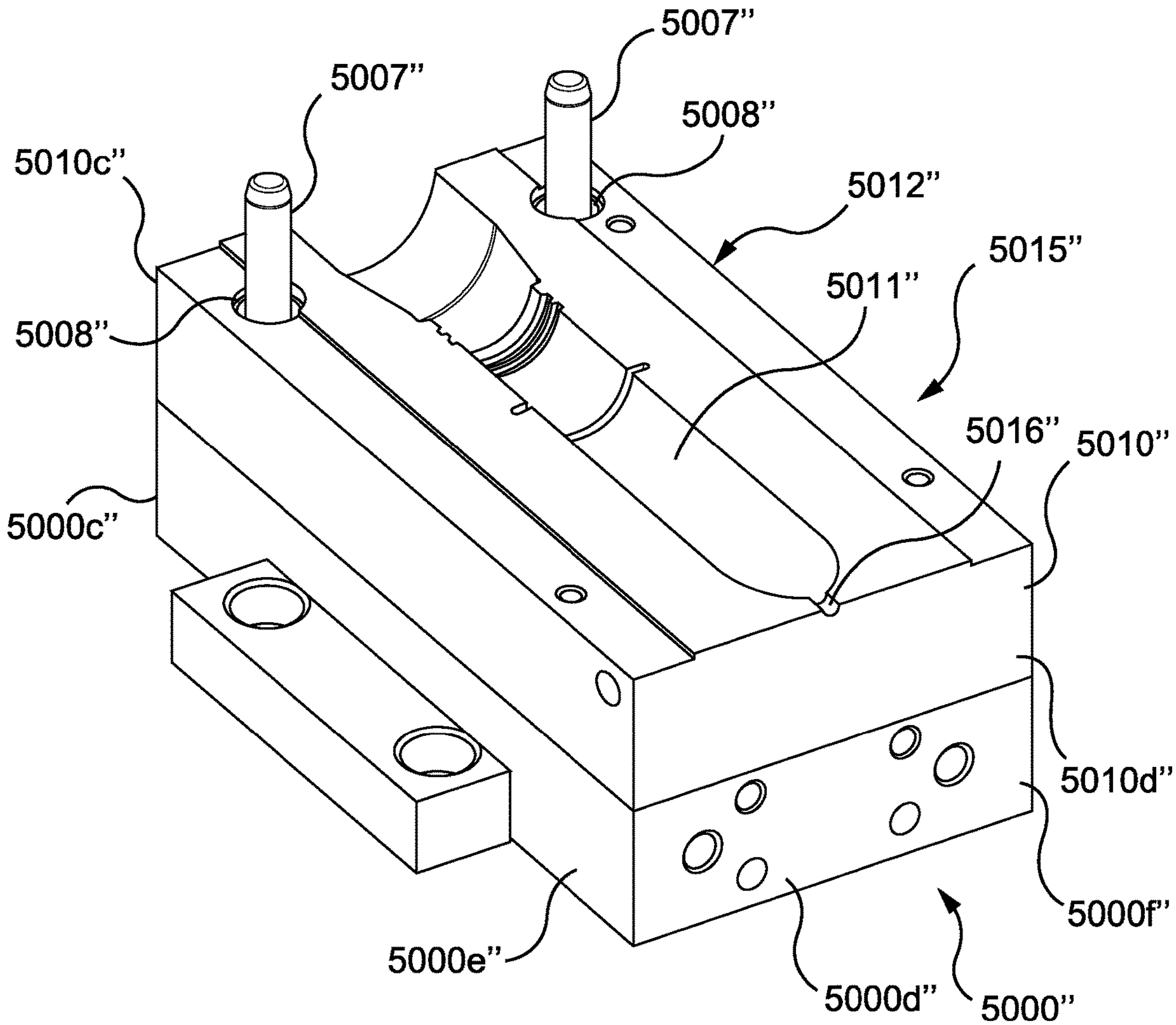
FIG. 26F is a perspective view of another disconnected components of the part shown in FIG. 26D.
Figure 26G:
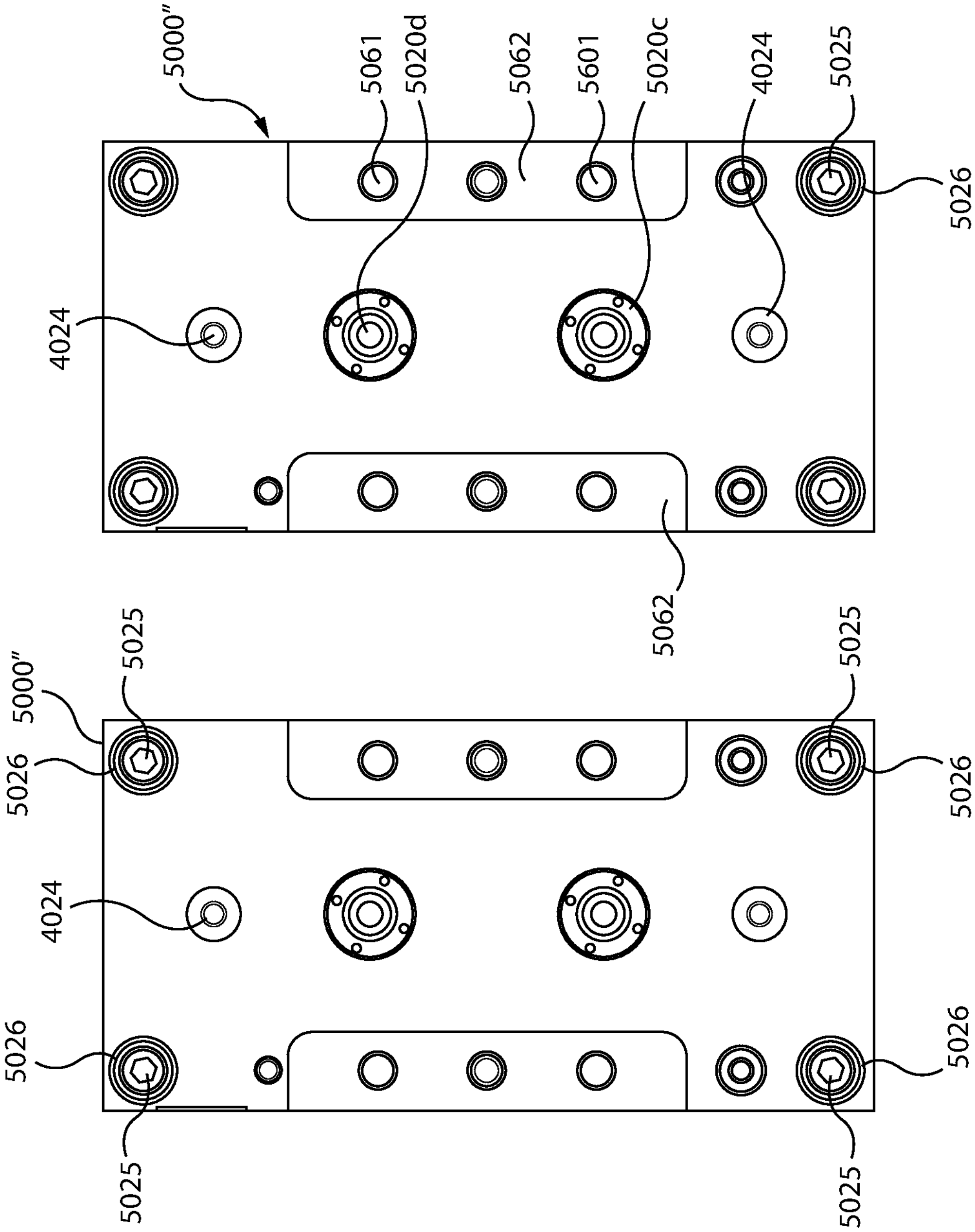
FIG. 26G are rear elevation views of the disconnected component of the part shown in FIG. 26D.
Figure 26I:
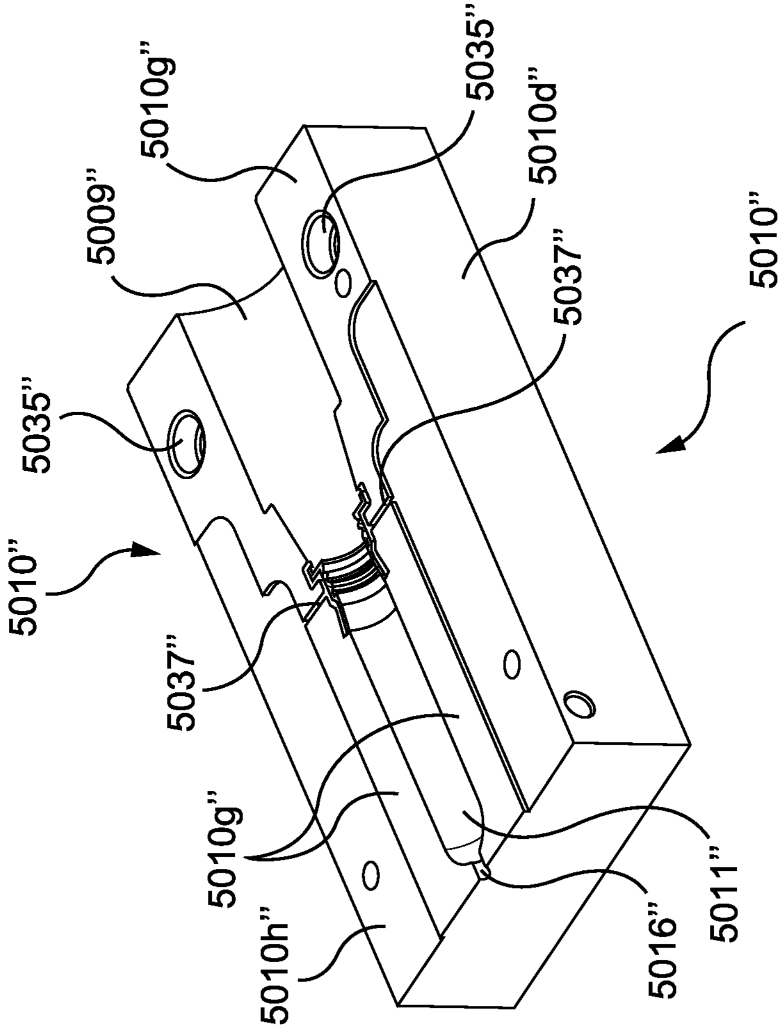
FIG. 26I is a top perspective view of the mold cavity block of the part of FIG. 26D.
Figure 26H:
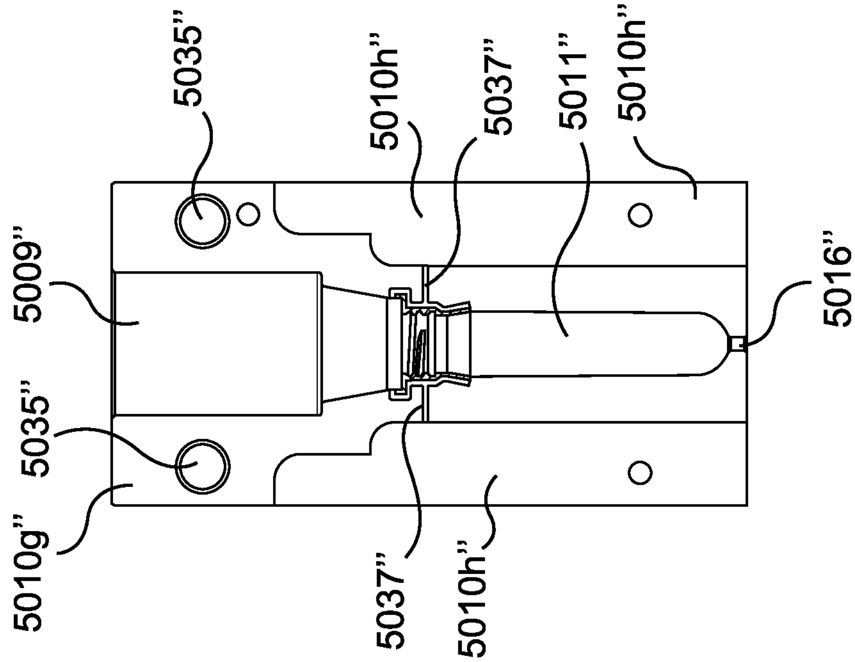
FIG. 26H is top plan view of the mold cavity block used in the part of FIG. 26D.

A further alternate embodiment of a mold cavity plate 194" is shown in FIGS. 26D-F which may be formed as two separate parts: (a) a base block 5000"; and (b) a mold cavity block 5010" that may be connected together in use. Base block 5000" may be generally formed like base block 5000 including base block 5000" having side surfaces 5000*e"* and 5000*f"* which are generally longitudinally extending and planar. Mold cavity block 5010" may be generally formed like mold cavity block 5010 except that its side surfaces 5010*e"* and 5010*f"* are also generally extending vertically and longitudinally and are planar. As is evident in FIG. 26B, and FIGS. 26D-F, when a mold cavity block 5010" is mounted to a base block 5000, surface 5010*e"* is generally flush with, and extends in same plane as, surface 5000*e*. Similarly, surface 5010*f"* is generally flush with and extends in the same plane as surface 5000*f*. Additionally, surface 5010*c"* is generally flush with and extends in the same plane as surface 5000*c*, and surface 5010*d"* is generally flush with and extends in the same plane as surface 5000*d*. Also, the cavity side surface topography 5012" of mold cavity block 5010" can be generally be divided into areas: (i) a contact surface area 5010*g"*; (ii) a slightly lower recessed non-contact surface area 5010*h"*; and (iii) a cavity wall surface area 5011". It may be appreciated, that if the size and shape of the mold cavity surface is different between two mold cavity blocks 5010", the shape of the contact surface area 5010*g"* and non-contact surface area 5010*h"* can be altered to some extent between the two mold cavity blocks, to ensure that with a given set clamping pressure, the contact pressure is held within a desired pressure range, even though the two mold cavity blocks 5010" are used for producing differently sized/shaped items.

With particular reference to FIG. 26A-C, the mold cavity for an item to be molded is formed between the outer surface of inner core 7032 and the cavity wall surfaces 5011" of mated and engaged cavity mold blocks 5010". The upper portion of the mold cavity is sealed by the bottom horizontal circular ring shaped edge 7030*a* of the outer core 7030. By the alignment of the outer core 7030 and the upper part of inner core 7032 with cavity wall surface 5011', the lower part of the inner core 7032 will be properly positioned within the cavity wall surfaces 5011' to form the precise mold cavity configuration that is desired. Each mold cavity block 5010' may also have opposed outer side surfaces 5010*e*" and 5010*f*".

Again with primary reference to FIGS. 26E-F, longitudinally extending guide pin openings 5035" may be provided in non-contact surface areas 5010*h*" of stationary mold cavity blocks 5010" (FIG. 26E) interconnected to a stationary platen 196, to receive a guide pin 5007" that may be mounted in openings 5008" on a moving mold cavity mold block 5010" (FIG. 26F) interconnected to a moving platen 196. Guide pin openings 5035", 5008" and guide pins 5007" may be formed to very high tolerances to ensure that when two mold cavity blocks 5010" are brought together in face to face mating relation with each other, with opposed contact surface areas 5010*g*" being in contact with and forced towards each other, all the features of the desired outer surfaces of the mold cavity are formed properly (eg. the two mold cavity halves are accurately aligned with each other to assist in avoiding/minimizing visible longitudinal split lines on the molded items).

Additionally, as shown in FIGS. 26D-F, mounting blocks 5060 may be secured by bolts 5063 received in openings 5064 through mounting blocks 5060 into aligned threaded openings in surface 5000*b*". Mounting blocks 5060 may also be secured to service plates 5196, 5196' with bolts 5062 received through openings 5061 into aligned threaded openings in 5196, 5196'. Mounting blocks 5060 help to stabilize the base blocks 5000 (and the mold cavity blocks mounted thereto), before and when they are subjected to loading by the clamping mechanism.

Advantages of the cavity plate combination of a base block 5000 and a mold cavity block 5010" is that the outer surface area is generally consistent or of a standard shape, yet the cavity side surface topography 5012" can be varied to accommodate any shape and size (within certain limits) of item to be molded. Thus, the relative size of contact surface area 5010*g*"; lower recessed non-contact surface area 5010*h*"; can be adjusted and can take into account the configuration and size of the cavity wall surface area 5011".

With reference to FIGS. 26A-F, a gate area 5016" may be formed vertically through a lower portion of the body of each mold block cavity 5010", to provide a channel from the exterior of the mold cavity block into the cavity half 5015" and into the mold cavity formed when the inner core 7032 and outer core 7030 of the mold core assembly 190 are received into cavities formed by interior core receiving surfaces 5009" and cavity wall surfaces 5011" of mated mold cavity blocks 5010" (FIG. 26A). The two opposed, face to face gate areas 5016" of opposed pairs of mold cavity blocks 5010" cooperate to define a gate structure 5017" (FIG. 26D) when, in operation of a mold sub-assembly 3040, 3040', a pair of mold cavity blocks 5010" are mated with each other. It is through the formed gate structure 5017" that molding material may be injected into the formed mold cavity as generally described herein.

Pairs of opposed vent areas 5037" may also be formed through each opposed sides of the body of each mold block cavity 5010" (FIG. 26E) to provide opposed pairs of vent channels between the exterior of the mold cavity block and the interior of the cavity half 5015". It will be appreciated that when during operation of system 100, two mold cavity blocks 5010" are oriented in face to face mated relation with each other, with opposed contact surface areas 5010*g*" being in contact with each other and forced towards each other, a pair of complete opposed vent structures will be formed by the two opposed, face to face vent areas 5037' of the opposed mold cavity blocks 5010'. It is through the formed vent structures that air may escape from the interior of the mold cavity as molding material is injected into the formed mold cavity.

It will be appreciated that when during operation of system 100, two mold cavity blocks 5010" are oriented in face to face mated relation with each other, with opposed contact surface areas 5010*g*" being in contact with and forced towards each other, the outer surface of a complete mold cavity will be formed by the opposed cavity wall surfaces 5111". This will result in a longitudinal split line being present between the two mating mold cavity blocks 5010" at the inward edges defined by the boundary between cavity wall surfaces 5011" and contact surface areas 5010*g*. Again, it is important that the mating edges of the two cavity wall surfaces be in tight, unbroken contact with each other and that the edges be flush with each other to avoid a discontinuity at the join of the adjacent cavity mold surfaces. To minimize problems associated with a visible longitudinal split line, it is important that the interface between a pair of mated and engaged mold cavity blocks 5010" be controlled with a very high degree of tolerance during operation of system 100.

Figure 26J:
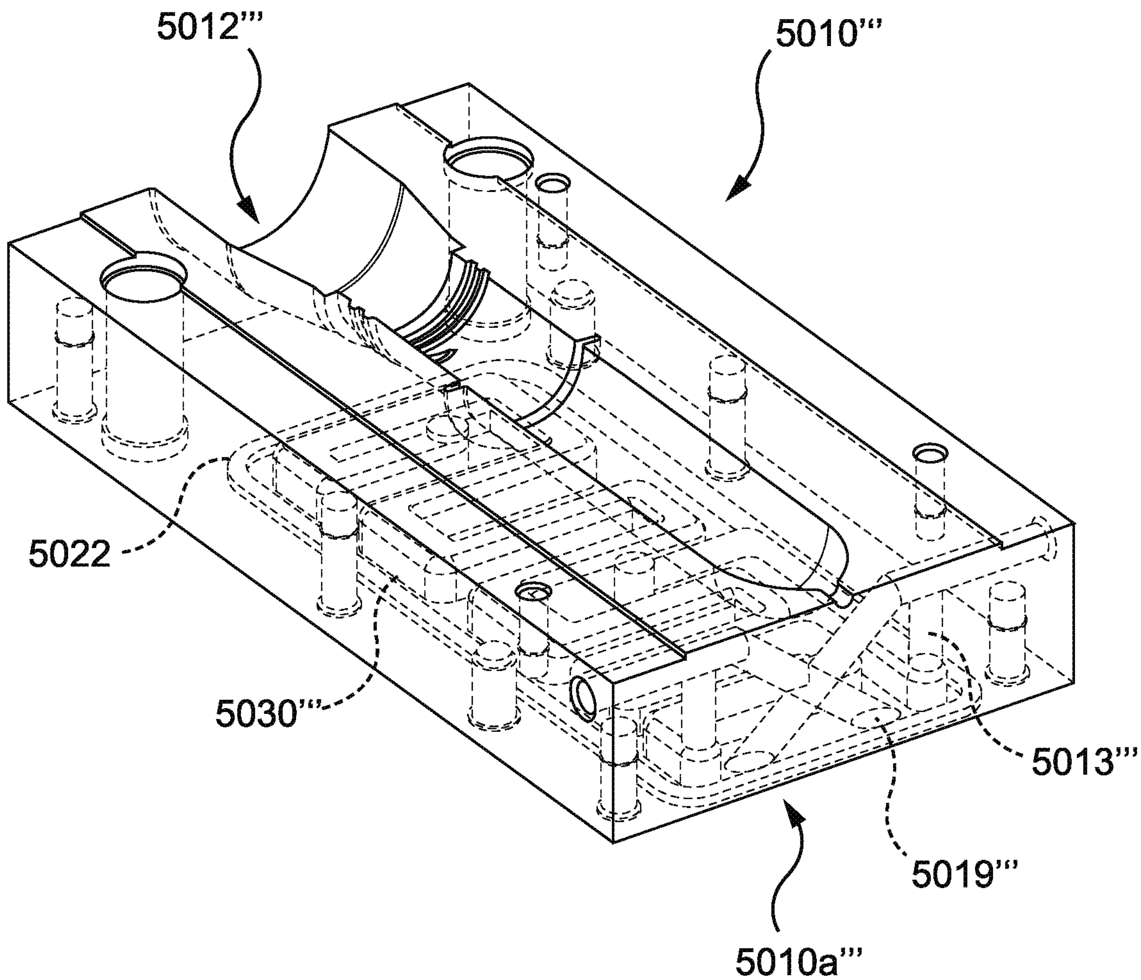
FIG. 26J is a top perspective view of an alternate mold cavity block that can be employed in the part of FIG. 26D.

With reference now to FIG. 26J, a further mold cavity block 5010'" is illustrated and in which the cavity side surface topography 5012'" may be formed generally in the same manner as the cavity side surface topography of mold cavity block 5010" as referenced above. Base block facing surface 5010*a*'" of mold cavity block 5010'" and its surface topography and features may be generally be the same manner as that of mold cavity block 5010" except for the following. A generally cuboid bottom open trough area 5013'" may be formed in surface 5010*a*'". Trough area 5010*a*'" may be formed by milling out the material from surface 5010*a*'" using conventional milling apparatuses and methods. Trough area 5010'" may be configured to receive therein a cooling channel module 5019'".

Cooling channel module 5019'" may have one or more cooling channels 5030'" (FIG. 26J) with respective input and output ports for connecting to corresponding ports to channels 5020/5021 in base block 5000 such that cooling fluid can flow through cooling channels 5030'", in a manner as described above. The configuration for the cooling channel in a cooling channel module 5019'" may vary and may be designed to provide desired cooling in the particular configuration of cavity wall surface 5011. The cooling channel module 5019'" may have an outer generally rectangular framework with side frame members and a base that support the cooling channels therein. The outer framework may provide a friction fit of the cooling channel module 5019" with the vertical walls of trough area 5010'".

In each embodiment where a mold cavity block is manufactured as a separate piece to the base block (such as mold cavity block 5010" and base block 5000" or cavity block 5010" ' and base block 5000"') a sealing ring may be provided on the opposed mating surfaces of the cavity block and base block around the water fittings to provide a water seal. For example, as shown in FIG. 26J a sealing o-ring 5022 made from a suitable material such as a suitable rubber may be provided between the mold cavity block 5010'" and base block 5000'" to provide a fluid seal between mold cavity blocks 5010'" and base blocks 5000'". Internal sealing within mold cavity block 5010'" and cooling channel module 5019'" is typically not required.

The result is that a standard configuration for a surface topography 5012'" defining the trough area 5013'" can be milled on the cavity side surface of a cavity mold block 5010'" and then a particularly configured cooling channel module 5019" can be inserted therein to provide the desired specific cooling channel configuration for the particular cavity wall surface configuration for the particular item to be molded. This enhances the efficiency of the manufacturing process. The components of cooling channel module 5019'" may be formed from any one or more suitable material(s) such as copper or stainless steel or a suitable plastic such as PP (polypropylene) or PE (polyethylene).

With reference to FIG. 28A, a sequence of steps (a) to (f) is shown by which a services block 5196 and a cavity plate 194 may be connected to a platen 196. In the first steps (a) to (c), a services block 5196 is mounted to a platen 196. Services block 5196 may be connected to a platen 196 by threaded bolts 5197 being received through openings 5198 in services block 5196 and into threaded openings 5195 in platen 196.

In step (d) a pre-prepared cavity plate 194 which may comprise a base block 5000 and a mold cavity block 5010, 5010', 5010" or 5010'", is made available to be connected to the services block 5196. A quick connection of the type described above may be utilized to connect the base block 5000, and thus cavity plate 194, to the services block 5196 to provide a platen and cavity plate assembly shown in (f) of FIG. 28A.

During operation of a mold sub-assembly 3040, 3040' as described elsewhere herein, the platen pairs 196 will have at least one services block 5196 attached thereon. One or more mold cavity plates 194 will be attached to a services block 5196. The cavity plates 194 may comprise a base block 5000 and a mold cavity block 5010, 5010', 5010" or 5010'", and may produce molded items within the mold cavities formed between opposed pairs of mold cavity blocks 5010, 5010', 5010" or 5010'". Cooling fluid and/or other services may be provided from the platens 196 to a services block 5196 and onto the base blocks 5000 and their corresponding mold cavity blocks 5010.

When it is desired to change the type of molded item being produced by particular mold cavity plate 194 of a mold sub-assembly 3040, 3040', the quick connection mechanism associated with the appropriate pair of cavity plates 194 can be operated to disconnect the base block 5000 from the services block 5196 with the quick connection mechanism, along with the currently being used mold cavity blocks 5010 attached to the base block 5000. A replacement cavity plate 194 can then be installed by connecting the base block 5000 to that services block 5196 with a quick connection mechanism, to thereby connect a replacement mold cavity blocks 5010 attached to the replacement base block 5000. The replacement pairs of base blocks 5000 and their respective mold cavity blocks 5010, 5010', 5010" or 5010'" may be configured to produce a different type/shape molded item than the removed pairs of base blocks and mold cavity blocks 5010, 5010', 5010" or 5010'".

Transfer of Material to Shaper

With primary reference to FIGS. 29-37, details of example features for transferring molding material into a shaper will now be described.

Figure 29:
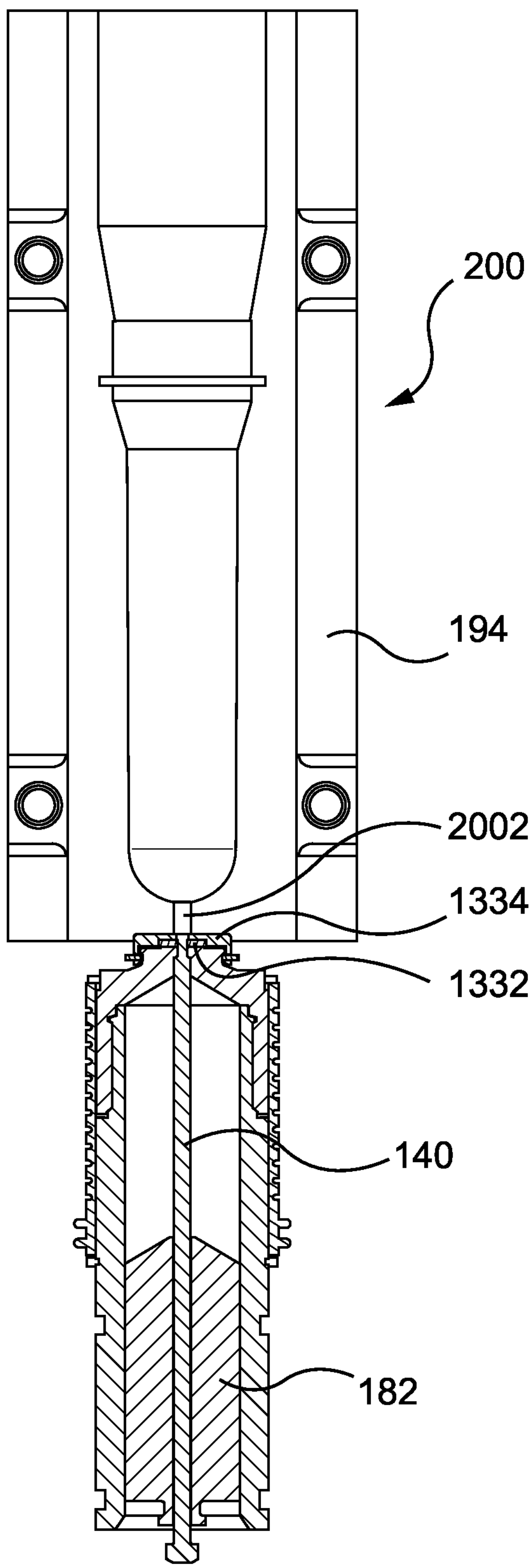
FIG. 29 is a cross-sectional view of a mold of the shaping station of FIG. 11 and a vessel.

FIG. 29 depicts a partial cross-sectional view of vessel 124 and a portion of cavity plate 194 of mold 200. As shown, orifice 136 of vessel 124 is aligned with a gate passage 2002, through which feedstock is injected into mold 200. In order for such injection to occur, sealing member 140 is withdrawn to un-seal orifice 136. Injection is then caused by driving piston 182 towards orifice 136 to reduce the volume of cavity 134 and force molding material out through orifice 136.

During injection of feedstock into mold 200, the tip of vessel 124 mates to a corresponding recess defined in cavity plate 194 proximate gate passage 2002. Vessel 124 is heated to a temperature corresponding to that of molten feedstock. Mold 200 is maintained at a cooler temperature, e.g. ambient temperature, to promote rapid cooling and solidification of feedstock after injection into the mold 200.

Typically, it is desirable for molten feedstock to be maintained at a target elevated temperature until immediately prior to injection, and then to subject the feedstock to a significant thermal gradient in order to rapidly cool and solidify the material within the mold. Such thermal control may maintain flowability of the feedstock during injection, to achieve uniform filling of the mold. Moreover, such treatment may ensure desired product characteristics. For example, rapid cooling tends to limit or prevent crystallization of feedstock, providing desired strength and appearance characteristics in finished parts. Such rapid cooling may be achieved by maintaining mold 200 at a low temperature relative to the molten feedstock.

Insulator 1332 and cap 1334 help maintain the desired thermal gradient at the interface of vessel 124 and mold 200. Specifically, as noted, insulator 1332 has low thermal conductivity and thus presents a barrier to heat transfer between with tip 1322 of vessel 124 and mold 200.

In contrast, cap 1334 has relatively high thermal conductivity and tends to promote cooling of sealing member 140 by heat transfer with mold 200.

Referring again to FIGS. 12A-12D, shaping station 104-1 also comprises an actuator assembly 204, aligned with the injection assembly and aligned with axis M-M. Actuator assembly 204 includes a vessel positioning actuator (not shown) and an injector 210. The vessel positioning actuator can be extended to urge vessel 124 into abutment with mold 200. In this position, gate orifice 136 of vessel 124 aligns with mold inlet gate 202 of mold 200.

Figure 30:
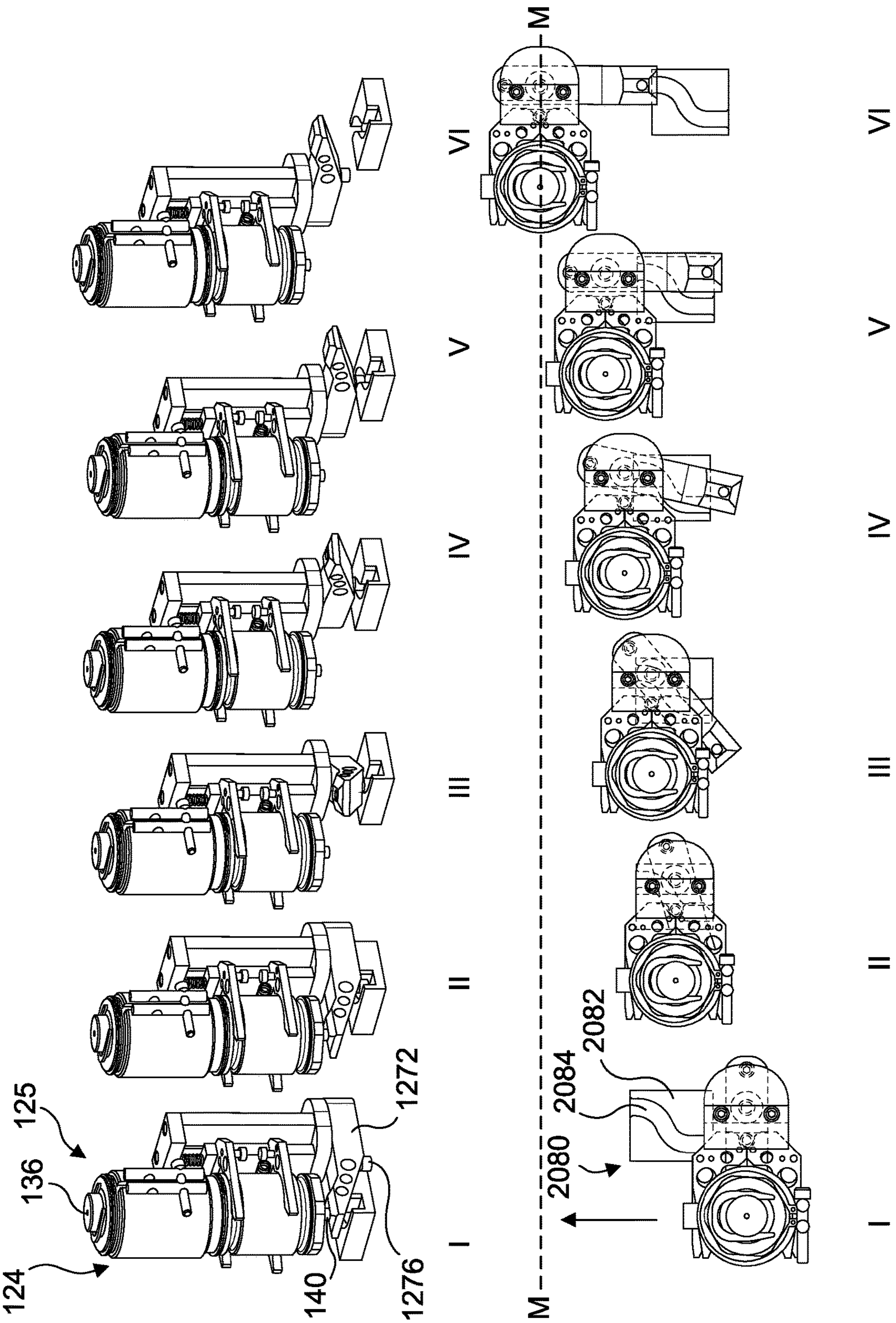
FIG. 30 is a sequence of overhead and isometric views showing sealing of a vessel.

Shaping station 104-1 may also comprise a valve locking assembly. The valve locking assembly may serve as a trigger for releasing sealing member 140 from its sealing position. FIG. 30 is a series of corresponding isometric and overhead views showing the operation of an example valve locking assembly 2080.

Valve locking assembly 2080 includes a cam guide 2082 with a slot 2084 for receiving a bearing 1276 rigidly mounted to movable arm 1272 of carrier 125. Bearing 1276 is received in slot 2084 as carrier 125 moves vessel 124 toward molding axis M-M of the shaping station. The direction of motion of the carrier 125 and vessel 124 is indicated by the arrow D in FIG. 36.

Slot 2084 has a profile such that it acts as a cam for bearing 1276 and arm 1272. That is, as the carrier 125 and vessel 124 progress toward molding axis M-M, slot 2084 causes bearing 1276 and arm 1272 to pivot from an initial position in which arm 1272 engages sealing member 140, holding the sealing member in its sealing position, toward a final position in which arm 1272 clears sealing member 140 such that the sealing member can be displaced from its sealing position.

With arm 1272 clear of sealing member 140, sealing member 140 can be pushed downwardly into vessel 124, clearing the occlusion of orifice 136 and allowing molten molding material to be transferred into the vessel 124. Sealing member 140 may, for example, be retracted by way of an actuator positioned above or below vessel 124, or by the pressure of the molten molding material acting on sealing member 140 through orifice 136.

As shown in FIGS. 7 and 30, closure assembly 1270, including movable arm 1272 and bearing 1276 are located at the bottom of carrier 125. However, in other embodiments, the closure assembly may be located at the top of the vessel.

Figure 31:
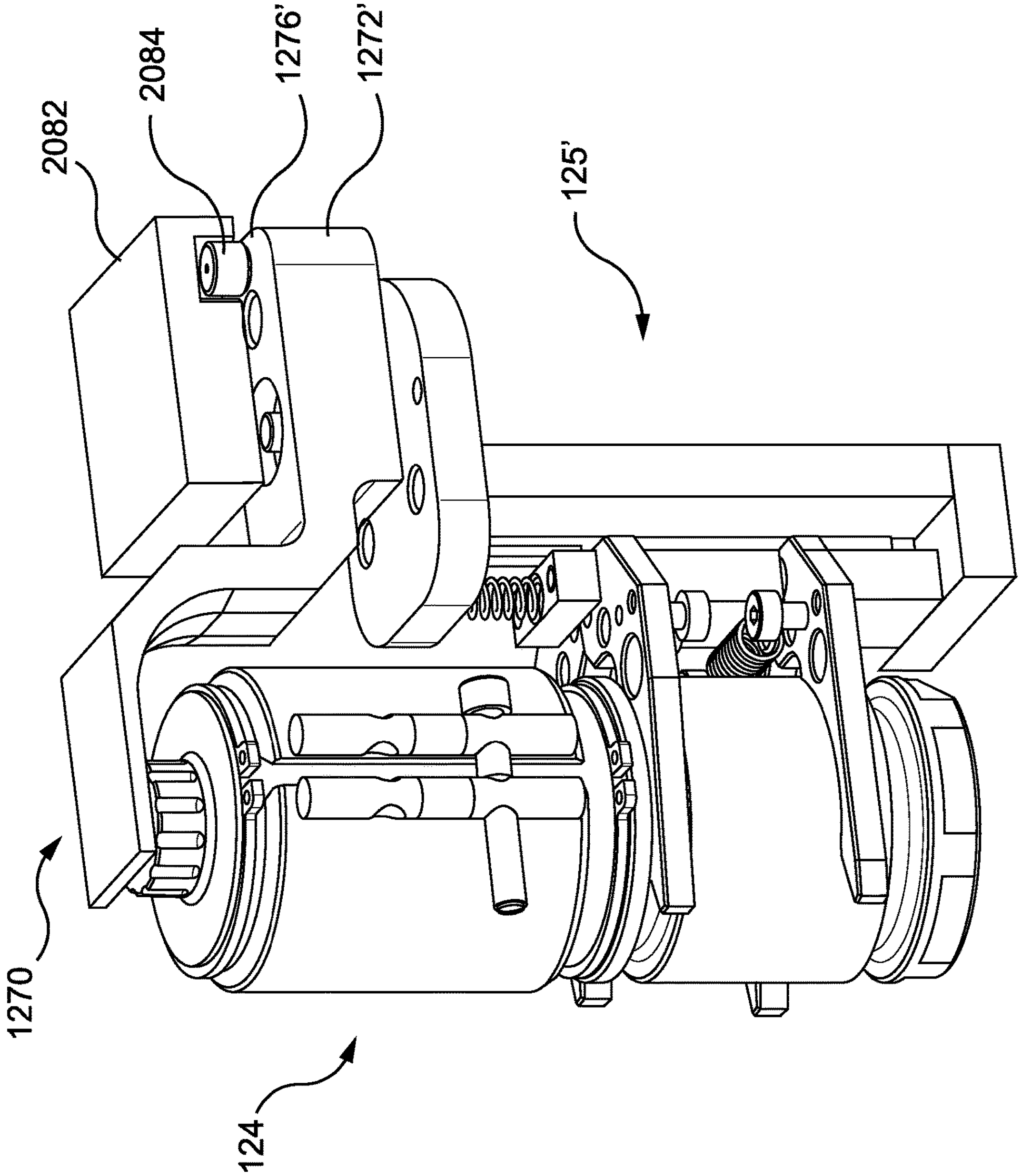
FIG. 31 is an isometric view showing sealing of another vessel.

For example, FIG. 31 depicts a carrier 125' with a top-mounted closure assembly 1270', movable arm 1272' and bearing 1276'. In the depicted embodiment, cam guide 2082 with slot 2084 is likewise positioned atop carrier 125, above vessel 124. Movable arm 1272' externally occludes orifice 136. Thus, arm 1272' functions as a sliding gate to seal orifice 136. That is, as arm 1272' moves towards a closed position, the arm slides over the top of vessel 124. In this embodiment, sealing member 140 may be omitted from vessel 124 or alternatively, may provide redundant sealing along with movable arm 1272'.

Referring to FIGS. 12A-12D, injector 210 of actuator assembly 204 can be extended to act against piston 182 of vessel 124, urging piston 182 towards gate orifice 136 and expelling molten feedstock out of cavity 134 through gate orifice 136. Injection of feedstock into mold 200 and subsequent cooling of the feedstock forms a molded workpiece 101'.

A second track 144 of transport subsystem 110 passes through an ejection position below shaping station 104-1 and aligned with ejection axis E-E.

A carriage 129 is received on track 144 and is slidable along the track, e.g. by electromagnetic, pneumatic or mechanical manipulation. Transport subsystem 110 is capable of indexing individual carriages to specific locations on track 144. For example, transport subsystem may comprise sensors or encoders (not shown) for repeating the precise position of carriage 129.

Carriage 129 includes a workpiece grip 131 for physically holding a workpiece to the carriage. As depicted, grip 131 comprises a nest which may be shaped to receive the molded workpiece 101'. In some embodiments, the nest may have a shape that is complementary to workpiece 101'. In other embodiments, the nest may not be precisely complementary to any specific workpiece 101; but may instead have a shape, e.g. a concave curve, designed to securely receive workpieces in a range of shapes and sizes. Suction may be applied to the nest to draw workpiece 101' against carriage 129. An actuator assembly 201 is located at the ejection position, and is operable to extend and push carriage 129 toward mold 200 so that the nest 133 is positioned immediately adjacent mold 200.

Tracks 144 of transport subsystem 110 are offset from one another to provide clearance for carriages 125, 129 and workpiece 101' and vessel 124. The offset between the tracks may be one or both of horizontal and vertical.

Figure 32:
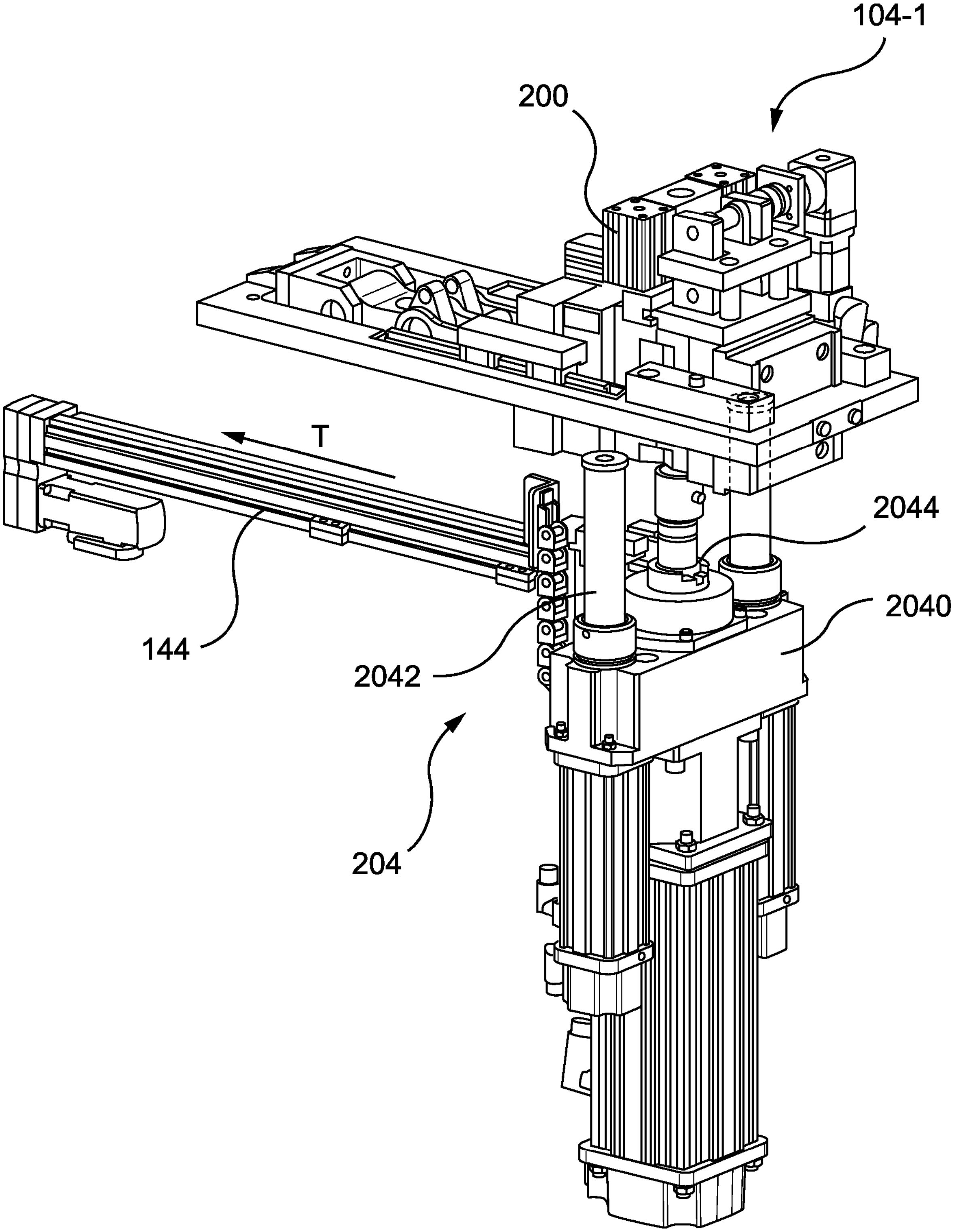
FIG. 32 is an isometric view of the actuator assembly of the shaping station of FIG. 11.

FIG. 32 depicts actuation assembly 204 of shaping station 104-1 in greater detail. In some embodiments, injection stations of dispensing cell 102 may have actuation assemblies substantially similar to actuation assembly 204. Actuation assembly 204 includes a carriage 2040 for supporting a vessel 124 proximate mold 200. Carriage 2040 is movable relative to mold 200 by linear drives (e.g. servos or hydraulic pistons) 2042.

Carriage 2040 has a nest 2044 mounted thereto, for receiving a vessel 124. Nest 2044 is positioned adjacent track 144 such that a vessel 124 can be transferred onto nest 2044 by a carriage 125 travelling along track 144 as indicated by arrow Tin FIG. 38.

Figure 33C:
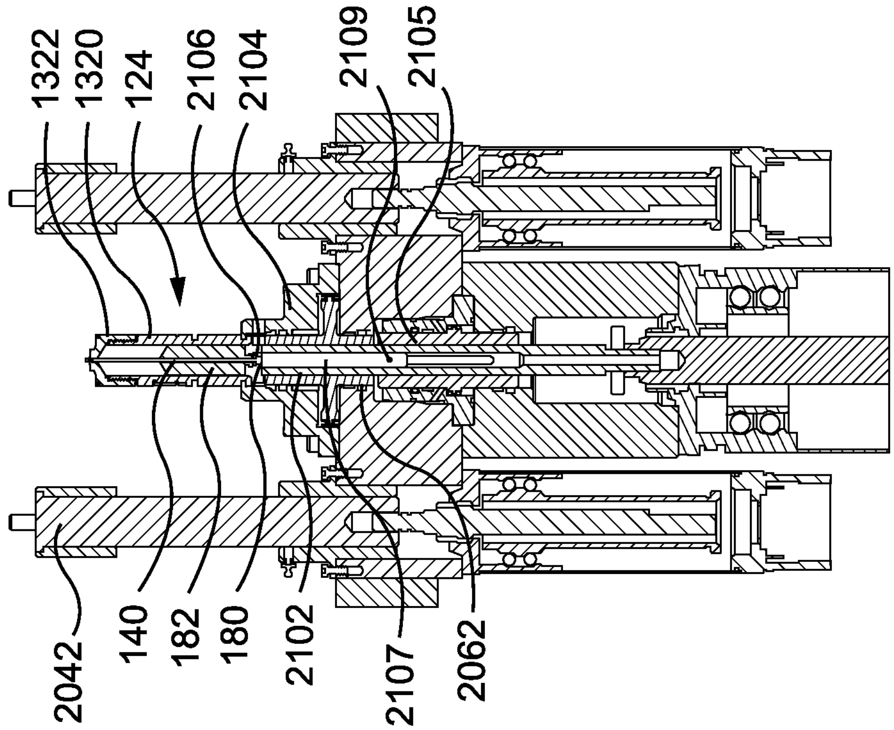
FIGS. 33A, 33B and 33C are isometric, cutaway and cross-sectional views, respectively, of a vessel and an actuation assembly at the shaping station of FIG. 11.
Figure 33B:
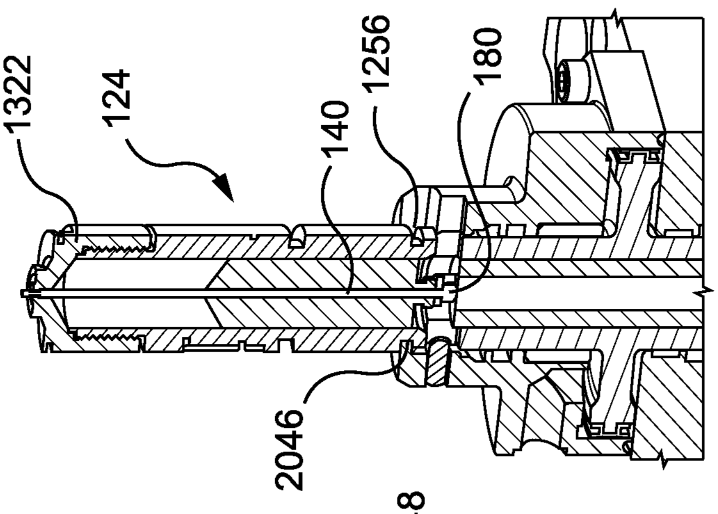
Figure 33A:
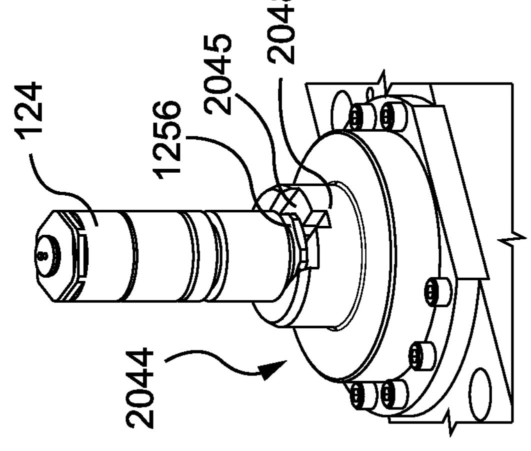

FIGS. 33A, 33B and 33C are isometric, cutaway isometric and cross-sectional views, respectively, showing details of nest 2044 and a vessel 124.

As shown, nest 2044 has an opening 2045 to receive the base of a vessel 124. The nest 2044 has side walls that project upwardly but are sized to provide clearance for tongs 1254 (FIG. 7A, 7B), such that vessel 124 may be inserted in nest 2044 while gripped by tongs 1254.

Nest 2044 has a locking projection 2046 sized and positioned to interlock with detent 1256 of vessel 124. Projection 2046 may be semi-annular in shape. As vessel 124 is inserted in nest 2044, projection 2046 is received in detent 1256 and retains the vessel in nest 2044.

Although closure assembly 1270 and valve locking assembly 2080 are not shown in FIGS. 32, 33A and 33B, it should be understood that valve locking assembly 2080 is positioned proximate nest 2044, such that it causes arm 1272 to pivot clear of nest 2044 prior to or concurrently with insertion of vessel 124 into nest 2044 (see FIG. 30).

Nest 2044 comprises a channel 2048 for receiving the base of sealing member 140, including detent 180.

The bottom of nest 2044 is open to permit interaction of actuation assembly 204 with the body of vessel 124 and with sealing member 140 and piston 182. Specifically, in the depicted embodiment, actuation assembly 204 includes actuators, e.g. pneumatic or servo-driven pistons, cylinders or the like, that can extend through the bottom of nest 2044 to act against the body of vessel 124, sealing member 140 or piston 182.

With reference to FIG. 33C, actuators for acting against vessel 124, sealing member 140 and piston 182 may be in a nested (e.g. concentric) arrangement. Specifically, a hollow vessel locking actuator 2062 is positioned to abut the base of vessel 124. A flow actuator, namely, injection actuator 2102 is nested within vessel positioning actuator 2062. A gate operating actuator 2104 is in turn nested within injection actuator 2102.

Vessel locking actuator 2062 and injection actuator 2102 may be tubular, i.e. with annular top and bottom surfaces. The top surfaces of actuator 2062 and 2102 (i.e. the surfaces closest to orifice 136 along the longitudinal axis) abut vessel 124 and piston 180, respectively. Gate operating actuator 2104 may include a gripping feature 2106 with a notch shaped to receive and interlock with detent 180 of sealing member 140.

In the depicted embodiment, vessel locking actuator 2062 and gate operating actuator 2104 are pneumatically driven and injection actuator 2102 is servo-driven. However, each actuator may be driven by any suitable drive type.

As will be explained in further detail, vessel locking actuator 2062 is operable to bias vessel 124 toward mold 200, such that the tip of vessel 124 tightly abuts the mold. In such condition, vessel 124 is loaded against projection 2046 of nest 2044.

In the depicted embodiment, gate operating actuator 2104 includes a first section 2105 and a second section 2107, which are coupled by a coupling pin 2109 that extends through a slot defined in the injection actuator 2102. Specifically, pin 2109 may be extended through holes in first and second sections 2105, 2107, to couple the sections such that they extend together. In the depicted embodiment, first section 2105 is a generally hollow tubular element whereas the second element is a generally cylindrical member. First section 2105 has an internal diameter to accommodate independent sliding motion of the injection actuator 2102 nested therein. Similarly, the injection actuator 2102 is a tubular member with an internal diameter to accommodate the second section 2107 of the gate operating actuator 2104 nested therein.

Gate operating actuator 2104 is operable to extend sealing member 140 into its sealing condition, in which the sealing member 140 substantially prevents flow of material through orifice 136, and to retract the sealing member 140 to open orifice 136.

As noted, in the depicted embodiment, injection actuator 2102 is driven by a servo. Servo drive of injection actuator 2102 may allow for large forces to be applied, to subject molding material to suitable injection pressure, with relatively high positional accuracy of injection actuator 2102, and thus, of piston 182. Other suitable drives may be used in other embodiments. For example, in some embodiments, injection actuator 2102 may be hydraulically driven.

Injection actuator 2102 is operable to act against piston 182 to force molding material out of vessel 124.

FIGS. 34A-34K depict shaping station 104-1 at various stages of a shaping operation. For simplicity, core positioning actuator 1046 and loading actuator 1050 are omitted from FIGS. 34A, 34B-34C, 34E, 34I and 34J.

Figure 34A:
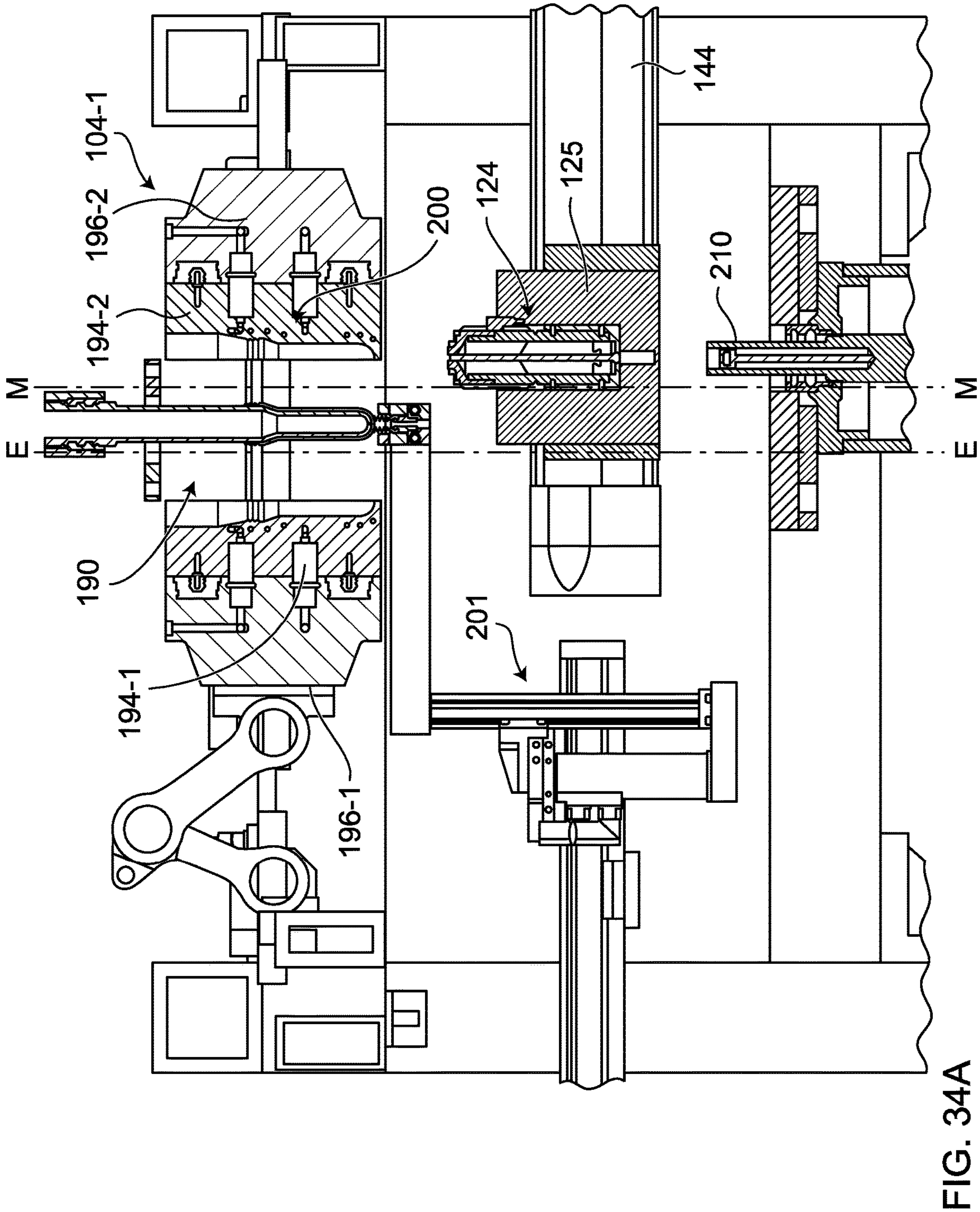
FIGS. 34A-34K are cross-sectional and partial cross-sectional views showing stages of a shaping operation at the shaping station of FIG. 11.

As shown in FIG. 34A, a carriage 125 carrying a vessel 124 is transported on track 144 to the injection position facing injection station 104-1 and aligned with mold axis M-M. Orifice 136 of vessel 124 is opened as carriage 125 and vessel 124 are moved into position at molding axis M-M, for example, as described above with reference to FIG. 30. Once in position the vessel locking actuator 2062 extends to lock the vessel 124 in the injection station 104-1.

Figure 34B:
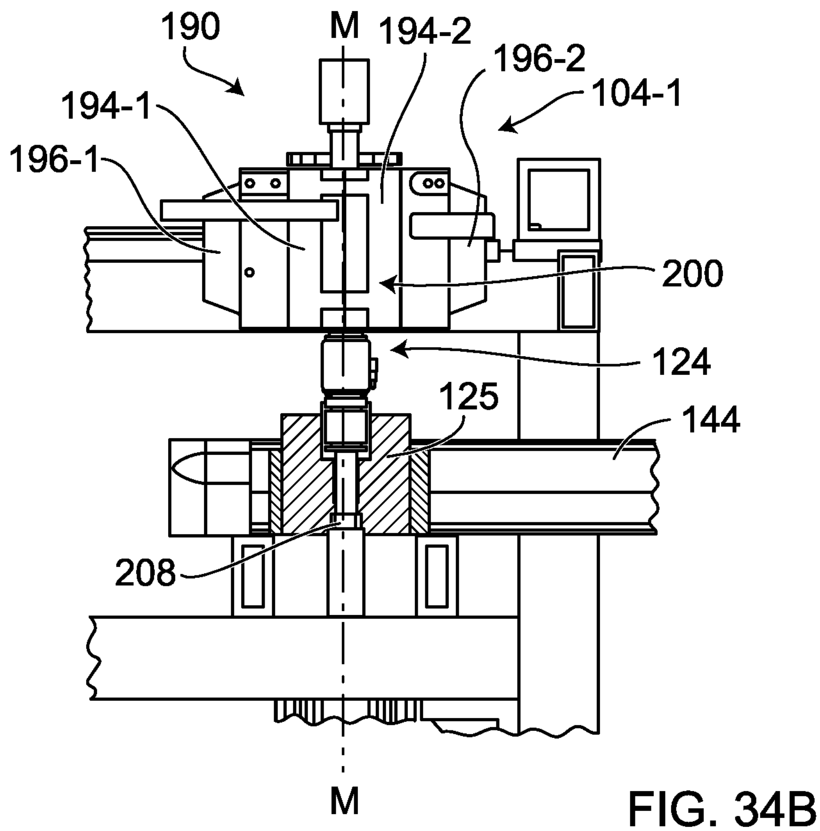
Figure 34C:
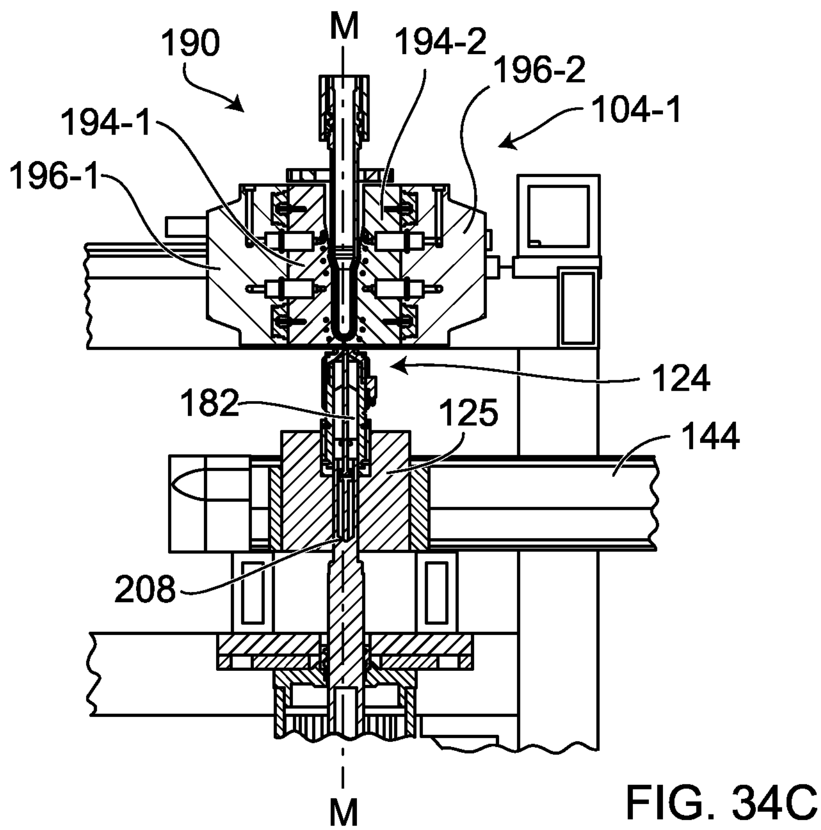

As shown in FIGS. 34B-34C, core assembly 190 is moved to align with mold axis M-M and cavity plate 194-2. Platen 196-1 is moved toward platen 196-2 and clamps mold 200 in a closed position.

Figure 34D:
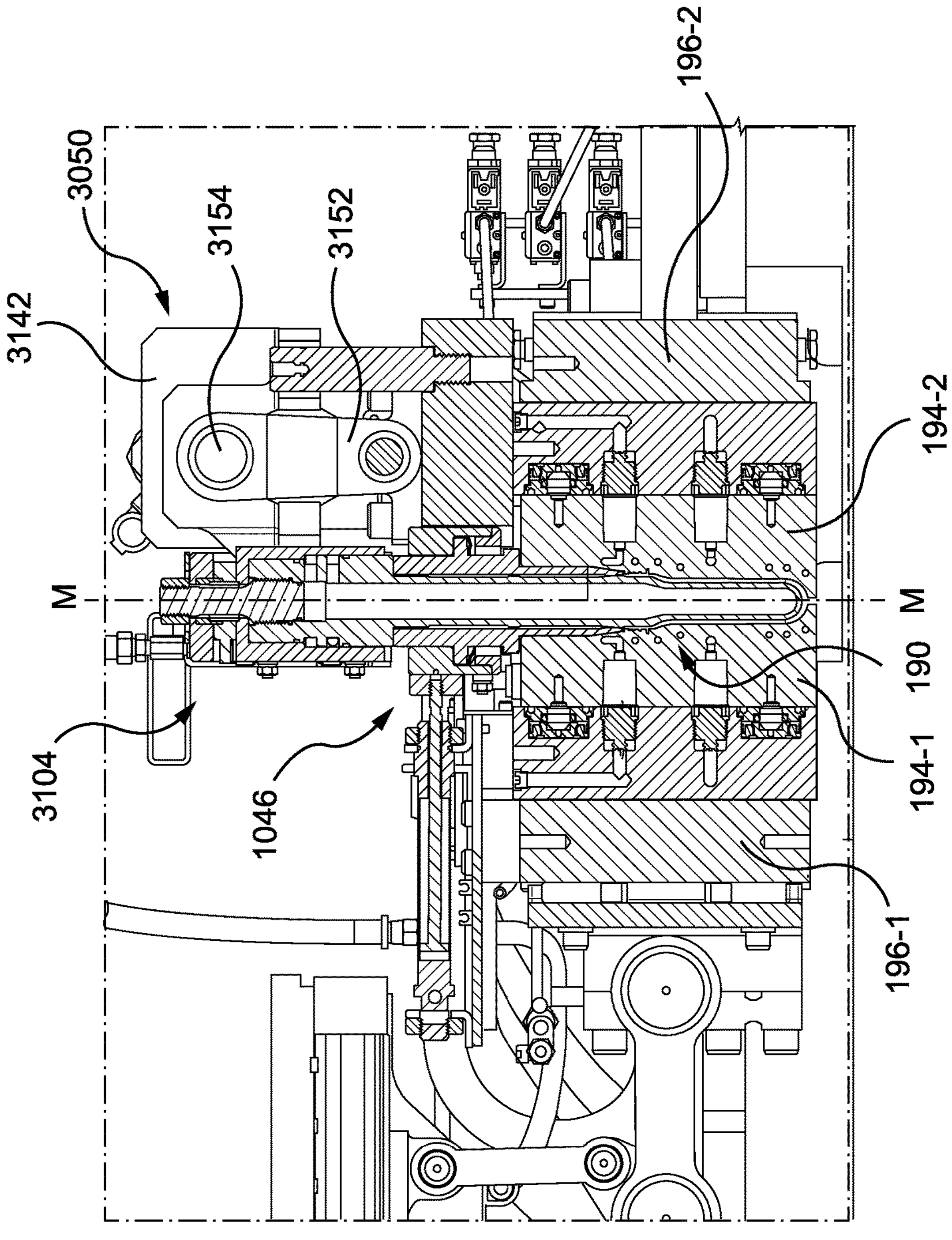

As shown in FIG. 34D, camshaft 3154 of load actuator 3050 rotates to urge moving plate 3142, loading frame 3104, and core 190 downwardly. The moving plate 3142, loading frame 3104 and core 190 move through a short stroke. In the depicted example, the length of the stroke is about 2 mm. A downward force is exerted on loading frame 3104 and core 190 to resist pressure from injection of molding material into mold 200. The downward force may be referred to as a pre-load. In the depicted example, the pre-load is about 60 kN.

Linear drives 2042 retract to move carriage 2040 toward mold 200 such that the coupling assembly of the vessel sealingly abuts with the mold plates of the mold 200 and the orifice 136 of vessel 124 aligns with gate 202 of mold 200. The linear drives also controls the contact force (effectively the sealing force) between the mold and vessel. Gate operating actuator 2104 next retracts the sealing member 140 away from the mold 200 thereby fluidly connecting the vessel 124 with the molding cavity.

Figure 34E:
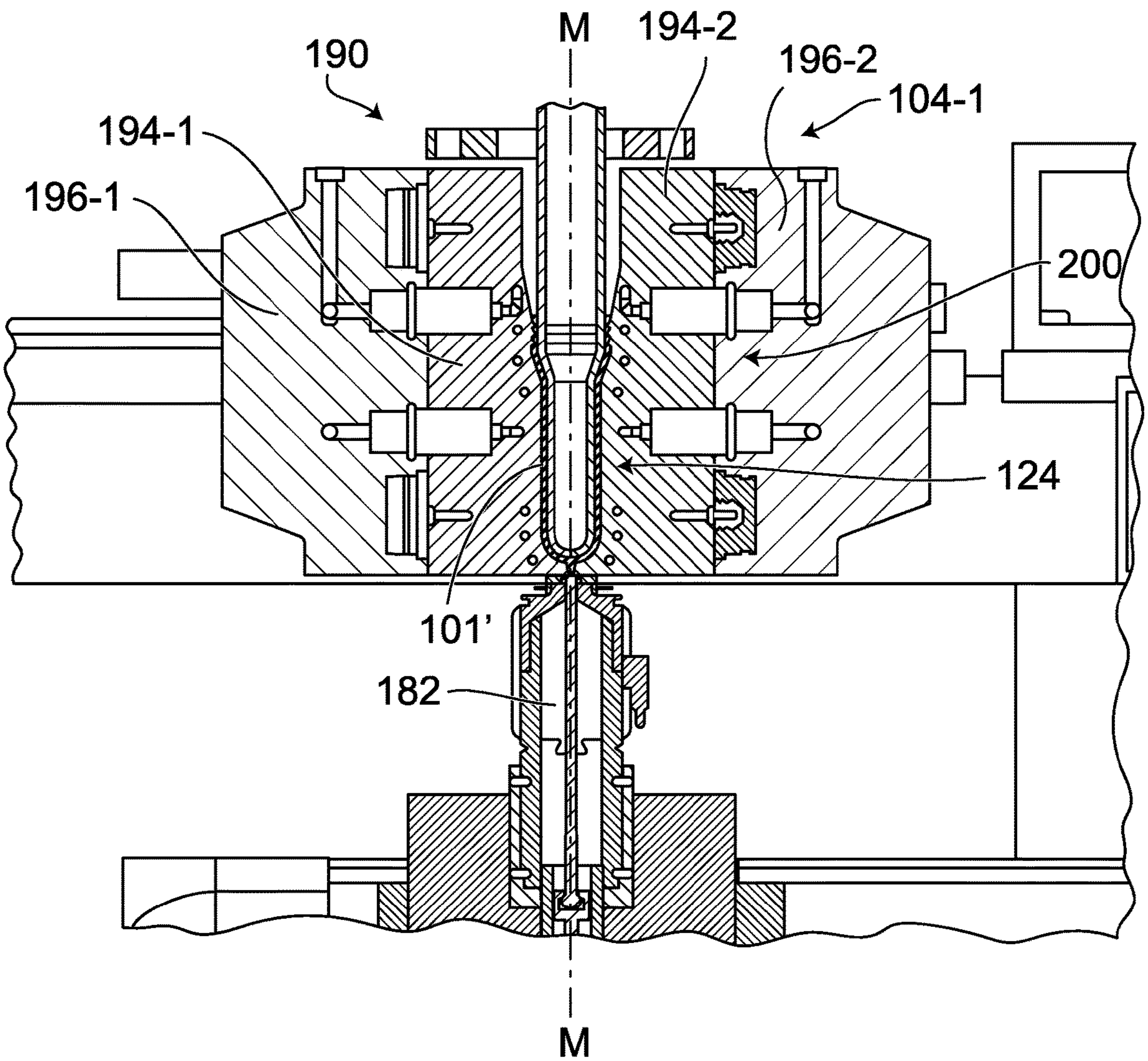

Injector 210 extends and forces piston 182 towards orifice 136, reducing the volume of cavity 134 and urging molten feedstock through gate 202 and into mold 200. The feedstock cools and solidifies, forming a solid molded article (FIG. 34E). Gate operating actuator 2104 then extends the sealing member 140 towards the mold 200 closing thereby isolating the vessel 124 from the molding cavity.

Figure 34F:
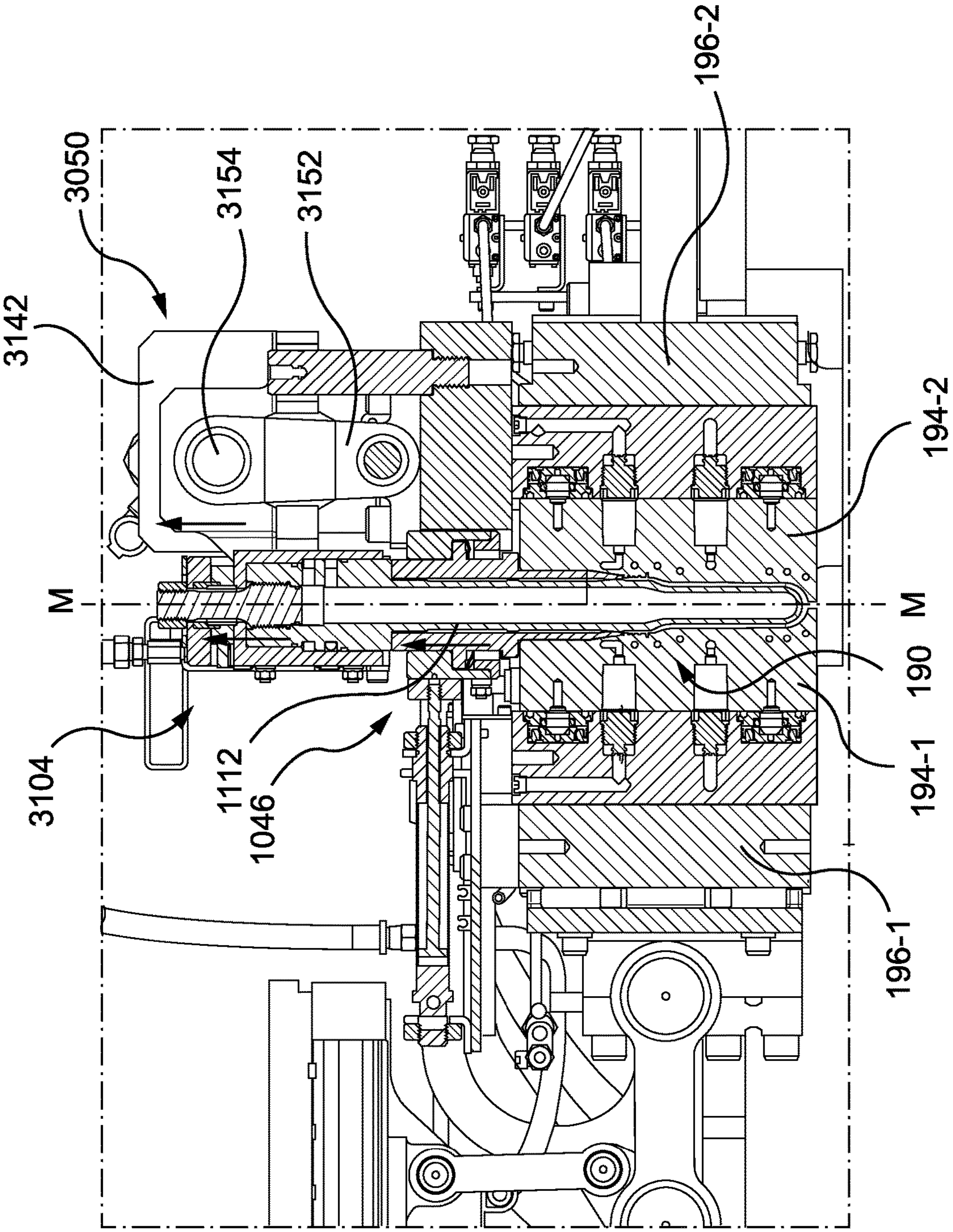

As shown in FIG. 34F, once molding is complete, loading actuator 3050 causes moving plate 3142, loading frame 3104 and core 190 to move upwardly through a short stroke. In the depicted embodiment, the stroke may typically be 3 mm or less in length. Camshaft 3154 rotates to bear against rocker 3152 and forces moving plate 3142 upwardly. Projections 3174 of moving plate 3142 bear against load frame 3104, moving the load frame upwardly. Inner core 3112 moves upwardly with load frame 3104. The force applied to inner core 3112 during the upward stroke may be relatively large. In some embodiments, the force may be similar in magnitude to the preload created by load actuator 3050 prior to molding. The upward movement dislodges the molded article from inner core 3112. That is, it forms a small initial crack between the molded article and inner core 3112.

Figure 34G:
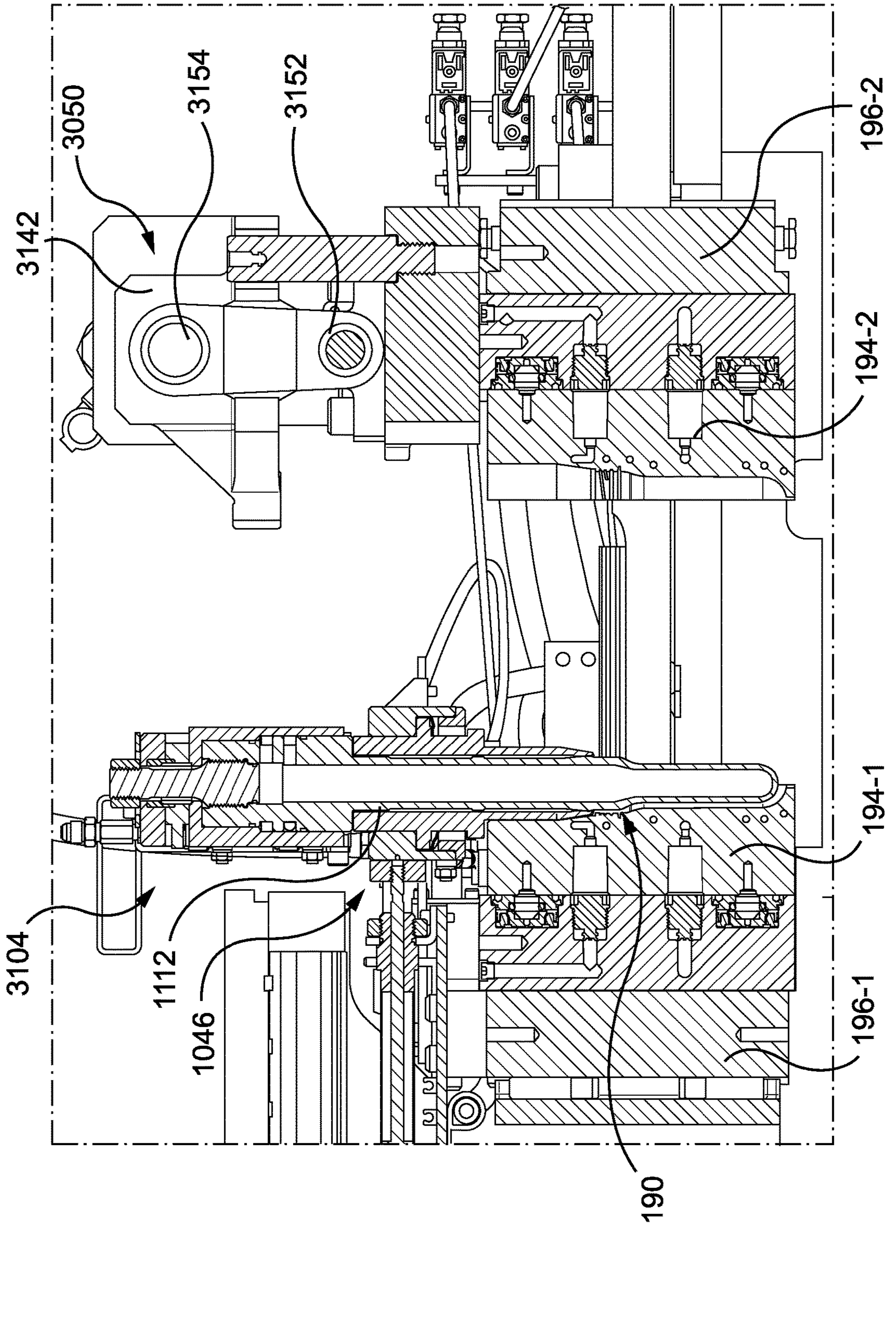

As shown in FIG. 34G, mold 200 is moved to its open state by clamping subassembly 3042 retracting platen 196-1 and cavity plate 194-1 from platen 196-2 and cavity plate 194-2.

Figure 34H:
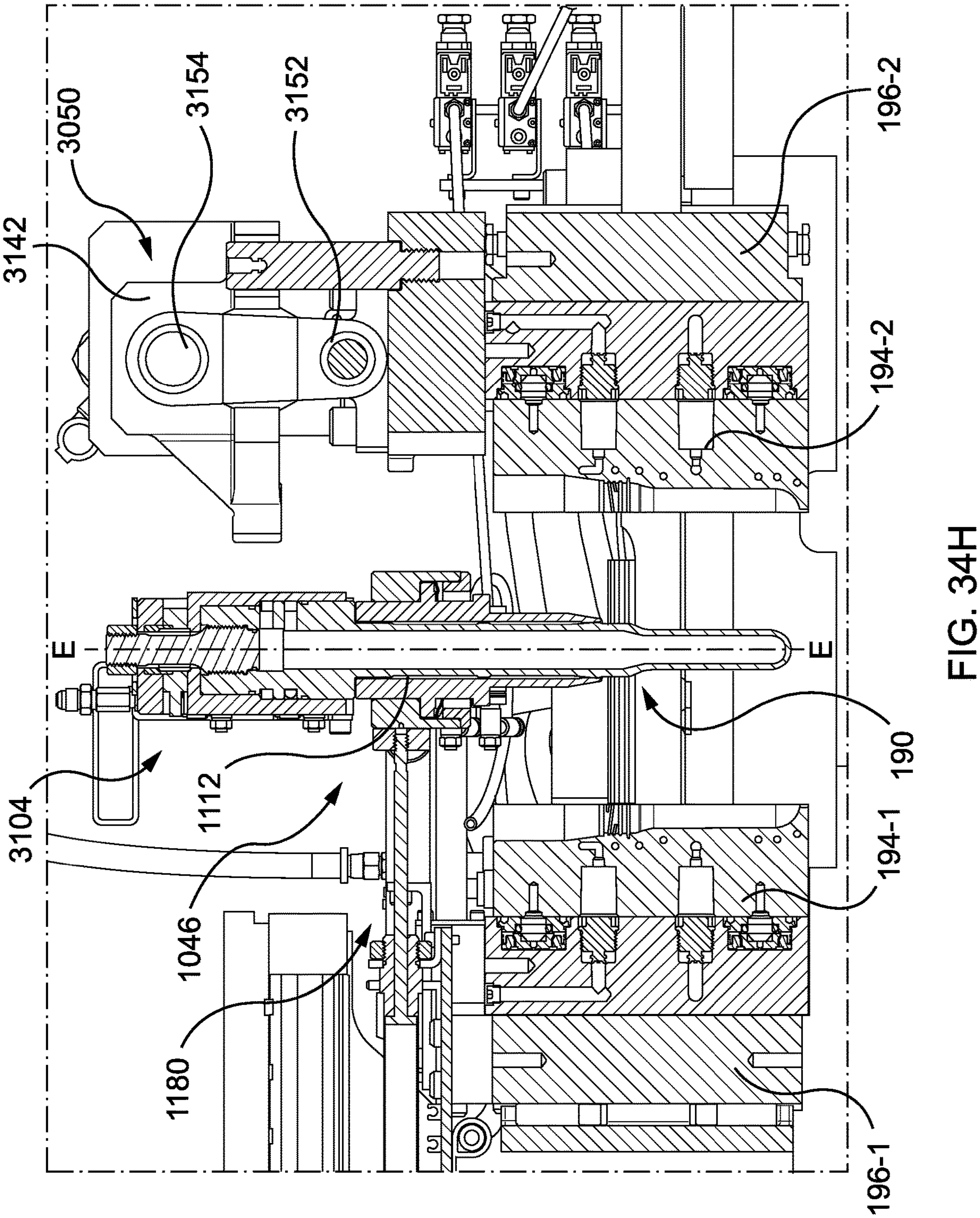
Figure 34I:
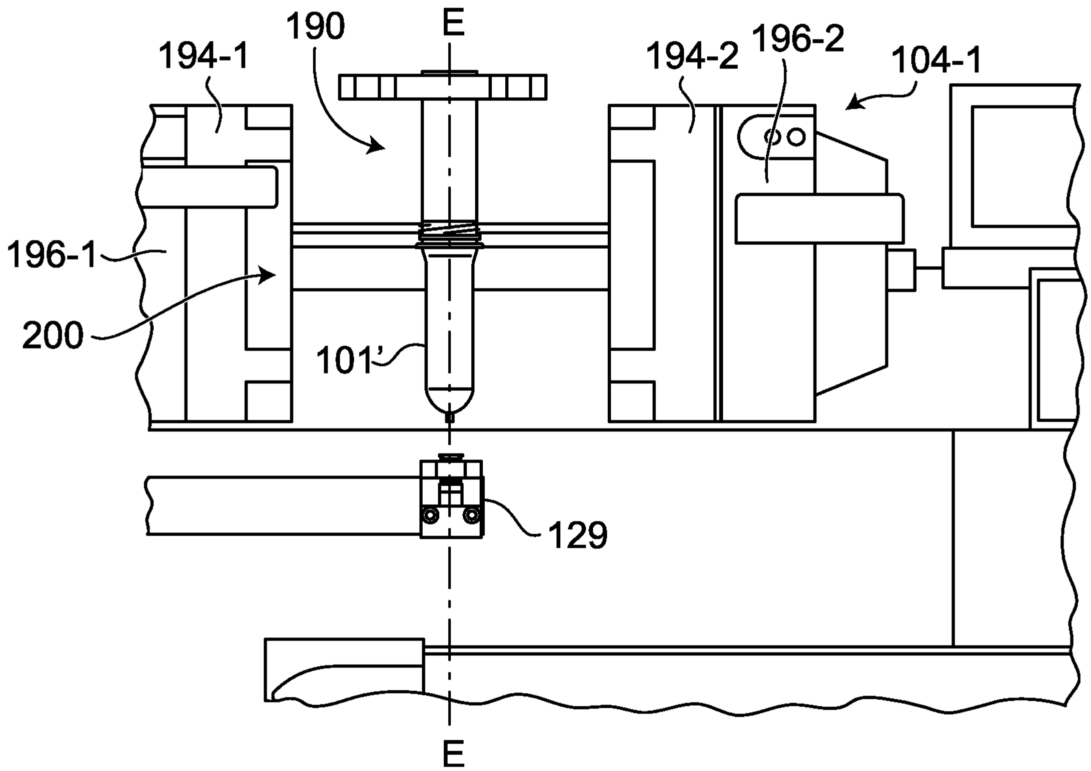
Figure 34J:
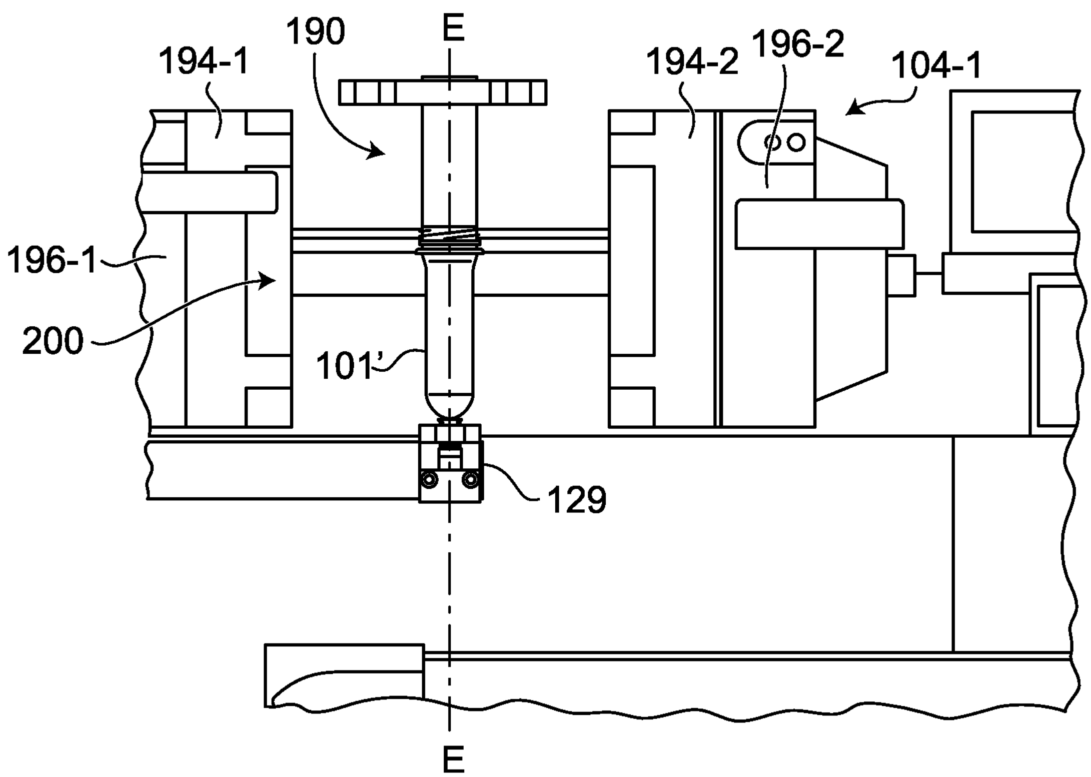
Figure 34K:
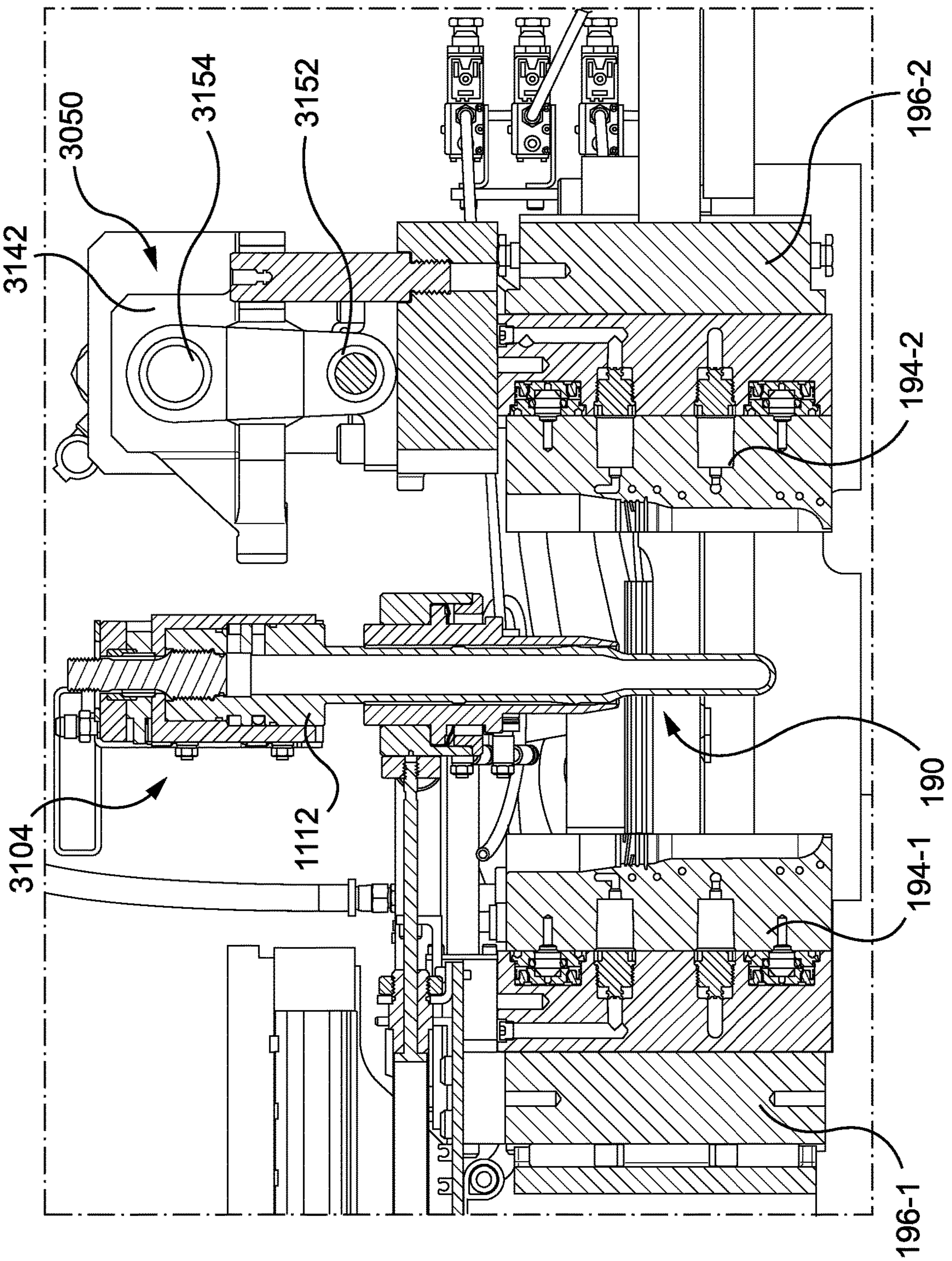

As shown in FIG. 34H, secondary mold opening actuator 3180 extends to move the core assembly 190 away from platen 194 so that core assembly 190 is aligned with ejection axis E-E (FIG. 39G).

Carriage 129 is extended upwardly so that its nest is positioned immediately below molded workpiece 101' and suction is applied through nest to assist in drawing molded workpiece 101' off of core assembly 190. Carriage 129, carrying molded workpiece 101', is then moved along track 144 for further processing.

Workpiece 101' may be removed from core assembly 190 by retracting the inner core 3112 away from carriage 129 along ejection axis E-E. Specifically, cylinders 3108 of core positioning actuator 3046 extend to move load frame 3104 and inner core 3112 away from outer core 3114 and carriage 129. As inner core 3112 retracts, outer core 3114 bears against the workpiece and pushes the workpiece off core assembly 190 as the core retracts.

Figure 35B:
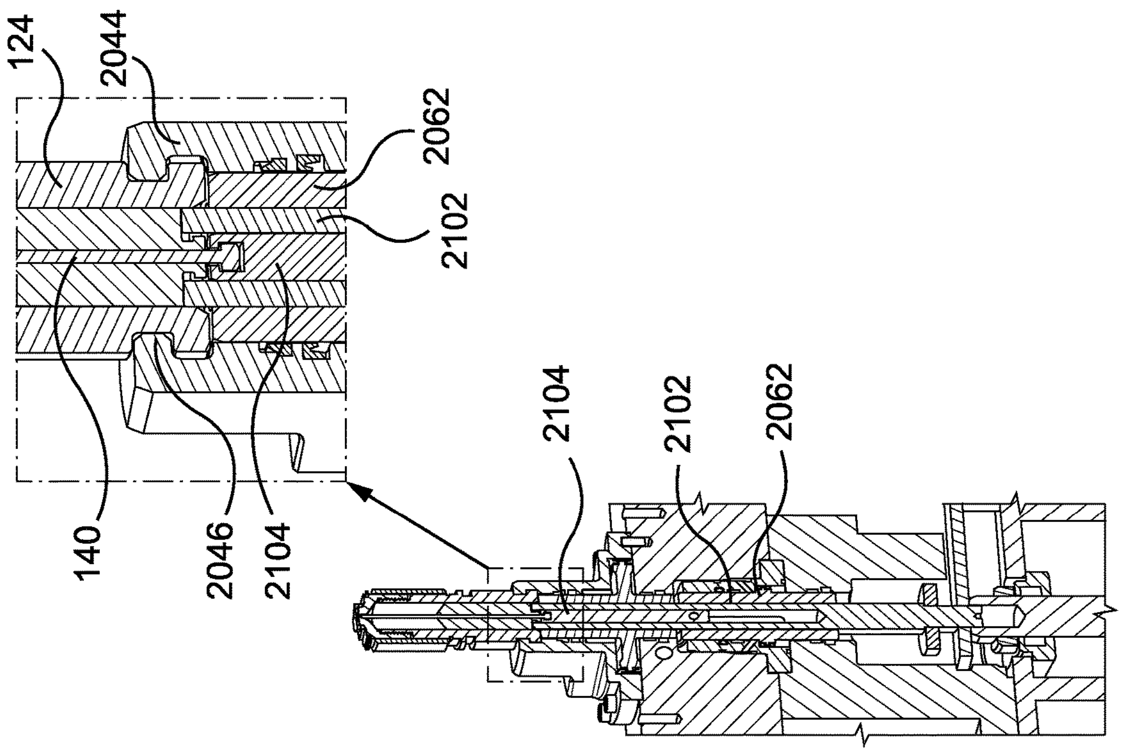
FIGS. 35A-35F are cutaway views of the vessel and actuation assembly of FIGS. 17A-17C, showing operations of the vessel and actuation assembly.
Figure 35A:
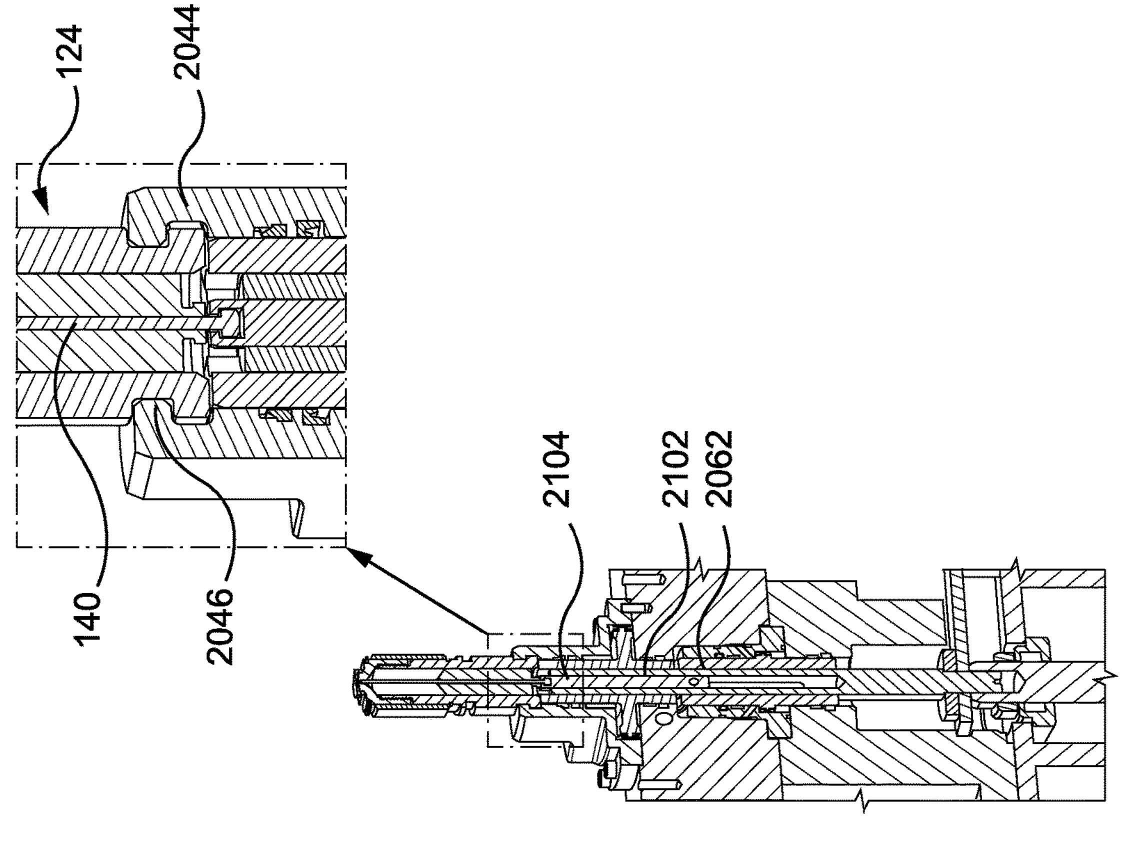
Figure 35D:
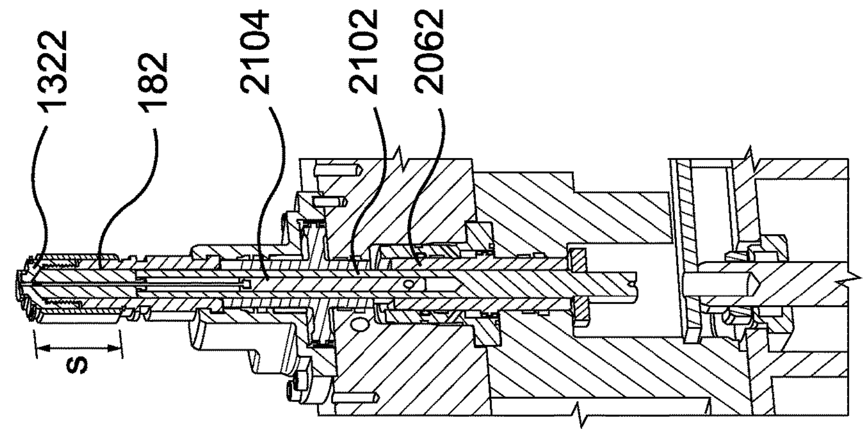

FIGS. 35A-35F show operation of actuation assembly 204 in greater detail. FIGS. 35A-35F are isometric cutaway views, which are cut away at a 90 degree angle to the views of FIGS. 33B-33C. As shown in FIG. 35A, once vessel 124 is moved into position on nest 2044, vessel locking actuator 2062 is extended, which biases vessel toward mold 200 and against projection 2046 of nest 2044. As mentioned previously, linear drives then retract to move carriage toward mold such that the vessel sealingly abuts the mold plates of the mold and the orifice of vessel aligns with gate of the mold.

Figure 35C:
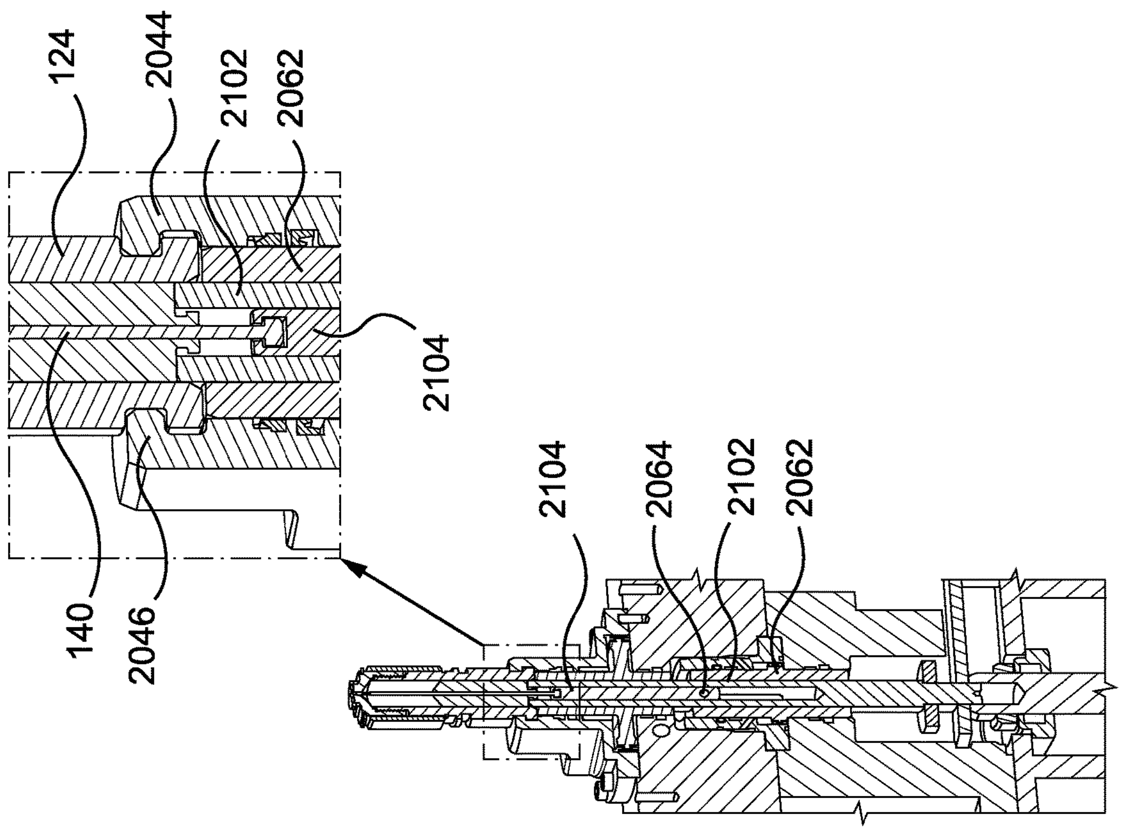

As shown in FIG. 35B, injection actuator 2102 is extended into contact with piston 182. As shown in FIG. 35C, gate operating actuator 2104 retracts and sealing member 140 retracts from its sealed position to its open position, in which molding material is free to flow through orifice 136.

Once sealing member 140 has been retracted to unseal orifice 136, injection actuator 2102 is extended through a stroke as shown in FIG. 35C to force molding material out of vessel 124 and into mold 200. The stroke may be a specific length, as defined by the drive mechanism of injection actuator 2102, or the stroke may continue until piston 182 abuts vessel tip 1322. Thus, the amount of material forced out of vessel 124 may be determined by injection actuator 2102 or its drive mechanism, or by the internal volume of vessel 124.

Figure 35F:
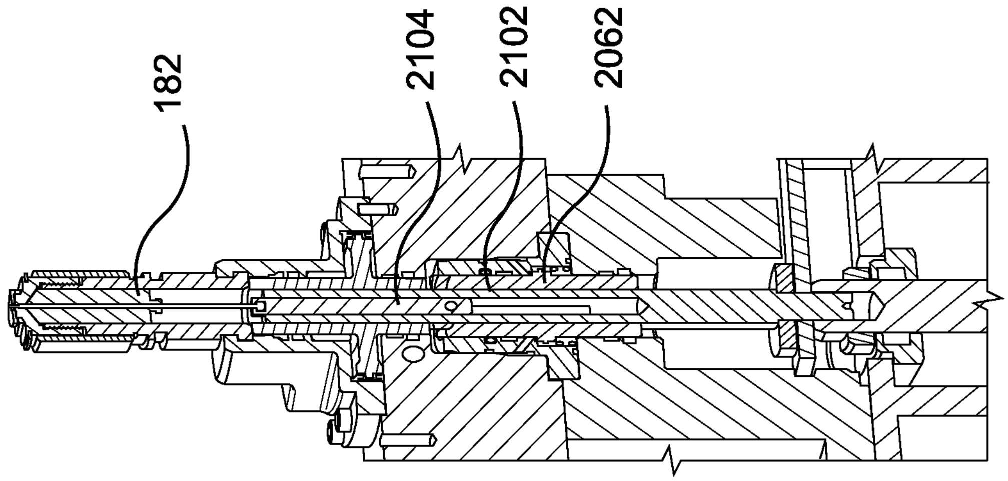
Figure 35E:
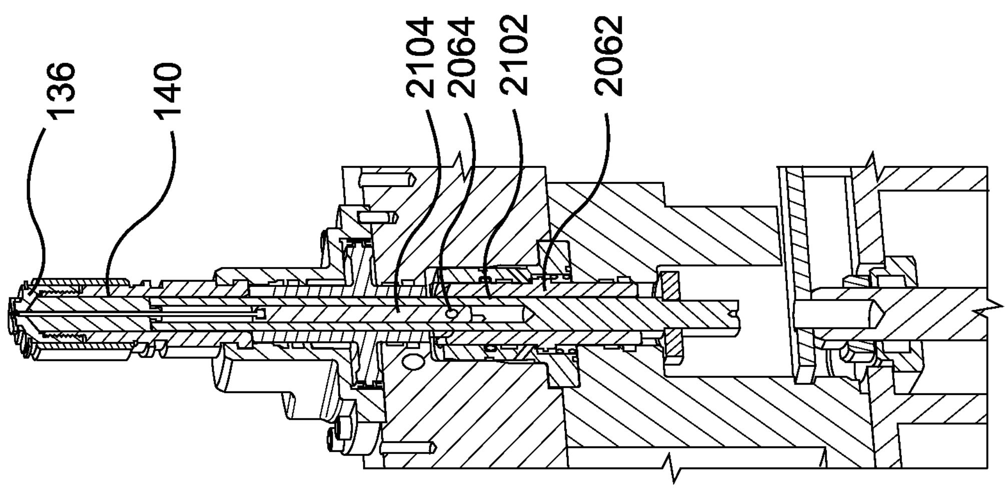

Orifice 136 is resealed by extension of sealing member 140 as shown in FIG. 35E. That is, the gate operating actuator 2104 extends, moving sealing member 140 into a sealing position.

Following completion of injection, injection actuator 2102 may be withdrawn as shown in FIG. 35F. As depicted, piston 182 may remain in its extended position following retraction of injection actuator 2102. For example, piston 182 may be maintained in its position by friction. In other embodiments, piston 182 may be retracted along with injection actuator 2102.

Figure 36:
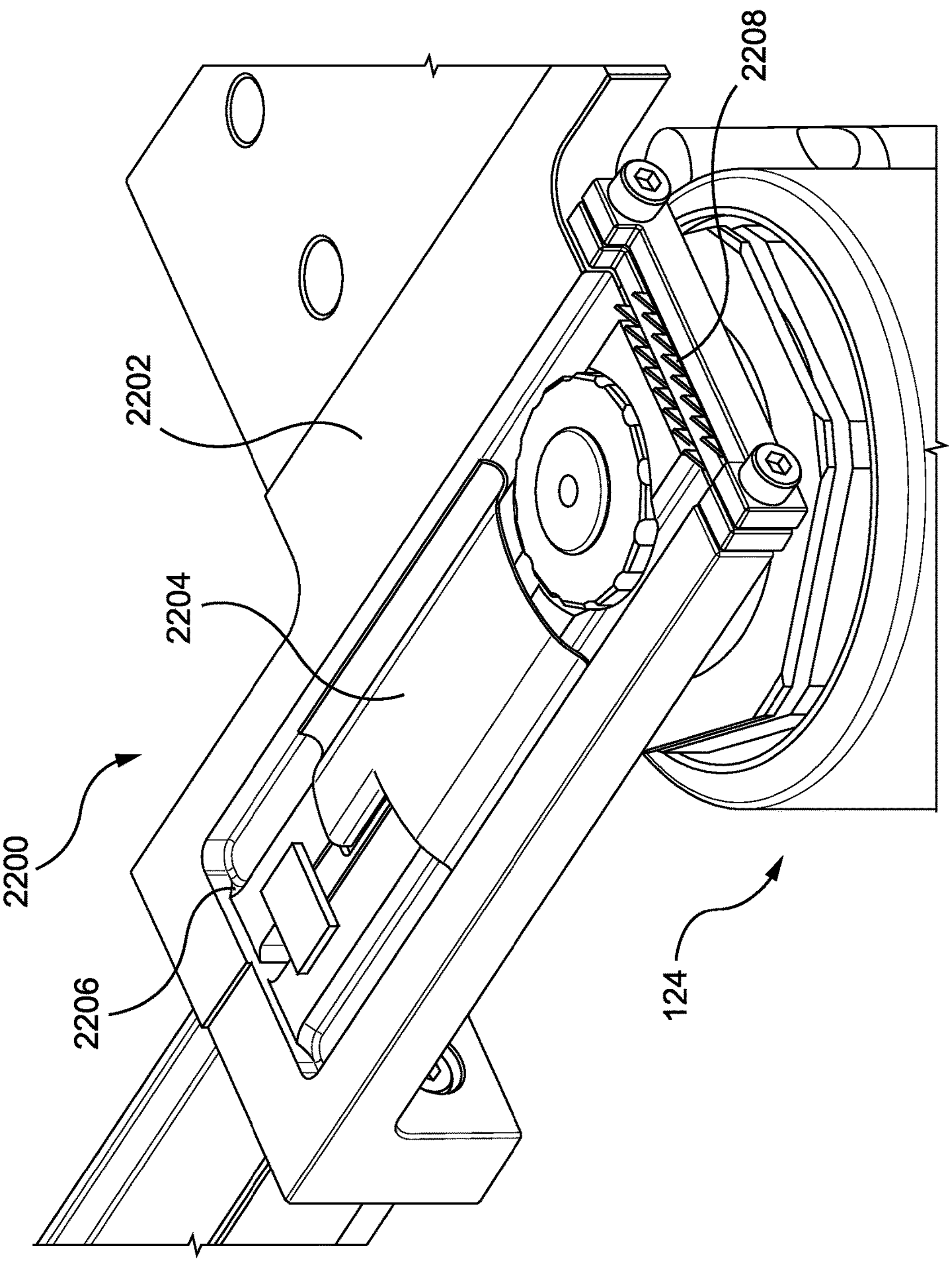
FIG. 36 is an exploded view of a gate assembly.

In an alternative embodiment, as depicted in FIG. 36, the shaping station 106-1 may further include a gate assembly 2200 provided between vessel 124 and mold 200 for selectively cutting a vestige of injected feedstock between vessel 124 and mold 200 after injection of the molding material is complete. The gate assembly 2200 is particularly useful when used in conjunction with a vessel without a sealing member 140 as mentioned previously. When used with the vessel 124 having a sealing member 140 the gate assembly 2200 nonetheless may assist with trimming of the vestige formed on the base of the preform prior to demolding. Gate assembly 2200 may comprise a plate 2202, which may be mounted below mold 200, and a blade 2204. Blade 2204 may be received in a pocket 2206 defined in plate 2202. As depicted, blade 2204 has an arched cross-sectional shape. The arched portion of blade 2204 is compressed within pocket 2206 between plate 2202 and mold 200. Compression of blade 2204 biases the blade against the lower surface of mold 200 such that the blade fits tightly against mold 200. However, in other embodiments, blade 2204 may have different cross-sectional shapes. For example, blade 2204 may be substantially flat. Gate assembly 2200 may also include a scraper 2208 positioned to rub against the underside of blade 2204 as it extends and thereby dislodge residual molding material from the underside of the blade. In the depicted embodiment, scraper 2208 is serrated. In other embodiments, scraper 2208 may have a straight edge.

Figure 37A:
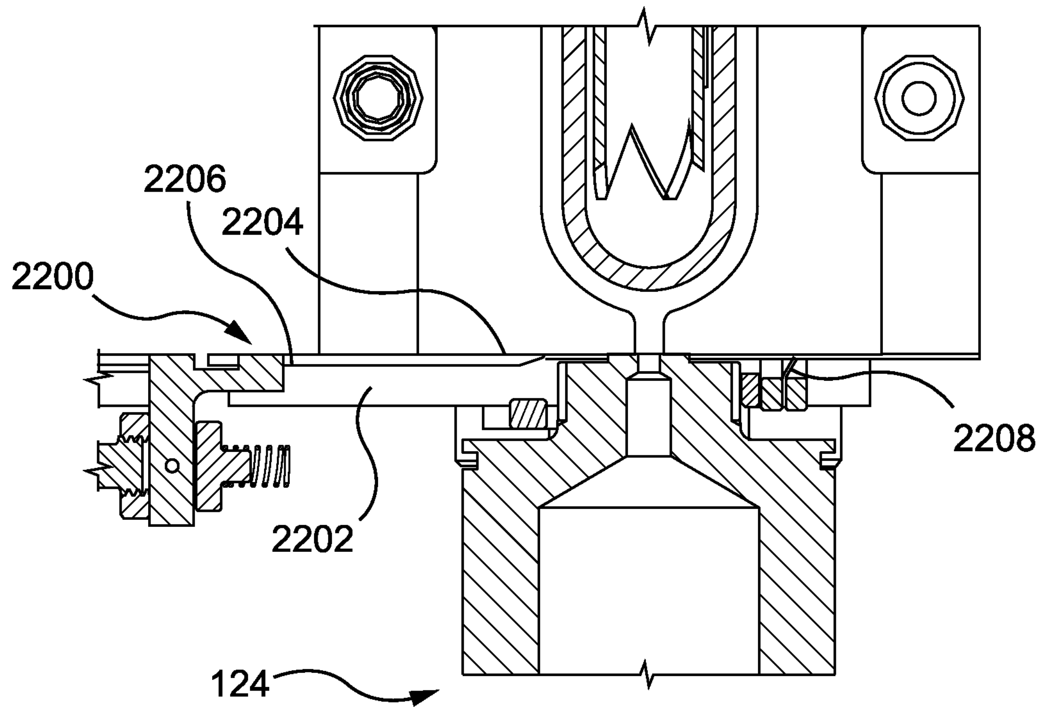
FIGS. 37A-37B are enlarged cross-sectional views showing operation of the gate assembly of FIG. 36.
Figure 37B:
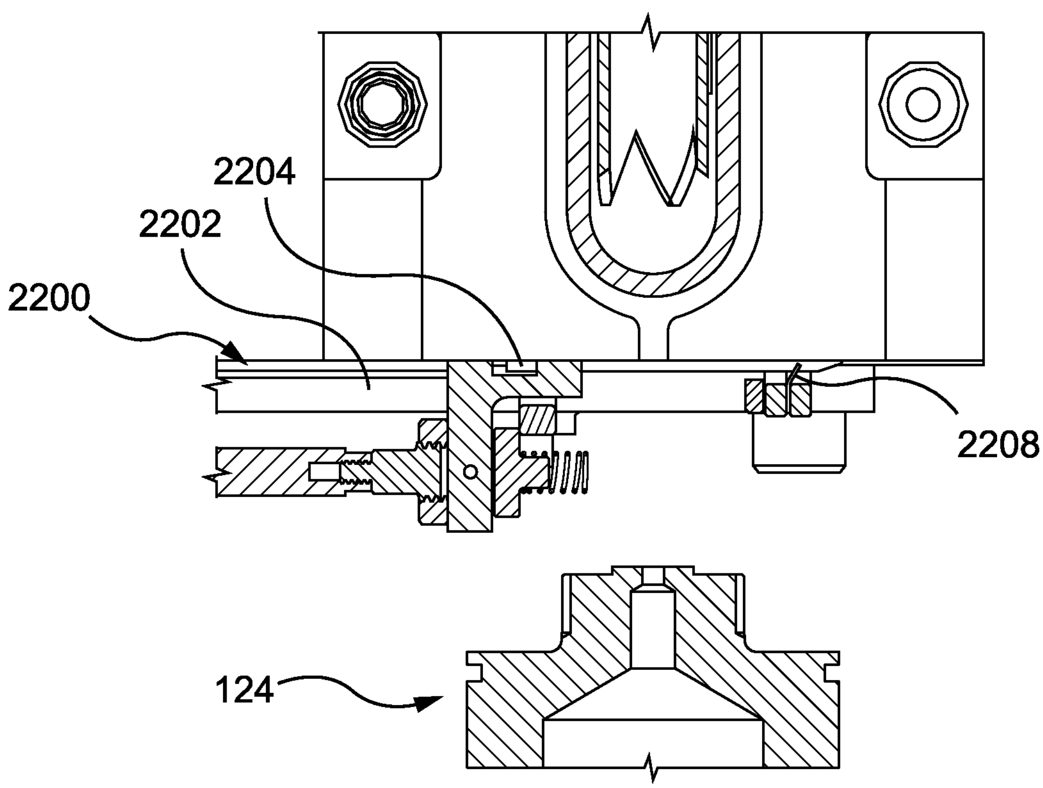

FIGS. 37A-37B are cross-sectional views showing a process of cutting a stream of molding material between vessel 124 and mold 200. The process may occur immediately after injection of molding material into mold 200 is completed. As shown in FIG. 37A, blade 2104 is advanced toward the stream of molding material, which may be partially or fully solidified.

As shown in FIG. 37B, blade 2104 cuts the stream of molding material, thereby parting the article within mold 200 from any residual molding material outside mold 200 or within vessel 124. After such parting, vessel 124 may be withdrawn from mold 200. Blade 2104 then extends past scraper 2108 to dislodge molding material, if any, from the underside of the blade.

Figure 38:
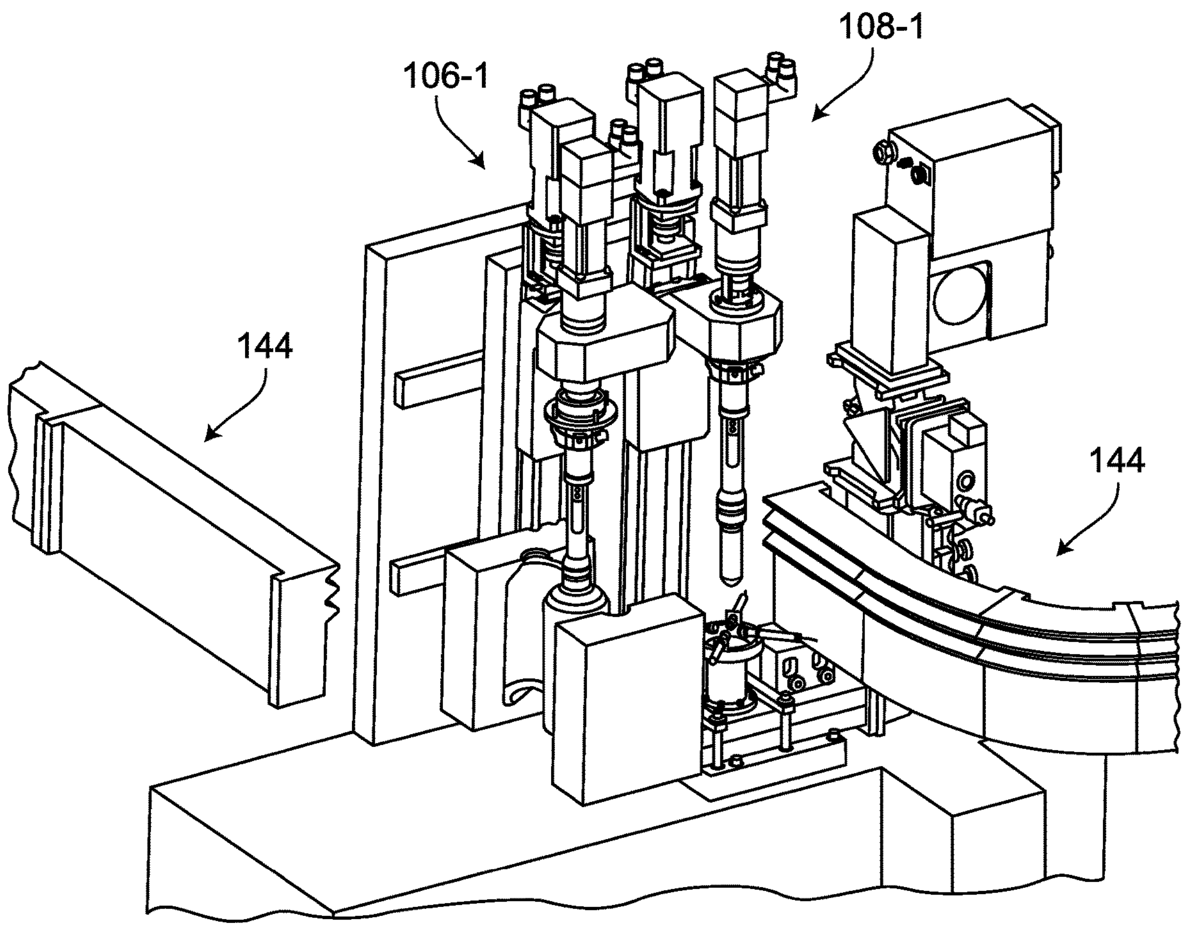
FIG. 38 is an isometric view of a conditioning station and a shaping station of the system of FIG. 3.

FIG. 38 depicts a conditioning cell 108 and shaping cell 106 in greater detail. As shown, stations of conditioning cell 108 and stations of shaping cell 106 are located in close proximity to one another. That is, conditioning station 108-1 and shaping station 106-1 are located close together.

Thermal Conditioning

With primary reference to FIGS. 39-40, details of an example conditioning cell 108 will now be described.

In the depicted embodiment, conditioning cell 108 is for creating a desired thermal profile by heating a molded workpiece in order to prepare the workpiece for a subsequent shaping operation at shaping cell 106. For example, stations of conditioning cell 108 may be configured to heat or cool a workpiece, changing its overall temperature; or to change the temperature distribution in a workpiece by preferentially heating or cooling some regions of the workpiece; or a combination thereof.

Figure 39:
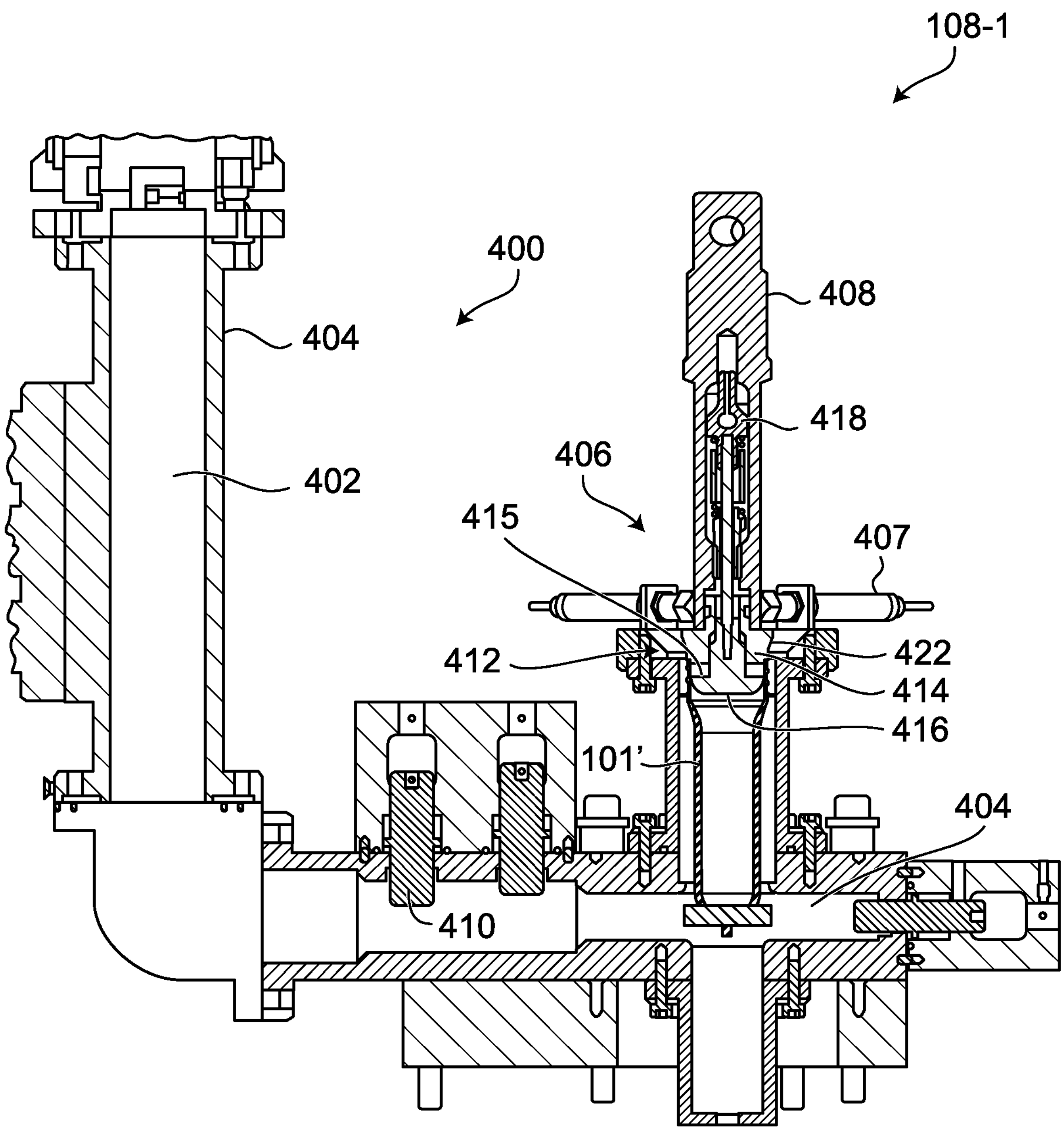
FIG. 39 is a side cross-sectional view of the conditioning station of FIG. 38.

FIG. 39 shows a cross-sectional view of conditioning station 108-1. Conditioning station 108-1 includes a frame 400 and a heat-generation assembly 402, a heating chamber 404, a thermal monitoring system 406, and a mandrel 408, all of which are supported on the frame 400.

Heat-generation assembly 402 includes a device for applying heat to a received workpiece. In some embodiments, heating may be achieved by exposing the workpiece to microwave radiation. In other embodiments, heating may be achieved by directing infrared light onto the workpiece. Other suitable techniques may be used in other embodiments. For example, a workpiece may be immersed in a heated fluid such as air.

Heat generation assembly 402 may include one or more thermal metering devices 410. Thermal metering devices 410 are operable to control the rate at which heat is applied to a workpiece. For example, thermal metering devices 410 may comprise wave tuners for influencing characteristics of microwave radiation, e.g. by altering a standing wave pattern of radiation within chamber 404 to control the position of high-radiation regions relative to a workpiece within the chamber. Alternatively or additionally, thermal metering devices 410 may comprise shields to partially or fully block incident radiation, or valves to regulate the flow of heated fluid.

Heating chamber 404 is configured to receive the workpiece, and heat from heat-generation assembly 402 is directed towards heating chamber 404, such that the temperature of the workpiece increases while it resides in heating chamber 404. In some embodiments, heat may be applied focally to specific areas of the workpiece, in order to produce a specific desired temperature profile. The overall (e.g. average) temperature of the workpiece may increase, remain static, or decrease. For example, in some embodiments, portions of the workpiece may be permitted to cool while heat is retained in or added to other portions. Thermal metering devices 410 may provide for control of the heat distribution and resulting temperature profile.

Mandrel 408 is mounted to frame 400 and is rotatable about its axis and movable in three dimensions.

Mandrel 408 has a grip assembly 412 configured to releasably engage a workpiece. As depicted, grip assembly 412 has a fixed block 414 and a movable block 416. Fixed block 414 is rigidly supported on mandrel 408. Movable block 416 is mounted to a linear actuator 418, which is in turn mounted to mandrel 408.

A compressible member 415 is positioned between fixed block 414 and movable block 416. Linear actuator 418, thereby axially compressing the compressible member 415, can retract movable block 416. Axial compression of the compressible member 415 causes a radial expansion of the member into contact with an interior wall of workpiece 101. The compressible member 415 frictionally engages the workpiece, and thereby retains the workpiece on the mandrel 408.

Movable block 416 has a tapered leading surface, which at its widest extent is sized for slight interference with a cavity of workpiece 101'. Movable block 416 may be extended into workpiece 101'. Such extension relieves strain in compressible member 415, allowing it to rebound to its original shape and release workpiece 101'. Extendable block 416 can then push workpiece 101' off mandrel 408.

Heating chamber 404 has a top opening 422 through which mandrel 408 can lower a workpiece into the chamber. Thermal monitoring system 406 comprises temperature probes 407 proximate top opening 422, to measure and record a temperature profile of a workpiece entering heating chamber 404. In the depicted embodiment, four temperature probes 407 are present, and are spaced evenly around top opening 422. The depicted temperature probes 407 are infrared cameras. In other embodiments, other types of temperature measuring devices may be used. For example, temperature probes may include thermocouples. Other suitable temperature-measuring devices may be used, as will be apparent to skilled persons.

Figure 40A:
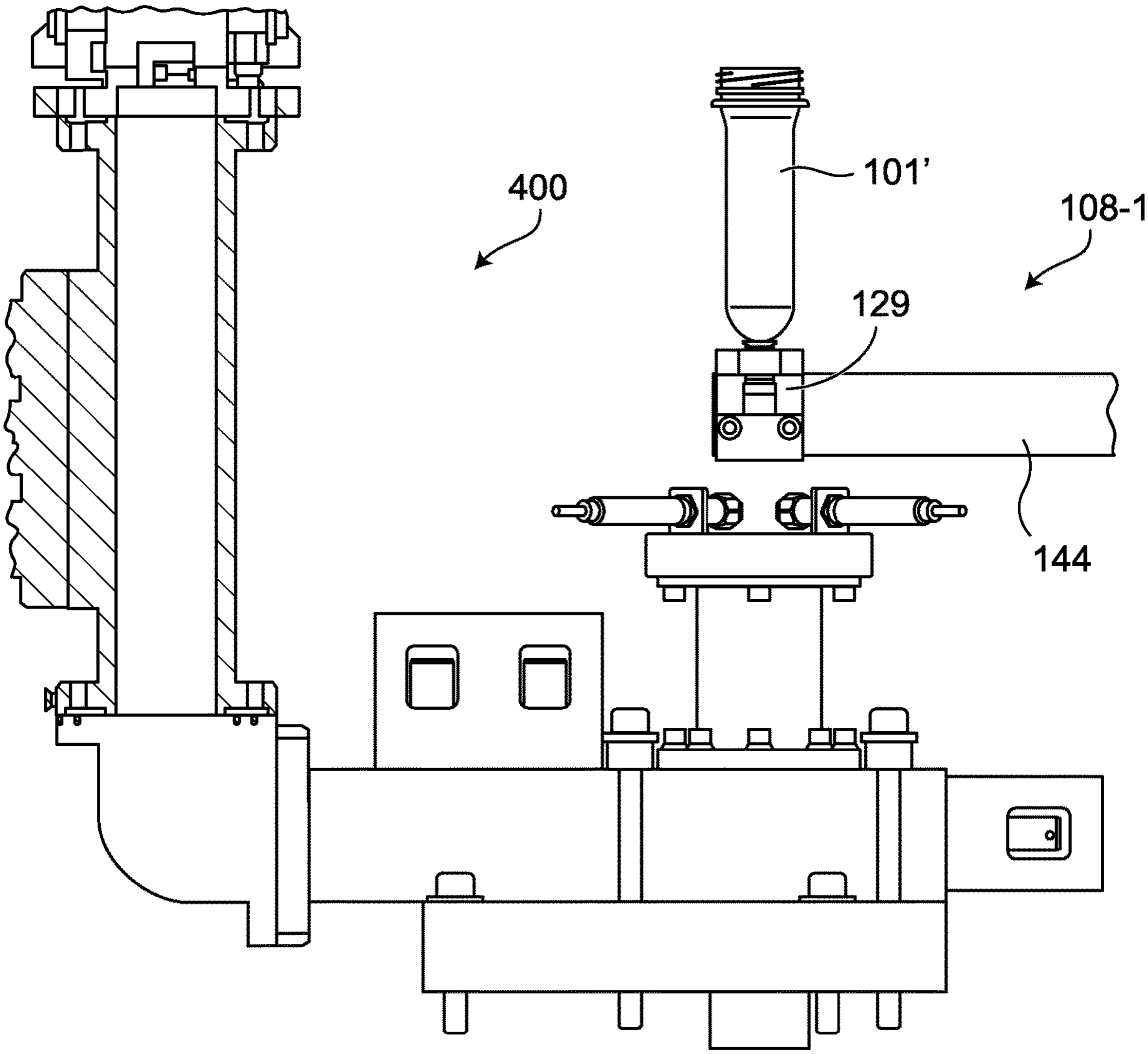
FIGS. 40A, 40B and 40C are side and cross-sectional views showing stages of a conditioning operation at the conditioning station of FIG. 38.
Figure 40B:
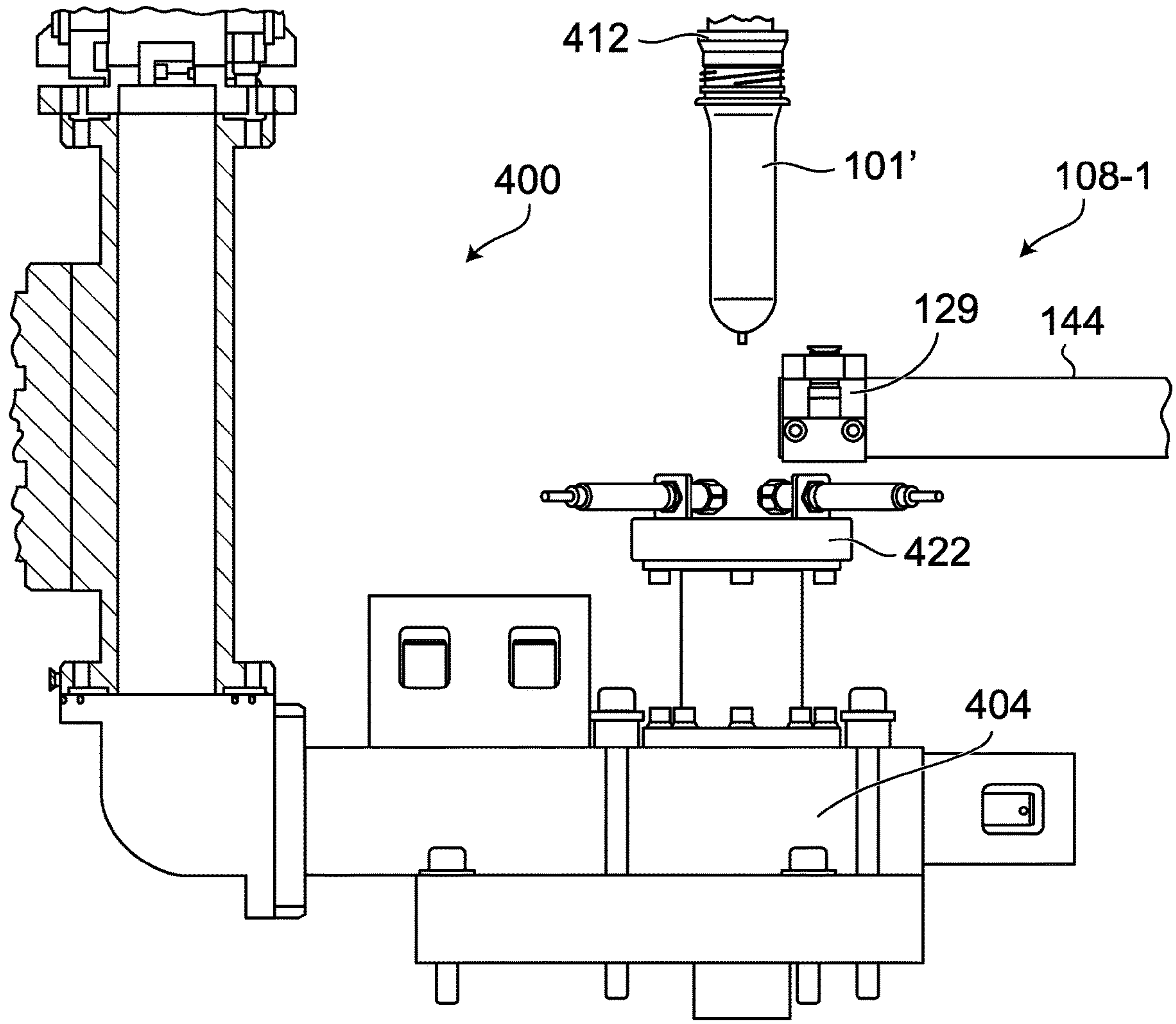
Figure 40C:
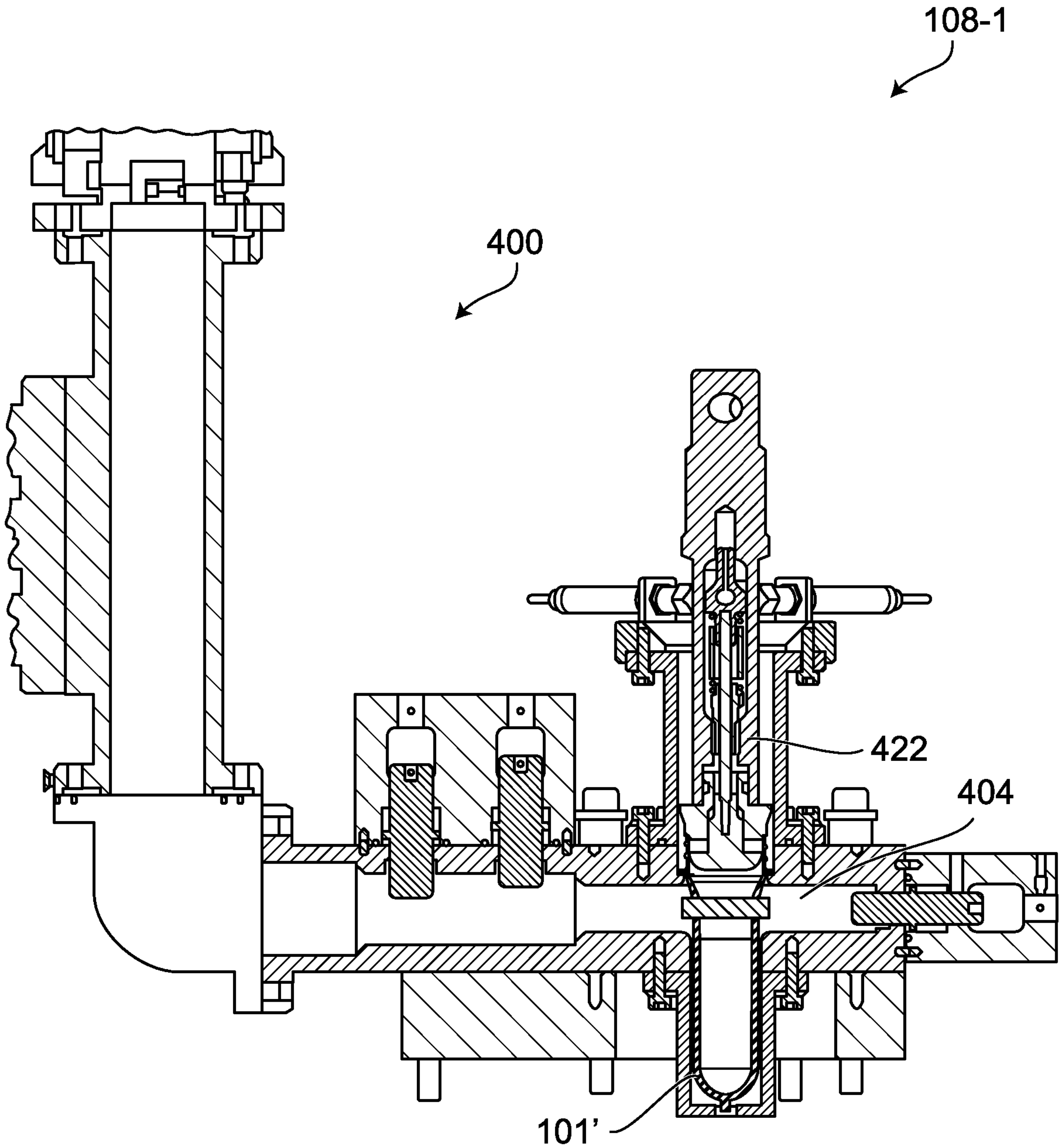

FIGS. 40A-40C depict conditioning station 108-1 at various stages of a conditioning operation. FIG. 40C shows the conditioning station 108-1 in cross-section to show internal components.

As shown in FIG. 40A, a workpiece 101' is delivered to conditioning station 108-1 by a carriage 129 travelling along track 144. Carriage 129 is moved to a carriage loading position.

As shown in FIG. 40B, mandrel 408 is positioned over workpiece 101', with grip assembly 412 received inside the workpiece. Movable block 416 of grip assembly 412 is retracted toward fixed block 414 to squeeze compressible member 415 against the workpiece. Friction between compressible member 415 and workpiece 101' holds the workpiece to mandrel 408.

Mandrel 408 moves workpiece 101' into position proximate top opening 422 of heating chamber 404 and then, as shown in FIG. 40C, passes workpiece 101' into the heating chamber 404. A treatment is applied to the workpiece 101'. Specifically, heat is generated by heat generation assembly 402 and applied to the workpiece within heating chamber 404.

Once treatment of workpiece 101' has been completed, mandrel 408 withdraws the workpiece 101' from heating chamber 404.

Secondary Shaping

With primary reference to FIGS. 41-51, features and operation of example stations of an example shaping cell 106 and a mold for the shaping cell will now be described in detail. In the depicted embodiments, the example stations are for blow molding of plastic articles. However, many features of the described embodiments are not limited to blow molding, as will be apparent.

Figure 41A:
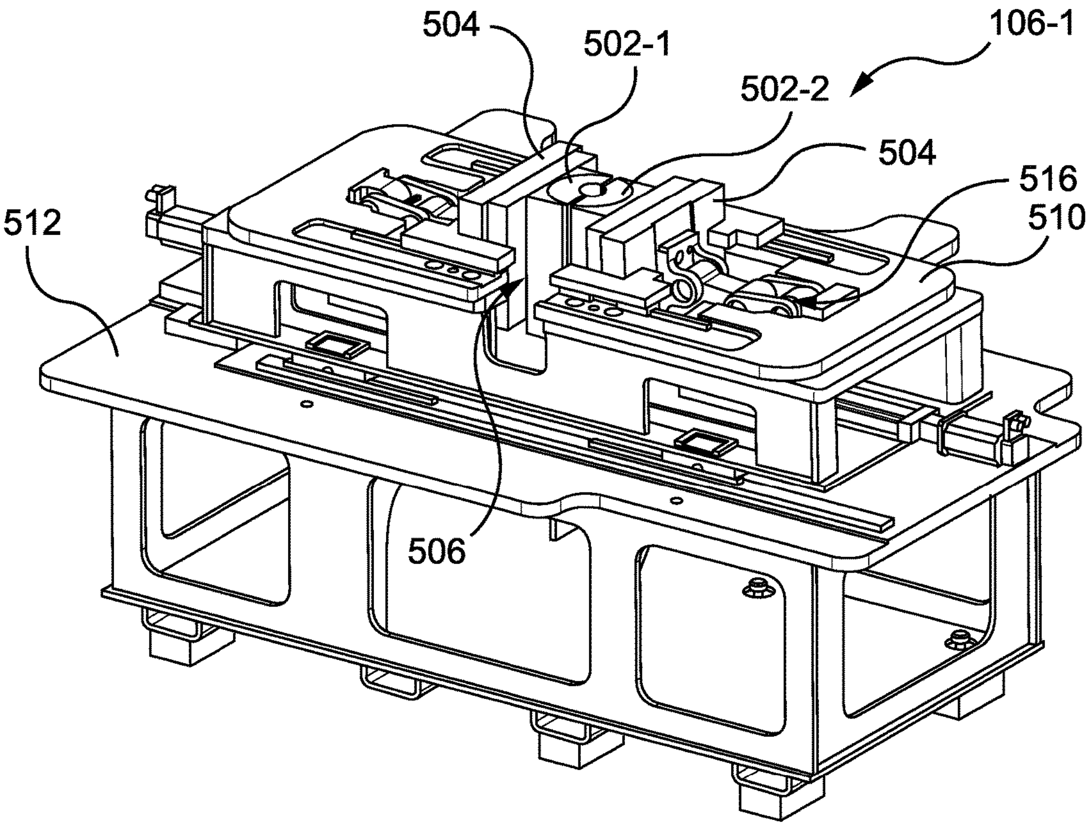
FIG. 41A is an isometric view of a shaping station.
Figure 41B:
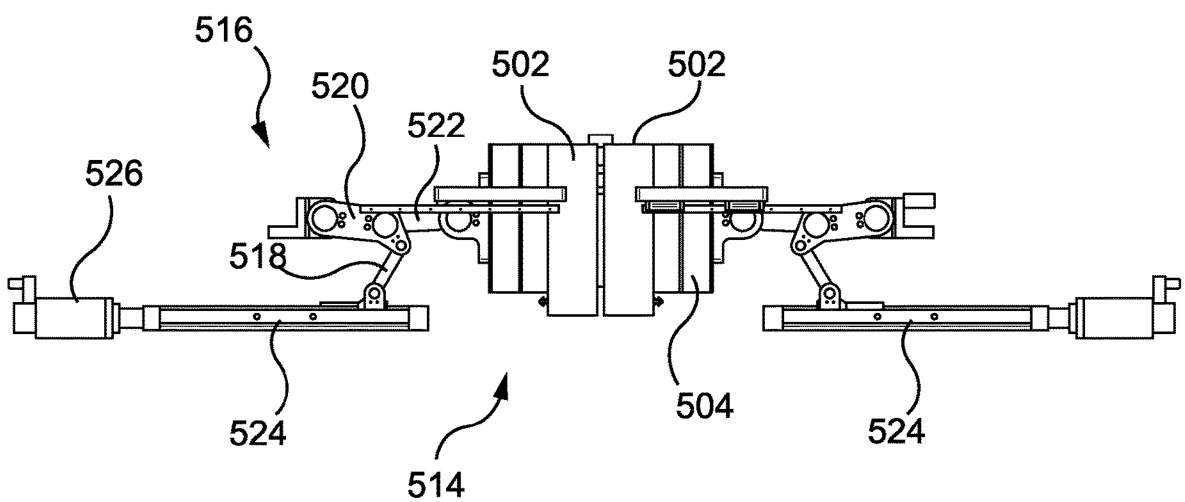
FIG. 41B is a side view of a press of the shaping station of FIG. 41.

FIGS. 41A-41B show a shaping station 106-1 of shaping cell 106 in greater detail.

As depicted, shaping station 106-1 is a stretch blow-molding station, for forming a hollow container from a molded workpiece. In an alternative embodiment, not shown, the shaping station is a liquid-molding station, wherein the operation of forming and filling of a container are combined. Station 106-1 includes a mold 500, defined by a plurality of mold sections 502-1, 502-2, . . . 502-*n* (individually and collectively, mold sections 502). In the depicted embodiment, mold 500 includes two sections 502-1, 502-2 and a bottom plug 503. However, more or fewer sections may be present.

Mold sections 502 are mounted to respective platens 504 of a press 506. Some or all of mold sections 502 are mounted to movable platens, so that the mold 500 can be opened to allow insertion of a workpiece or removal of a completed part, and so that the mold 500 can be clamped shut during molding.

Press 506 is mounted to a support frame 510 which is in turn removably mounted to a base 512. A clamping assembly 514 is mounted to support frame 510 and platens 504 are fixed to clamping assembly 514 for opening and closing of the platens.

Clamping assembly 514 is shown in greater detail in FIG. 47. In the depicted embodiment clamping assembly 514 has two linkages 516, each coupled to a respective platen 504.

Each linkage 516 is substantially identical to linkage 3070 depicted in FIG. 12D and has a drive link 518 and rockers 520, 522. Drive link 518 is coupled to a crosshead 524 which is driven in reciprocating motion by a linear actuator, such as a ball screw driven by an electric motor 526.

In other embodiments both platens may be driven by a single linkage. For example, the linkage may be substantially identical to any of linkages 3070', 3070'', 3070''', 3070''''.

Press 506, mold sections 502 and bottom plug 503 may be installed to and removed from a support base as a unitary assembly, substantially as described above with reference to shaper module 3054 of shaping station 104-1.

Shaping cell 106 is located close to conditioning cell 108 and lies within an area reachable by mandrel 408, such that mandrel 408 is able to reach stations of conditioning cell 108 as well as stations of shaping cell 106. In other words, mandrel 408 is capable of removing a workpiece from heating chamber 404 of conditioning station 108-1 and placing the workpiece in mold 500 of shaping station 106-1 for molding into a container.

A molding head 504 is mounted on a second mandrel 506 and is operable to inject pressurized fluid into a workpiece within mold 500 to expand the workpiece to conform to the mold. Molding head 504 has a grip assembly similar to grip assembly 412 of mandrel 408. The grip assembly comprises fixed and moving blocks 510, 512 and a compressible member 514 to frictionally grip workpiece 101' when squeezed between blocks 510, 512. Molding head 504 further comprises a fluid injection passage extending along an axis of mandrel 506 through which pressurized fluid (e.g. air or liquid) can be injected into workpiece 101'.

Figure 42:
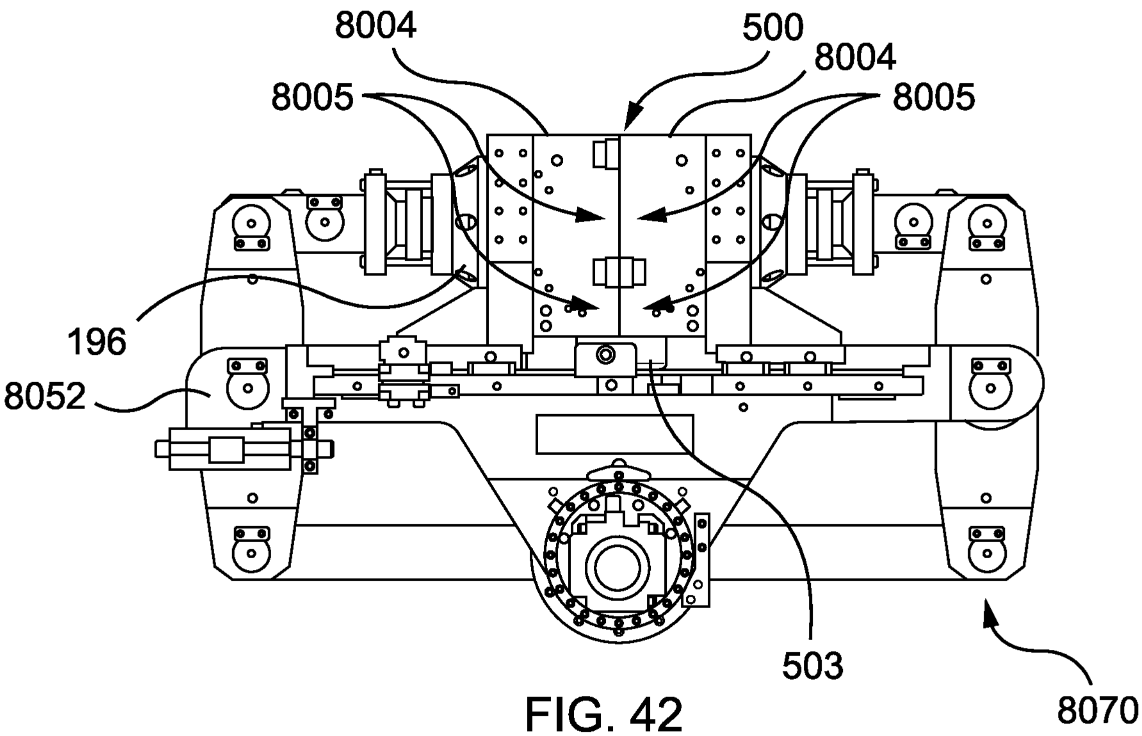
FIG. 42 is a side view of another shaping station.
Figure 43:
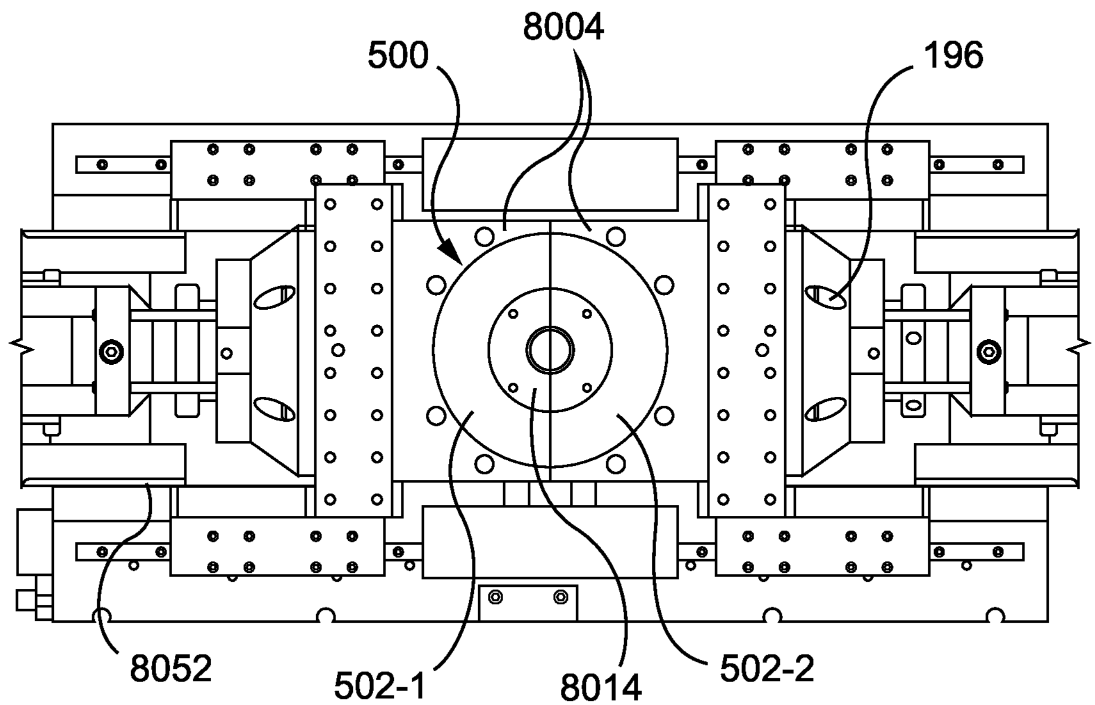
FIG. 43 is a top view of the shaping station of FIG. 42.

FIGS. 42-43 depict components of shaper station 106-1 in greater detail. As noted, mold 500 includes mold sections 502-1, 502-2 and a bottom puck 503. Mold sections 502-1 and 502-2 are mounted to platens 196 which are supported on a shaper frame 8052.

Platens 196 are movable by a clamp 8070 between open and closed positions. In the closed position, mold sections 502-1, 502-2 and bottom puck 503 mate to cooperatively define a mold cavity 8000. In the open position, platens 196 are spaced apart. In a first mode, mold sections 502-1, 502-2 are coupled to the platens so that a molded part may be removed. In a second mode, mold sections 502-1, 502-2 are de-coupled from platens 196, so that they can be removed as an assembly.

Shaper frame 8052 and clamp 8070 are substantially identical to shaper frame 3052 and clamp 8070.

Multiple interchangeable molds 500 may be present, each comprising a set of mold sections 502-1, 502-1 and bottom puck 503. Each mold defines a specific mold cavity 8000 in operation, for forming parts of a specific configuration. For example at any given time, a single mold 500 may be installed to platens 196 of a shaper station 106-1. The mold 500 may be interchanged with another mold, for example, to produce parts of a different configuration or for maintenance or repair.

Each mold section 502 is removably mounted to services block 8004. Each services block 8004 is in turn mounted directly to platen 196. Mold sections 502 may be formed of a relatively lightweight material such as an aluminum alloy. Services blocks 8004 may be formed of a suitable tool steel or a high-strength aluminum alloy.

During molding (as shown in FIGS. 42-43), clamp 8070 exerts a closing force on the mold 500. The closing force urges mold sections 502 against one another and provides mold conditions consistent with high-quality molded articles. However, mold sections 502 tend to be formed of relatively low-strength material. Accordingly, services blocks 8004 have load limiting features, namely, load limiting blocks 8005 formed in the opposing faces of services blocks 8004.

Under nominal molding conditions, load limiting blocks 8005 are spaced apart by a small margin. However, in the event that the load applied by clamp 8070 is excessive, mold sections 502 may deform or compress incrementally, such that load limiting blocks 8005 abut one another. In this condition, load limiting blocks 8005 bear at least part of the clamping load, and thus protect against further deformation of mold sections 502.

Figure 44:
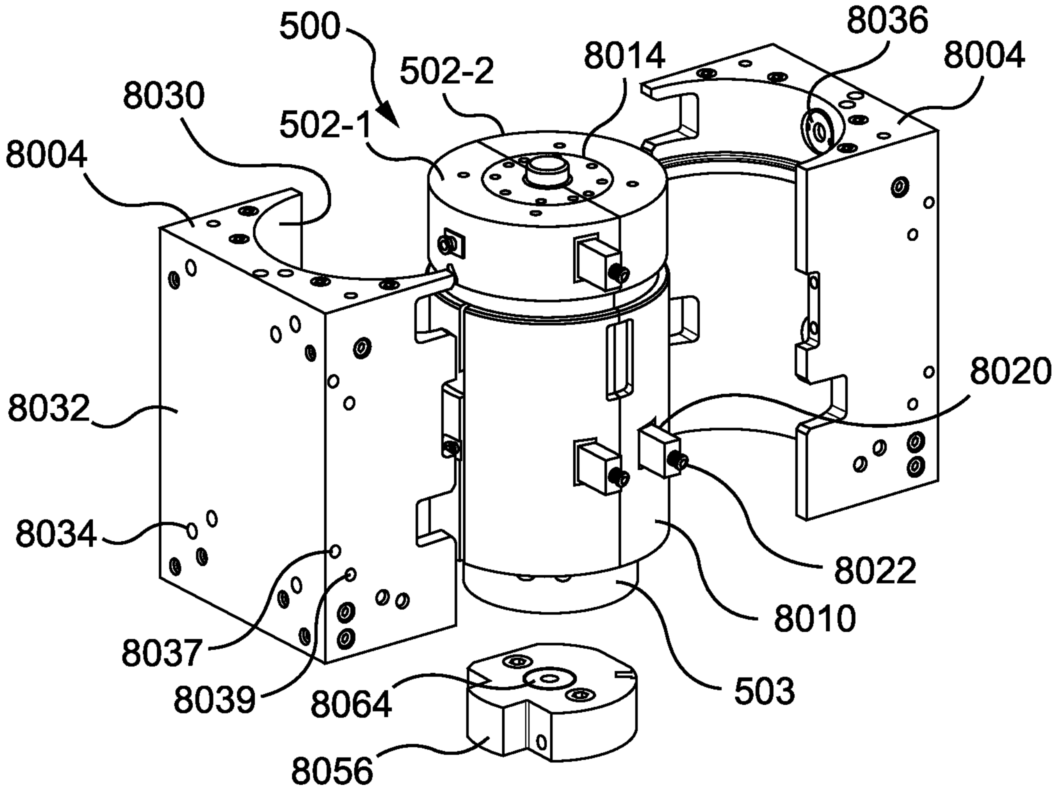
FIG. 44 is an exploded view of a mold and services plates of the shaping station of FIG. 42.
Figure 45:
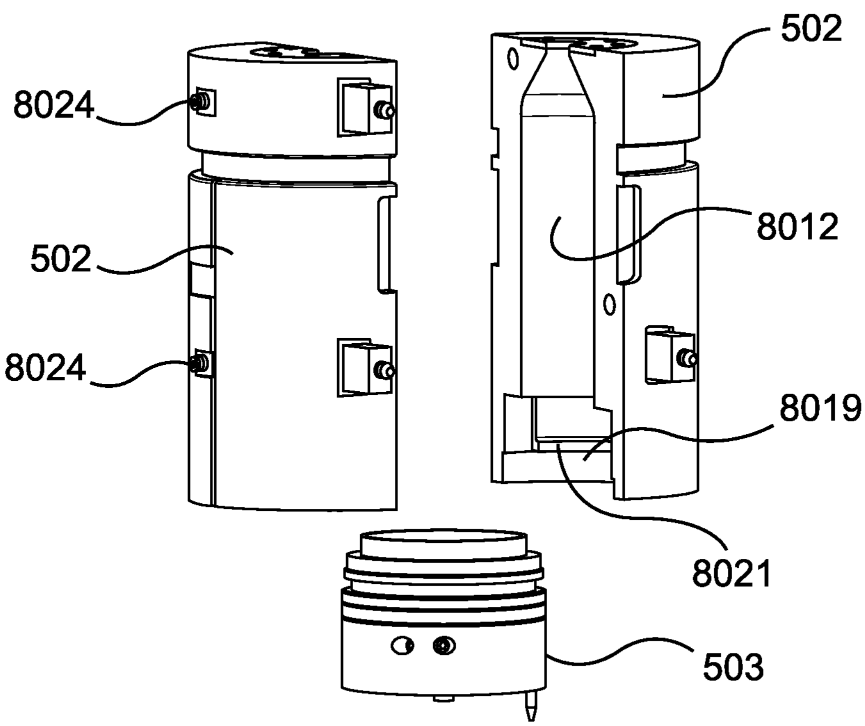
FIG. 45 is an exploded view of the mold of FIG. 44.

FIG. 44 shows an isometric view of mold 500 and services blocks 8004, with services blocks 8004 exploded from mold sections 502. FIG. 45 shows an isometric view of mold 500 with mold sections 502 and puck 503 exploded from one another. As depicted, each mold section 502 has a half-cylindrical outer surface and an inner surface 8012 shaped according to the desired configuration of mold cavity 8000 (and thus, of the produced parts).

Each mold section 502 has a support ledge 8014 at its top surface. Each support ledge 8014 is generally annular. In the closed position, with mold sections 502 abutting one another, the support ledges 8014 cooperate to define a mold opening. A preform from shaper cell 104 may be supported on support ledges 8014, such that a neck ring of the preform abuts support ledges 8014 and the preform extends into mold cavity 8000.

Mold sections 502 have handling studs 8020 which extend outwardly from their outer surfaces. Handling studs 8020 have connectors 8022 for engagement by a material handling device such as a robot. Mold sections 502 additionally have connectors 8024 on outer surfaces 8010 which, in operation, face towards services blocks 8004. As which be explained in further detail, connectors 8024 can be selectively engaged with corresponding connectors on services block 8004 to couple mold sections 502 to services blocks 8004.

As shown in FIG. 45, mold sections 502 have recesses 8019 at their lower ends. Recesses 8019 are half-cylindrical and are sized to cooperatively receive bottom puck 503 when mold 500 is closed (see FIG. 46). Semi-annular retaining flanges 8021 project inwardly from the walls of recesses 8019. When mold 500 is closed, flanges 8021 are received by and interlock with puck 503. Thus, puck 503 is captive as part of mold 500 when the mold is closed.

Each services block 8004 has a mold-facing surface 8030 and a rear surface 8032. Rear surface 8032 is shaped to mate to platen 196 and mold-facing surface 8030 is shaped to mate to the outer surface 8010 of a mold section 502. In the depicted embodiment, rear surface 8030 is generally planar and cavity block-facing surface 8030 is generally half-cylindrical.

Rear surface 8032 has a plurality of connectors 8034 which, in operation, align to corresponding connectors of platen 196. In the depicted embodiment, the connectors between services block 8004 and platen 196 are fasteners such as bolts. Dowels (not shown) may be installed to locate services block 8004 relative to platen 196.

Cavity block-facing surface 8032 has connectors 8036 which, in operation, face towards the corresponding mold portion 502 and align with connectors 8024. As noted, connectors 8036 and connectors 8024 may selectively engage one another to lock mold section 502 and services block 8004 together.

In the depicted embodiment, services blocks 8004 also has services connections. For example, electrical circuits connect sensors such as thermocouples, and power heating elements. Pneumatic circuits are be used to drive actuators, e.g. to control quick connection mechanisms. Water circuits provide cooling. As depicted, cooling and pneumatic services need not be routed to mold sections 502. Rather, pneumatic operation of connectors 8024/8036 is provided within services blocks 8004. Cooling fluid flows in a circuit through services blocks 8004, which cool mold sections 502 are cooled by conduction. In some embodiments, services connections are routed to lateral sides of services blocks 8004. Alternatively or additionally, services connections may be routed through platens 196 or through a discrete distribution plate mounted between each platen 196 and services block 8004.

In other embodiments, in addition to physical coupling by way of connectors, 8024, 8036, mold sections 502 and base plates 8004 may be connected with one or more services such as electrical, pneumatic and water circuits. For example, liquid cooling circuits may be defined in mold sections 502 and pneumatic lines may be defined in mold sections 502 for operation of connectors.

Services blocks 8004 have auxiliary pneumatic ports 8037, 8039. Auxiliary pneumatic ports 8037, 8039 are for providing a supply of pressurized air to operate connectors 8036. Port 8037 is for receiving a pressurized stream to center connectors 8036, 8024 relative to one another. That is, with a connector 8024 and a connector 8036 coupled together, a stream of pressurized air may be provided to port 8037 to briefly unload the connectors. Upon release of the pressurized air, the connectors return to nominal locked positions. Port 8039 is for receiving a pressurized stream of air to disengage connectors 8036, that is, to bias them to a released state in which connectors 8024 can be freely removed.

Figure 46:
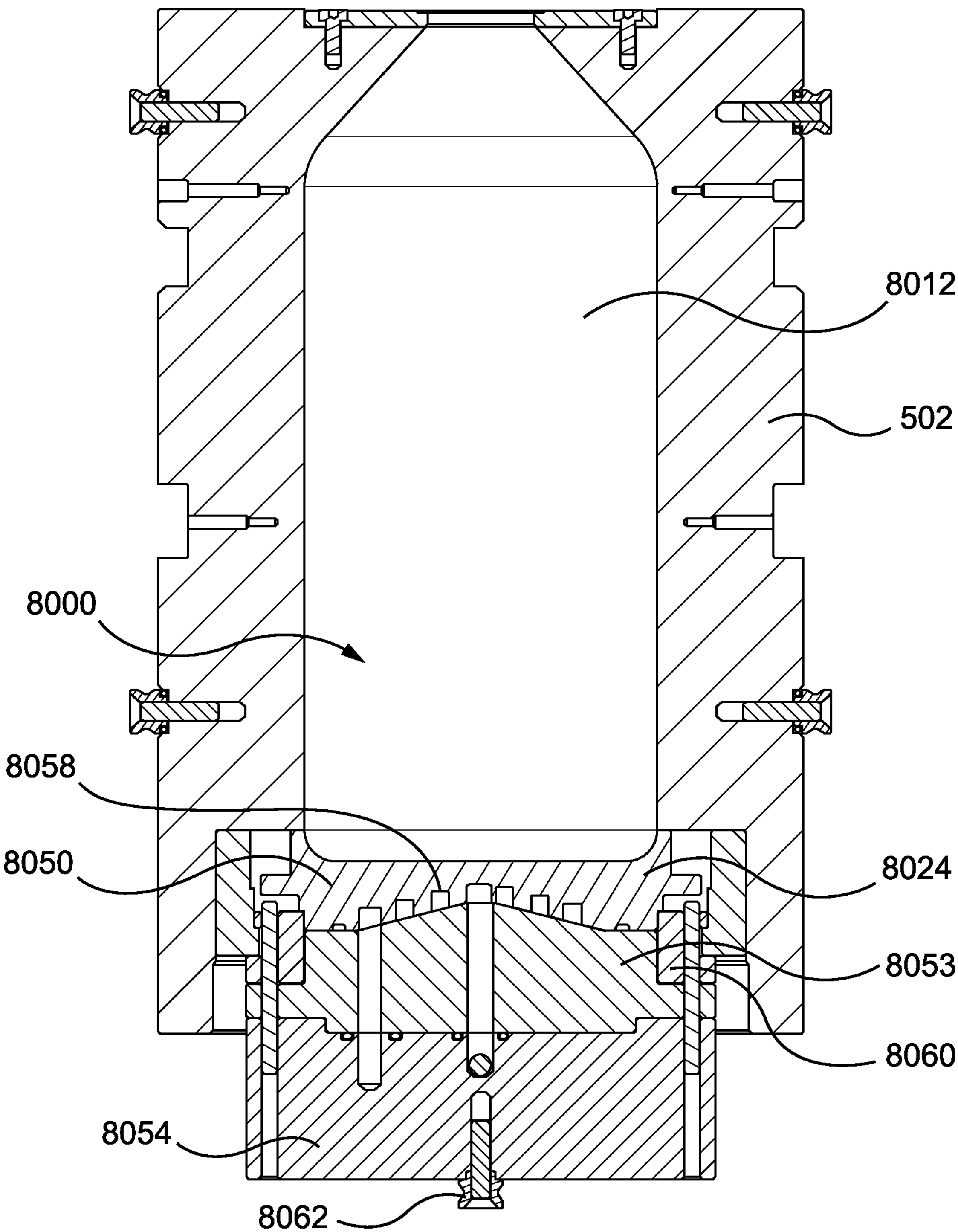
FIG. 46 is a cross-sectional view of the mold of FIG. 44.

Referring to FIG. 46, bottom puck 503 comprises a puck cavity block 8050, a puck base block 8053 and a connecting block 8054. Connecting block 8054 is in turn connected to an actuator block 8056. Puck 503 is movable as an assembly along an axis perpendicular to the closing axis of clamp 8070. Such movement may be affected, for example, by one or more linear actuators mounted beneath actuator block 8056 and supported on shaper frame 8052. The linear actuators may be, for example, servos, or hydraulic or pneumatic pistons.

Puck cavity block 8050 defines the bottom surface of mold cavity 8000 when mold 500 is closed. As will be appreciated, molding occurs at relatively high temperatures. Once the part has assumed its final shape, it is desirable to quickly cool the part to avoid deformation or other defects, and to enable the part to be removed. A thermal regulation circuit 8058 is defined between puck cavity block 8050 and puck base block 8053. Fluid such as water may be circulated through the circuit to promote removal or heat from the molded part or introduction of heat to the molded part.

Puck base block 8053 is mounted (e.g. bolted) to the underside of puck cavity block 8050. Base block 8053 has an annular lock ring 8060 fitted around its outer periphery. Lock ring 8060 defines a pocket in which locking flange 8021 of cavity blocks is received when mold 500 is closed, thereby locking base block 8053 connecting block 8054 and puck cavity block 8050 to mold sections 502.

Connecting block 8054 is mounted (e.g. bolted) to base block 8053. Connecting block 8054 has a connector 8062 on its underside which faces actuator block 8056 in operation. Connecting block 8054 further has one or more ports for services, such as pneumatic, cooling and electrical circuits. A flow path for cooling fluid extends from the port through base block 8053 and connecting block 8054 to cooling circuit 8058. Connecting block 8054 and actuator block 8056 may connect in fluid communication by way of quick-connection ports that couple to one another upon being brought together. Coupling may be automatic, e.g. electronically triggered and operated or spring-loaded and triggered by insertion.

Connector 8062 is received in a corresponding socket 8064 of actuator block 8056 (FIG. 43). Actuator block 8056 is configured to mate with linear actuators for movement of puck 503.

Any of connectors 8024, 8036, 8062, 8064 may be quick connectors. That is, any of connectors 8022, 8024, 8034, 8036 and may form quick connection mechanisms with their counterpart connectors. Such quick connection mechanisms may have characteristics as previously described above.

In the depicted embodiment, the quick connection mechanisms comprise studs projecting from mold sections 502 towards mating sockets defined in services block 8004, and connectors 8062 which are studs projecting from connection block 8054 towards mating connectors 8064 which are sockets defined in actuator block 8056.

As described above, the sockets are operable in engaged and disengaged states. In the disengaged state, a stud may freely pass into or out of the socket. In the engaged state, grippers in the socket are biased into interlocking engagement with the studs. The studs may be shaped such that interlocking by a socket biases a stud into a precise position relative to the socket. In other words, the quick connection mechanisms may locate mold sections 502 and services blocks 8004 relative to one another, as well as retaining them together.

The sockets of the quick connection mechanisms may, for example, be spring-biased to one operating state (e.g. the engaged state), and may be shifted to the other state (e.g., the disengaged state) by application of pneumatic pressure. Accordingly, pneumatic supply may be routed to services blocks 8004 for operation of the quick-connection mechanisms.

In the depicted embodiment, the quick connection mechanisms may be substantially similar to those depicted in FIG. 4H above. For example, the quick connection mechanisms may be model 305979 and 306050 connectors, manufactured and sold by Andreas Maier GMBH & CO. KG (AMF) of Germany Quick connection mechanisms for services ports such as fluid ports may be model 6989N and 6989M connectors, manufactured and sold by AMF.

Conveniently, coupling and de-coupling of mold sections 502 and services blocks 8004 by way of quick-connect couplings allows a mold 500 to be quickly and easily removed and substituted with another mold 500.

FIGS. 47-49 depict stages of changing a mold 500.

Figure 47A:
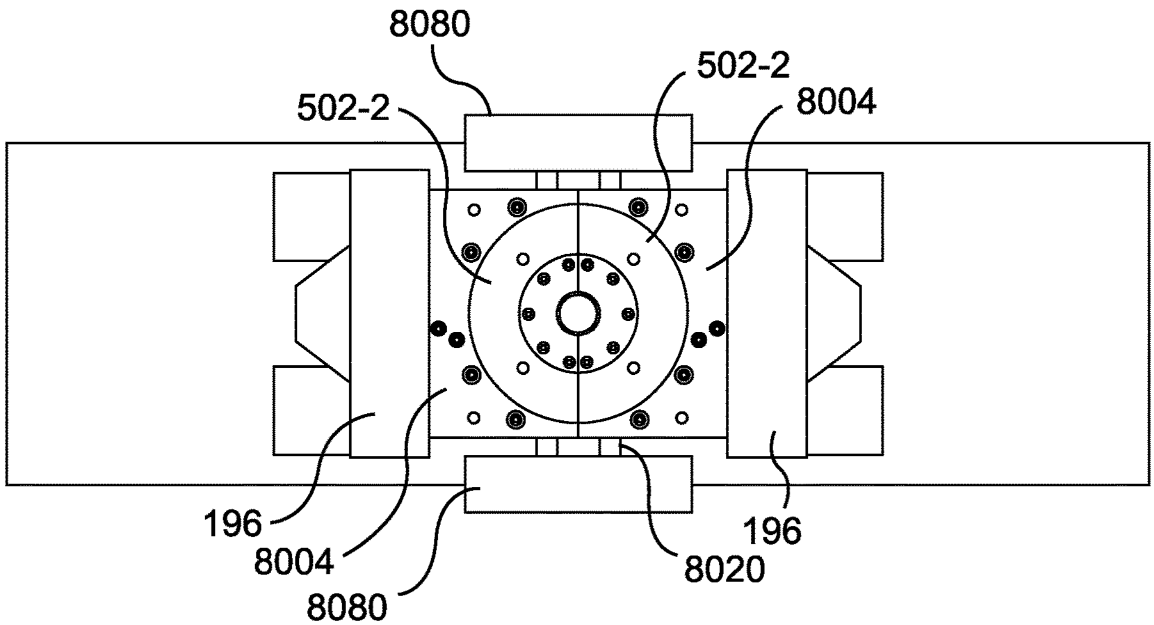
FIGS. 47A-47B are top and side schematic views of the shaping station of FIG. 42 during mold removal.
Figure 47B:
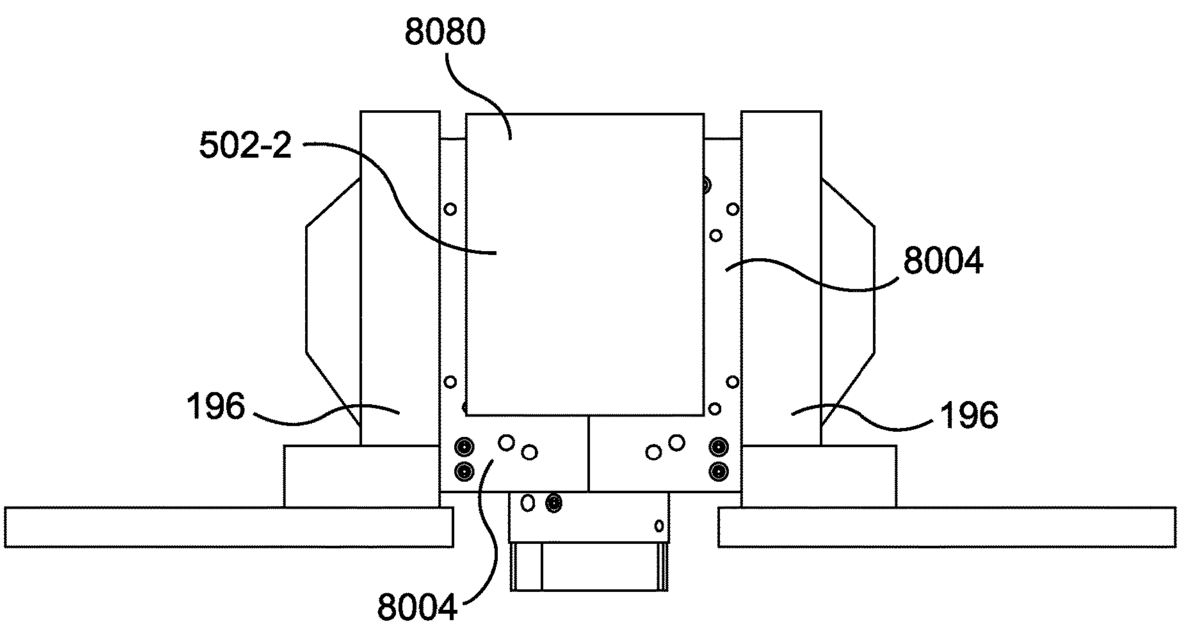

As shown in FIGS. 47A-47B, platens 196 are held in their closed positions, with mold sections 502-1, 502-1 abutting one another. With the mold in a closed position, material handling devices, namely, gripping plates 8080 mounted on robotic arms (not shown), move towards the lateral faces of mold 500. Gripping plates 8080 have connectors corresponding to handling connectors 8022 of mold sections 502. Specifically, the connectors of gripping plates 8080 are positioned and sized to mate to connectors 8022 of mold sections 502. In the depicted embodiment, connectors are sockets configured to matingly receive connectors 8022 to define a quick connection mechanism. In some embodiments, gripping plates 8080 may approach vertically. In other embodiments, the gripping plates may approach horizontally.

Figure 48A:
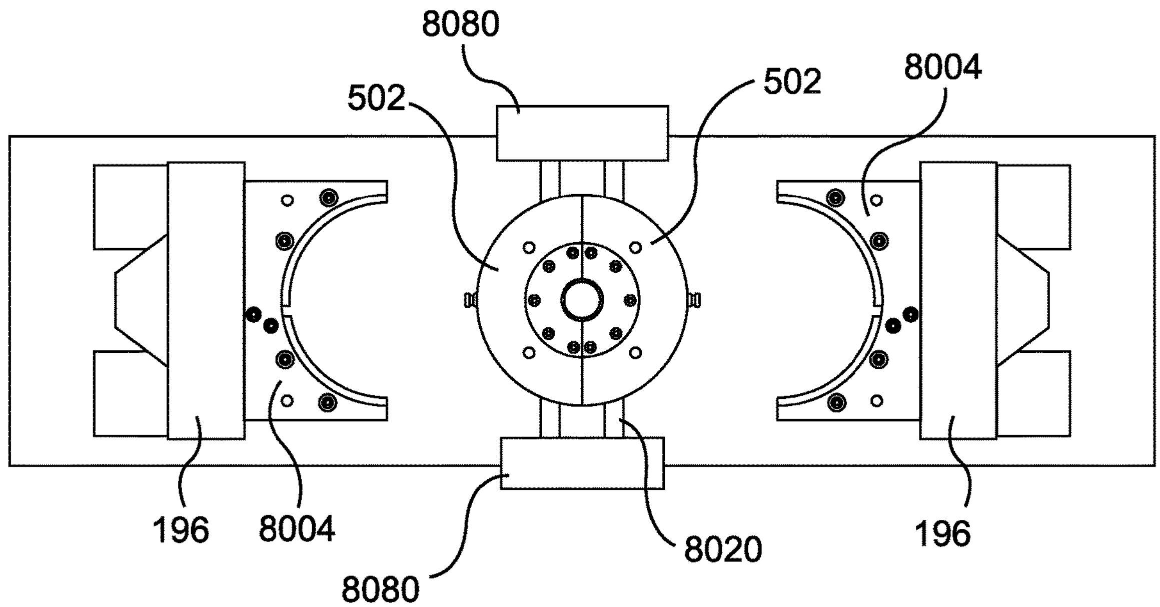
FIGS. 48A-48B are top and side schematic views of the shaping station of FIG. 42 during mold removal.
Figure 48B:
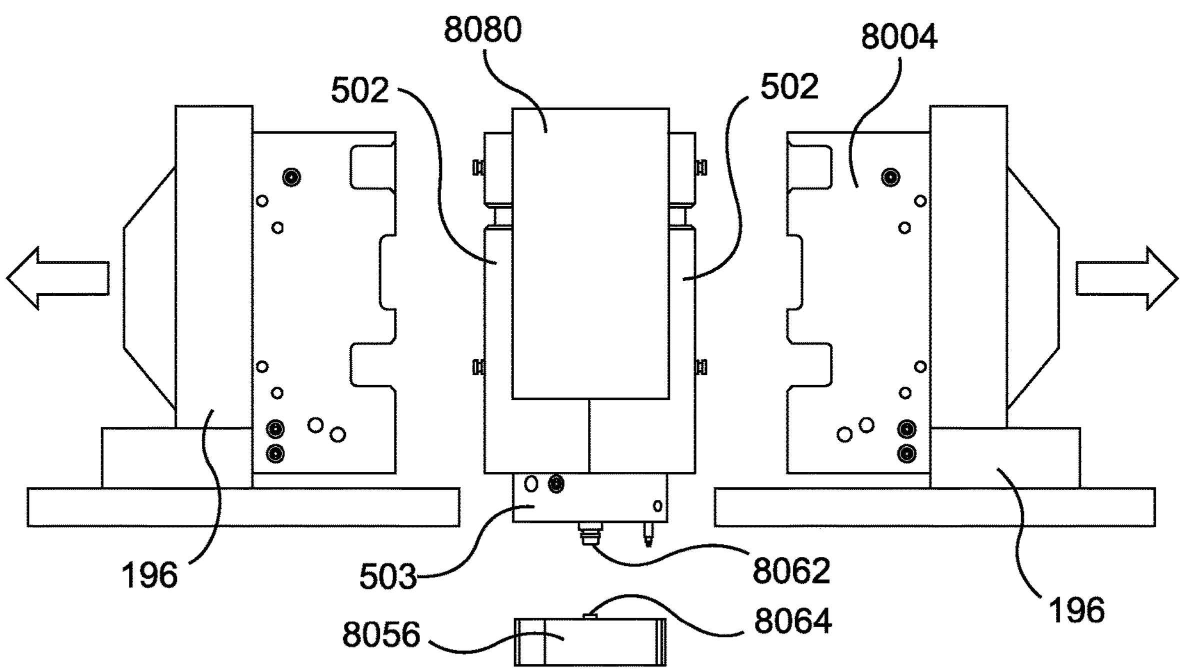

Once engaged with connectors 8022, as shown in FIGS. 48A-48B, gripping plates 8080 and their associated robot arms are capable of supporting and lifting mold 500 as a unitary assembly. Specifically, mold sections 502-1, 502-2 and puck 503 may be removed as an assembly.

After gripping plates 8080 engage connectors 8022, pressurized air is provided to auxiliary port 8039 of services block 8004. Application of pressurized air by way of auxiliary port 8039 causes connectors 8036 to release connectors 8024, thereby de-coupling mold sections 502 from services blocks 8004. In the depicted embodiment, the pressurized air is provided from a line associated with the shaper station 106-1. Alternatively, supply lines may be associated with gripping plates 8080.

Platens 196 and services blocks 8004 pull away from mold sections 502. Meanwhile, gripper plates 8080 hold mold sections 502 together.

Holding of mold sections 502 in assembly with services blocks 8004 likewise holds bottom puck 503 to the assembly. Specifically, semi-annular annular retaining flanges 8021 of mold sections 502 are held in registration with lock ring 8060 of bottom puck 503.

Connector 8062 of puck connecting block 8054 is released from actuator block 8058. The release may be affected, for example, by pneumatic actuation. Once connector 8062 is released, bottom puck 503 may be freely pulled away from actuator block 8058.

Figure 49A:
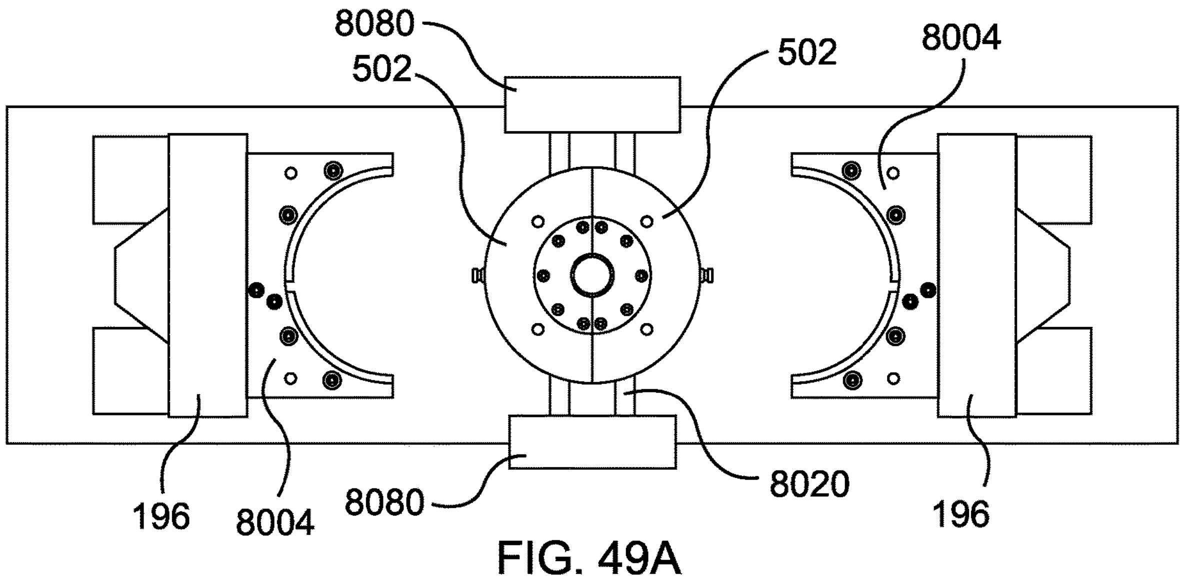
FIGS. 49A-49B are top and side schematic views of the shaping station of FIG. 42 during mold removal.
Figure 49B:
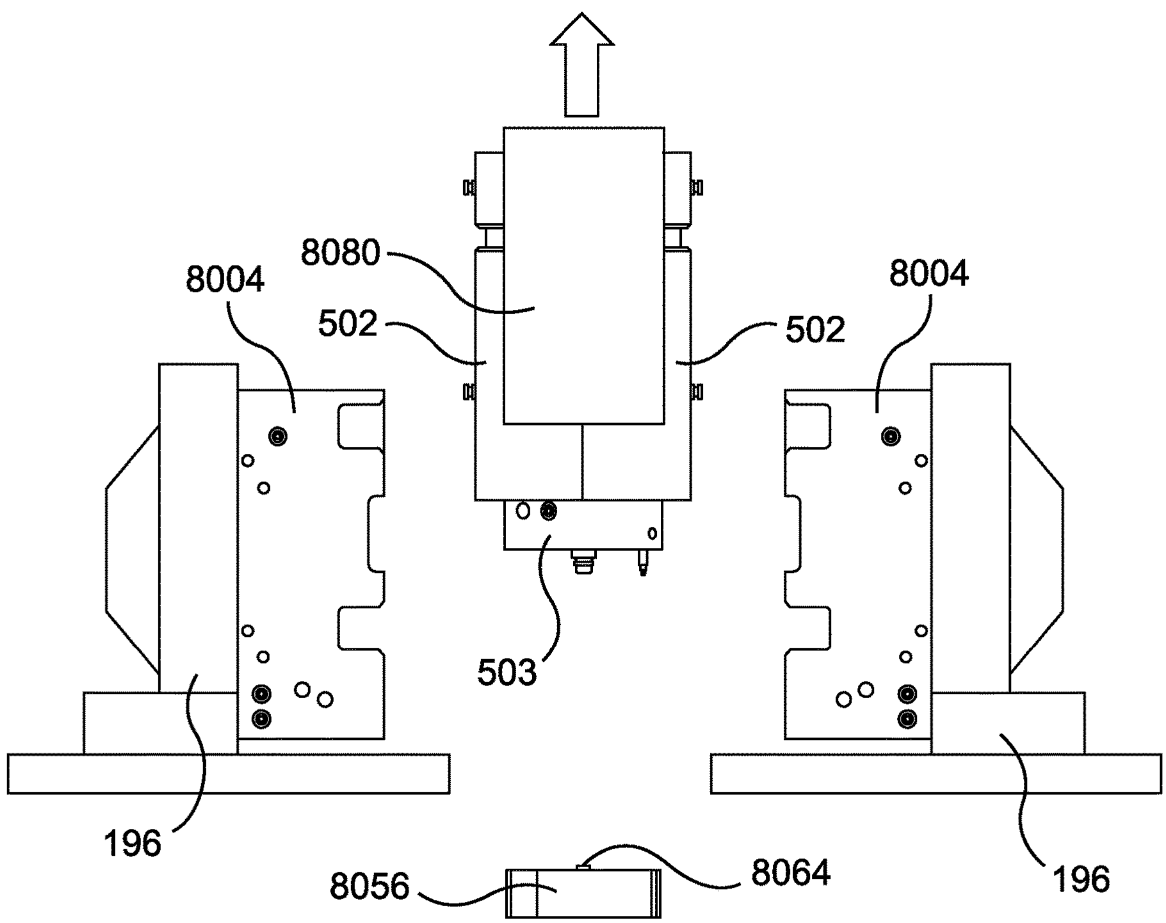
Figure 50:
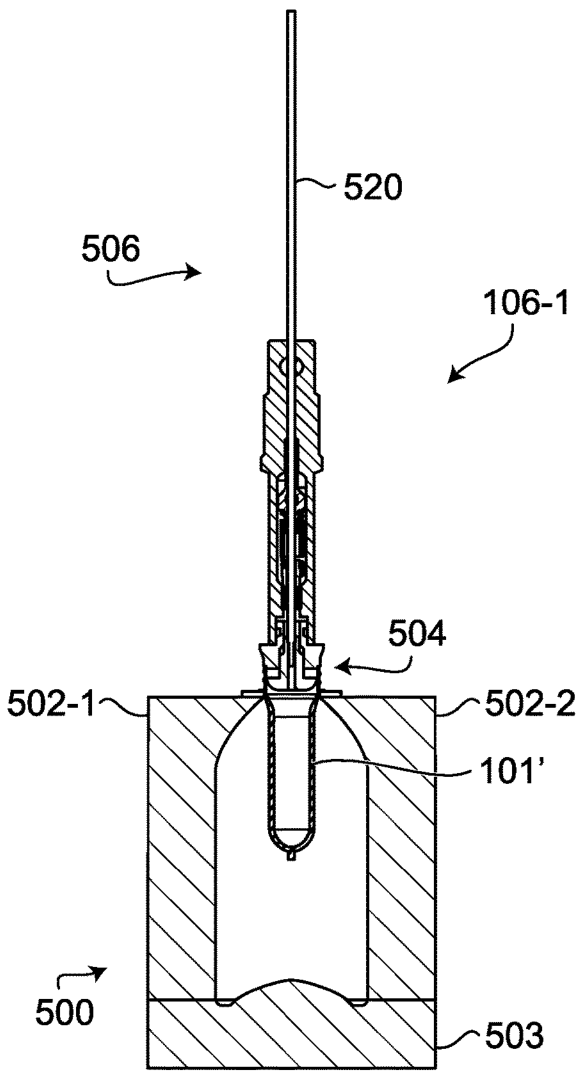
FIG. 50 is a schematic view showing mold components at a shaping station.

Gripping plates 8080 and the associated robot arms may then remove mold 500 as a single assembly, shown in FIGS. 49A-49B. Specifically, in the depicted embodiment, the robot arms lift gripping plates 8080 and mold 500 away from services blocks 8004, actuator block 8056 and platens 196.

Installation of a new mold 500 may follow.

Gripping plates 8080 and the associated robot arms interface with and lock to connectors 8022 of another mold 500.

Once the new mold 500 is engaged by gripping plate 8080, the robot arms position the new mold in shaper cell 106-1 for mounting of the new mold 500 to platens 196. Clamp 8070 then moves platens 196 and services blocks 8004 inwardly. Connectors 8024 of mold sections 502 align in registration with connectors 8036 of services blocks 8004. Connectors 8024, 8036 engage and lock together. A pneumatic supply may be provided to auxiliary port 8037 of services block 8004 to seat connectors 8024, 8036 together.

Actuator block 8056 is extended upwardly towards connecting block 8054 of bottom puck 503. Connector 8064 of actuator block 8056 and connector 8062 of connecting block 8054 are aligned with one another. Connector 8064 receives and locks with connector 8062 of connecting block 8054.

Once connector 8062 is received by connector 8064, connector 8064 is actuated to a closed shape, e.g. by application of pneumatic pressure. Bottom puck 503 is therefore locked to actuator plate 503.

Once base plates 8004 are coupled to services plates 8006, and bottom puck 503 is coupled to actuator plate 8056, mold 500 can be operated by clamping unit 8070 produce parts according to the configuration of cavity 8000.

In the depicted embodiment, swapping of molds 500 can therefore be accomplished relatively quickly and easily, with little or no manual setup. Indeed, connections between base plates 8004 and mold sections 502, and between actuator plate 8056, connecting block 8054, puck base block 8053 and puck cavity block 8050, may be entirely automated. For example, all of the connectors may be operated by actuators, such that they can be simply switched between locked and unlocked states.

Accordingly, shaper station 106-1 can be readily configured for molding a variety of parts in a variety of different shapes and sizes.

In the depicted embodiment, shaping station 106-1 is a stretch blow molding apparatus. A rod 520 extends within mandrel 506 and is extendible into workpiece 101' within mold 500 to mechanically stretch the workpiece. In other embodiments, stations of shaping cell 106 may be for other types of shaping operations. For example, stations of shaping cell 106 may be any suitable type of blow-molding apparatus.

FIGS. 51A-51D depict mold components of a shaping cell 106-1 at various stages of a shaping operation.

Mandrel 408 (FIGS. 39-40) carries workpiece 101' from conditioning cell 108-1 to a mold position within mold 500 of shaping cell 106-1. Grip assembly 412 releases the workpiece and mandrel 408 is withdrawn. Mandrel 506 moves to a position proximate mold 500.

Figure 51A:
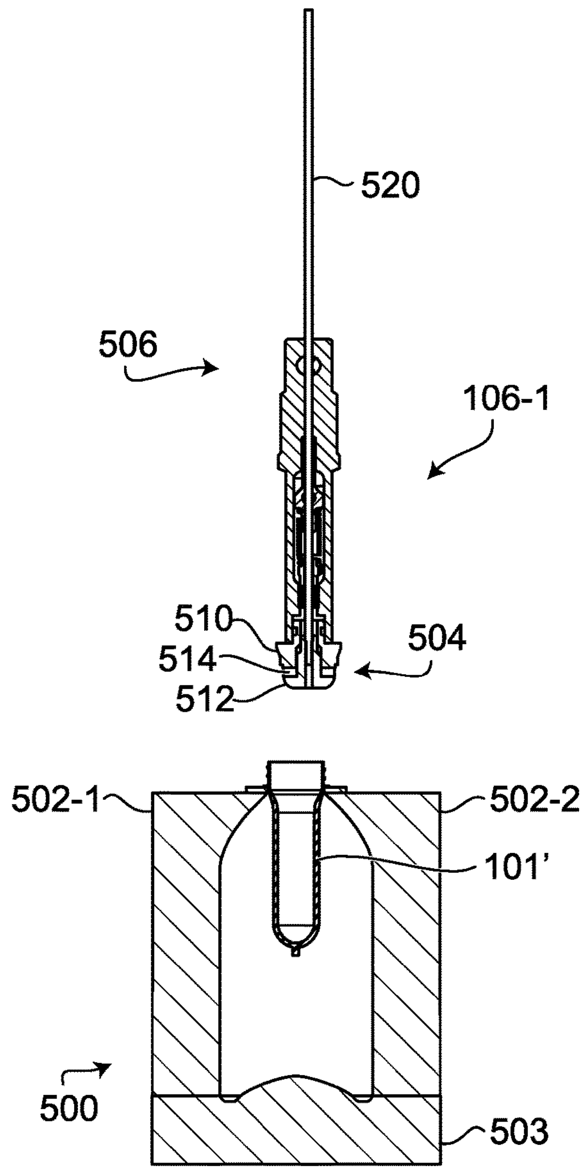
FIGS. 51A, 51B, 51C and 51D are schematic views showing stages of a shaping operation with the mold components of FIG. 50.
Figures 51B, 51C:
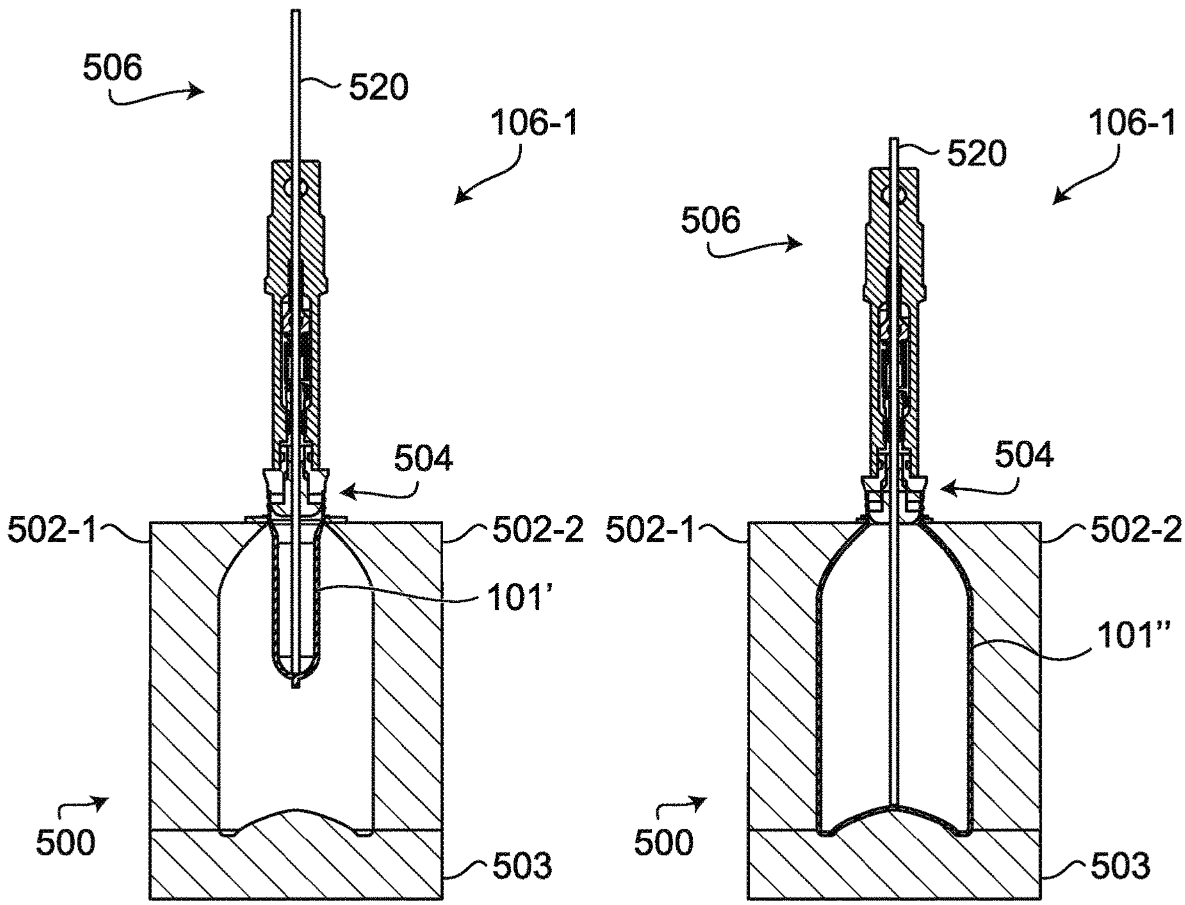
Figure 51D:
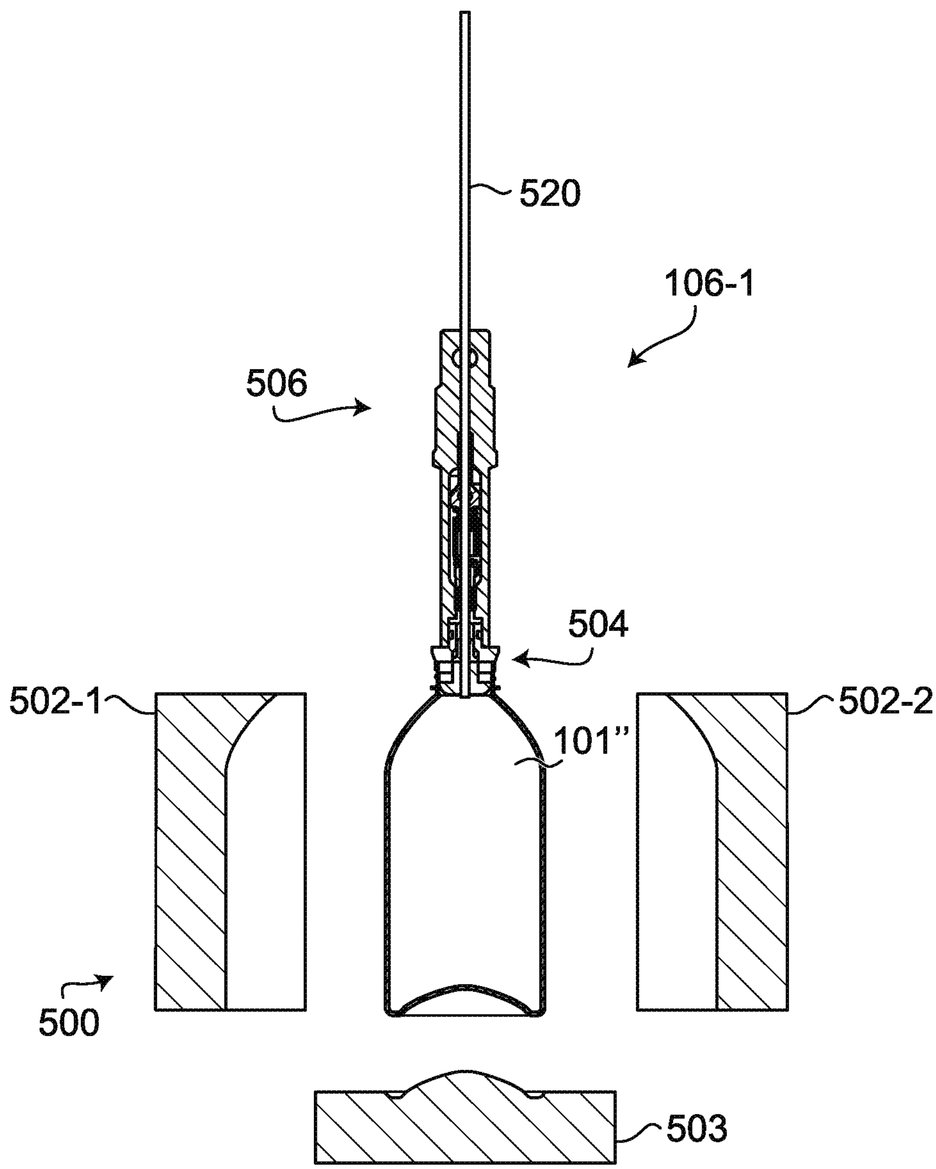

As shown in FIG. 51B, mandrel 506 moves toward workpiece 101' and grip assembly 508 extends into workpiece 101'. Compressible member 514 is squeezed into the workpiece to grip it. Rod 520 is extended into workpiece 101' and the workpiece is stretched by rod 520 and injection of pressurized air to conform to the shape of mold 500 (FIG. 37C). The stretched workpiece cools and hardens to form a final-shaped workpiece 101", e.g. a hollow container such as a bottle. Mold 500 is opened and workpiece 101" is removed by mandrel 508.

Transport Subsystem

With primary reference to FIGS. 52-66, details of example transportation systems will now be described.

As described above and shown in FIGS. 39-40 and 50-51, shaping cell 106 and conditioning cell 108 have associated mandrels 408, 506 that form part of transport subsystem 110. Each mandrel can reach a conditioning station 108-1, 108-2, . . . 108-*n* and a shaping cell 106-1, 106-2, . . . 106-*n*. In other embodiments, mandrels 408, 506 may be longer, such that a single mandrel is capable of reaching multiple conditioning stations and multiple shaping stations.

In other embodiments, one or both of mandrels 408, 506 may be replaced with one or more tracks 144. The tracks may include one or more loops and one or more branches connecting individual conditioning or shaping stations to the one or more loops.

Thus, as depicted, molding material is processed in four stages to produce a workpiece 101" such as a bottle. Specifically, molding material is dispensed at dispensing station 102-1 and shaped into a preform in a primary shaping operation, i.e. injection molding at shaping station 104-1. The preform is heated at conditioning station 108-1 to produce a temperature profile suitable for blow molding, and the heated preform is shaped into a final shape in a secondary shaping operation, i.e. stretch blow molding at shaping station 106-1.

The workpiece 101" so produced has specific characteristics according to the processing stages. For example, properties such as material type, colour and mass depend on the configuration of dispensing station 102-1. The shape of the bottle depends on the configuration of shaping station 104-1, conditioning station 108-1 and shaping station 106-1.

Dispensing stations 102-2, 102-3, 102-4 may be configured differently than dispensing station 102-1. For example, dispensing stations 102-2, 102-3, 102-4 may contain different feedstock materials and/or different colours.

Likewise, shaping station 104-1 may be configured differently from the other stations of shaping cell 104 and shaping station 106-1 may be configured differently from other stations of shaping cell 106. For example, each station of shaping cell 104 may have installed a mold defining a unique preform size and shape. Each station of shaping cell 106 may have installed a mold defining a unique bottle size and shape. A pre-shaped workpiece 101' having a given size, shape and weight may be transformed into any of multiple possible types of finished workpiece 101" (e.g. bottles of different sizes and shapes), depending on the shaping station 106 at which the pre-shaped workpiece is processed. Similarly, a station of shaping cell 106 may be used to form any of multiple possible types of finished workpiece 101", depending on the pre-shaped workpiece 101' that is used. For example, a larger pre-shaped workpiece 101'

Stations of conditioning cell 108 may also be configured differently to produce articles with different characteristics. For example, the final shape created at a station of shaping cell 106 may be influenced by the temperature profile of workpiece 101' at the beginning of shaping. That is, higher-temperature portions of workpiece 101' may be more readily re-shaped. Accordingly, a station of conditioning cell 108 may be configured to a produce a non-uniform temperature distribution in a workpiece 101' in order to result in non-uniform stretching, e.g. into an oblong shape.

Transport subsystem 110 flexibly interconnects stations of process cells 102, 104, 106, 108, such that molding system 100 can be rapidly configured to produce parts having varied characteristics. In some embodiments, multiple types of parts having different colours, shapes, sizes, or the like can be produced simultaneously.

Figure 52:
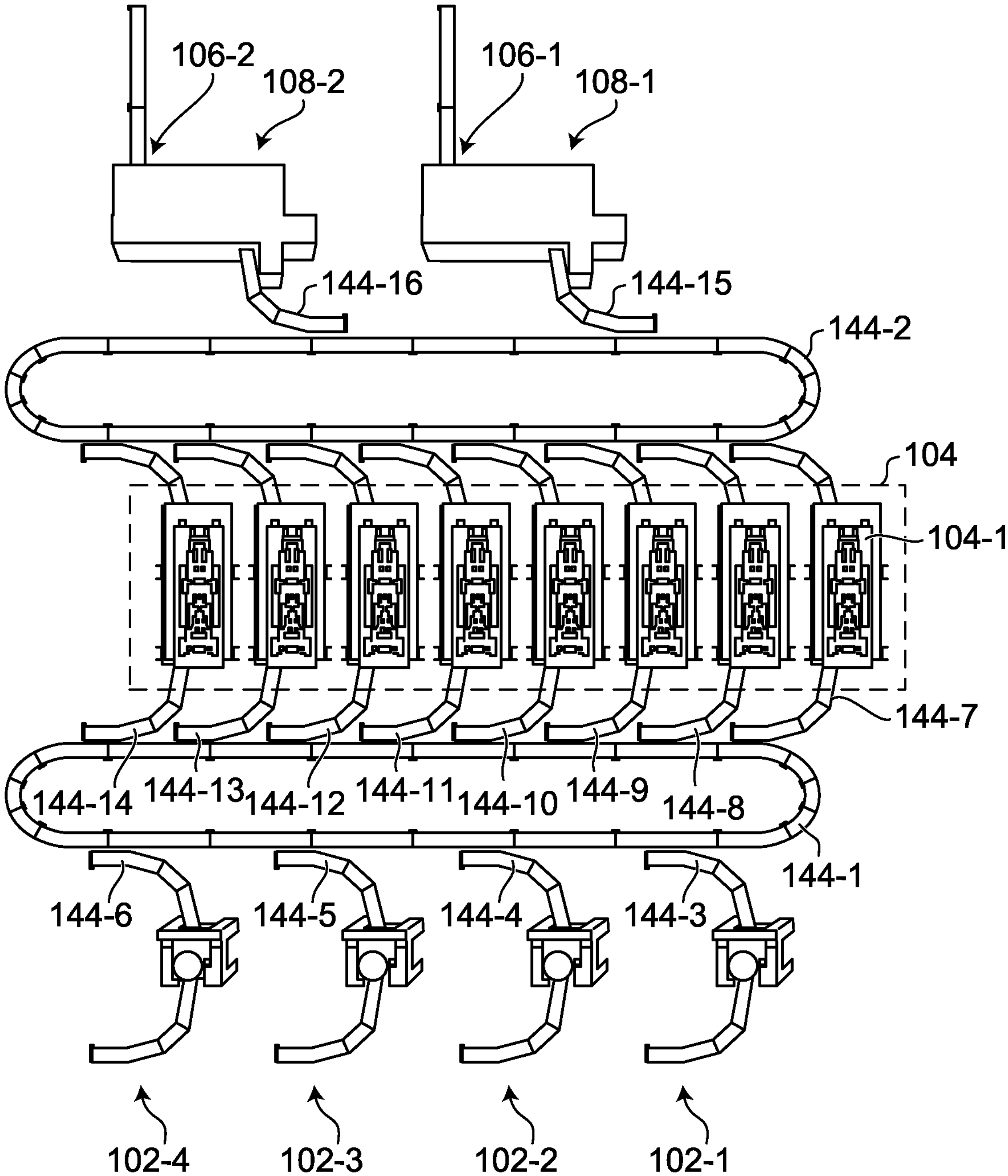
FIG. 52 is a top plan view of the molding system of FIG. 3, showing a transport subsystem.

FIG. 52 is an overhead plan view of system 100, showing an example configuration of transport subsystem 110.

As noted, in the depicted example, transport subsystem 110 includes a series of tracks 144. Tracks 144 are arranged in individual segments 144-1, 144-2, 144-3, . . . 144-*n*. Segments 144-1, 144-2 are shared loops for accessing any station of dispensing cell 102, shaping cell 104 and conditioning cell 108, respectively. Other segments are branches connecting the shared loops with individual stations or connecting shared loops together. In the depicted embodiment, 16 track segments are present, including two shared loops. However, more or fewer tracks may be present, including more or fewer shared loops, depending on the configuration of system 100. For example, the number of stations within each of process cells 102, 104, 106, 108 and the physical layout of the stations may influence the total number of tracks 144 and the number of shared loops of tracks 144. In some embodiments, transport subsystem 110 may not include any shared loops of tracks 144.

Each of tracks 144 is configured to releasably engage and retain carriages 125, 129. The carriages may, for example, be coupled to the tracks 144 by rollers which interlock with the tracks 144.

Alternative, carriages 125, 129 may be magnetically coupled to tracks 144. In some embodiments, carriages 125, 129 may be mounted to shuttles which themselves are coupled to and movable along tracks 144. In some embodiments, such coupling may be electromagnetic or may be achieved using suitable mechanical fasteners.

Carriages 125, 129 may be moved along tracks 144 by any suitable drive mechanism. In some embodiments, carriages 125, 129 may be coupled to a belt or chain drive carried on tracks 144. In other embodiments, carriages 125, 129 may be moved by electromagnetic drives. For example, the magnetic drive may comprise an array of driving electromagnetic induction coils which can be sequentially activated to lift and move a magnetized vessel 125, 129 along track 144. An array of electromagnetic detection coils may be positioned proximate the array of driving induction coils and may be used to detect and track the position of the vessels 125, 129.

As will be apparent from FIG. 52, paths through system 100 may include one or more of shared track loops 144-1, 144-2 as well as one or more individual track segments. For example, a path through dispensing station 102-1, shaping station 104-1, conditioning station 108-1 and shaping station 106-1 may require carriages 125, 129 to bear a workpiece along each of track loops 144-1, 144-2 and track segments 144-3, 144-7 and 144-15.

Transport subsystem 110 is equipped with a control system 1000 for directing and tracking the positions of carriages 125, 129. In some embodiments, the position of individual carriages 125, 129 may be tracked using a drive mechanism with a position encoder. In other embodiments, position of carriages 125, 129 may be tracked using a machine vision system, radio frequency tracking or other suitable techniques.

In some embodiments, a large number of carriages 125, 129 may simultaneously be carried on tracks 144. Accordingly, control system 1000 may maintain a data structure containing position data for each carriage 125, 129.

At some locations in transport subsystem 110, carriages 125, 129 may be transferred from one segment of track 144 to another segment of track 144. Such transfers may be affected by diverter units (not shown). For example, a diverter unit may be provided at each junction between a shared track loop 144-1, 144-2 with another track segment. Diverter units, under control of control system 1000 are operable to selectively engage a carriage 125, 129 remove the carriage from a first segment of track 144, move the carriage 125, 129 to a second segment of track 144, and disengage from the carriage once the carriage is coupled to the second segment of track 144. Diverter units may be activated based on measured position of carriages 125, 129 on track 144.

Thus, by operation of diverter units under control of control system 1000, each part produced by molding system 100 may follow a specific selectable path through the system 100.

Molding system 100 can therefore be configured to contemporaneously produce one or more parts of common or multiple types, in substantially any proportion. For example, parts may be produced in a lot size as small as one unit, i.e. a single part having a particular set of characteristics.

For example, in a specific configuration, dispensing cell 102 may include multiple stations with the same materials, while each station of shaping cells 104, 106 includes a mold of a unique shape. By coordinated operation of diverter units, any given dose of feedstock material may be directed through a sequence of process stations to produce a specific type of article, while a different arrangement of operation of diverter units would direct a dose of feedstock material through a different sequence of process stations, to produce a different type of part.

Transport subsystem 110 and the stations of process cells 102, 104, 106, 108 collectively define a large number of paths through molding system 100. For instance, a unique path corresponds to and is defined by each unique combination of a dispensing station; a shaping station of cell 104; a conditioning station of cell 108 and a shaping station of cell 106. In addition, in some embodiments, one or more of cells 104, 106, 108 may be bypassed. For example, in some cases it may be possible to immediately transport a workpiece from shaping cell 104 to shaper cell 106, without an intermediate conditioning step. This may be possible, for example, when the workpiece temperature following the first shaping operation is relatively high, and when the workpiece can be transported relatively quickly to a station of shaping cell 106, such that it does not lose significant heat, or when the shaping processes and molds are designed such that the temperature profile of a workpiece exiting a station of shaping cell 104 is ideal for a process to be performed at shaping cell 106.

Alternatively or additionally, in some embodiments, additional process cells may be present and may be included in some paths through molding system 100. For example, one or more of a bottle or preform coating cell, labelling cell, filling cell, capping cell or inspection cell may be present.

An inspection cell (not shown) may include a detection device positioned proximate part of transport subsystem 110, for observation of a workpiece such as a molded preform or a finished molded article as it is conveyed past the detection device. The detection device generally comprises a camera and an evaluation unit. Images of the workpiece are produced by the camera, the images being compared with setpoint values of a fault-free workpiece using image processing methods, in order to determine whether defects are present. The inspection cell may include further means for diverting molded articles that are considered defective.

Figure 53:
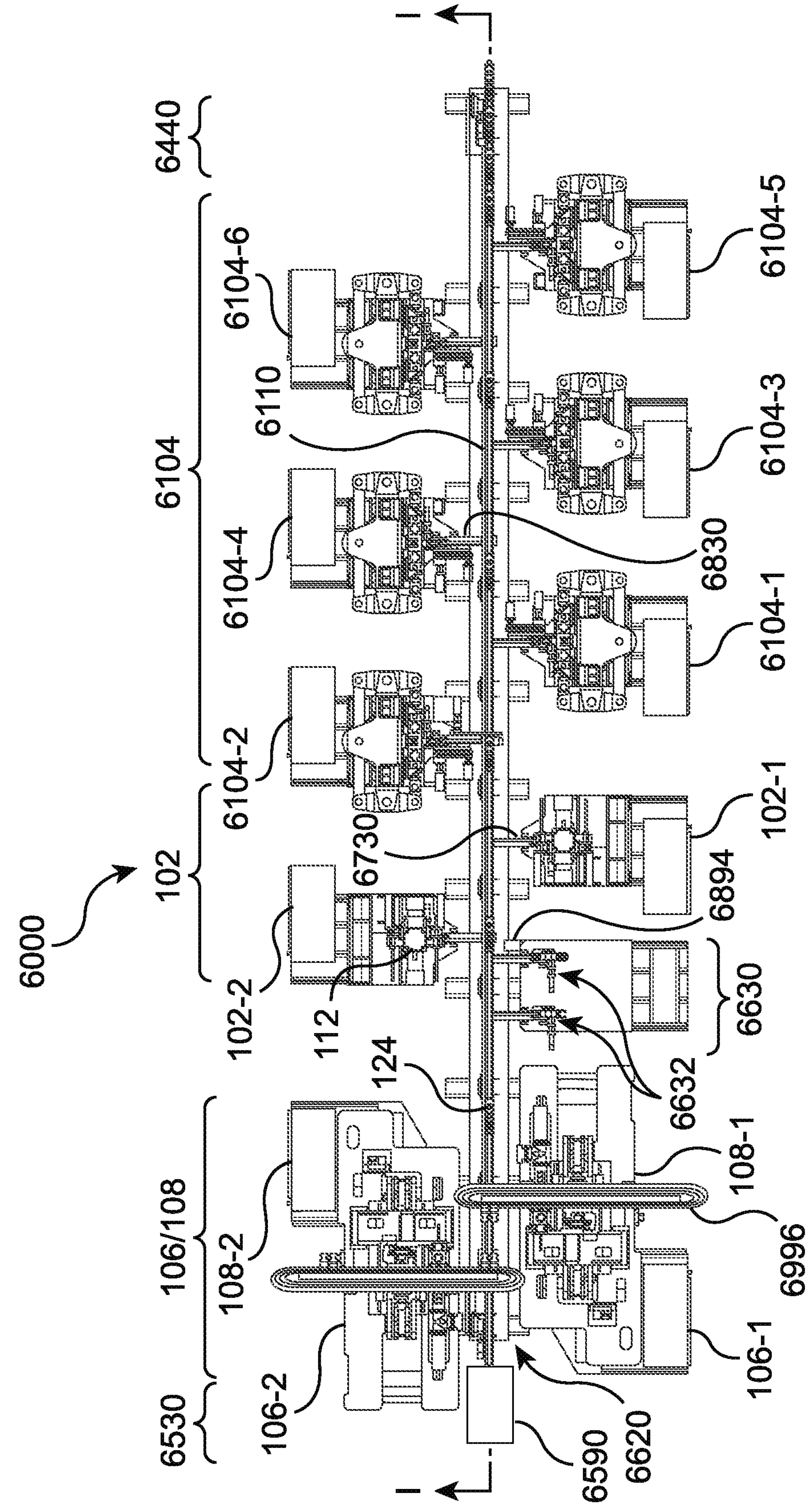
FIG. 53 is a plan view of an injection molding system in accordance with another embodiment.
Figure 54:
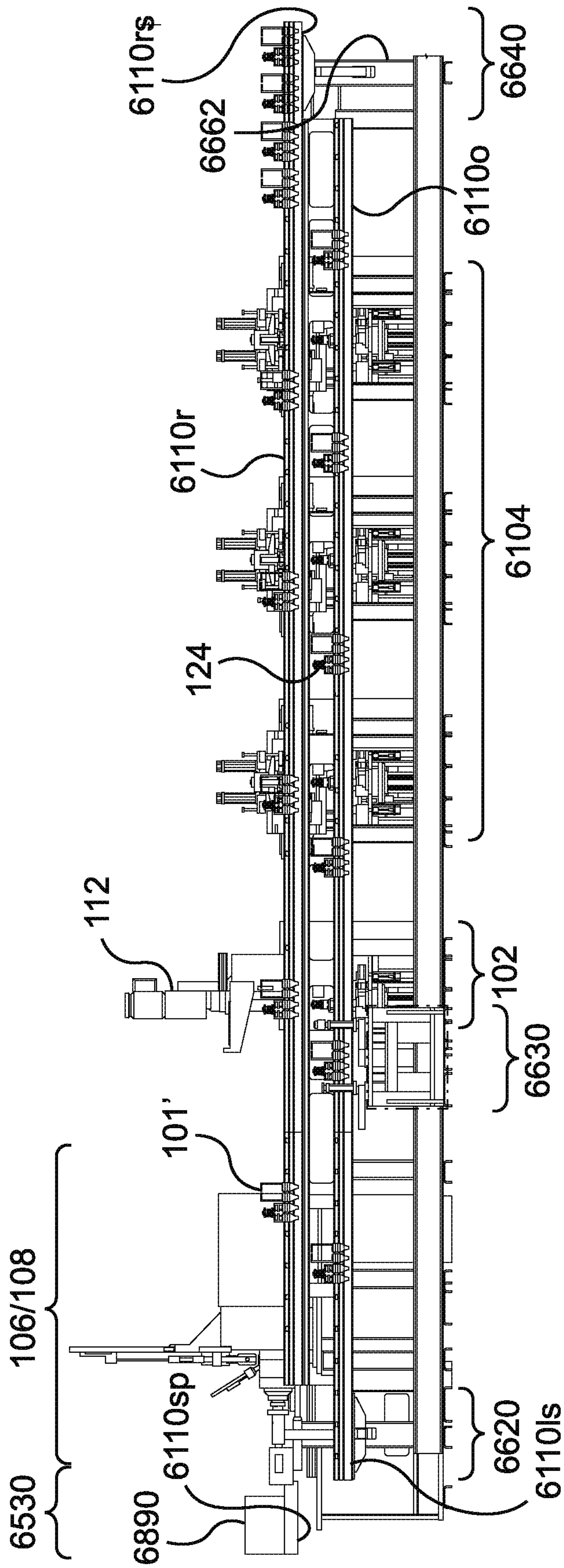
FIG. 54 is a cross-sectional view along the lines I-I of FIG. 53.

FIGS. 53 and 54 are plan and side views of an injection molding system 6000 made in accordance with another embodiment of the subject system. Parts of system 6000 which are the same as parts of system 100 are given like reference numerals.

In overview, molten molding material is transferred to individual vessels 124, which are then conveyed to subsequent process cells along a track 6110. The vessels are carried by independently controllable carriages and progress serially along an outgoing line of the track. A vessel may be stopped at a molten molding material dispensing cell 102 where a dose of molten molding material is dispensed from a molten molding material dispenser (which may also be referred to as a molten molding material station) 102-1, 102-2—which, in the illustrated embodiment is an extruder 112—into the vessel. The vessel is then advanced further along the track to a preform molding cell 6104 where the molten molding material is dispensed from the vessel to a preform molder (preform molding station) 6104-1, 6104-2, 6104-3, 6104-4, 6104-5, 6104-6. The vessel is then shunted to a return line. Preforms 101' molded at a preform molding cell are transferred to carriages on the return line. The return line runs past conditioning cell 108 and blow molding cell 106 where preforms on the return line are transferred to conditioners 108-1, 108-2 and blow molders 106-1, 106-2 and blow molded into articles. At the end of the return line, vessels are shunted back to the outgoing line, optionally after having been first parked at a buffering and cleaning cell 6530.

A controller monitors the location of each carriage, vessel, and preform and controls movement, so that the right vessel is filled with the right molten molding material, this molten molding material is dispensed to the right preform molder, and the preform formed at this molder is transferred to the right blow molder.

With this system, a variety of different blow molded articles can be made by providing differing preform molders and blow molders at cells along the track, and filling vessels with different doses and different compositions of molten molding material suited for ones of the preform and blow molders.

Figure 55B:
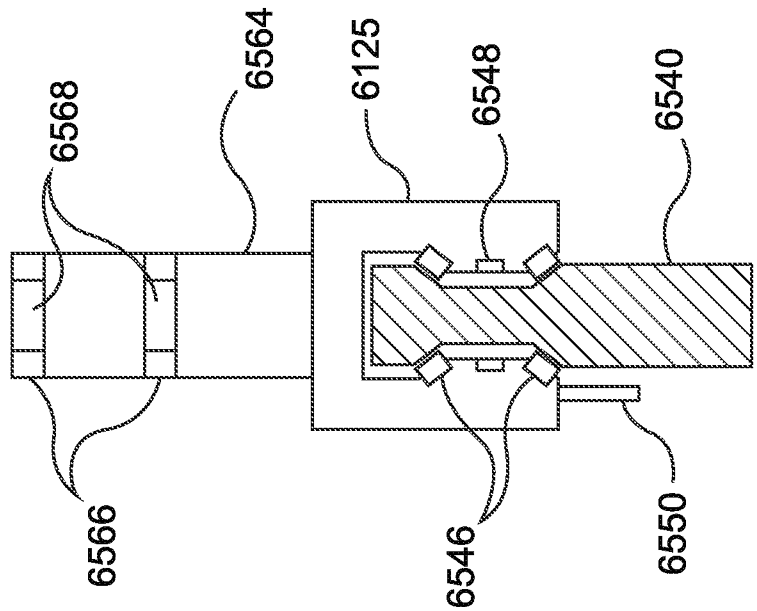
FIG. 55B is a cross-sectional view along the lines II-II of FIG. 55A.
Figure 55A:
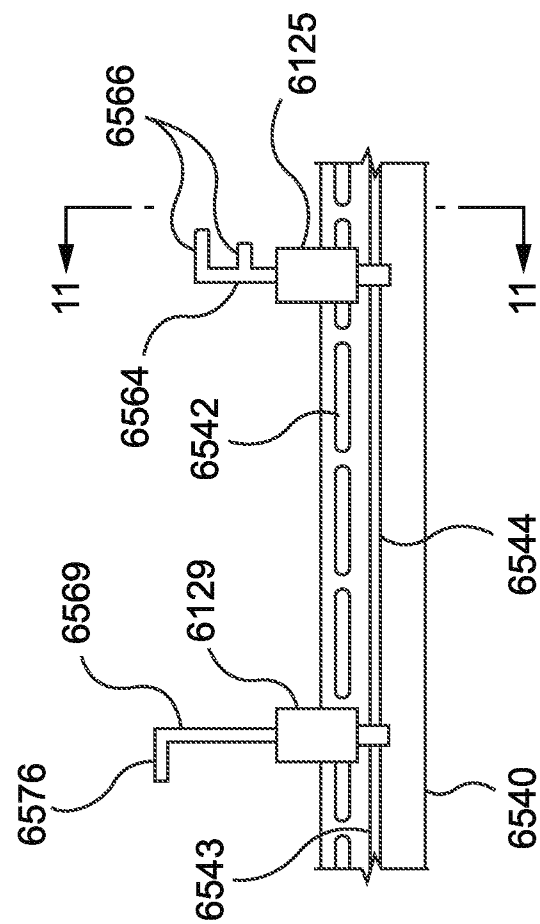
FIG. 55A is a side view of a track section.
Figure 55C:
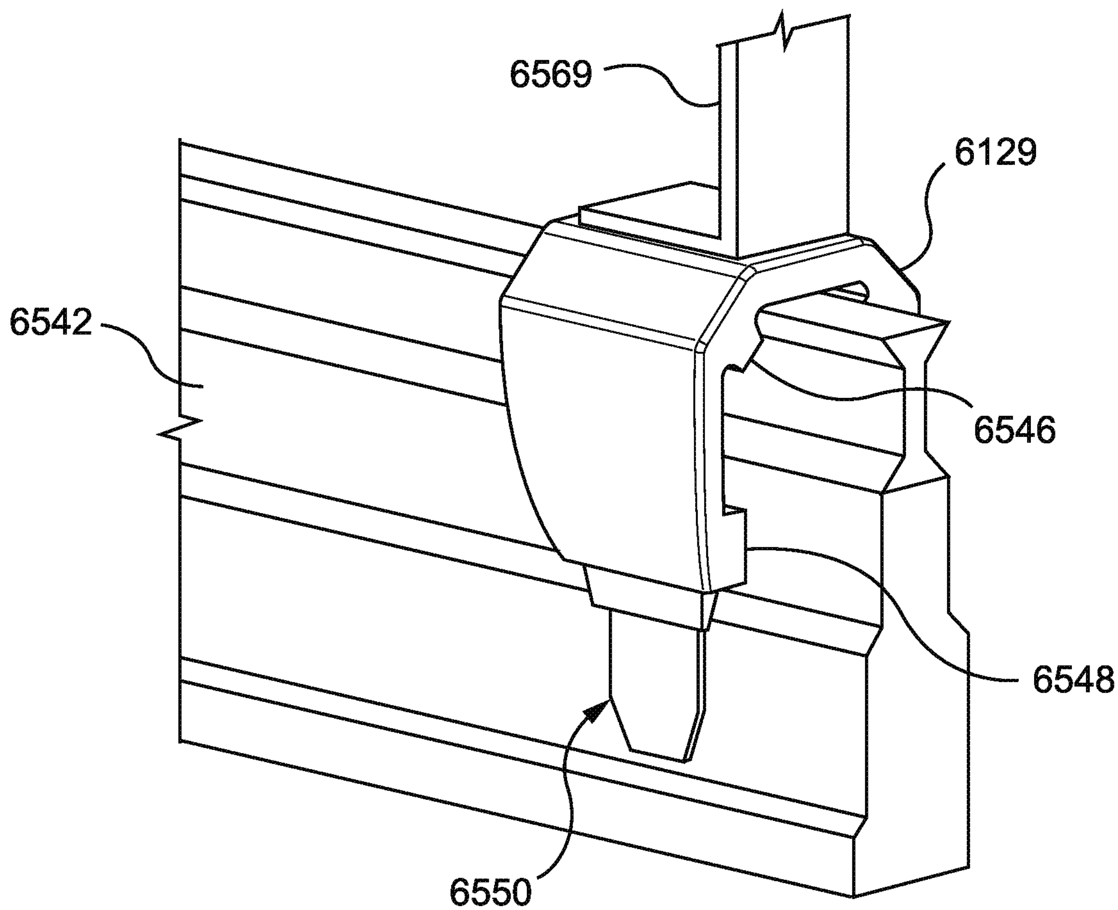
FIG. 55C is a perspective fragmentary view of a portion of the track of the system of FIG. 55A.

The track 6110 of injection molding system 6000 is made up of repeating segments. With reference to FIGS. 55A and 55C, each track segment 6540 has an array of electromagnets 6542 extending along its length. Each track segment also has a scale 6543 and an encoder output sensor 6544 extending along its length. The controller provides control voltages to the electromagnets of the track segments and is connected to the encoder output sensor.

Carriages ride on the track. With reference to FIGS. 55B and 55C, each carriage 6125, 6129 is supported on the track by rollers 6546 that ride on upper and lower track surfaces which prevent a carriage from lifting off the track. Each carriage has a series of permanent magnets 6548 and a position encoder flag 6550 that is responsive to the scale carried by the track to output position pulses sensed by the encoder output sensor of the track. With this arrangement, the controller remains aware of the current location, identity, and velocity of each carriage on the track and can independently move each carriage in either direction on the track by application of suitable control voltages to the electromagnets of the track.

Track 6110 and carriages 6125, 6129 may be those manufactured by Beckhoff Automation GmbH & Co. KG under the trademark XTS.

Returning to FIG. 54, the track of injection molding system 6000 has an outgoing line 61100, a parallel return line 6110*r* disposed directly above the outgoing line, a spur line 6110*sp* stood off from the left end of the return line, a left side shunt line 61101*s* that may be shifted from a lower position where it extends the outgoing line to a raised position where it extends the return line and joins the return line to the spur line, and a right side shunt line 6110*rs* that may be shifted from a lower position where it extends the outgoing line to a raised position where it extends the return line.

Figure 56:
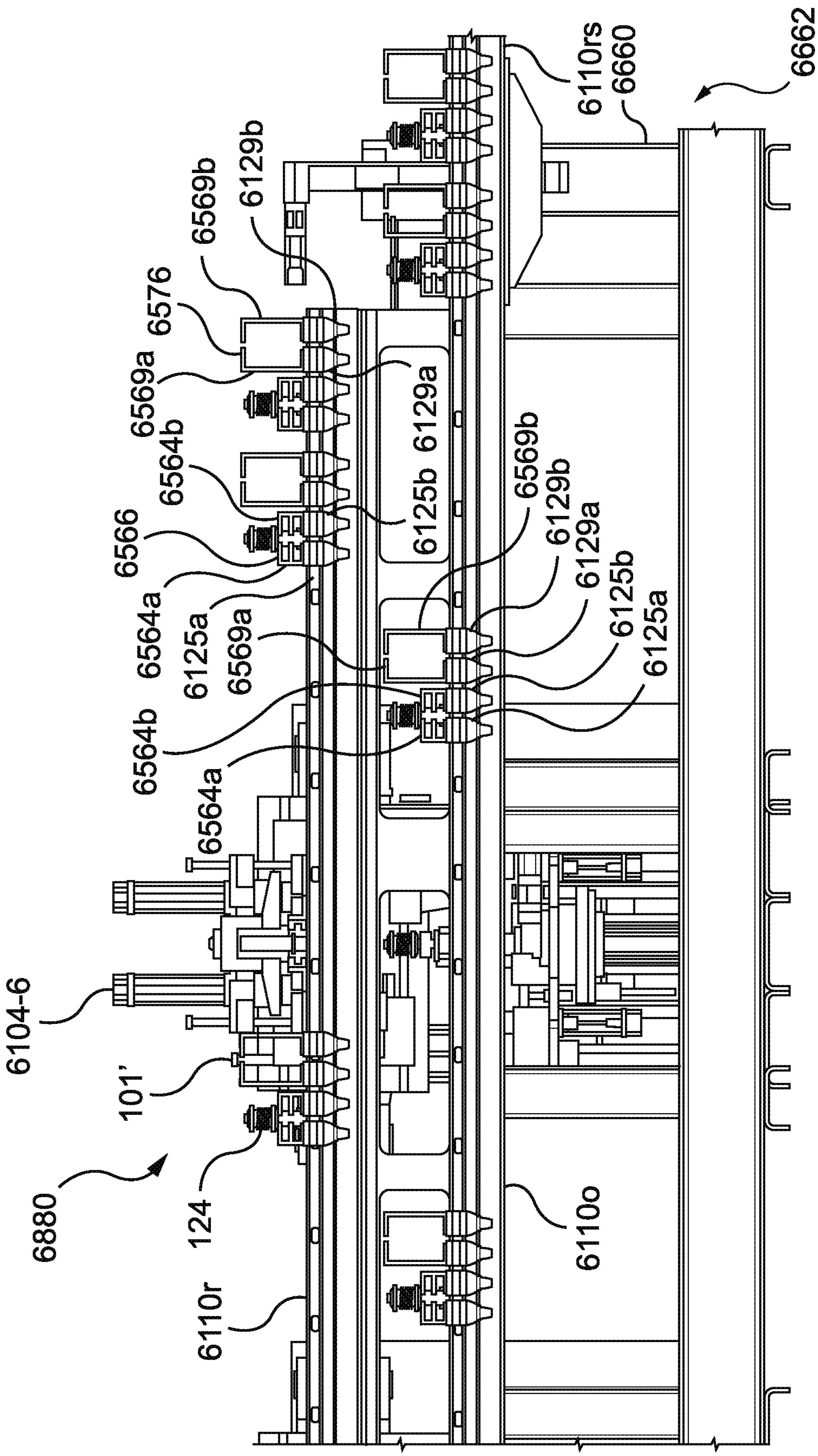
FIG. 56 is a side view of a portion of the system of FIG. 53.

Referring to FIG. 56 along with FIGS. 55A and 55B, an upwardly extending arm 6564 is attached to each carriage 6125 and an upwardly extending arm 6569 is attached to each carriage 6129. The arm 6564 of carriages 6125 has a pair of horizontally projecting flanges 6566, each of which terminates in a concave arcuate tip 6568. The upwardly extending arm 6569 of carriages 6129 has a horizontally projecting flange 6576 which terminates in a concave arcuate tip (not shown). The arms 6564, 6569 alternate in orientation from one carriage to the next such that a carriage 6125*a* on the outgoing line 6110*o* with rightwardly projecting flanges 6564*a* trails a carriage 6125*b* on the outgoing line 6110*o* with an arm having leftwardly projecting flanges 6564*b*. (On the return line 6110*r* this is reversed: a carriage 6125*a* on the return line 6110*r* with rightwardly projecting flanges 6564*a* leads a carriage 6125*b* with an arm having leftwardly projecting flanges 6564*b*.) With this arrangement, carriages can be grouped into pairs of adjacent carriages which have complementary features, namely flanges that are opposed to one another. The carriages 6125, 6129 with different lengths of arms are arranged such that, on the outgoing line 6110*o*, a pair of carriages 6129*a*, 6129*b* with longer length arms 6569*a*, 6569*b* leads a pair of carriages 6125*a*, 6125*b* with shorter length arms 6564*a*, 6564*b*. (On the return line 6110*r* this is reversed: a pair of carriages 6125*a*, 6125*b* with shorter length arms leads a pair of carriages 6129*a*, 6129*b* with longer length arms.)

The flanges 6566 of the shorter arms are configured so that an opposed pair of such flanges, when moved toward each other, will fit within the annular notches 1255, 1256 (FIG. 7A) of a vessel 124 and trap (pinch) the vessel between the pair of flanges. Moreover, the length of the shorter arms is such that, with a vessel trapped between a pair of flanges, the vessel clears the base of the carriages 6125 below the vessel. The flanges of the longer arms are configured so that an opposed pair of such flanges, when moved toward each other, will extend around a preform workpiece 101' (FIGS. 29J and 68) below the lip 6570 (FIG. 60) of the preform such that the lip 6570 of the preform will be supported on the opposed flanges.

Returning to FIGS. 53 and 54, the injection molding system 6000 is divided into a number of cells. Cells that are used along the outgoing line 6110*o* are, from left to right, a left side shunting cell 6620, a re-ordering cell 6630, a molten molding material dispensing cell 102, a preform molding cell 6104 and a right side shunting cell 6640. Cells that are used along the return line are, from right to left, the right side shunting cell 6640, the preform molding cell 6104, conditioning and blow molding cell 106/108, the left side shunting cell 6620, and a buffering and cleaning cell 6530.

Each shunting cell 6620, 6640 comprises a shunt line and an elevator to which the shunt line is mounted. Returning to FIG. 56, the right side shunt line 6110*rs* is attached for sliding movement on vertical pillar 6660. The vertical pillar is essentially a track segment with a series of electromagnets, like track segment 6540. Magnets (not shown) are mounted to the shunt line 6110*rs* such that the shunt line is a carriage riding on the pillar. The controller is connected to a control input of the pillar. With this arrangement, the pillar acts as an elevator 6662 for the shunt line 6110*rs* to move the shunt line between the lower outgoing line 6110*o* and the upper return line 6110*r*. It will be apparent that when the right side shunt line is vertically aligned with the outgoing line, the shunt line abuts the right side end of the outgoing line 6110*o* and effectively lengthens the outgoing line. Similarly, when the shunt line is vertically aligned with the return line 6110*r*, the shunt line abuts the right side end of the return line and extends the return line. The left side shunt line is configured in like manner, however, additionally, when the left side shunt line is aligned with the return line, it also abuts the end of the spur line 6110*sp* (FIG. 54) so as to join the return line 6110*r* to the spur line.

Figure 57:
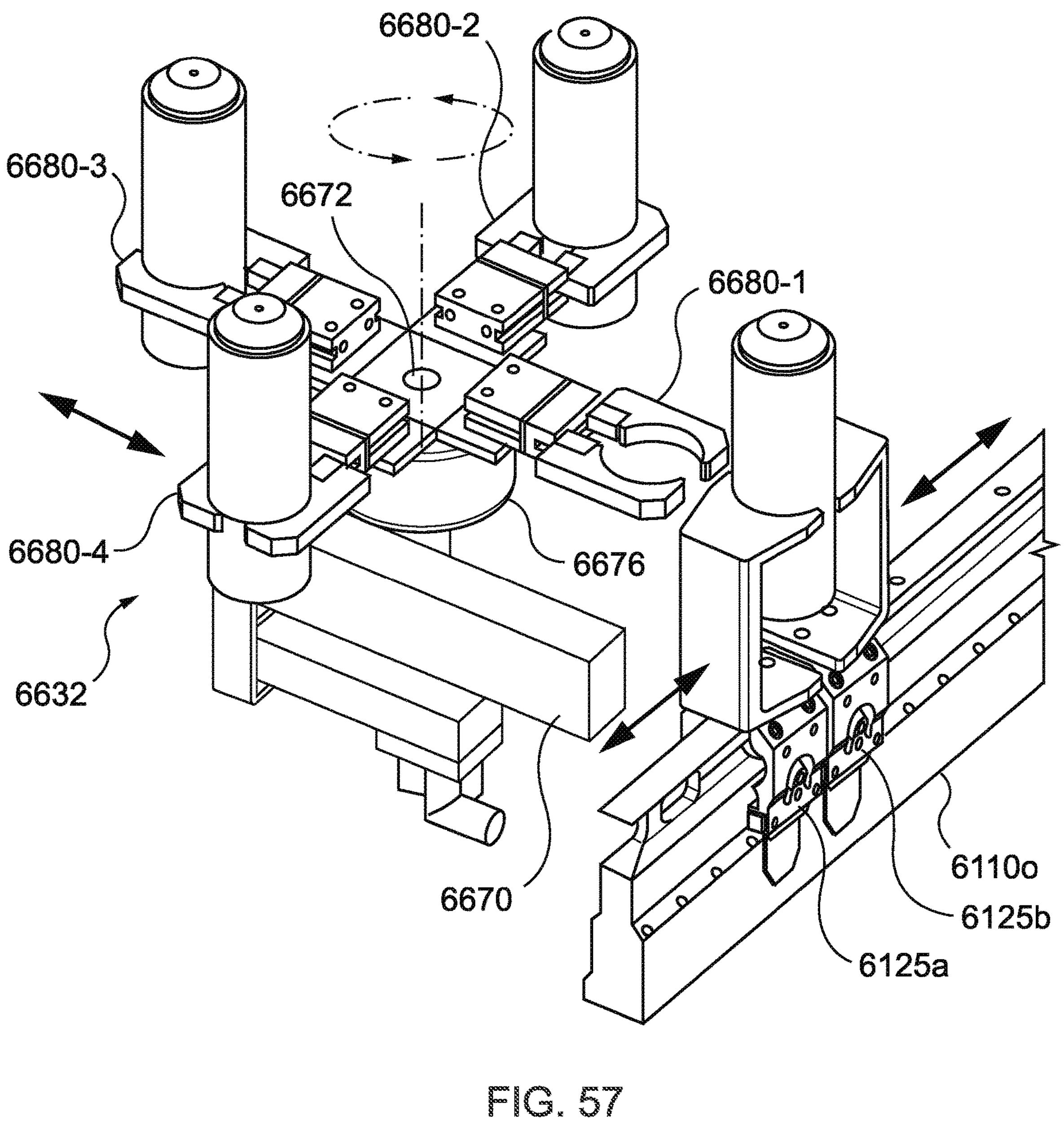
FIG. 57 is a perspective fragmentary view of another portion of the system of FIG. 53.

Re-ordering cell 6630 has one or more re-ordering devices 6632. Turning to FIG. 57 which illustrates one re-ordering device 6632, the device has a rail 6670 extending transversely of the outgoing line 6110*o*, which is configured as the primary part of a linear actuator, and a carriage 6672 slidably mounted on the rail, which carriage is the secondary part of the linear actuator. A rotary servo motor is mounted to the carriage and a turntable 6676 (which is a gearbox) is mounted to the rotor (not shown) of the servo motor. Four outwardly directed grippers 6680-1, 6680-2, 6680-3, 6680-4 are mounted to, and equally spaced about, the turntable. The grippers may be servo driven or spring biased closed with an air circuit to open. The controller provides a control input to the linear actuator and to the rotary servo motor, as well as to the grippers.

Figure 58:
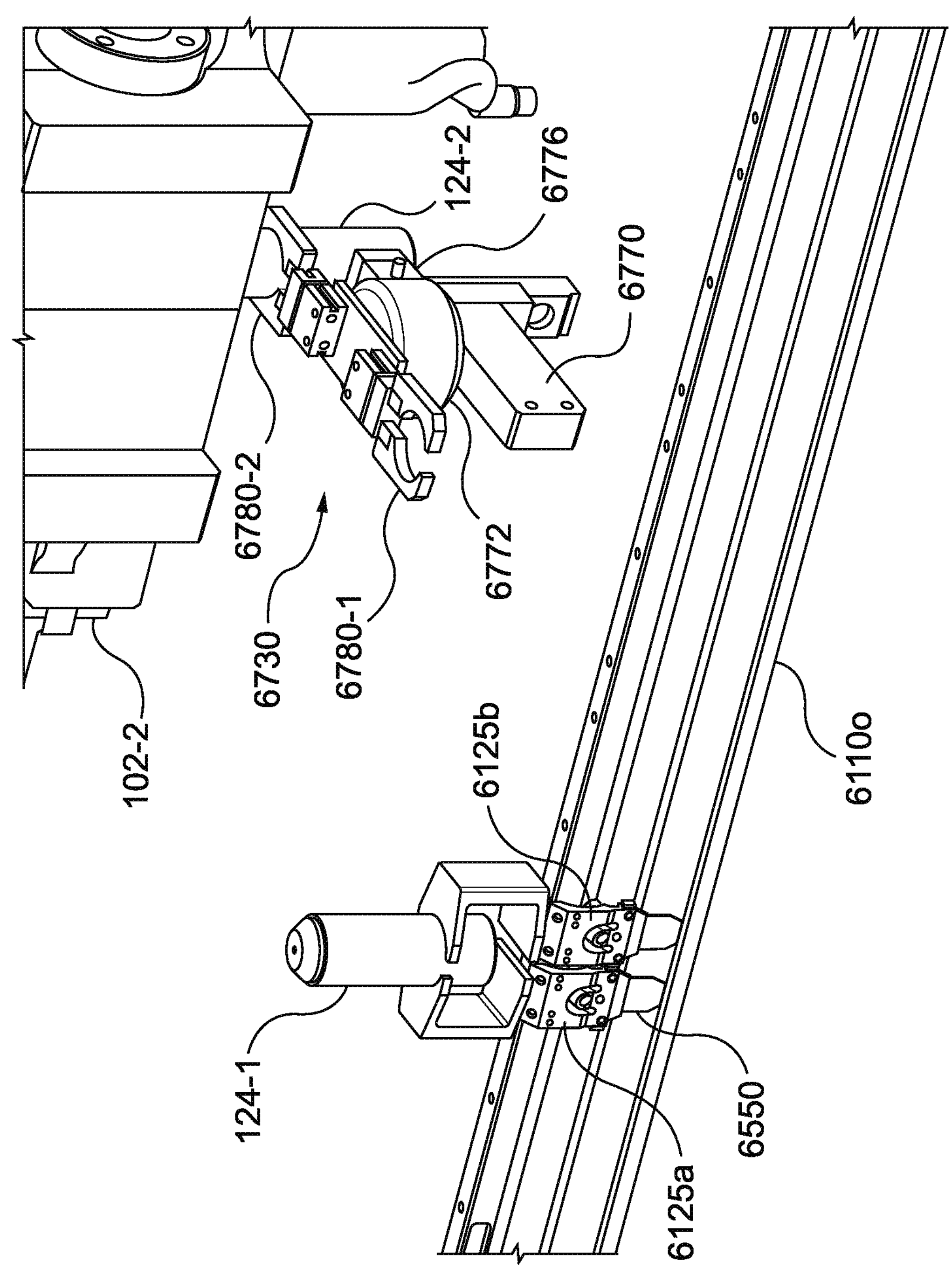
FIG. 58 is a perspective fragmentary view of a further portion of the system of FIG. 53.

As seen in FIG. 53, the two molten molding material dispensers 102-1, 102-2 are positioned one on each side of the outgoing line and staggered along the line. A hand-off device 6730 is associated with each molten molding material dispenser. Turning to FIG. 58, the hand-off device 6730 has a rail 6770 extending transversely of the outgoing line 6110*o*, which is the primary part of a linear actuator, and a carriage 6772 slidably mounted on the rail, which carriage is the secondary part of the linear actuator. The stator (not shown) of a rotary servo motor is mounted to the carriage and a turntable 6776 is mounted to the rotor (not shown) of the servo motor. Two pairs of outwardly directed grippers 6780-1, 6780-2—closed by a spring bias and opened with an air circuit, or servo controlled—are mounted to the turntable opposite one another. The controller provides a control input to the linear actuator and to the servo motor, as well as to the grippers.

The preform molding cell 6104 has preform molders 6104-1, 6104-2, 6104-3, 6104-4, 6104-5, and 6104-6 staggered along either side of the outgoing line. The preform molders are similar to preform molders 104-1, 104-2, 104-3, 104-4, 104-5, 104-6, 104-7, 104-8, except as to differences described hereinafter. Referencing FIG. 59, similar to the preform molders of cell 104, an actuator assembly has a vertically moveable nest 2044 with a semi-annular slot (seen in FIG. 32) that the base of a vessel 124 can slide into so as to be retained by the nest. A hand-off device 6830 having two pairs of outwardly directed grippers 6840-1, 6840-2, like the hand-off device 6730, is associated with each molten molding material dispenser and is mounted between each preform molder and the outgoing line 6110*o* for transferring a vessel to and from the nest 2044 of a preform molder.

Figure 59:
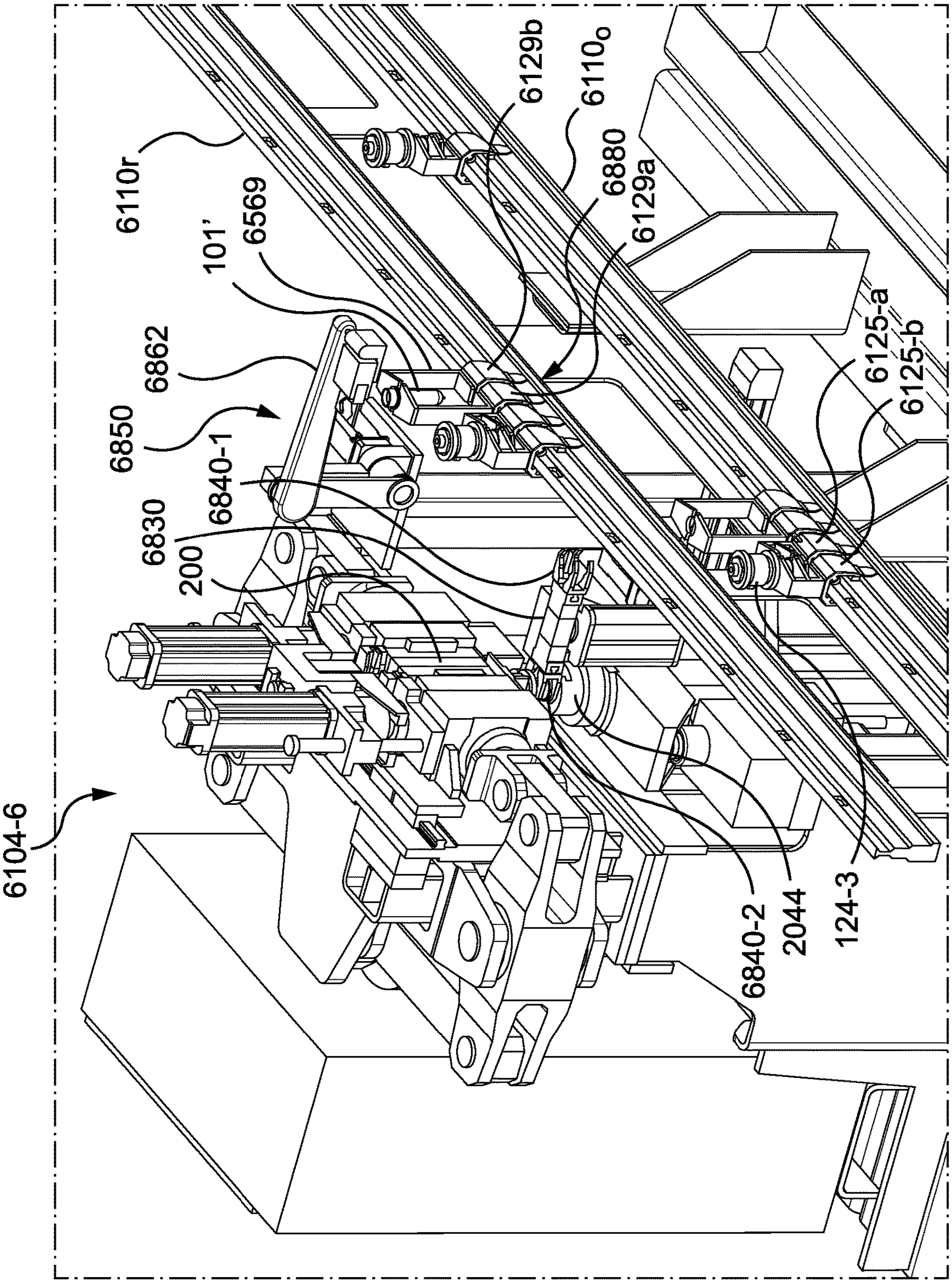
FIG. 59 is a perspective fragmentary view of a yet a further portion of the system of FIG. 53.

With the preform molders 104, a carriage 129 (FIG. 34I) riding on a second track 144 that extends below the preform molder 104 is positioned below the preform mold 200 prior to the inner mold core 3112 (FIG. 18B) being moved upwardly to a short extent to break a seal between the preform and the mold core 190. The carriage 129 has a nest shaped to receive the preform and suction may be applied to draw the preform into the nest. In contrast, in injection molding system 6000, as shown in FIG. 59, the transfer device is a robot arm 6850 which is mounted beside the mold 200 of each preform molder 6104. With injection molding system 6000, prior to breaking the seal between the preform and mold core, the robot arm is manipulated so that its end effector grips the preform.

Figure 60:
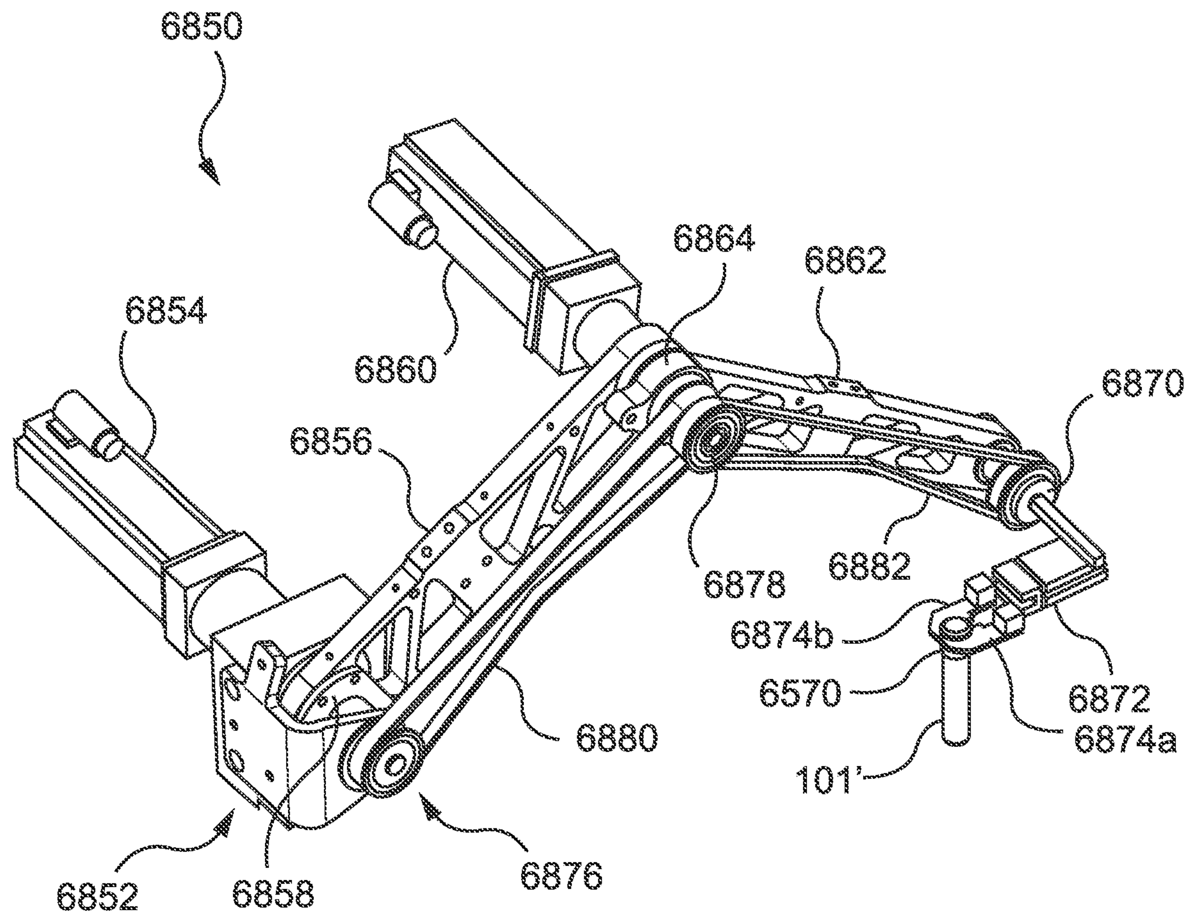
FIG. 60 is a perspective detail view of a portion of FIG. 58.

With reference to FIG. 60 along with FIG. 59, robot arm 6850 has a fixed trunk 6852 supporting the stator of a first servo motor 6854. An upper robot arm 6856 is mounted at a first end to the rotor 6858 of the first servo motor. The second end of the upper robot arm supports the stator of a second servo motor 6860 and one end of a lower robot arm 6862 is mounted to the rotor 6864 of the second servo motor 6860. The second end of the lower robot arm 6862 has a distal rotatable pulley 6870, and the end effector 6872 is mounted to the shaft of the distal pulley so as to project transversely from the shaft. The end effector has a pair of servo controlled grippers 6874*a*, 6874*b*. A base pulley 6876 is fixed to the trunk 6852 such that it does not rotate. A double width medial pulley 6878 is rotatably mounted to the robot arm coincident with the rotational axis of the rotor 6864 of the second servo motor 6860. All three pulleys 6870, 6876, 6878 have the same radius A coupling belt 6880 extends around the base pulley 6876 and medial pulley 6878. A second coupling belt 6882 extends around the medial pulley and the distal pulley 6870. The controller controls the servo motors of the robot arm to position the end effector. In this regard, as will be appreciated by those skilled in the art, with the end effector initially projecting horizontally, the end effector will maintain its horizontal orientation as the lower and upper arms are rotated by the servo motors 6850, 6860 due to the operation of the coupling belts 6880 and 6882. The controller also controls the grippers of the end effector.

Referring to FIG. 59 along with FIG. 60, with this arrangement, after the robot arm is moved into position with its grippers 6874*a*, 6874*b* gripping a preform 101' and the seal is broken between the preform and mold core 3112 (FIG. 18B), the robot arm is controlled to first lower the preform 101' so that it descends to clear the mold core. (It will be appreciated that the spent vessel is first removed from below the mold 200 so that it will not interfere with this operation.) After the preform clears the mold core, it is translated to the return line 6110*r* and, specifically, to a position between a spaced pair of carriages 6129*a*, 6129*b* with opposed longer length arms 6569, with the lip 6570 of the preform above the horizontally projecting flanges 6576 (FIG. 56) of arms 6569. These carriages are then moved together to trap the preform between the opposed arms 6569. The end effector of the robot arm then releases the preform and withdraws. The preform is then retained by the opposed arms 6569 with its lip 6570 resting on the flanges 6576 of the opposed arms 6569 of the pair of carriages 6129*a*, 6129*b*.

Returning to FIGS. 53 and 54, a blow molder 106-1, 106-2, with its associated conditioner 108-1, 108-2, lies on either side of the return line 6110*r*. A track 6996 perpendicular to main track 6110 is associated with each blow molder/conditioner to transfer a preform from the return line to a particular blow molder/conditioner. Alternatively, the transfer device may be the aforedescribed mandrel 408 (FIG. 34), or a robot arm similar to the robot arm illustrated in FIGS. 59 and 60.

Figure 61:
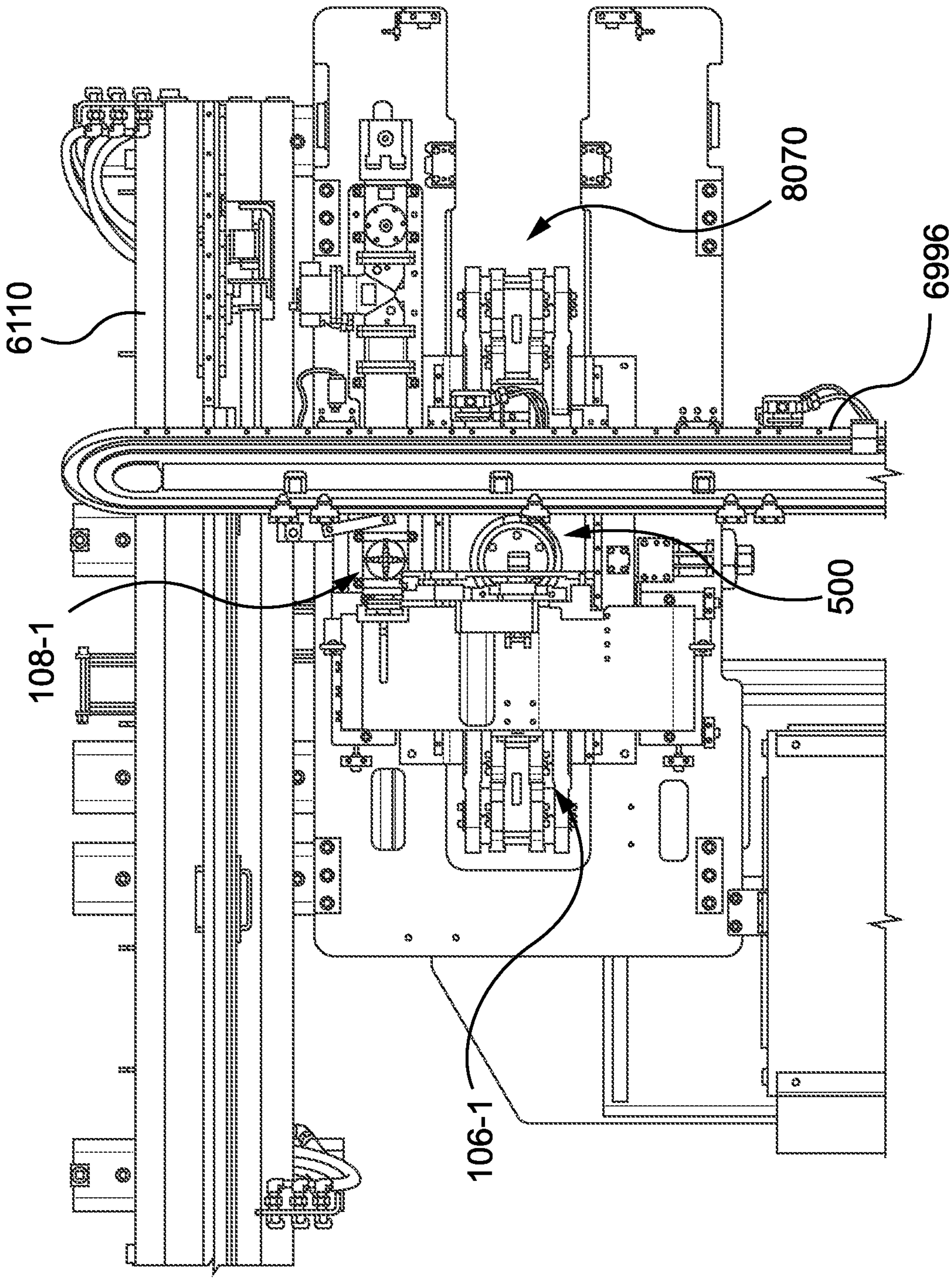
FIG. 61 is a top view of a conditioner and shaper station and associated transfer system.
Figure 62:
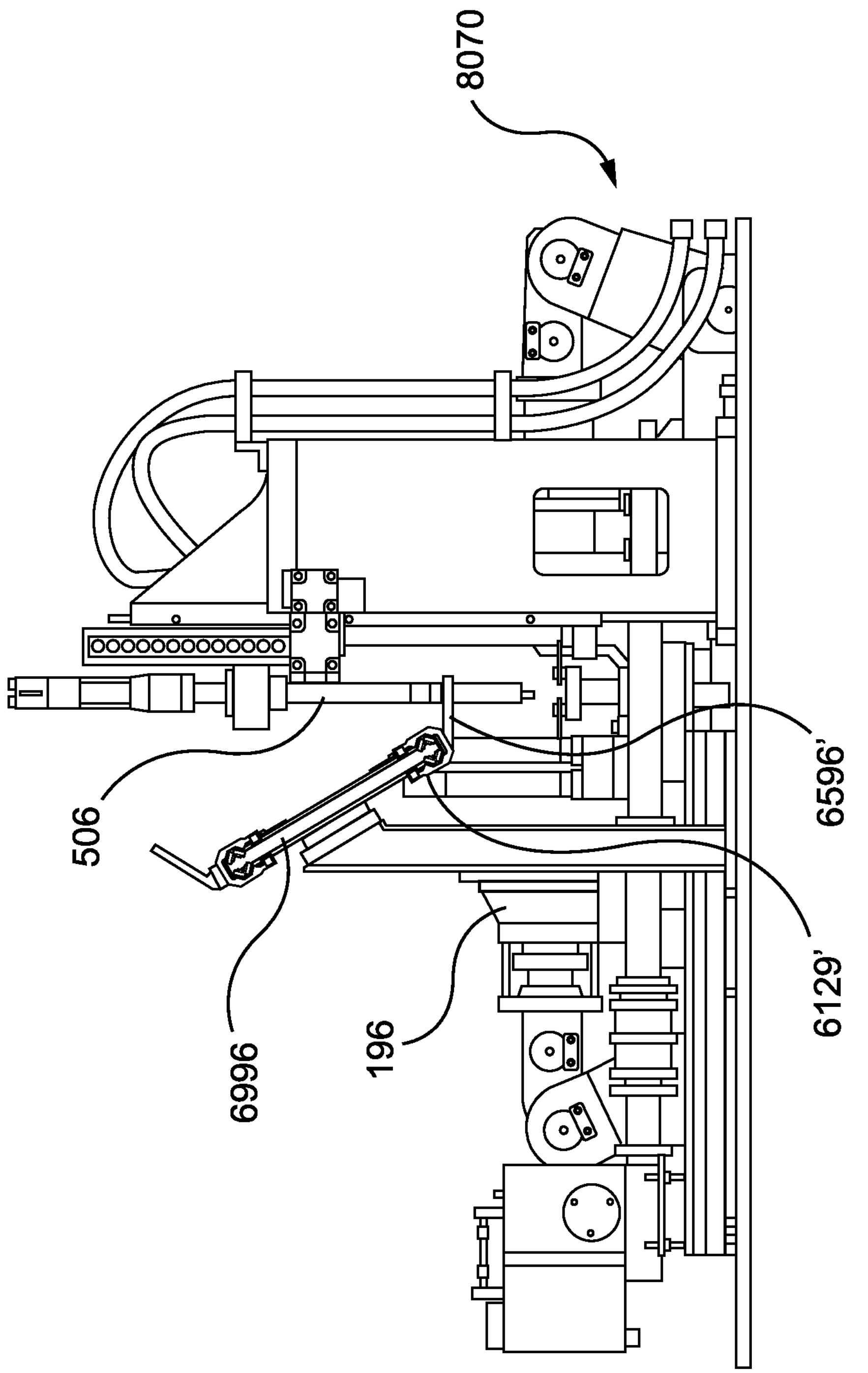
FIG. 62 is a side view of the stations and transfer system of FIG. 61
Figure 63A:
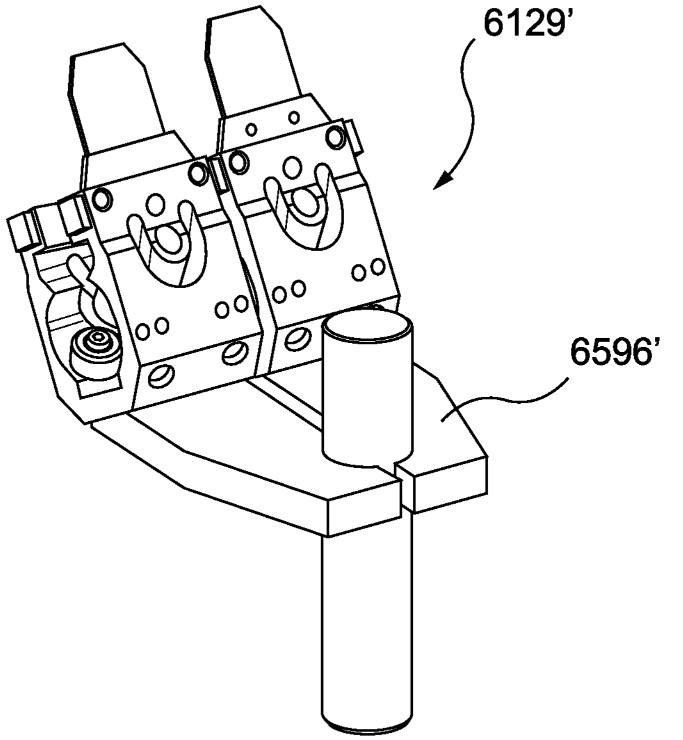
FIGS. 63A-63B are isometric and side views, respectively, of a carriage of the transfer system of FIG. 61.
Figure 63B:
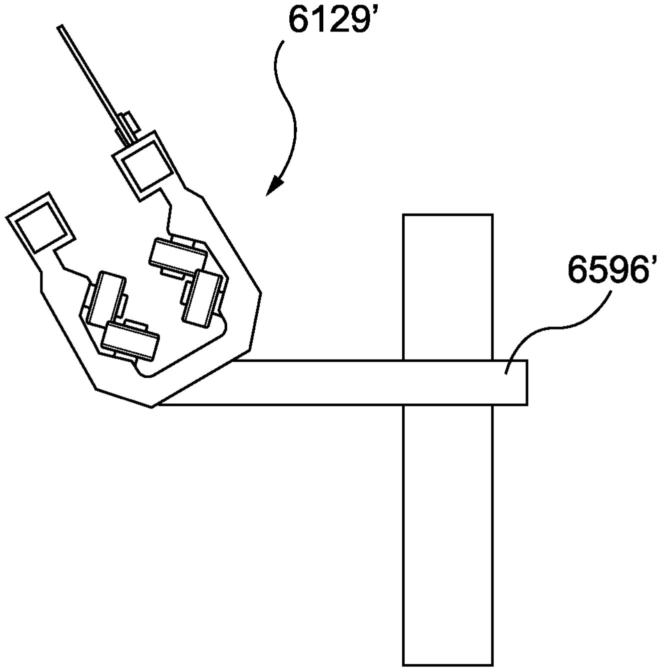

Details of track 6996 are depicted in FIGS. 61-63. FIGS. 61 and 62 depict top and side views, respectively, of blow molder 106-1 and associated conditioner 108-1, and the transfer device. FIGS. 64A and 71B depict isometric and side views, respectively, of carriages mounted on track 6996.

As shown in FIG. 61, track 6996 extends away from main track 6110 and spans across block molder 106-1 and conditioner 108-1. Track 6996 is substantially identical to main track 6110, except that track 6996 is inclined at an angle to the vertical. Likewise, pairs of carriages 6129' are mounted to track 6996. Carriages 6129' are substantially identical to carriages 6129 except that carriages 6129' have arms 6569' which extend horizontally, at an angle to track 6996.

Pairs of carriages 6129' are movable towards one another to grip a preform between arms 6569'. Specifically, a pair of carriages 6129' on track 6996 is positioned above a pair of carriages 6129 on main track 6110. Carriages 6129' grip a preform held by carriages 6129, and the carriages 6129 are then moved to release the preform. Accordingly, the preform is transferred from carriages 6129 to carriages 6129'. Arms 6569' of carriages 6129' may grip the preform above flanges 6576 of carriages 6129, proximate the top edge of the preform.

After picking up the preform, carriages 6129' are moved along track 6996 to position the preform above conditioner 108-1. A mandrel then engages the preform, and carriages 6129' move apart to release the preform. The mandrel inserts the preform into conditioner 108-1 for treatment and subsequently withdraws the preform to a position proximate carriages 6129' after treatment is completed. The carriages 6129' then move together to again grip the preform and are conveyed along track 6996 to a position aligned with blow molder 106-1.

Specifically, with platens 196 of blow molder 106-1 withdrawn from one another, such that mold 500 is opened, carriages 6129' move the preform to a position between the molds. The height of arms 6569' is selected such that the preform is slightly above a molding position when gripped by the arms.

With carriages 6129' holding the preform in a position aligned with mold 500, platens 196 are moved to their closed (molding) position by clamp 8070. Thus, mold 500 is closed around the preform. Carriages 6129' are then moved apart, so that the preform drops into position in mold 500. In the depicted embodiment, the preform drops only a small distance, e.g. a few millimetres.

In some embodiments, closing of mold 500 may occur in two steps. Specifically, the mold may initially be partially closed, leaving a small clearance around the preform so that it can be supported on mold 500 by an annular support ledge near the top of the preform, but the preform can freely fall into the correct molding position, without binding against the mold.

A mandrel is then moved to engage the preform substantially as described with reference to FIGS. 51A-51D. A rod is extended into the preform and stretches the preform as pressurized air is injected through the mandrel to stretch the preform into the shape defined by mold 500.

After molding, the preform is permitted to cool. Carriages 6219' are then moved together to again grip the finished molded article (e.g. a bottle). When gripping the finished article in mold 500, arms 6596' grip at a location slightly higher than when they grip the preform at conditioner 108-1. The height difference corresponds to the distance the preform is dropped subsequent to closing of mold 500.

Carriages 6129' then move the completed article away from blow molder 106-1, where it may be removed for further processing such as labelling.

After removal of the completed article, carriages 6129' are returned along track 6996 to a position for gripping a new preform from main track 6110.

The buffering and cleaning cell 6530 comprises spur line 6110*sp* with an enclosure 6890 containing vessel cleaners (not shown).

The right side shunting cell 6640 comprises the right side shunt line 6110*rs* and the elevator 6662 to which the right side shunt line is mounted.

A reader 6894 is positioned along the track downstream of the re-ordering cell 6630 to read an identifier of passing vessels 124.

Figure 64:
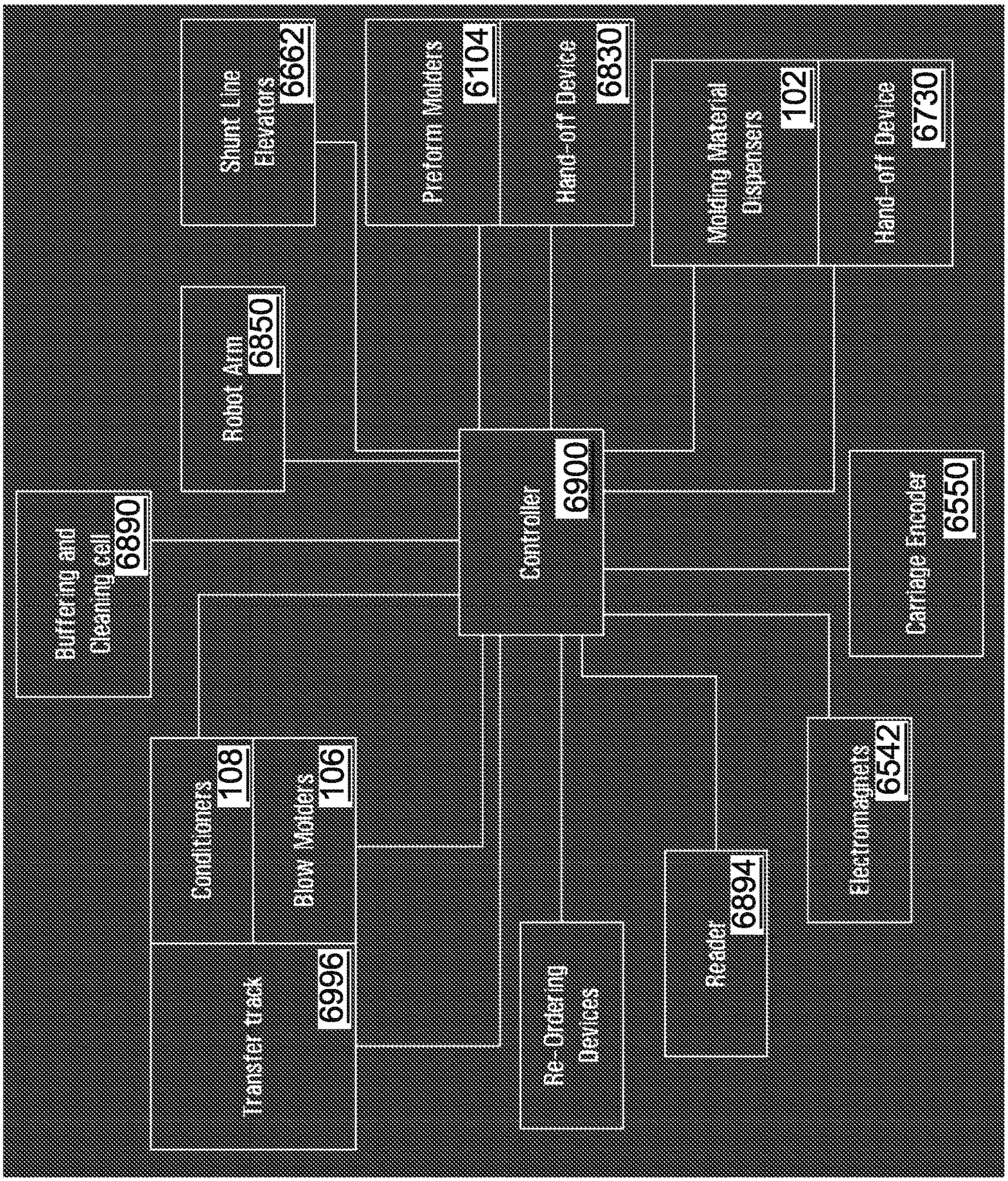
FIG. 64 is a block diagram.

Turning to FIG. 64, the controller 6900 has a control input to the electromagnets 6542 of each track segment, the elevator 6662 of each shunt line, each re-ordering device 6632, each hand-off device 6730, 6830 and each robot arm 6850, and each transfer track 6996. The controller receives an input from the encoder flag 6550 of each carriage and from the vessel identification reader 6894. As illustrated, the controller also has a control input to each molten molding material dispenser of molding material dispensing cell 102, each preform molder of preform molding cell 6104, each conditioner of cell 108 and each blow molder of cell 106, and the buffering and cleaning cell 6890. Alternatively, some of these devices may have independent controls. For example, a preform molder could have a microswitch that is triggered when a hand-off device 6830, under control of the controller, loads a vessel into its nest which causes the preform molder to cycle through its molding operation, and a second microswitch which is triggered when the controller positions a robot arm 6850 to receive a molded preform in order to release the molded preform.

To prepare injection molding system 6000 for operation, feedstock is provided to the molten molding material dispensers of cell 102. The composition of the feedstock provided to each molten molding material dispenser may differ in material or colour or both. Thus, by way of an example embodiment, one molten molding material dispenser holds blue (pellets) feedstock and the second molten molding material dispenser holds green (pellets) feedstock. The type of feedstock provided to each dispenser is uploaded to the controller.

Given green and blue feedstock, the vessels 124 are divided into first vessels which are dedicated to holding blue molten molding material—referred to hereinafter as "blue vessels" for simplicity—and second vessels which are dedicated to holding green molten molding material—referred to hereinafter as "green vessels". The vessels are organized in this fashion as, even after cleaning, a vessel will retain some molten molding material residue. Thus, using only one type of molten molding material in a vessel avoids cross-contamination. Each vessel is marked with an identifier and the identifier on a vessel is read by reader 6894 so that the controller 6900 becomes aware of which vessels are blue vessels and which vessels are green vessels and can thereafter track the location of each vessel to maintain this awareness. A suitable identifier that may be used is an annular strip code, i.e., a pattern of strips that encircle the vessel which may be visually read. An annular strip code has the advantage that it may be read no matter what the rotational orientation of the vessel about its longitudinal axis. In an alternate embodiment, the information as to which carriage pairs and which grippers hold blue vessels and which hold green prior to start-up is input to the controller and the controller thereafter tracks the location of each vessel so as to maintain awareness of which vessel is which. However, it is generally preferred to mark each vessel with an identifier to avoid problems that could otherwise result should any vessels be manually swapped out or switched during a shut down without informing the controller.

Continuing with the example, the carriages on the track are organized as gangs 6880 (FIG. 56) of four carriages each. On the outgoing line 6110*o*, the leading pair of carriages 6129*a*, 6129*b* of each gang 6880 has opposed longer arms 6596*a*, 6596*b* and the trailing pair of carriages 6125*a*, 6125*b* has opposed shorter arms 6564*a*, 6564*b*. (On the return line 6110*r*, it is the pair of carriages with shorter arms that is the leading pair of carriages in a gang.) At start-up, each trailing pair of carriages on the outgoing line may hold an empty blue vessel or an empty green vessel.

The controller 6900 may receive a product order, say fifty blue bottles and twenty-five green bottles. Given this, two of the four grippers of each re-ordering device may be loaded with blue vessels and one gripper may be loaded with a green vessel, leaving the fourth gripper of each device free: if the system is not configured so that the controller can identify these vessels, this information is fed to the controller.

The controller may (rapidly) advance the gangs of carriages along the track until a gang 6880 of carriages holding a blue vessel is presented at a molten molding material dispenser holding blue molten molding material feedstock. In this regard, if there happened to be an uninterrupted series of green vessels upstream of the molten molding material dispensing cell, the controller may use the re-ordering cell 6630 upstream of the molten molding material dispensing cell to swap out green vessels from the outgoing line 6110*o* and insert blue vessels in their place. More specifically, the next carriage gang with a green vessel can be advanced by the controller to a re-ordering device 6632 of the re-ordering cell 6630 where it is halted, the turntable 6676 of a re-ordering device 6632 operated to direct the empty grippers 6680-1 of the re-ordering device toward the outgoing line, and then the turntable advanced. If the grippers are spring biased, the turntable is advanced until the biased empty grippers are first deflected by, and then snap around, the green vessel. The opposed arms of the leading carriage pair 6125*a*, 6125*b* of the gang which trap the green vessel absorb the reaction force as the empty grippers of the re-ordering device are deflected by the vessel. With the grippers holding the green vessel, the controller then separates the leading pair of carriages so that the green vessel is released from the outgoing line. The turntable is then retracted, turned to present grippers holding a blue vessel toward the outgoing line, and advanced again to position the blue vessel between the opposed open arms of the leading pair of carriages of the carriage gang. The controller then brings the leading carriage pair back together to close the open arms of this pair in order to trap the blue vessel. The grippers are then opened (with an air circuit or under servo control) to release the blue vessel, and the turntable is retracted. The carriage gang, now holding a blue vessel, may then be advanced to the molten molding material dispensing cell.

It will be apparent that, after this swap, the re-ordering cell 6630 continues to have one set of empty grippers but now holds two green vessels and one blue vessel.

Referencing FIG. 58 and assuming dispenser 102-2 holds blue feedstock, if an empty blue vessel 124-1 is advanced to molten molding material dispenser 102-2, the controller can operate the carriages 6125*a*, 6125*b* and hand-off device 6730 to transfer the vessel 124-1 to grippers 6780-1. More specifically, with the blue vessel halted under at the molten molding material dispenser 102-2, empty grippers 6780-1 of the hand-off device associated with the dispenser are advanced toward the empty blue vessel 124-1 and brought into engagement with the vessel. The pair of carriages 6125*a*, 6125*b* trapping the vessel is then separated to release the vessel. Since the grippers 6780-2 of the hand-off device hold a blue vessel 124-2 that would have been previously filled at dispenser 102-2, the hand-off device rotates to deliver this previously filled blue vessel 124-2 between the pair of carriages 6125*a*, 6125*b* and these carriages are advanced toward each other to trap this vessel 124-2 between them. The grippers 6780-2 are then opened and the hand-off device retracted to present the vessel 124-1 held by grippers 6780-1 at the outlet of the molten molding material dispenser. The retraction of the hand-off device also frees the pair of carriages 6125*a*, 6125*b* with vessel 124-2 to progress along the track. With vessel 124-1 at the outlet of the molten molding material dispenser 102-2, blue molten molding material is dispensed to this vessel 124-1, as aforedescribed in conjunction with the embodiment of FIGS. 8A-8D. In this regard, the dose of material received by a vessel at the molten molding material dispenser is a dose sufficient to make a single preform, which dose may or may not fill the vessel. Filled blue vessel 124-1 is then ready to be picked up by a subsequent pair of carriages arriving on the track. Note that if grippers 6780-2 did not hold a vessel on the arrival of vessel 124-1, the pair of separated carriages 6125*a*, 6125*b* may be paused in place at dispenser 102-2 until blue vessel 124-1 is filled and returned to the pair of grippers.

The filled blue vessel returned to the pair of carriages 6125*a*, 6125*b* at the dispenser is advanced along the track to the preform molding cell 6104. In this regard, specific preform molders may be dedicated for molding blue preforms if there is a risk of a residue of blue molten molding material remaining in the preform molder mold 200. The controller preferentially chooses a "blue" preform molder further toward the right end of the outgoing line 6110*o* in order to leave open other preform molders between the chosen preform molder and the molten molding material dispensing cell 102 so that while carriages are paused at the chosen preform molder, they do not block vessels from being advanced to these other preform molders.

Referencing FIG. 59, assuming the chosen preform molder for a green vessel 124-3 is preform molder 6104-6, the vessel is advanced by the carriage gang holding it to this preform molder, engaged by grippers 6840-1 of hand-off device 6830, and released by carriages 6125-*a*, 6125*b* of the carriage gang. A previously emptied green vessel held by grippers 6840-2 may then be returned to the carriage gang so that the gang is freed to advance further along the track 6110*o*. The hand-off device then transfers vessel 124-3 to the nest 2044 of the preform molder. The vessel positioning actuator is then extended vertically to urge the vessel into abutment with the mold 200 (FIG. 12A), with gate orifice 136 of vessel 124 aligned with mold inlet gate 202 of mold 200. The molten molding material in the green vessel may then be injected into the mold 200—by operation of piston 182 (FIG. 6B) of the vessel as aforedescribed—and the spent green vessel is then ready to be returned to the outgoing line 6110*o* when a next carriage gang arrives at the preform molder 6104-6.

A carriage gang leaving the preform molding cell is advanced to the right side shunting cell where the elevator 6662 moves the shunt line 6110*rs* up into engagement with the return line 6110*r*. The elevated carriage gang then moves back toward the preform molding cell 6104. Once this carriage gang leaves the shunt line 6110*r*, the shunt line is again returned to the outgoing line 61100.

A carriage gang 6880 arriving on the return line 6110*r* with a spent blue vessel may be moved to the preform molder, e.g., preform molder 6104-6, that will next have a completed preform 101', regardless of whether the preform is green or blue. At this preform molder, the pair of carriages 6129*a*, 6129*b* with the longer arms 6569*a*, 6569*b* (which is now the trailing pair of carriages of the gang) is separated while the robot arm 6850 moves a preform 101' released from the preform mold 200 to a position in between the arms of the separated carriages. The carriages 6129*a*, 6129*b* of the pair are then brought together to trap the preform between them and the robot end effector 6872 is withdrawn to release the preform from the robot arm.

The carriage gang may then advance with the preform 101' to the conditioning and blow molding cell 106/108 where the preform is removed from the carriage gang by a transfer device. More specifically, the transfer device engages the preform, subsequent to which the pair of carriages trapping the preform is separated to release the preform. The transfer device then inserts the preform into the heating chamber 404 of a conditioner, say conditioner 108-1. After heating, the transfer device withdraws the preform from the heating chamber past a thermal monitor 406. If the preform is properly conditioned, the transfer device then moves the conditioned preform to blow molder 106-1 and inserts the preform into the mold 500 of the blow molder. The transfer device then releases the conditioned preform and the preform is engaged by the molding head 504 of a mandrel 506, whereupon the preform is blown into a bottle as aforedescribed. Where each blow molder blows a bottle of identical shape, the preform can be transferred to any of the blow molders. However, if the bottles blown by different blow molders are of different shapes, then the preform must be transferred to a blow molder which is suited to blowing a bottle from that preform.

After the preform is transferred from the carriage gang 6880, the carriage gang is further advanced to the buffering and cleaning cell 6890 where the empty vessel carried by the gang is optionally cleaned. The controller could then immediately return the carriage gang to the left side shunt line 61101*s* or, alternatively, hold the carriage gang in the buffering and cleaning cell for future use.

When the carriage gang is returned to the shunt line 61101*s*, the shunt line descends to return the carriage gang to the outgoing line 6110*o*, and when the carriage gang is advanced beyond the left side shunt line, the left side shunt line 61101*s* again returns to the return line 6110*r*.

It will be apparent from the foregoing that carriage gangs 6880 circulate on the track, moving to the right along the outgoing line 6110*o*, then being elevated to the return line 6110*r* where they move to the left and, when they reach the left hand end of the upper track, may be offloaded to the buffering and cleaning cell 6530 or returned to the outgoing line. With this operation, it will be apparent that the vessels 124 are maintained upright throughout their travels. This helps ensure molten molding material does not leak from the vessels while moving through the system. It will also be apparent from the foregoing that carriage gangs riding on the outgoing line may hold a vessel but do not hold a preform 101', and carriage gangs riding on the return line may hold a vessel, and, in addition, may also hold a preform.

From the foregoing, it will be apparent that the controller has logic to control the carriages 6125, 6129, logic to control the vessels 124, and logic to control the preforms 101'. The carriage control is enabled by the encoder flag 6550 on each carriage that is monitored by the controller 6900. This allows the controller to track the location of each carriage and control its movement as desired. The vessel control is enabled either by the controller being provided with the initial location and designation of each vessel (e.g., a blue vessel) or by each vessel being marked with an identifier that is input to the controller from a reader at one or more locations in the system and the controller storing the designation of each marked vessel. The preform control is enabled by the controller storing which preform molders are associated with which blow molders, and by the controller tracking carriage gangs that are loaded with a particular preform so as to offload the particular preform held by the carriage gang at the appropriate blow molder.

The example operation described assumed the system was run with feedstock of two different colours. The system could also be run with feedstock more than two colours, for example, five different colours. In this instance, the system may be modified to provide five molten molding material dispensers, one for each colour of feedstock, and at least two separate re-ordering devices in the re-ordering cell, such that at least one vessel for each of the five colours may be held at the re-ordering cell while ensuring at least one of the two re-ordering devices has an empty set of grippers. The system could also be run with multiple different types of feedstock. In general, the system could be run with any feedstock that forms a flowable molten material. For example, the feedstock could be a thermoplastic, a thermoset plastic resin, or a glass. Giving a specific example, in a system with three molten molding material dispensers, one could hold high density polyethylene (HDPE), one polypropylene (PP), and one polyethylene terephthalate (PET).

The system could be modified to have preform molders and blow molders with different sized molds which form blow molded articles of different sizes. In this instance, preforms molded at a particular preform molder are fed to a particular blow molder adapted to blow mold the particular preform. Thus, the controller must track the carriage gang 6880 which receives a preform 101' to ensure the preform reaches the correct blow molder. Further, it may be that less molten molding material is needed to form a smaller molded article. In this situation, vessels 124 supplying the preform molder for the articles requiring less molten molding material are not filled to capacity at a molten molding material dispenser but are instead filled a metered amount reflective of the needed volume of molten molding material for the smaller blow molded articles.

While the example embodiment shows a re-ordering cell 6630 with two re-ordering devices, each having one set of empty grippers, optionally a re-ordering device may have several sets of empty grippers and there may be multiple re-ordering devices so that several pairs of grippers may be empty and several may hold vessels, so that a selected pair of grippers (with or without a vessel) may be advanced toward the track.

Figure 65:
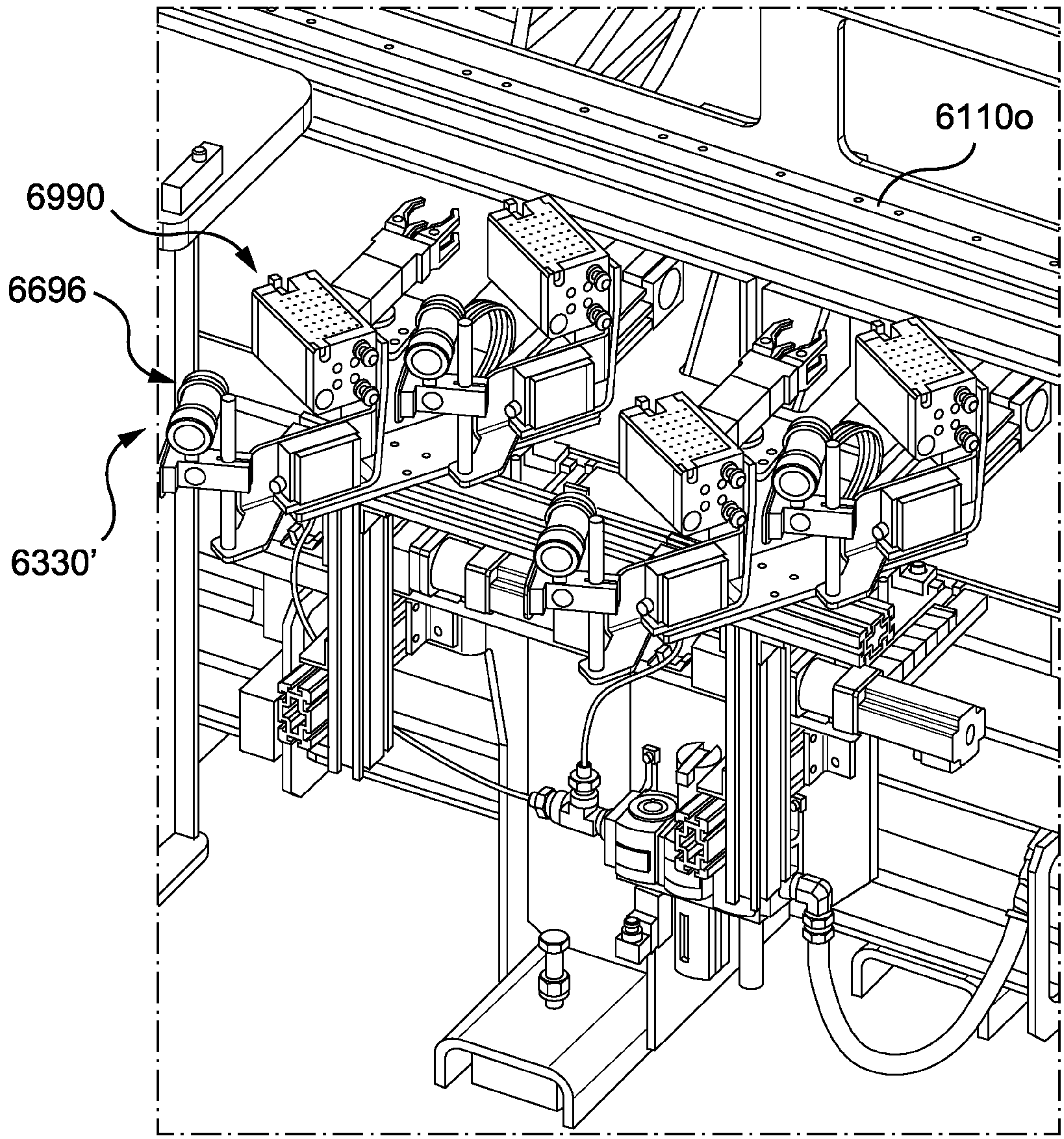
FIG. 65 is a perspective fragmentary view of a portion of a modified system.
Figure 66:
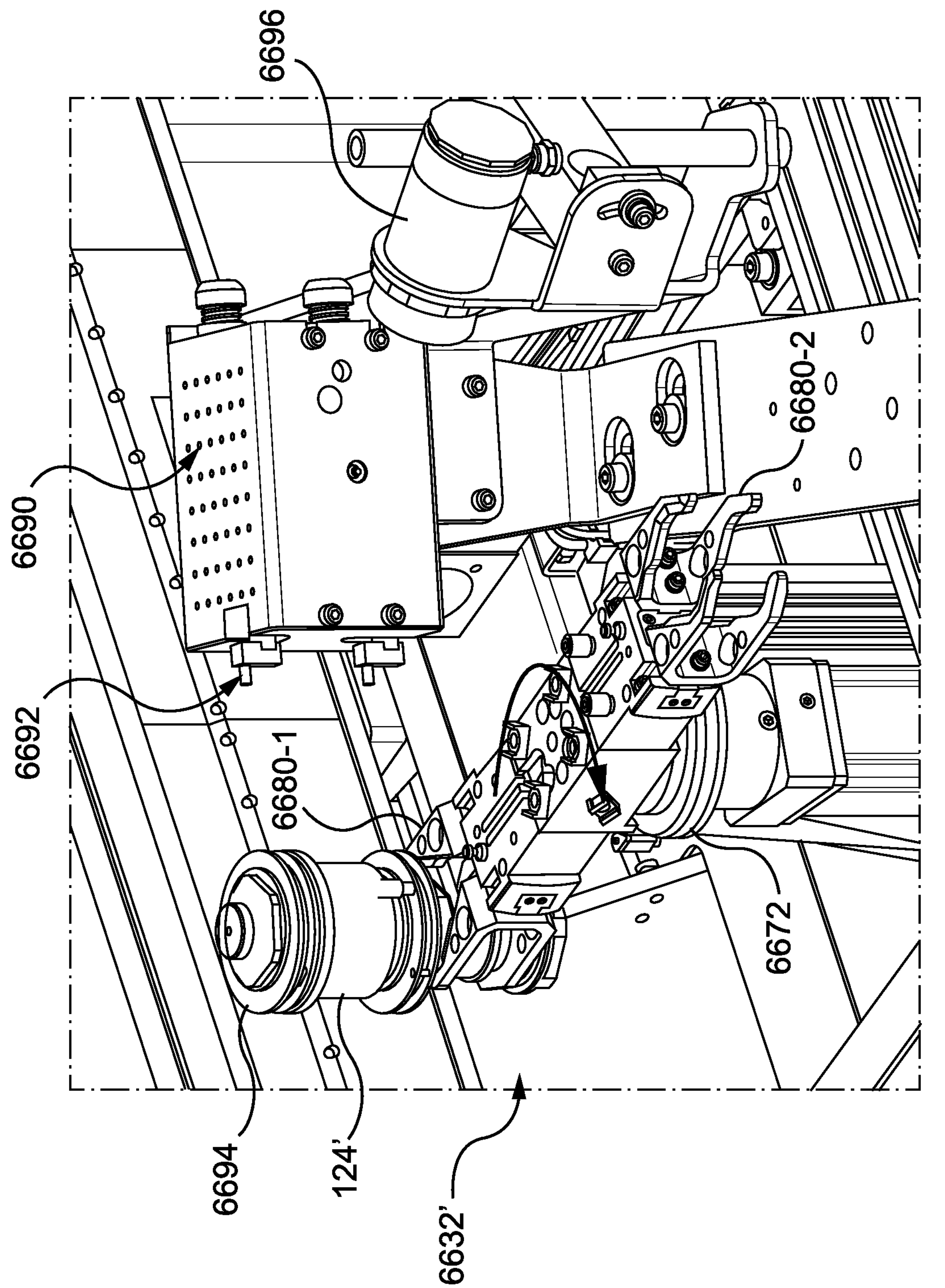
FIG. 66 is a perspective detail view of a portion of FIG. 63.

Optionally, heaters may be added to system 6000 to warm vessels 124 at periodic intervals in order to make up for heat loss in the vessels during vessel transit along the track. For example, heaters may be located upstream of the dispensing cell 102 so that vessels are warmed prior to melt being dispensed to them. FIGS. 65 and 66 illustrate such an arrangement where a heating system is associated with a re-ordering cell 6330' upstream of the dispensing cell. Turning to these figures, each re-ordering device 6632' is identical to the re-ordering device 6632 of FIG. 57 except that each device 6632' has two pairs of grippers 6680-1 and 6680-2 rather than four pairs of grippers. Two heaters 6690 are positioned beside each device 6632'. Each heater has a pair of reciprocal prongs 6692 that may be extended by an air cylinder (not shown) inside the housing. A power supply (not shown) inside the housing selectively supplies AC power to the prongs. To adapt the vessels for use with the heaters 6690, the vessels 124' are provided with a pair of conductive bands 6694. The heating system also has a temperature sensor 6696 associated with each heater 6690. The temperature sensor is an infrared sensor that emits an infrared beam. The heating system is positioned such that a re-ordering device 6632', when retracted away from the outgoing line 61100 of the track, may be rotated about its carriage 6672 to a parked position whereat a vessel 124' in each of the two pair of grippers 6680-1, 6680-2 of the device 6632' is adjacent a heater 6690 and in the path of a beam emitted from the associated temperature sensor 6696. The controller is operatively connected to the heaters and temperature sensors. Based on the temperature of a vessel 124' detected by a temperature sensor, the associated heater may be selectively energized by the controller to heat the vessel to a desired temperature as measured by the temperature sensor. More specifically, the prongs of the heater are extended into contact with the conductive bands of the vessel and AC power is applied to the prongs until the temperature sensor measures the target temperature. The heater may then be de-energised and the prongs retracted. The vessel, warmed to the target temperature, may then be transferred to the outgoing line of the track.

Given the provision of a heater and temperature sensor for each of the two pairs of grippers 6680-1, 6680-2 of a re-ordering device 6632', if two vessels are held by the re-ordering device (and another upstream re-ordering device has at least one pair of free grippers to take a vessel off the line or some upstream carriage gangs on the outgoing line are not carrying vessels), both vessels may be simultaneously heated. This is useful if both vessels are currently needed on the outgoing line 6110*o*. On the other hand, if only one of the vessels were needed on the outgoing line, only that vessel would be heated.

In a modification, only one heater and associated temperature sensor is associated with each re-ordering device.

While in the example embodiment the buffering and cleaning cell 6530 is located at the left hand end of the track, optionally this cell could instead be located elsewhere. In this instance, the buffering and cleaning cell may not include a spur line, but instead could include another arrangement to transfer vessels from the track to the enclosure 6890 containing vessel cleaners. For example, a vessel cleaning enclosure could be located at the re-ordering cell 6630 and the grippers of the re-ordering cell could selectively transfer vessels from the track to the vessel cleaning enclosure 6890. Alternatively, the buffering cell could be located elsewhere along the track and a robot arm, similar to robot arm 6850, could be provided in place of the spur line to transfer vessels from the track to the vessel cleaning enclosure.

Each carriage gang may hold a vessel as the carriage gang travels along the track. Alternatively, some of the carriage gangs may travel all or portions of the track without holding a vessel.

While the carriages have been described as travelling in gangs of four, alternatively, the carriages could travel in gangs of two, with one type of gang designed for holding vessels and a second type of gang designed for holding preforms. As a further option, carriages could travel in gangs of three where the middle carriage has two arms—a right facing arm for co-operating with a left facing arm of the leading carriage and a left facing arm for co-operating with a right facing arm of the trailing carriage. While the carriages 6125 are shown as having a pair of horizontally projecting flanges 6566, in another embodiment, they may have a single horizontally projecting flange, or multiple horizontally projecting flanges.

As another option, each carriage could support a set of grippers opening along the length of the track, such as the biased tongs 1252 of carriage 125 of FIG. 7A, to hold vessels. With this option, it will be apparent a vessel is held by a single carriage. With this option, each carriage can also be provided with a further set of spring biased tongs projecting in the opposite direction to that of the first set of tongs with the further set of spring biased tongs being adapted to hold preforms.

Other track configurations are possible. For example, the function of the upper and lower lines could be reversed such that molten molding material is dispensed to vessels on the upper track and preforms are moved to the conditioning and blow molding cell along a lower track. Also, track and carriage systems other than the XTS system of Beckhoff may be used to provide controlled movement of carriages on a track.

It will be apparent from the foregoing that injection molding system 6000 may be adapted to form a variety of different sized or shaped bottles by switching in suitable molten molding material dispensers, preform molders and conditioners and blow molders.

While the injection molding system 6000 has been described as first molding a preform and subsequently blow molding a bottle from the preform, the system may also be used without the conditioning and blow molding cell to produce preforms for blow molding in a different location. Also, the system can be used without the conditioning and blow molding cell and the molds of the preform molders adapted to mold articles other than preforms such as, for example, plastic toys. Other modifications will be apparent to those of skill in the art.

Figure 67:
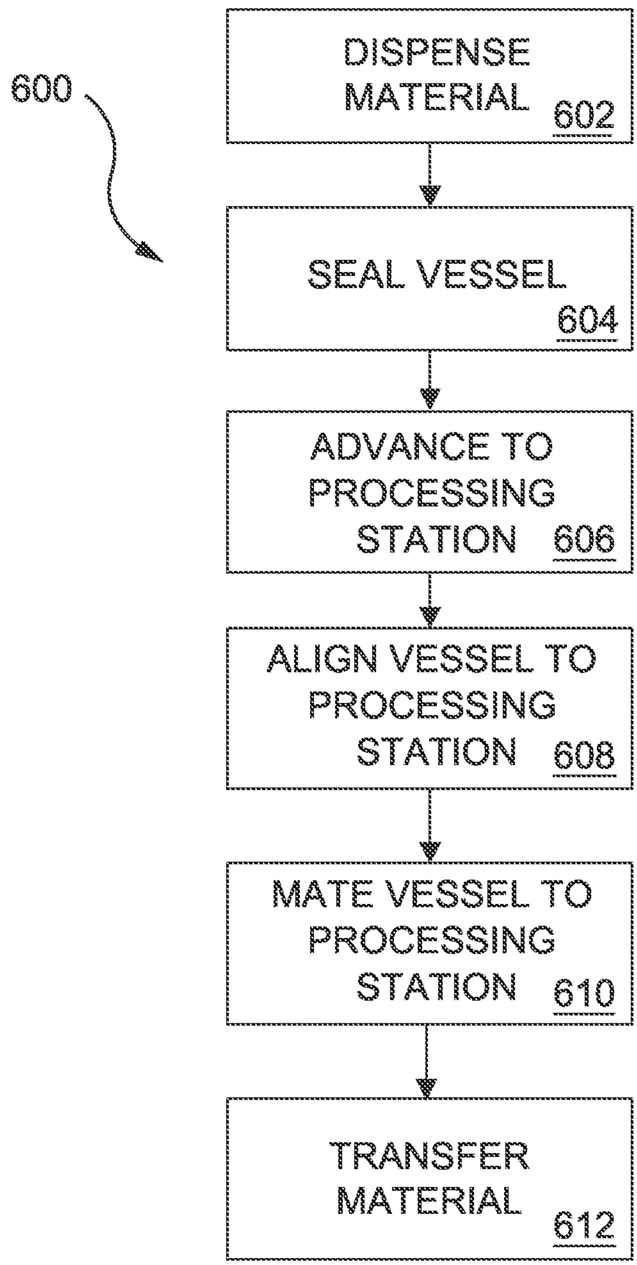
FIG. 67 is a flow chart showing a method of transporting molding material.

FIG. 67 is a flow chart showing an example method 600 of transporting molding material.

At block 602, a vessel 124 is positioned at a station of dispensing cell 102. The coupling assembly of vessel 124 is aligned to and coupled with the nozzle assembly 113 of an extruder 112. Orifice 136 is opened and molding material is dispensed into cavity 134 of vessel 124 through orifice 136.

After filling of vessel 124 is complete, at block 604, vessel 124 is sealed, e.g. by operation of sealing member 140. At block 606, the sealed vessel is moved, e.g., along track 144 of transport subsystem 110, to a subsequent processing station. The subsequent station may be, for example, a shaping station.

At block 608, the vessel 124 is aligned with the subsequent processing station. The vessel is unsealed during such alignment. In some embodiments, alignment causes unsealing of the vessel, e.g. by interaction of closure assembly 1270 with slot 2084.

At block 610, the vessel 124 is mated to the processing station. For example, the coupling assembly of vessel 124 is moved into sealing engagement with mold 200 of a shaping station and orifice 136 is aligned with the mold gate.

At block 612, piston 182 is actuated to reduce the volume of the internal cavity 134 of vessel 124, thereby forcing molding material out of vessel 124 and into mold 200.

Figure 68:
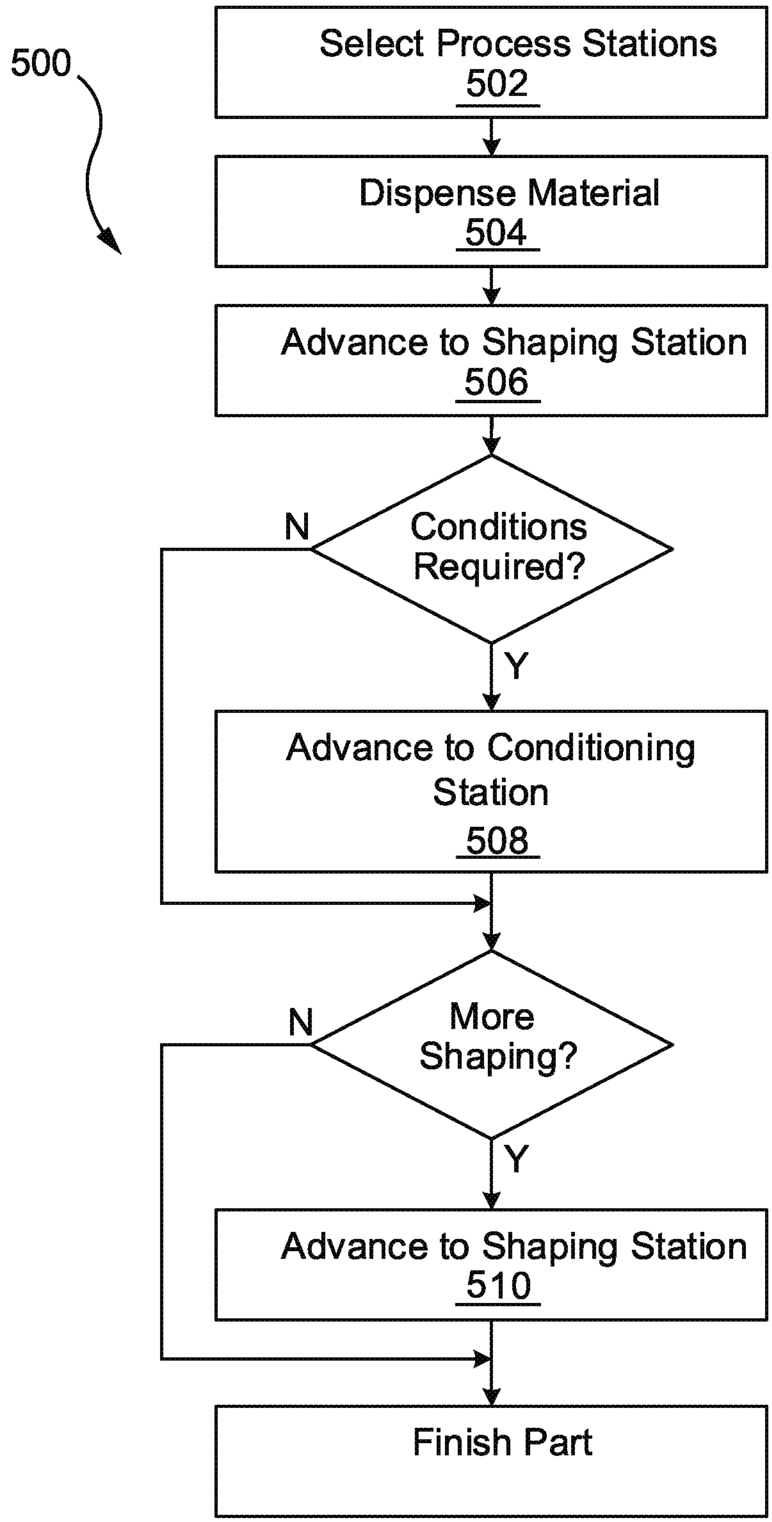
FIG. 68 is a flow chart showing a method of producing plastic molded products.

FIG. 68 is a flow chart showing an example method 700 of producing plastic molded articles.

At block 702, a process path, defined by a sequence of process stations, is selected according to the desired characteristics of an article to be produced. That is, a dispensing station 102-1, 102-2, . . . **102-*n*** is selected according to the desired material, colour and the like. Shaping and conditioning stations may also be selected, as applicable. In some embodiments, multiple possible process paths may exist for forming a specific type of article. In such cases, a process path may be chosen based on one or more criteria such as production time, idle process stations and the like.

At block 704, the selected dispensing station is activated and molten feedstock is dispensed from the corresponding extruder 112 into a vessel 124 as described above. The dispensed feedstock in its molten form is referred to as a workpiece 101. The workpiece is transformed at other stages in the process path. For example, the workpiece may experience state changes (e.g. from molten to solid states); shape changes; and condition changes such as temperature or thermal profile changes.

At block 706, the vessel 124 is conveyed in its carriage 125 along track 144 to the next processing station. Diverters of the transport subsystem 110 are operated to direct the carriage along track 144 to the selected shaping station 104-1, 104-2, . . . **104-*n*. For example, selected ones of the diverters may be activated at specific times to move vessel 124 to each station along the process path. The molten feedstock, i.e., workpiece 101 is injected into mold 200. The workpiece is shaped according to the shape of the mold into a pre-shaped workpiece 101'** (e.g. a preform for molding a bottle) as described above.

The pre-shaped workpiece 101' is removed from the shaping station by a carriage 129. If a conditioning operation is selected, at block 708, the carriage 129 is conveyed to a conditioning station 108-1, 108-2, . . . **108-*n*. Diverters of the transport subsystem are operated to direct the carriage 129 to the selected conditioning station. If no conditioning operation is selected, conditioning cell 108** is bypassed.

If a further shaping operation is selected, at block 710, the pre-shaped workpiece 101' is conveyed to the selected shaping station 106-1, 106-2, . . . **106-*n*. Shaping, e.g. blow molding, is performed as described above to transform the pre-shaped workpiece 101' into a finished workpiece 101"**.

In some embodiments, additional finishing operations may be performed. For example, labels may be applied to containers, or containers may be filled and closed.

The process repeats as long as there are parts to be produced, or until operation of molding system 100 is interrupted, e.g. for changing or maintenance of components.

In some embodiments, components may be subjected to a cleaning process. For example, vessels 124 may be cleaned after transferring feedstock to a shaping station. Cleaning may, for example, be affected by heating of vessels to melt and drain feedstock residue, by scraping or other mechanical agitation of feedstock within vessels 124, or by a fluidized bed bath, pyrolysis, or dry ice blast cleaning. Cleaning may be performed in a buffering area or in a discrete cleaning area.

During a period in which molding system 100 is operated, process sequences may be varied, such that molding system 100 produces heterogeneous output including molded articles of multiple types. Output including multiple types of molded articles may correspond to one or more production orders. That is, a first order may call for containers of a first type to be produced in a first quantity, while a second order may call for containers of a second type to be produced in a second quantity. The two orders may be fulfilled concurrently according to systems and methods described herein. Orders (also referred to as "lots") may be as small as a single molded article.

In some configurations, molding system 100 is configured so that a single process path is available to produce a given part type. That is, containers having a given size, shape and material type may be produced by a unique combination of stations in each of dispensing cell 102, shaping cells 104, 106, and conditioning cell 108. In other examples, molding system 100 may be configured such that multiple process paths are available to produce parts of the same type. For example, a single dispensing station 102 may dispense feedstock of a particular material type and colour. That feedstock may be provided to two stations of shaping cell 104, two stations of conditioner cell 108, and two stations of shaping cell 106. That is, a single dispensing station may correspond to and feed two parallel sets of pre-shaping, conditioning and final shaping stations. The ratios of stations of shaping cell 104, conditioning cell 108 and shaping cell 106 need not be 1:1. Rather, the ratios may differ based, for example, on the length of time required for each operation. For example, if an injection molding process at cell 104 takes twice as long as a conditioning process at cell 108 or a blow molding process at cell 106, twice as many stations in cell 106 may be provided for producing a particular type of part.

As described above, transport subsystem 110 includes a guide, namely tracks 144, along which vessels 124 and workpieces are moved. Alternatively or additionally, other types of guides may be used. For example, transport subsystem 110 may include one or more conveyors such as belt conveyors. Alternatively or additionally, transport subsystem 110 may include one or more robotic devices. Such robotic devices may for example be multi-axis robots with suitable end effectors, and may be operable to transfer vessels 124 or workpieces between stations of cells 102, 104, 106, 108. In such embodiments, process paths may be defined by stations through which workpieces can be processed.

As described above, stations of dispensing cell 102 dispense doses of feedstock material into vessels 124 to define workpieces. The amount of material in each dose corresponds to the amount of material in a single preform workpiece 101' and a single final-shape workpiece 101". In other embodiments, doses of feedstock dispensed by stations of dispensing cell 102 may differ. For example, doses may comprise any multiple of the amount of material in a single preform workpiece 101' or in a single final-shape workpiece 101". In such embodiments, feedstock material in a single vessel 124 may feed multiple injection cycles at a shaping station 106. For a vessel 124 containing sufficient feedstock for two preform workpieces 101', half of the feedstock may be injected into the mold of a shaping station 106-1, 106-2, . . . **106-*n* in each of two cycles. Alternatively or additionally, one or more shaping stations may have a mold 200 with multiple molding cavities, for simultaneously producing multiple preforms. In other embodiments, feedstock doses may be slightly larger than the amount of material required to mold one or more parts. In other words, a small surplus of material may be dispensed into vessels 124, such that residual material remains in the vessel after transferring to a station of shaping cell 104**. The residual material may remain in the vessel for a subsequent filling of the vessel, or may be cleaned from the vessel.

In other embodiments, stations of dispensing cell 102 may dispense doses of a smaller quantity of material than is required to form a single preform workpiece 101' or final-shape workpiece 101". For example, a vessel 124 may receive doses of different materials from multiple stations of dispensing cell 102, such that the vessel 124 simultaneously holds multiple types of materials. The vessel 124 may then be transported to a station of a shaping cell to form a molded workpiece of composite material construction, such as multi-layered construction.

In some embodiments, vessels 124 may be sequentially delivered to a station of a shaping cell 104, 106, such that feedstock doses from multiple vessels 124 contribute to a single molded article. For example, an article of composite material construction may be formed by injection of a first material from a first vessel 124 and a second material from a second vessel 124, prior to molding.

Apparatus and methods disclosed herein may allow for relatively flexible reconfiguration. Each station of dispensing cell 102, shaping cell 104 and shaping cell 106 can be reconfigured by removal and replacement of components such as an extruder barrel 114 and screw 116, or a mold 200 or a mold 500 may be easily removed from a station and replaced with a different barrel and screw or mold. Stations of conditioning cell 108 may be reconfigured by removal and replacement of components, or by adjusting controls based on a desired thermal profile.

In some embodiments, reconfiguration of stations may be done without interrupting operation of system 100. For example, an extruder 112 may be removed while other stations of dispensing cell 102 continue to dispense feedstock. Likewise, a mold 200 or a mold 500 can be removed and replaced during operation of the other cells, and reconfiguration (e.g. physical adjustment of re-programming) of a conditioning statement may be done while other conditioning stations continue to operate.

Thus, apparatus and methods disclosed herein may provide for flexibility of production in that the plurality of process paths through dispensing cell 102, shaping cell 104, conditioning cell 108 and shaping cell 106 allow for concurrent production of many different types of articles. Moreover, some or all stations of the cells may be changed or reconfigured without interruption of production, which further increases the variety of articles that may be produced during a production run.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

The term "comprise", including any variation thereof, is intended to be open-ended and means "include, but not limited to," unless otherwise specifically indicated to the contrary.

When a set of possibilities or list of items is given herein with an "or" before the last item, any one of the listed items or any suitable combination of two or more of the listed items may be selected and used.

The above described embodiments are intended to be illustrative only. Modifications are possible, such as modifications of form, arrangement of parts, details and order of operation. The examples detailed herein are not intended to be limiting of the invention. Rather, the invention is defined by the claims.

What is claimed is:

1. An apparatus for transporting molten molding material, comprising:

a vessel having an internal cavity for receiving said molten molding material through an orifice and preventing flow of said material during transport;

a coupling assembly defining an orifice for transfer of molding material with a processing station, said coupling assembly having a locating surface configured to matingly engage a corresponding locating feature of a processing station to thereby align said orifice with said processing station to transfer molding material;

a displacement member received in said cavity and extendable into said cavity to displace said molten molding material out of said vessel; and a thermal regulating assembly on said vessel for controlling a thermal profile of said molten molding material, wherein said thermal regulating assembly comprises a heat sink.

2. The apparatus of claim 1, wherein said displacement member comprises a piston received in the cavity.

3. The apparatus of claim 1, wherein said orifice is for receiving said molding material from a melter, and said coupling assembly comprises a seal assembly for selectively sealing said orifice.

4. The apparatus of claim 1, wherein said orifice is a filling orifice for mating to a melter to receive said molten molding material, and an ejection orifice for mating to a mold to force said molten molding material from said vessel into said mold.

5. The apparatus of claim 1, wherein said thermal regulating assembly comprises an insulator.

6. The apparatus of claim 1, wherein said thermal regulating assembly includes a heating element.

7. The apparatus of claim 1, wherein said coupling assembly comprises a movable seal assembly for selectively sealing said orifice.

8. The apparatus of claim 7, wherein said seal assembly includes a valve stem.

9. The apparatus of claim 8, wherein said valve stem extends along an axis of said vessel, within said internal cavity.

10. The apparatus of claim 7, wherein said seal assembly comprises a sliding gate.

11. The apparatus of claim 1, wherein said vessel comprises a handling feature for releasably securing said vessel to a transport device, for movement of said vessel relative to said processing station.

12. The apparatus of claim 11, wherein said transport device comprises a guide and said handling feature comprises an adapter configured to engage said vessel and said guide.

13. The apparatus of claim 12, wherein said coupling assembly is part of said adapter.

14. The apparatus of claim 1, wherein the vessel comprises a barrel and a tip, the tip fits over and seals with an end portion of the barrel and the barrel and the tip cooperate to define the inner cavity.

15. The apparatus of claim 14, wherein the barrel and tip may be formed of different materials.

16. The apparatus of claim 14, wherein the thermal regulating assembly is positioned over at least a portion of the barrel and the tip.

17. The apparatus of claim 14, wherein the thermal regulating assembly includes a metallic sleeve and a heating coil.

18. The apparatus of claim 14, wherein the thermal regulating assembly includes a sleeve, wherein the sleeve is a thermal insulator and inhibits heat loss through underlying surfaces of the barrel and the tip.

19. The apparatus of claim 14, wherein the thermal regulating assembly includes a sleeve, the sleeve is a heat sink, such that it tends to promote heat transfer out of molding material within cavity.

20. An apparatus for transferring a flowable molding material between a container having an internal cavity for holding flowable molding material and a processing station, comprising:

a holder for supporting said container, said holder comprising a nest configured to matingly receive said container;

a coupling device for selectively engaging said container with the processing station, by mating locating surfaces of said container and said processing station, to thereby establish a flow path for said flowable molding material between said container and said processing station; and a flow actuator for causing flow of said flowable molding material through said flow path;

wherein said nest comprises an interlocking feature for maintaining a position of said container.

21. The apparatus of claim 20, wherein said apparatus comprises a locking actuator for biasing said container against said interlocking feature.

22. The apparatus of claim 20, wherein said apparatus comprises a seal actuator for operating a seal of said container.

23. The apparatus of claim 22, wherein said apparatus comprises a locking actuator for biasing said container against said interlocking feature and wherein said seal actuator is in a nested relationship with one or more of said flow actuator and said locking actuator.

24. The apparatus of claim 20, wherein said holder comprises a triggering structure for releasing a seal of said container.

25. The apparatus of claim 24, wherein said triggering structure comprises a guide and said releasing a seal comprises receiving a locking projection in said guide and moving said locking projection as it traverses said guide.

26. The apparatus of claim 20, wherein said processing station comprises a dispensing station for transferring said flowable molding material to said container.

27. The apparatus of claim 20, wherein said processing station comprises an injection molding station and said flow actuator is operable to force said flowable molding material from said container to a mold of said injection molding station by displacement of a piston.

* * * * *